US008554582B2

(12) United States Patent
Ikeda

(10) Patent No.: US 8,554,582 B2
(45) Date of Patent: Oct. 8, 2013

(54) DATA MANAGEMENT APPARATUS AND METHOD THEREOF

(75) Inventor: Mitsuyuki Ikeda, Osaka (JP)

(73) Assignee: Nissay Information Technology Co., Ltd., Tokyo (JP)

( * ) Notice: Subject to any disclaimer, the term of this patent is extended or adjusted under 35 U.S.C. 154(b) by 411 days.

(21) Appl. No.: 11/576,999

(22) PCT Filed: Oct. 12, 2005

(86) PCT No.: PCT/JP2005/018808
§ 371 (c)(1),
(2), (4) Date: Sep. 24, 2007

(87) PCT Pub. No.: WO2006/041104
PCT Pub. Date: Apr. 20, 2006

(65) Prior Publication Data
US 2008/0016099 A1    Jan. 17, 2008

(30) Foreign Application Priority Data
Oct. 13, 2004 (JP) ................................ 2004-299055

(51) Int. Cl.
*G06Q 40/00* (2012.01)
(52) U.S. Cl.
USPC ..................................... 705/4; 705/3; 705/2
(58) Field of Classification Search
USPC ............. 705/4, 3, 2; 707/999.107; 463/25, 29
See application file for complete search history.

(56) References Cited

U.S. PATENT DOCUMENTS

| 6,191,792 B1 | 2/2001 | Iizuka et al. |
| 6,199,111 B1 | 3/2001 | Hara et al. |
| 2002/0107859 A1 | 8/2002 | Tsuyuki |
| 2004/0103011 A1* | 5/2004 | Hatano et al. ............ 705/4 |
| 2005/0203777 A1* | 9/2005 | Rosenfeld et al. ........ 705/3 |

FOREIGN PATENT DOCUMENTS

| JP | 1-029928 | 1/1989 |
| JP | 1064044 | 3/1989 |
| JP | 5-197534 | 8/1993 |
| JP | 6-139130 | 5/1994 |

(Continued)

OTHER PUBLICATIONS

Nishimura/Uemura "Introduction to COBOL" OHMU Publishing, Apr. 1, 1993, pp. 143-145.
International Search Report (including translation) for International (PCT) Application No. PCT/JP2005/018808, mailed Apr. 26, 2007.
Written Opinion (including translation) for International (PCT) Application No. PCT/JP2005/018808, mailed Apr. 26, 2007.

(Continued)

*Primary Examiner* — Behrang Badii
(74) *Attorney, Agent, or Firm* — Jason H. Vick; Sheridan Ross, PC

(57) ABSTRACT

The present invention provides a data management apparatus (i-Win (trademark)) which carries out centralized management of data containing data on each product during the management of product data having different data items to be handled and which has increased maintenance-ability in system and program(s).
A data storage part 13 stores transaction data (contract data) including class ID (logic key) and data contents ID (variable). A data definition part 17 records data contents IDs and data contents (clause data) for each clause ID. A data processing means 15 acquires combination data of a data contents ID and data content from the data definition part 17 (definition body) in accordance with a class ID recorded in the data storage part 13 and performs processing which relates to data contents of a predetermined data item (contract condition). In this way, centralized management of plurality of product data having different product features from its clause and prospectus and the like can be carried out.

5 Claims, 99 Drawing Sheets

1: DATA MANAGEMENT APPARATUS

(56) References Cited

FOREIGN PATENT DOCUMENTS

| JP | 6-236315 | 8/1994 |
|---|---|---|
| JP | 8-272804 | 10/1996 |
| JP | 8-329142 | 12/1996 |
| JP | 9-185542 | 7/1997 |
| JP | 3489326 | 10/1997 |
| JP | 10-283248 | 10/1998 |
| JP | 10-301911 | 11/1998 |
| JP | 10-334160 | 12/1998 |
| JP | 11-073431 | 3/1999 |
| JP | 11-143749 | 5/1999 |
| JP | 11-249952 | 9/1999 |
| JP | 11-265395 | 9/1999 |
| JP | 2000-123038 | 4/2000 |
| JP | 2000-137735 | 5/2000 |
| JP | 2000-215063 | 8/2000 |
| JP | 2000-271826 | 10/2000 |
| JP | 2000-322463 | 11/2000 |
| JP | 2001-195297 | 7/2001 |
| JP | 2002-163134 | 6/2002 |
| JP | 2003-108429 | 4/2003 |
| JP | 2003-150644 | 5/2003 |
| JP | 2003-228686 | 8/2003 |
| JP | 2004-185270 | 7/2004 |

OTHER PUBLICATIONS

International Preliminary Report on Patentability (including translation) for International (PCT) Application No. PCT/JP2005/018808, mailed Apr. 26, 2007.
Notification of Reason for Refusal for Japanese Patent Application No. 2006-540955, dated Jul. 6, 2009 (English Translation).
Notification of Reason(s) for Refusal for Japanese Patent Application No. 2006-540955, issued Jan. 4, 2010 (including English translation).
Official Action (including translation) for Chinese Patent Application No. 200580035135.0, dated Aug. 11, 2010.
Official Action (including translation) for Chinese Patent Application No. 200580035135.0, issued Jul. 23, 2012.
First Examination Report for Indian Patent Application No. 1341/KOLNP/2007, dated Aug. 27, 2012.
Official Action (including translation) for Chinese Patent Application No. 200580035135.0, dated Dec. 31, 2011.
Official Action (including translation) for Chinese Patent Application No. 200580035135.0, issued Jan. 7, 2013.
Examination Report for Corresponding Indian Patent Application No. 1341/KOLNP/2007, dated May 31, 2013.

* cited by examiner

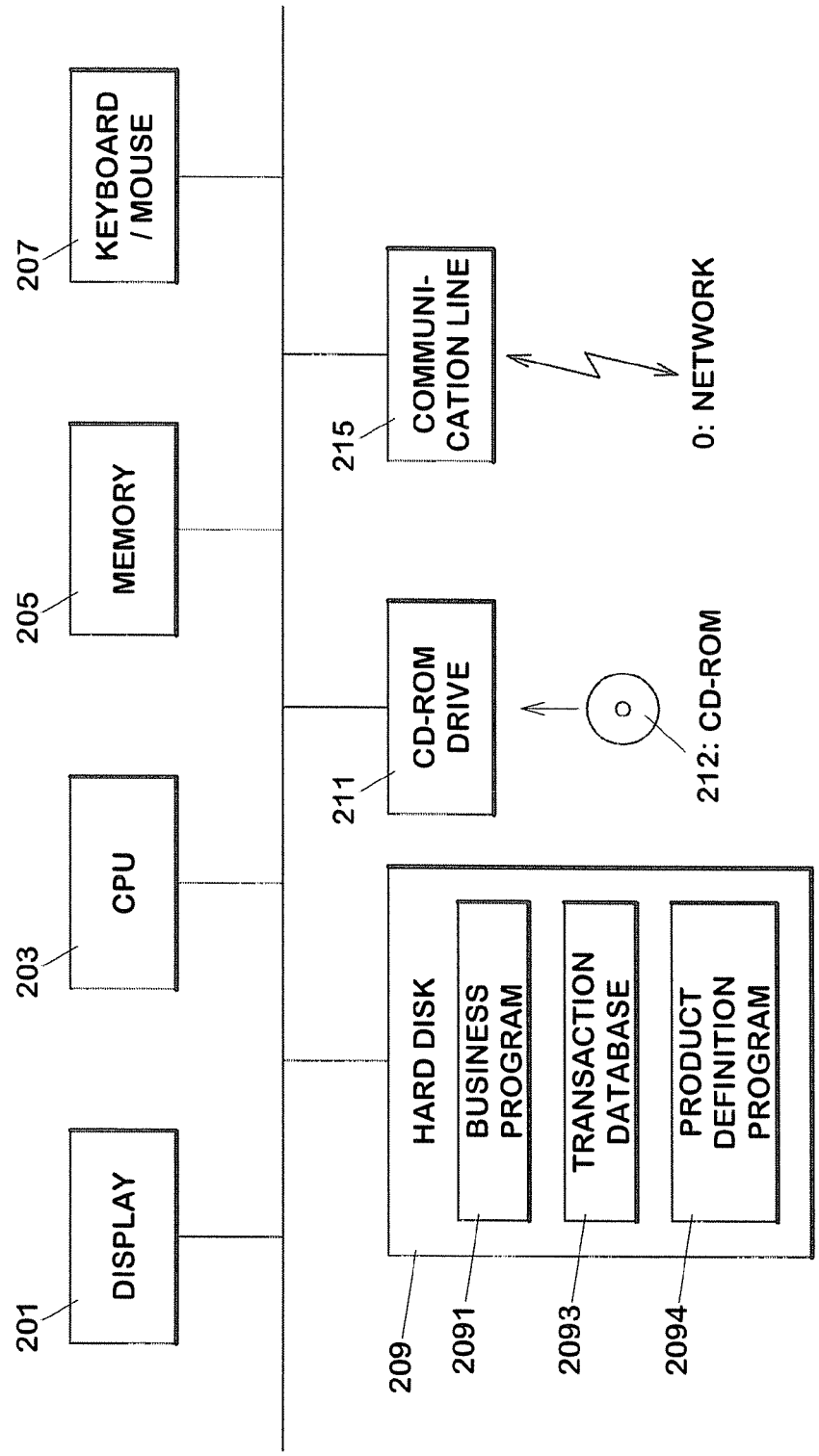
FIG.2 HARDWARE STRUCTURE DIAGRAM OF DATA MANAGEMENT APPARATUS

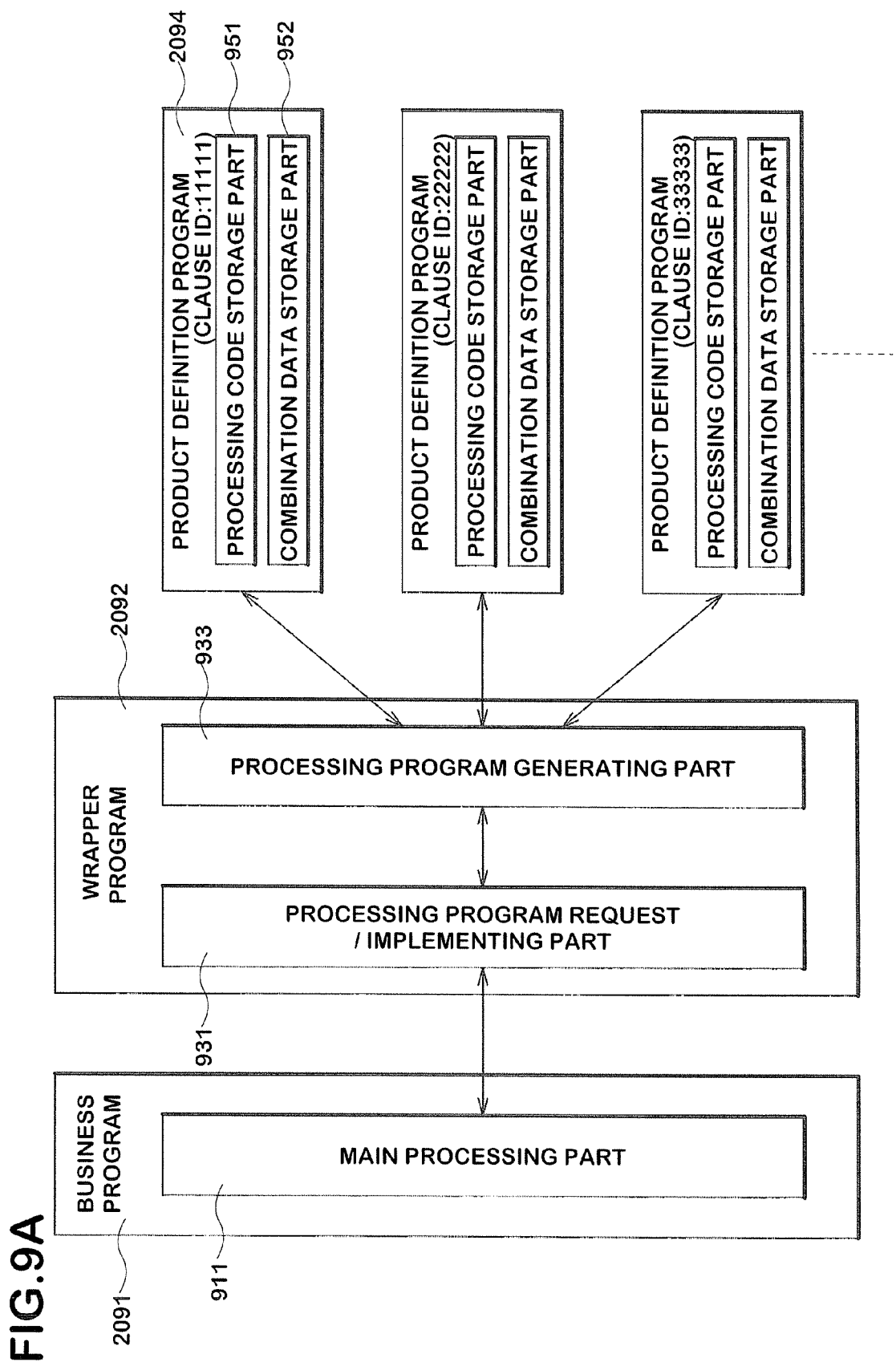

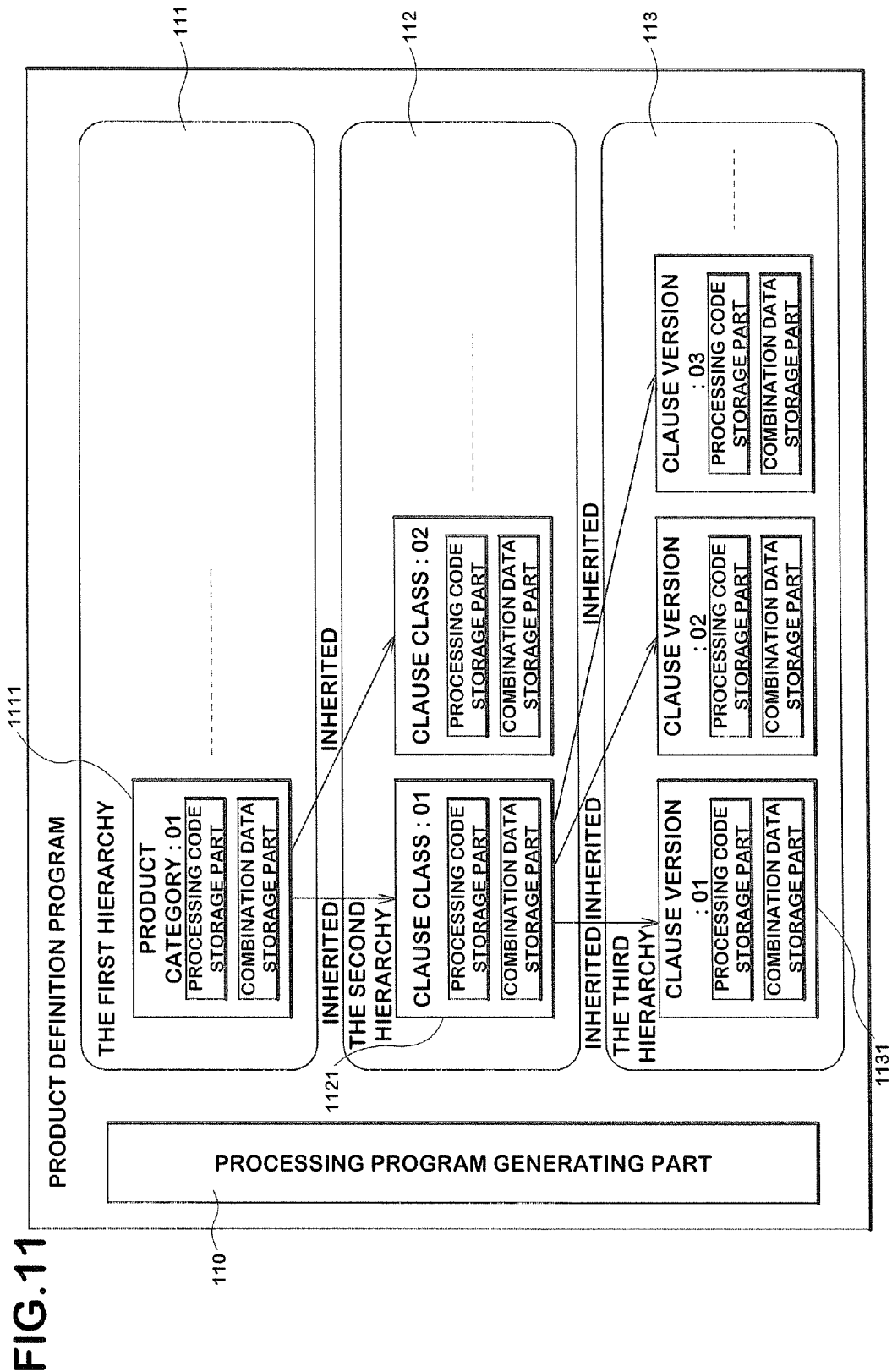

FIG.12

| | INDUSTRY | MANAGEMENT DATA | DATA CLASS | DATA ITEMS |
|---|---|---|---|---|
| 121 → | LIFE INSURANCE | INSURANCE CONTRACT | LIFE INSURANCE | ANNUITY CLASS, ANNUITY PAYMENT PERIOD |
| 122 → | BANK | LOAN SETTLEMENT | WHOLE LIFE INSURANCE | STEP PAYMENT PERIOD, STEP PAYMENT RATIO |
| | | | MORTGAGE LOAN | REQUIREMENT OF JOIN GROUP CREDIT LIFE INSURANCE |
| | | | CAR LOAN | AVAILABILITY OF NO-CLAIM BONUS |
| 123 → | BANK | CONTRACT IN DEPOSIT | FIXED DEPOSIT | PRIVILEGED ITEMS |
| | | | LARGE-TIME DEPOSIT | FLOOR RATE |
| 124 → | BANK | DERIVATIVE CONTRACT | INTEREST-RATE SWAP | CLASS OF APPLIED INTEREST-RATE, CLASS OF TARGET APPLIED INTEREST-RATE |
| | | | OPTION | STRIKE RATE |
| 125 → | SECURITIES | SECURITIES TRADING CONTRACT | STOCK INVESTMENT FUND | STOCK RATIO |
| | | | REAL-ESTATE INVESTMENT FUND | REAL-ESTATE APPRAISAL |
| 126 → | MANUFACTURE | PRODUCT INFORMATION | SEDAN | OPTIONS |
| | | | STATION WAGON | COMBINATION OF BODY COLORS |
| 127 → | FOOD | FOOD INFORMATION | AGRICULTURAL PRODUCTS | MATERIALS COUNTRY OF ORIGIN |
| | | | SUPPLEMENT FOODS | NUMBER OF SPECIFIED HEALTH FOOD |

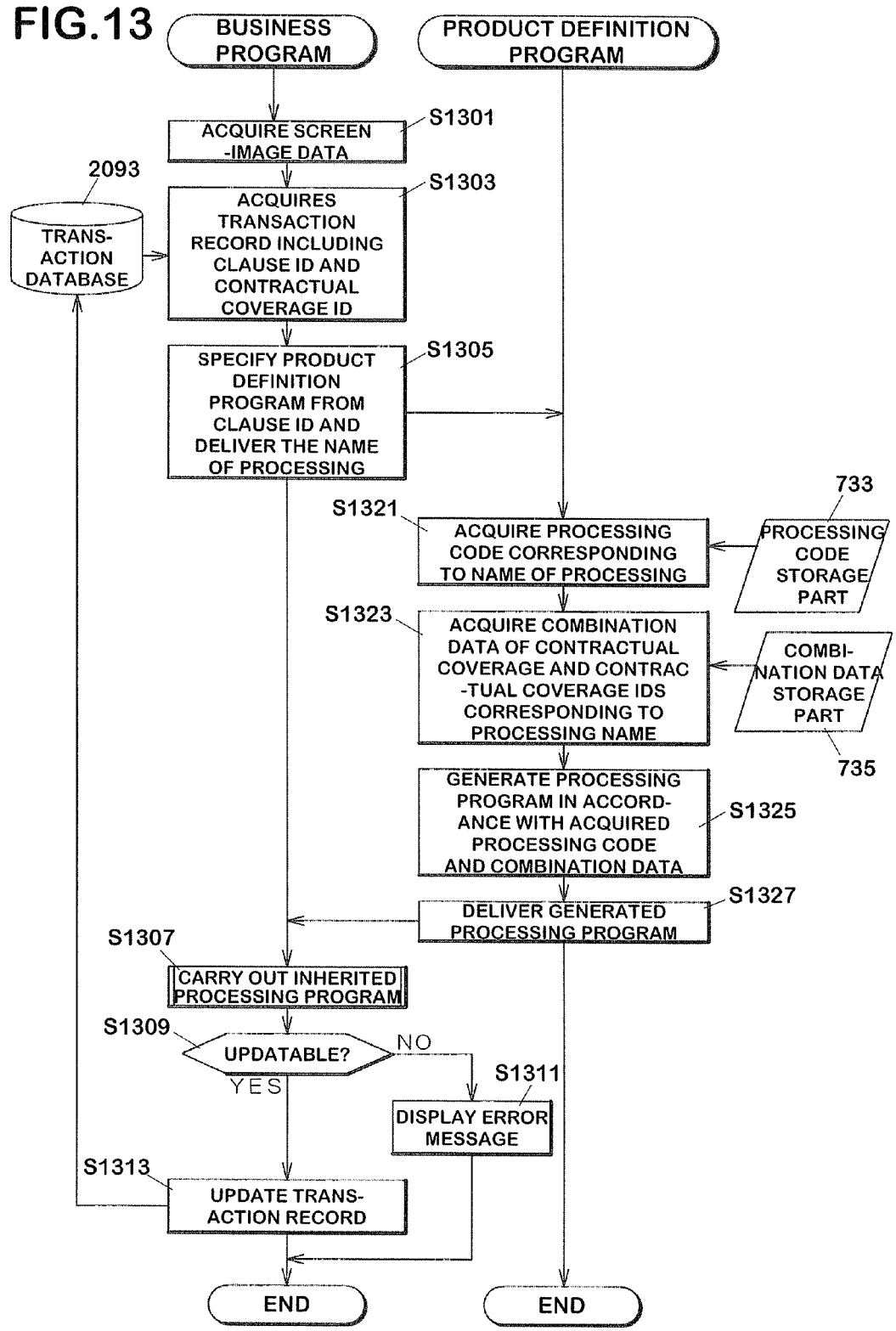

PROCESSING PROGRAM(ANNUITY CLASS SET-UP)

COMBINATION DATA: ANNUITY CLASS

| CONTRACTUAL COVERAGE ID | CONTRACTUAL COVERAGE |
|---|---|
| 01 | ANNUITY CERTAIN |
| 02 | WHOLE LIFE ANNUITY WITH GUARANTEED INSTALLMENT |

173

PROCESSING PROGRAM (PAYMENT PERIOD SET-UP)

COMBINATION DATA : PAYMENT PERIOD

| CONTRACTUAL COVERAGE ID | CONTRACTUAL COVERAGE |
|---|---|
| 01 | WHOLE LIFE |
| 02 | 5 YEARS |
| 03 | 10 YEARS |
| 04 | 15 YEARS |
| 05 | 20 YEARS |

175

PROCESSING CODE(CORRELATION CHECK [ANNUITY CLASS: PAYMENT PERIOD])

CHECK DATA (ANNUITY CLASS: PAYMENT PERIOD)

| ANNUITY CLASS | PAYMENT PERIOD |
|---|---|
| 02 (WHOLE LIFE ANNUITY WITH GUARANTEED INSTALLMENT) | 01 (WHOLE LIFE) |
| 01 (ANNUITY CERTAIN) | 02 (5 YEARS) |
| 01 (ANNUITY CERTAIN) | 03 (10 YEARS) |
| 01 (ANNUITY CERTAIN) | 04 (15 YEARS) |
| 01 (ANNUITY CERTAIN) | 05 (20 YEARS) |

FIG.18    CONVENTIONAL ART (1)

A. TRANSACTION DATA

| POLICY NUMBER | PREMIUMS | CLAUSE CODE | INSURANCE PERIOD | TYPE | |
|---|---|---|---|---|---|
| 00001 | 10000 | WHOLE LIFE | 0001 | 001 | |
| 00002 | 20000 | 10 YEARS | 0002 | 001 | |
| 00003 | 30000 | WHOLE LIFE | 0001 | 002 | |
| | | | | | |

B. WHOLE LIFE INSURANCE TABLE (CLAUSE CODE: 0001)

| TYPE | STEP PAYMENT PERIOD | STEP PAYMENT RATIO |
|---|---|---|
| 001 | 10 YEARS | 1.3 TIMES |
| 002 | 15 YEARS | 1.5 TIMES |
| | | |

C. ANNUITY INSURANCE TABLE (CLAUSE CODE: 0002)

| TYPE | ANNUITY CLASS | ANNUITY PAYMENT PERIOD |
|---|---|---|
| 001 | ANNUITY CERTAIN | 10 YEARS |
| 002 | ANNUITY CERTAIN | 15 YEARS |
| 003 | WHOLE LIFE ANNUITY WITH GUARANTEED INSTALLMENT | WHOLE LIFE |
| | | |

D. RESCHEDULED INTEREST-RATE SENSITIVE ANNUITY INSURANCE ANNUITY TABLE (CLAUSE CODE: 0003)

| TYPE | ANNUITY CLASS | ANNUITY PAYMENT PERIOD | RATIO REVIEW PERIOD |
|---|---|---|---|
| 001 | ANNUITY CERTAIN | 10 YEARS | REVIEW EVERY 5 YEARS |
| 002 | ANNUITY CERTAIN | 10 YEARS | REVIEW EVERY 10 YEARS |
| 003 | ANNUITY CERTAIN | 15 YEARS | REVIEW EVERY 5 YEARS |
| 004 | ANNUITY CERTAIN | 15 YEARS | REVIEW EVERY 10 YEARS |
| 005 | WHOLE LIFE ANNUITY WITH GUARANTEED INSTALLMENT | WHOLE LIFE | REVIEW EVERY 5 YEARS |
| 006 | WHOLE LIFE ANNUITY WITH GUARANTEED INSTALLMENT | WHOLE LIFE | REVIEW EVERY 10 YEARS |
| | | | |

FIG. 19    CONVENTIONAL ART (2)

A. TRANSACTION DATA

| POLICY NUMBER (1901) | PREMIUMS (1902) | CLAUSE CODE (1903) | INSURANCE PERIOD (1904) | FREE DEFINITION ITEMS (FILLER) (1905) |
|---|---|---|---|---|
| 00001 | 10000 | WHOLE LIFE | 0001 | 1013 (10 YEARS/1.3 TIMES) |
| 00002 | 20000 | 10 YEARS | 0002 | KN10 (ANNUITY CERTAIN/ 10 YEARS) |
| 00003 | 30000 | WHOLE LIFE | 0001 | 1515 (15 YEARS/1.5 TIMES) |

B. RE-DEFINITION IMAGE (COBOL)

```
01 TRANSACTION DATA
    03 CERTIFICATION_NUMBER                               X(05).
    03 PREMIUMS                                           9(09).
    03 INSURANCE_PERIOD                                   X(08).
    03 CLAUSE_CODE                                        X(03).
    03 FREE_DEFINITION_ITEMS
        05 FILLER                                         X(100).
    03 FILLER REDEFINES FREE_DEFINITION_ITEMS
        05 WHOLE_LIFE_INSURANCE_STEP PAYMENT_PERIOD       X(02).  ⎫
        05 WHOLE_LIFE_INSURANCE_STEP PAYMENT_RATIO        X(02).  ⎬ 1911
        05 VACANT_AREA                                    X(96).  ⎭
    03 FILLER REDEFINES FREE_DEFINITION_ITEMS
        05 ANNUITY_INSURANCE_ANNUITY_CLASS                X(02).  ⎫
        05 ANNUITY_INSURANCE_ANNUITY PAYMENT_PERIOD       X(02).  ⎬ 1912
        05 VACANT_AREA                                    X(96).  ⎭
    03 FILLER REDEFINES FREE_DEFINITION_ITEMS
        05 RESCHEDULED_INTEREST-RATE_SENSITIVE_ANNUITY    X(02).  ⎫
           _INSURANCE_ANNUITY_CLASS                               ⎪
        05 RESCHEDULED_INTEREST-RATE_SENSITIVE_ANNUITY    X(02).  ⎪
           _INSURANCE_ANNUITY_PAYMENT_PERIOD                      ⎬ 1913
        05 RESCHEDULED_INTEREST-RATE_SENSITIVE_ANNUITY    X(02).  ⎪
           _INSURANCE_INTEREST_RATE_REVIEW_PERIOD                 ⎪
        05 VACANT_AREA                                    X(94).  ⎭
```

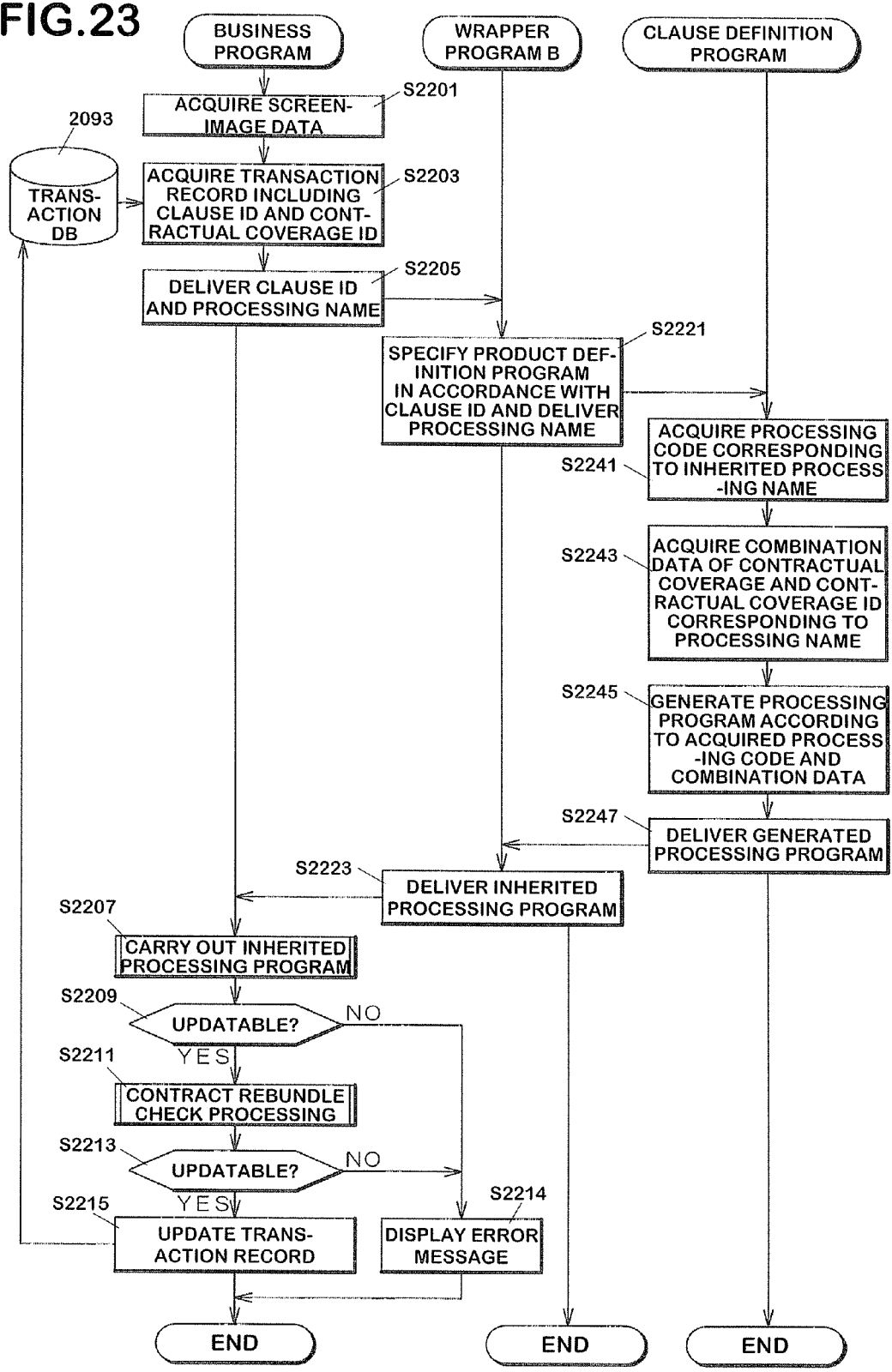

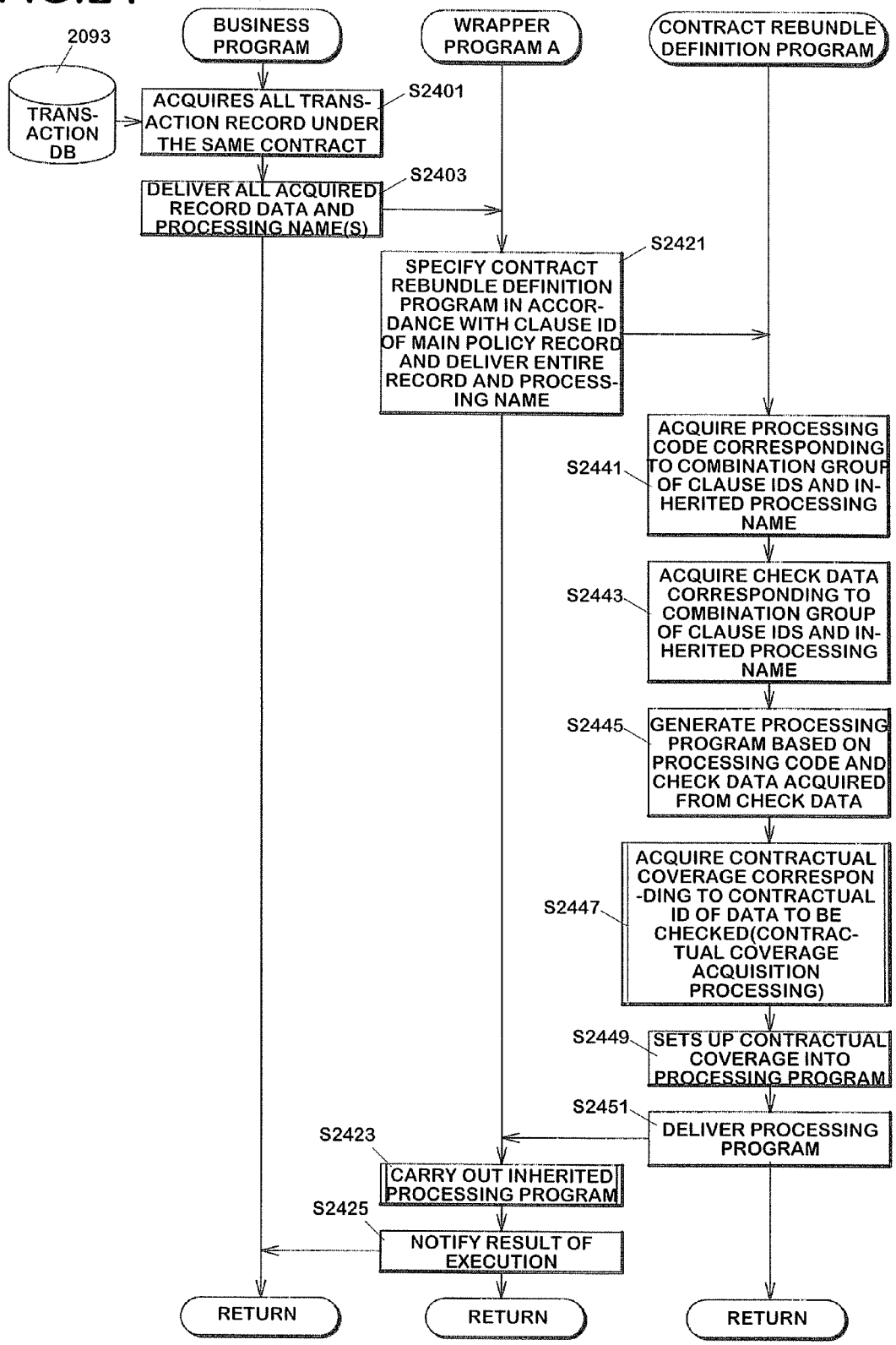
FIG.24 CONTRACT REBUNDLE CHECK PROCESSING

CONTRACT REBUNDLE CHECK PROCESSING

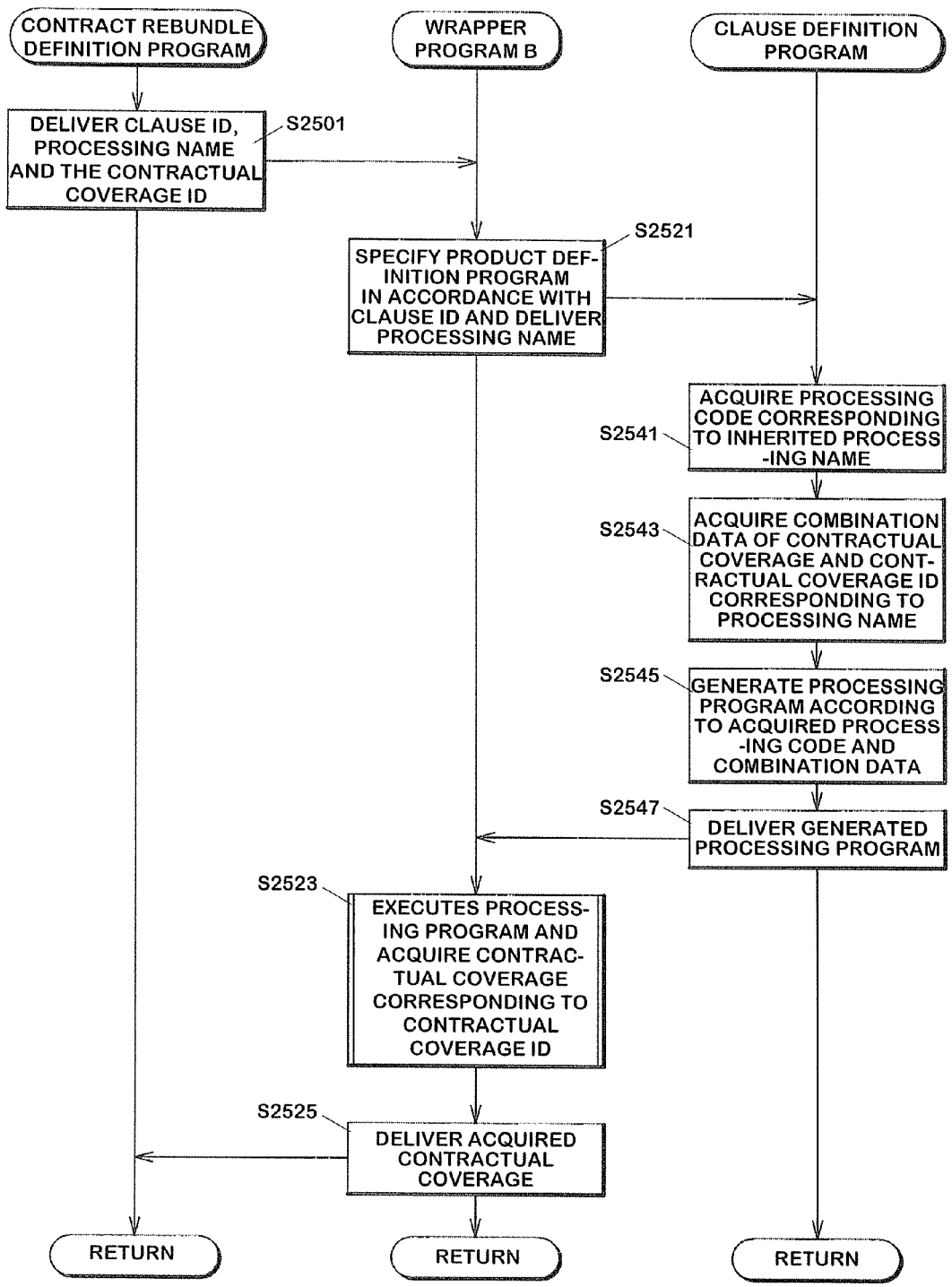

PROCESSING PROGRAM OF CONTRACT REBUNDLE CHECK PROCESSING

PROCESSING PROGRAM OF CONTRACT REBUNDLE CHECK PROCESSING

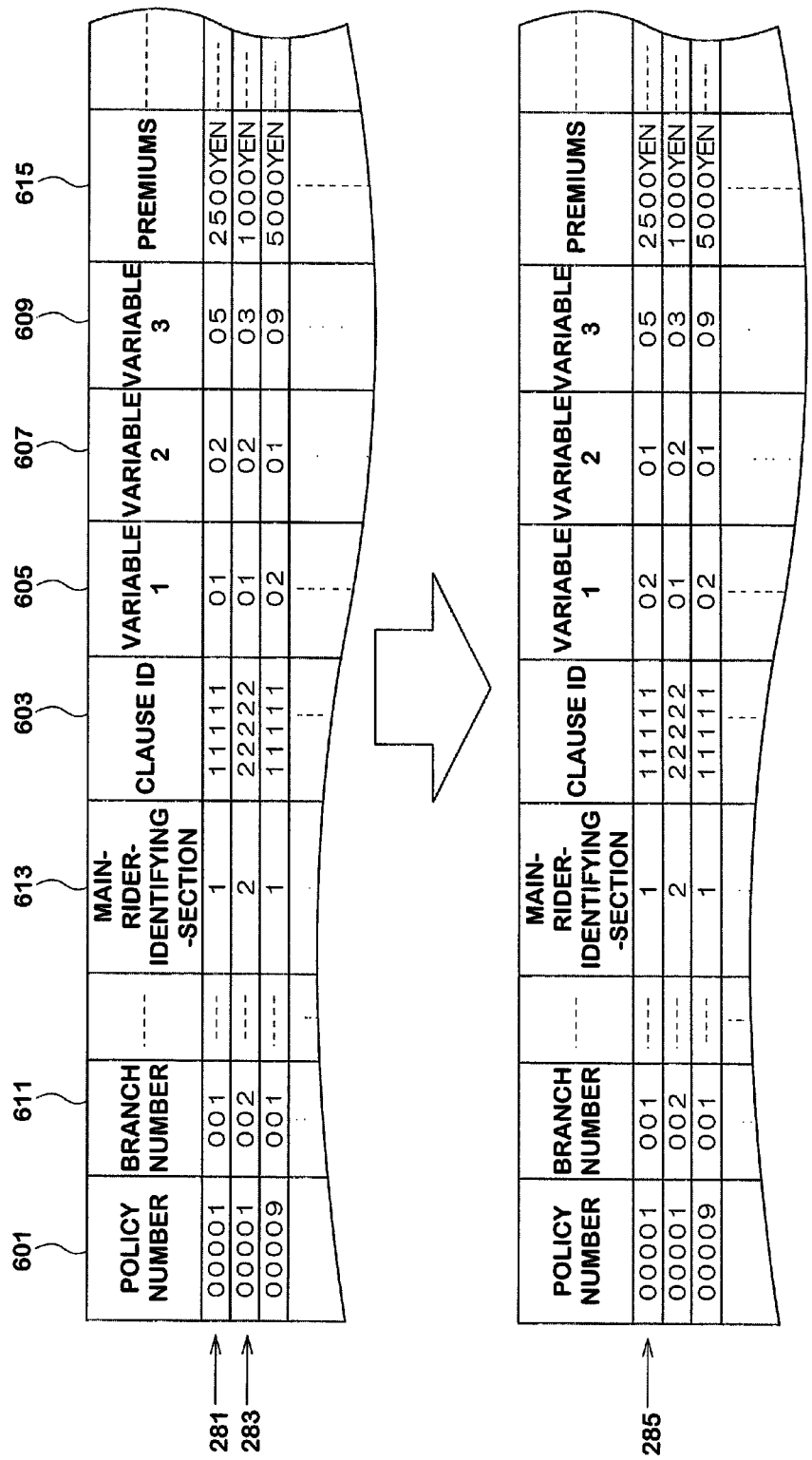

PROCESSING PROGRAM:
CONTRACT REBUNDLE CHECK OF PAYMENT PERIOD- ANNUITY CLASS

CHECK DATA:
CONTRACT REBUNDLE CHECK OF PAYMENT PERIOD- ANNUITY CLASS

| ANNUITY CLASS | PAYMENT PERIOD |
|---|---|
| WHOLE LIFE ANNUITY WITH GUARANTEED INSTALLMENT | WHOLE LIFE |

PROCESSING PROGRAM:
CONTRACT REBUNDLE CHECK OF PAYMENT PERIOD- ANNUITY CLASS

2931

DATA TO BE CHECKED:
CONTRACT REBUNDLE CHECK OF PAYMENT PERIOD- ANNUITY CLASS

| ANNUITY CLASS | PAYMENT PERIOD |
|---|---|
| WHOLE LIFE ANNUITY WITH GUARANTEED INSTALLMENT | WHOLE LIFE |

2933

CHECK DATA:
CONTRACT REBUNDLE CHECK OF PAYMENT PERIOD- ANNUITY CLASS

| ANNUITY CLASS | PAYMENT PERIOD |
|---|---|
| WHOLE LIFE ANNUITY WITH GUARANTEED INSTALLMENT | WHOLE LIFE |

WORK RECORD

| POLICY NUMBER | BRANCH NUMBER | CLAUSE ID | VARIABLE 1 | VARIABLE 2 | VARIABLE 3 | ... | MAIN CLAUSE ID | CONTRACT DATE | RESPONSIBILITY START DATE | ... |
|---|---|---|---|---|---|---|---|---|---|---|
| 00003 | 003 | 55555 | 01 | 01 | 05 | ... | 00005 | | SEPTEMBER 27TH, 2005 | ... |

3501

| POLICY NUMBER | BRANCH NUMBER | CLAUSE ID | VARIABLE 1 | VARIABLE 2 | VARIABLE 3 | ... | MAIN CLAUSE ID | CONTRACT DATE | RESPONSIBILITY START DATE | ... |
|---|---|---|---|---|---|---|---|---|---|---|
| 00003 | 003 | 55555 | 01 | 01 | 05 | ... | 00005 | OCTOBER 1ST, 2005 | SEPTEMBER 27TH, 2005 | ... |

3503

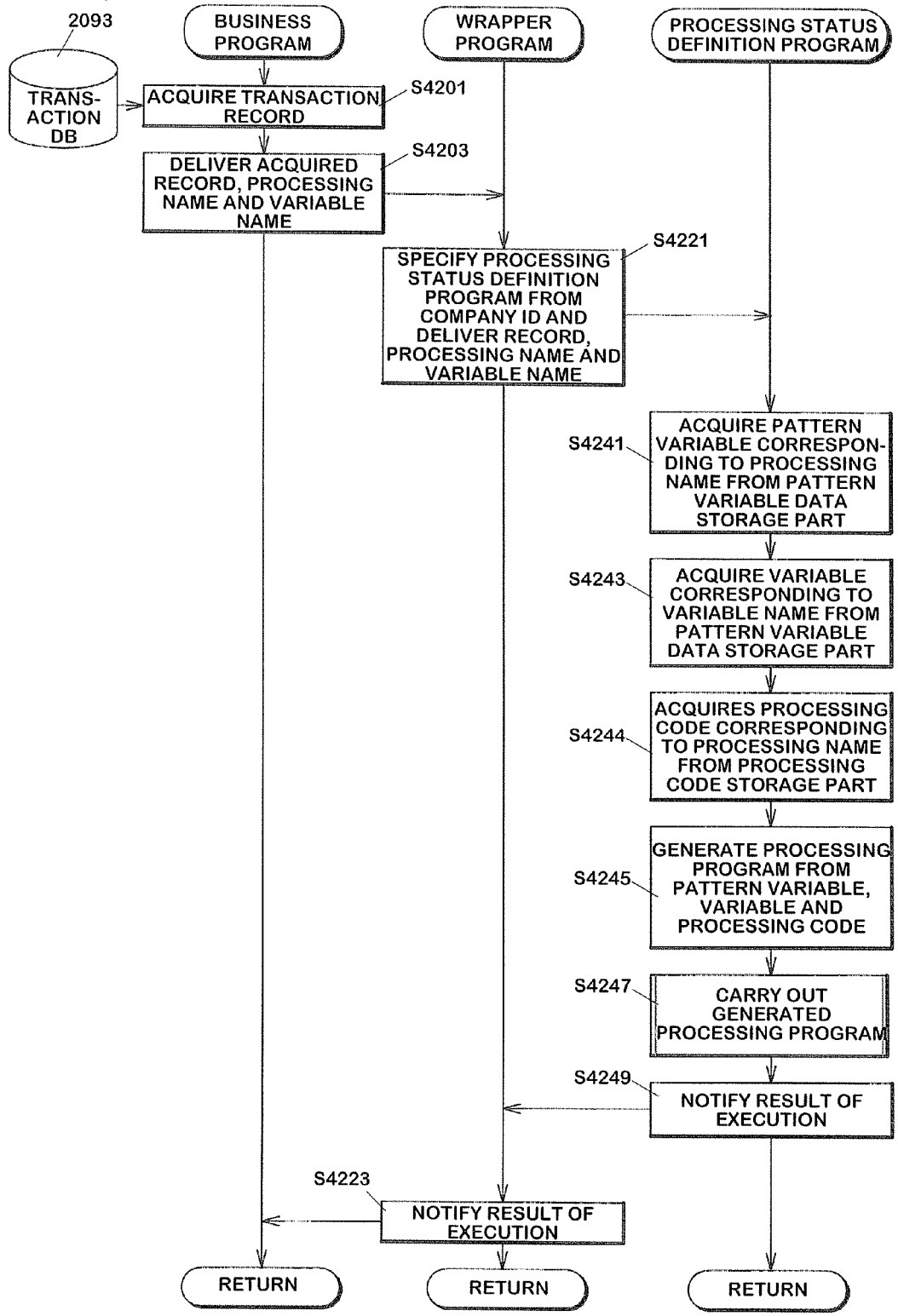
FIG.42 EXECUTE PATTERN VARIABLE SET-UP PROCESSING

FIG.45A

PROCESSING PROGRAM:
PRESERVATION SECTIONS REQUESTING SPECIAL ATTENTION ACQUISITION — 451a

PATTERN VARIABLE DATA

| PATTERN VARIABLE | PATTERN VARIABLE NAME | VARIABLE | VARIABLE NAME |
|---|---|---|---|
| 002 | PRESERVATION SECTION REQUESTING SPECIAL ATTENTION | 01 | ERROR IN PRESERVATION |
| | | 02 | WARNING ON PRESERVATION |
| | | 99 | LIFTING OF SPECIAL ATTENTION |

| POLICY NUMBER | ... | COMPANY ID | PATTERN VARIABLE1 | DATA 1 | ... | PATTERN VARIABLE2 | DATA 2 | ... | PATTERN VARIABLE3 | DATA 3 | ... |
|---|---|---|---|---|---|---|---|---|---|---|---|
| 00001 | ... | 01 | 002 | 2005/09/01 | ... | 010 | ¥100,000 | ... | 100 | ...CHUOU-KU, OSAKA CITY | ... |

601 — 630 — 651 — 652 — 653 — 654 — 655 — 656

4701 →

DATA 1 ← RATE REFERENCE DATE
DATA 2 ← ACCUMULATED AMOUNT
DATA 3 ← ADDRESS

PATTERN VARIABLE NAME ACQUISITION PROCESSING

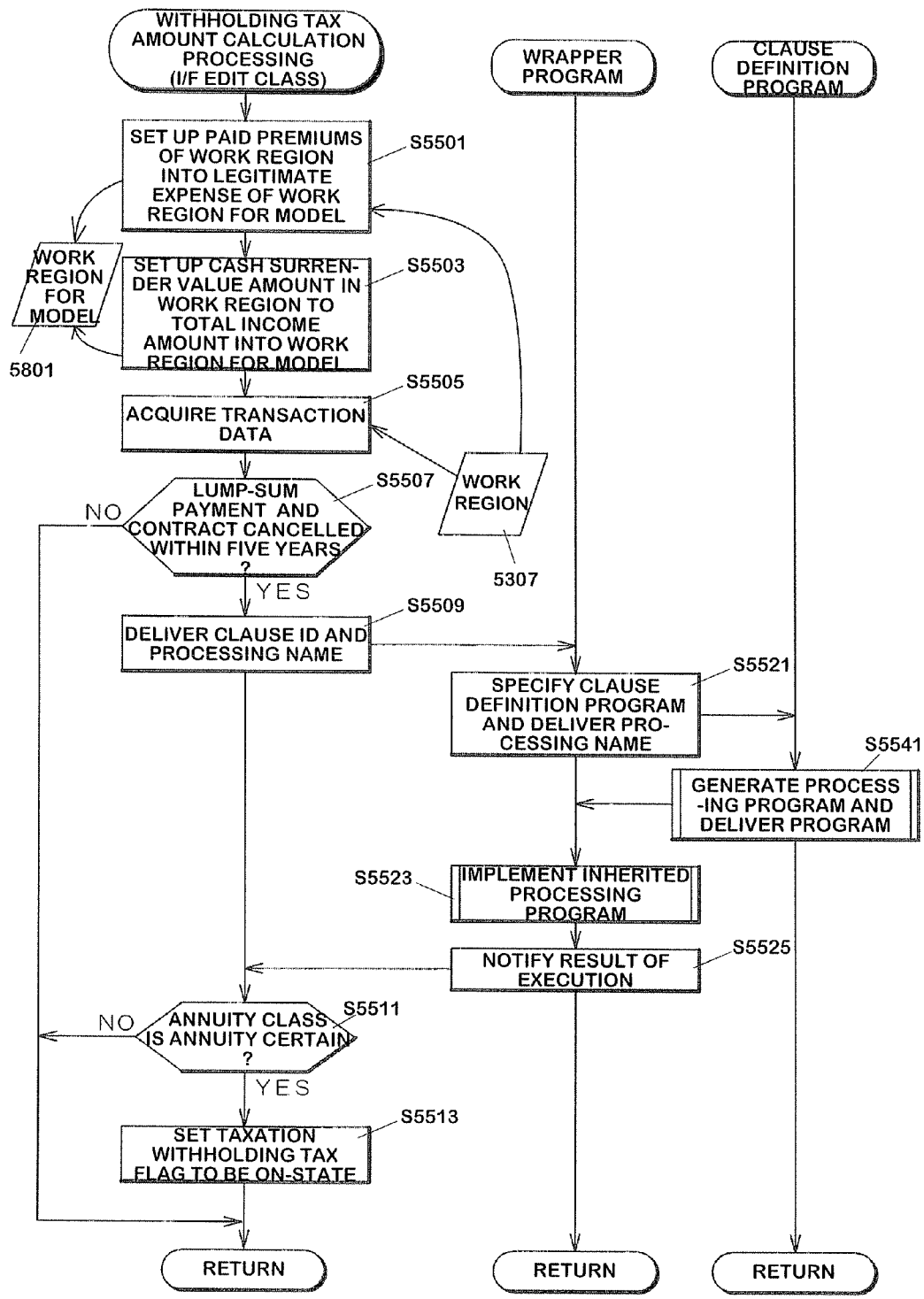
FIG. 56 WITHHOLDING TAX AMOUNT CALCULATION PROCESSING

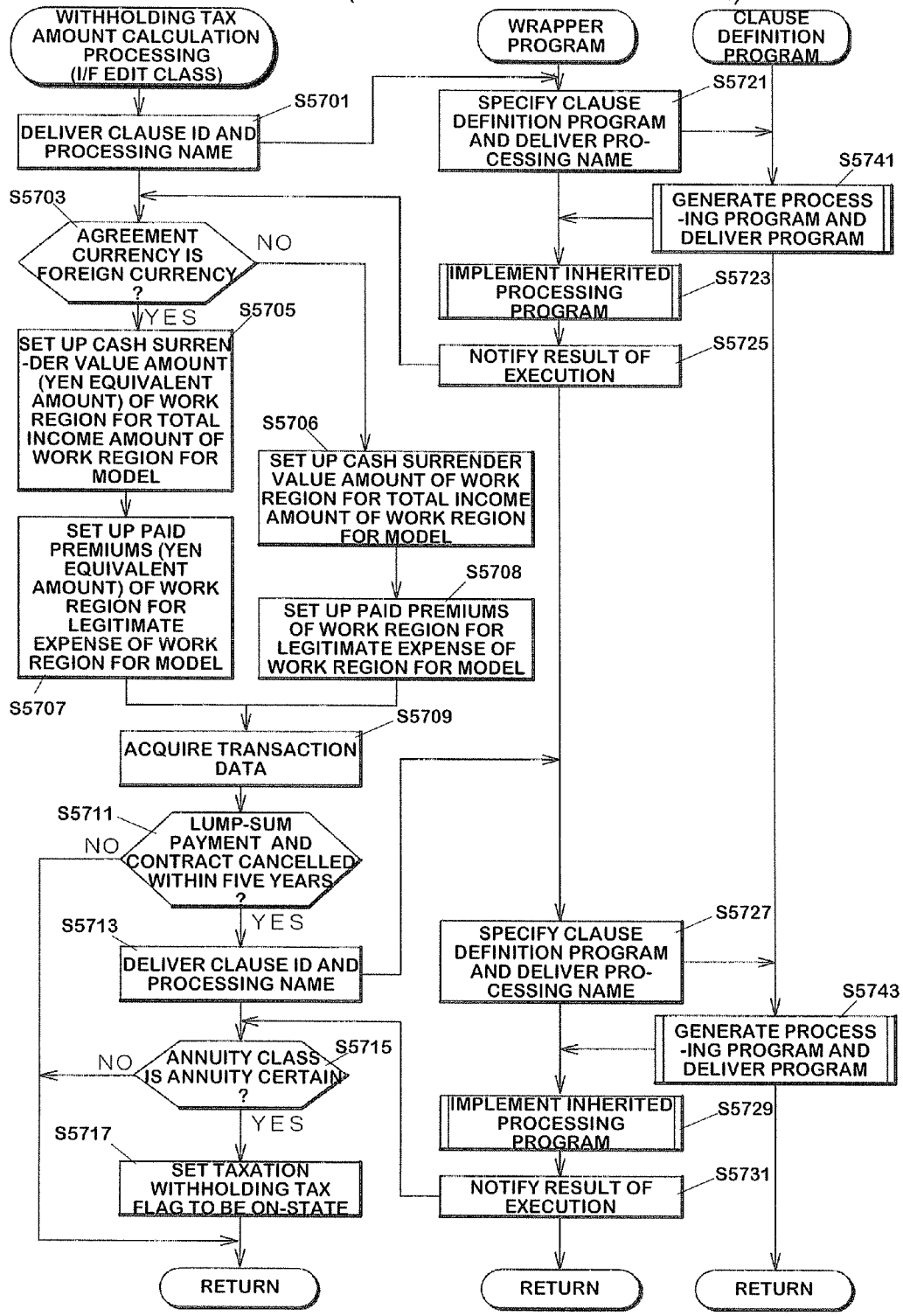

FIG.58

5307: WORK REGION

| WORK RECORD | | | SCREEN-INPUT DATA | | CALCULATION RESULT DATA | | |
|---|---|---|---|---|---|---|---|
| POLICY NUMBER | CLAUSE ID | VARIABLE 1 | POLICY NUMBER | CANCELLATION DATE | CASH SURRENDER VALUE AMOUNT | PAID PREMIUMS | WITHHOLDING TAX AMOUNT |
| 00001 | 55555 | 01 | 00001 | OCTOBER 1ST 2005 | ¥100,000 | ¥80,000 | ¥4,000 |

5811  5813  5815  5821  5823  5831  5833  5839

5801 →

5891: WORK REGION FOR MODEL

| INPUT DATA | | | OUTPUT DATA |
|---|---|---|---|
| TOTAL INCOME AMOUNT | LEGITIMATE EXPENSE | TAXATION WITHHOLDING TAX FLAG | WITHHOLDING TAX AMOUNT |
| ¥100,000 | ¥80,000 | ON | ¥4,000 |

SCREEN-IMAGE FOR CALCULATING CASH
SURRENDER VALUE AMOUNT FOR DEDUCTION

OCTOBER 1ST, 2005 — 598

POLICY NUMBER: 00001 — 591

INSURANCE POLICYHOLDER'S NAME: ○○○○ — 593

ACCUMULATED AMOUNT
AFTER DEDUCTION: ¥500,000 — 598

CASH SURRENDER VALUE
AMOUNT FOR DEDUCTION: ¥100,000 — 594

PAID PREMIUMS FOR DEDUCTION: ¥80,000 — 595

WITHHOLDING TAX AMOUNT: ¥4,000 — 596

CALCULATION — 597

590

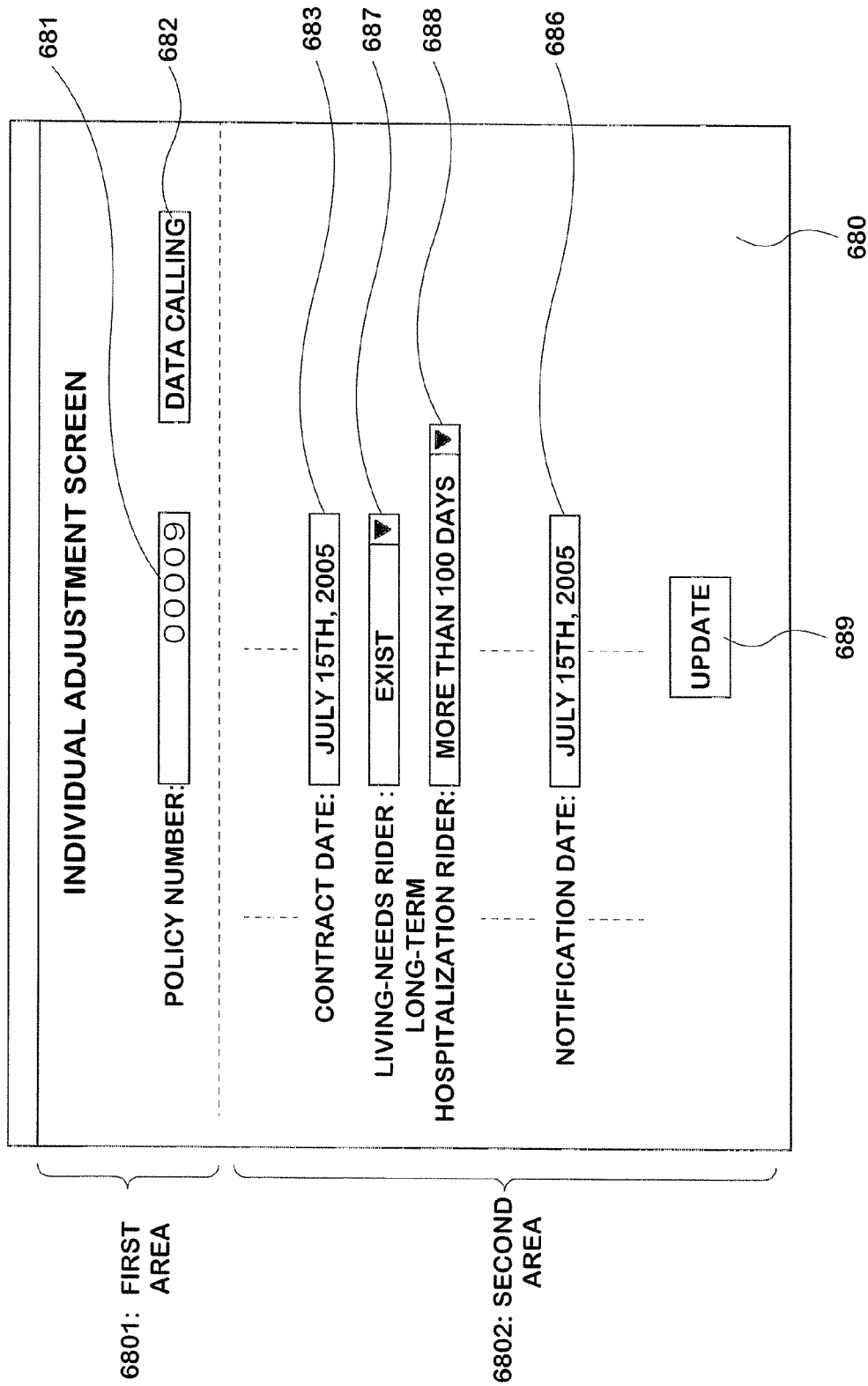

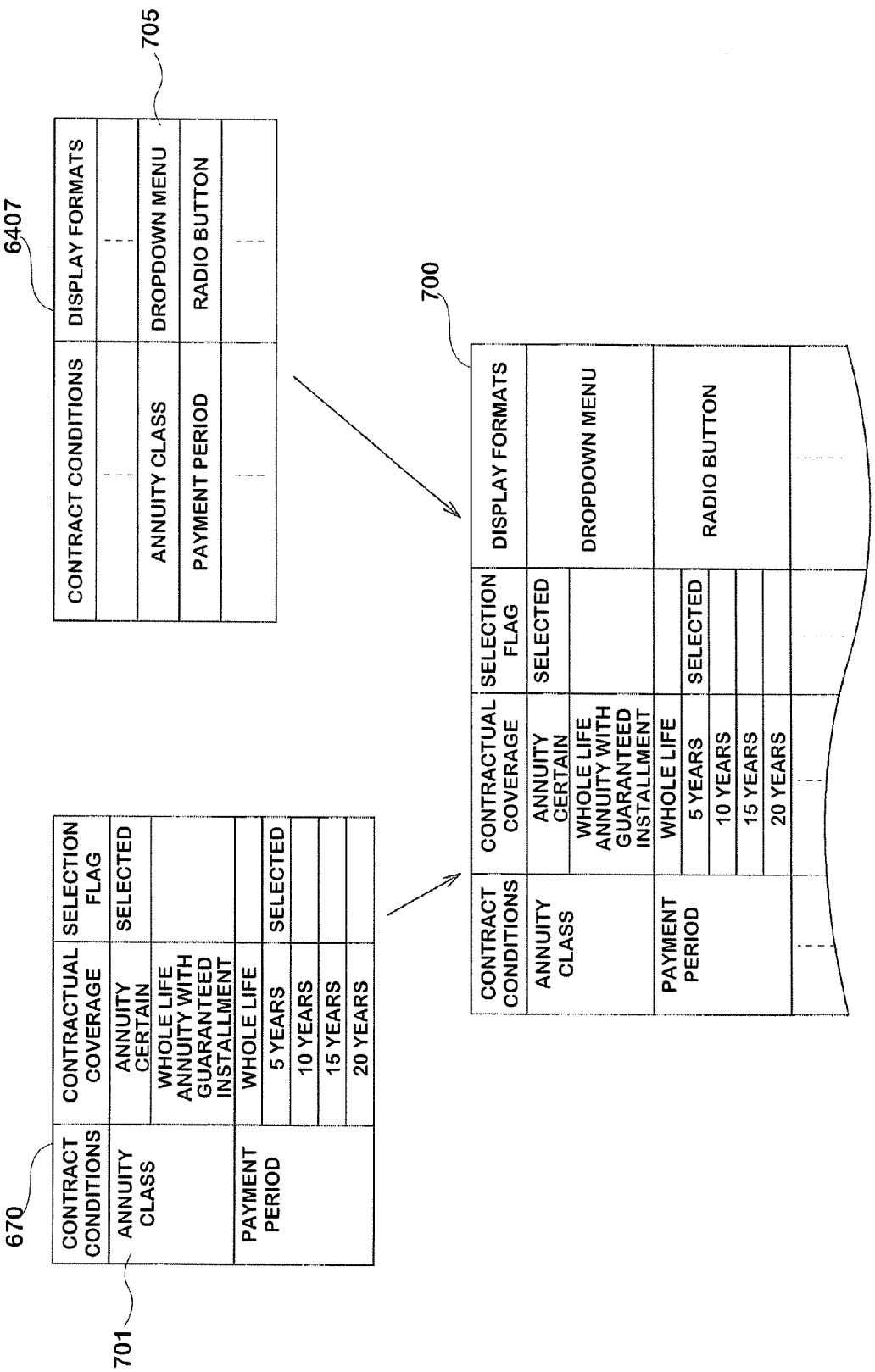

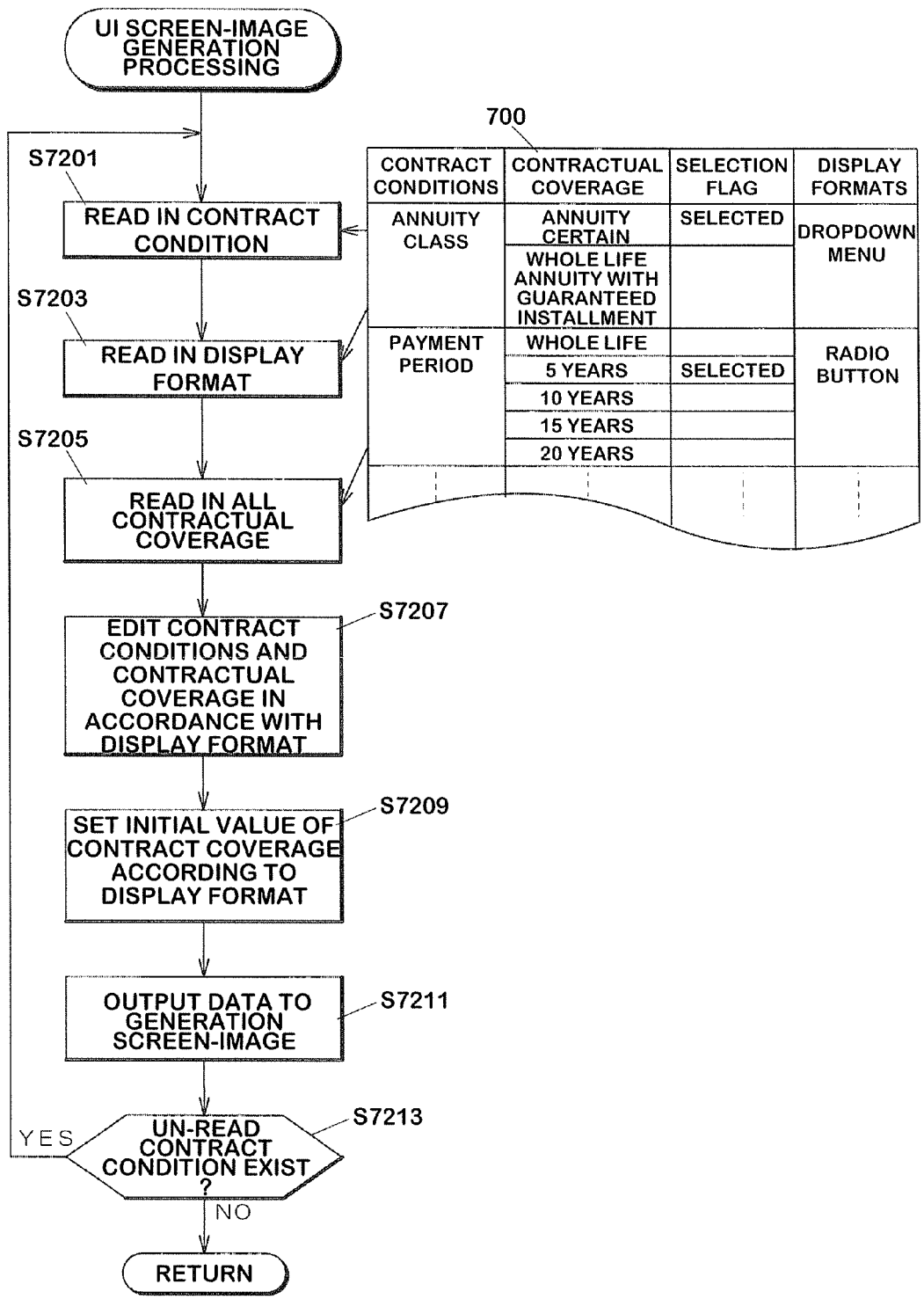

DATA MANAGEMENT APPARATUS AND METHOD THEREOF

CROSS REFERENCE TO RELATED APPLICATIONS

This application is a national stage application under 35 U.S.C. 371 of PCT Application No. PCT/JP2005/018808 having an international filing date of Oct. 12 2005, which designated the United States, which PCT application claimed the benefit of Japanese Patent Application No. 2004-299055 filed Oct. 13, 2004, each of which are incorporated herein by reference in their entirety.

FIELD OF THE INVENTION

This invention relates to a data management apparatus managing a plurality of data in which data items to be managed are respectively different and a method thereof.

BACKGROUND ART

Generally, diversification of data class to deal with may produce a difference in data items to be managed for every data class in data management. For example, if the class of product is diversified when managing product data, since the data items of the product managed in connection with this will be diversified, it is necessary to manage various data items for every goods kind.

When dealing with a plurality of the product data having a wide variety of product features with difference in the data item to be managed using a computer device, there is a method of managing the product data of all classes generated during a transaction using one record format. In this case, since the data item required for all products is set up beforehand, it may just refer to one database for the operating program which processes product data.

However, a record format which defines a data item need to be changed whenever change in product class or a data item arises, if the product data of all classes is managed using one record format, and a problem with complication of work for changing such change is expected. Even if it is the data item used only for a specific product, a region must be secured as a data item of all other products, and there is a problem that a memory region cannot be used effectively as a whole.

In order to solve such problems, there exist the following conventions technologies such as (1) and (2). In addition, the following conventional technology (3) exists as the case in which plural classes of products which have the various product features are dealt.

(1) Product class codes for specifying class of product and product content codes for identifying content of product are recorded in transaction data, and a product management table in which product contents corresponding to the product codes are classified in a plurality of data items and stored is created for each product class. A business application program for processing the transaction data specifies the product management table in accordance with the product class codes and further acquires each of data items as the product contents in accordance with the product content codes.

Consequently, what is necessary is to change only the product management table, even when there are some changes on the product class. Similarly, it is necessary to change only the product management table even when data items on the product management table have been changed. In this way, no change is required for the record format of the transaction data.

FIG. 18 illustrates an example of the conventional technology (1) described in the above. A is transaction data managing insurance contracts by which data of policy number 1801, of insurance premiums 1802, of insurance period 1803, of clause code 1804 and of types 1805 and so on are managed. In this case, the clause code 1804 is data for specifying a product class of an insurance product. B is a table (a whole life insurance table) managing data item of "whole life insurance" that is product content corresponding to the insurance product whose clause cord 1804 is "001", and also manages data of step payment period 1807 and of step payment ratio 1808. C is a table managing (annuity insurance table) data item of "insurance annuity" that is product content corresponding to insurance product whose clause code is "0002", and also manages data of annuity class 1811 and of annuity payment class 1812 for each type 1809.

Hence, even if it is the case where a new insurance instrument is additionally introduced by preparing the managing table which became independent every clause code 1804 which is a product code, and constituting so that the content of the product of the management table can be specified in accordance with the type 1805, additional creation of the product managing table corresponding to this can be carried out, and change of a record format of the transaction data can be avoided.

In an insurance product management system, there exists a case in which a desired product information is acquired by recording a basic key commonly used for products and sub-keys each having difference in meaning for products on a product information table and by conducting a search for the product information table in accordance with the sub-keys in a program by which products are handled (see patent document 2, for example).

(2) The data related to the data item corresponding to a desired product class is acquirable by establishing free definition items into the transaction data and by redefining formats within the free definition items for each product class. Consequently, change in the system can be done by just varying the method of redefining the free definition items even if it is the case where change arises in the product class.

FIG. 19 illustrates an example of the conventional technology (2) described in the above. A is transaction data managing insurance contracts by which data of policy number 1901, of insurance premiums 1902, of insurance period 1903, of clause code 1904 and of free definition item 1905 and so on are managed. In this case, the free definition item 1905 is an item for redefining and using a product content related to the insurance product specified by the clause code 1904. B is a part of a COBOL (Common Business Oriented Language) program for redefining and using the free definition item 1905. In other words, with the program, data responding to the product class corresponding to a desired clause code can be handled by defining the free definition item 1905 as a FILLER item of X(100) and then by defining the FILLER item for product class using a REDEFINE clause (see non-patent document 1, for example). A redefining description 1911 is for redefining data of its product class "whole life insurance" and similarly another redefining description 1912 is for redefining data of its product class "annuity insurance".

Thus, even if it is the case where a new insurance product is additionally introduced, by constituting so that the free definition item may be redefined every clause code 1904 which is a product class, the redefinition description corresponding to this can be added and change of a record format of the transaction data can be avoided.

(3) A system in which a data value of a desired data item in a desired product class is acquired by creating a product database respectively defining data items to be handled as constituent elements and by carrying out operations such as switching one of the product database used in a business application program implementing processing the product data and the database into which data related to the constituent elements is recorded, is known to the public (see patent document 1, for example).

[Patent document 1] Patent laid-open publication Hei10-334160

[Patent document 2] Patent laid-open publication Hei08-329142

[Non-patent document] Pages 143 to 145 of "Introduction to COBOL" published on Apr. 1, 1993 by OHMU Publishing under collective writing of NISHIMURA/UEMURA In the conventional technology (1), however, it is necessary to newly provide a managing table in the case of adding product class and also necessary to change the format of the managing table when data item of the product class is changed. In this case, the operator needs to set up each of the types while ensuring consistency on each of data contents among each of data items managed at the managing table for each product class.

For example, D shown in FIG. 18 is a table (prescheduled interest-rate sensitive annuity insurance annuity table) managing data items of "prescheduled interest-rate sensitive annuity insurance" that corresponds to an insurance product whose clause cord 1804 is "003" and data of annuity class 1814, of annuity payment period 1815 and of ratio review period 1816 are managed for each type 1813. When the prescheduled interest-rate sensitive annuity insurance annuity table is added, the operator carries out operations in accordance with the annuity insurance table having similar data items. Specifically, the prescheduled interest-rate sensitive annuity insurance annuity table D is obtained by adding a line of the ratio review period 1816 to the duplicated annuity insurance table C.

It is assumed that there exist two kinds of data for the ratio review period 1816 such as "review every 5 years" and "review every 10 years". In this case, the ratio review period 1816 can be added to each of line record of the duplicated annuity insurance table C. The operator, therefore, needs to set up the type 1813 corresponding to each of the line records while ensuring consistency on each combination of the annuity payment period 1815 and ratio review period 1816. Such additional work on the managing table requires great amount of attention as well as work, so that the work become unexpectedly complicated.

In the conventional technology (2), there exist a problem that the maintenance-ability of the business application program decreases during addition/alteration work of product class because a huge amount of alteration work is required based on the differences in product class in the business application program which handle the transaction data.

For example, as shown in FIG. 19, it is necessary to add another redefining description 1913 on the prescheduled interest-rate sensitive annuity insurance while adding judgment logic where the article code 1904 represents the prescheduled interest-rate sensitive annuity insurance. Further, a processing logic on the product features in the case of dealing the prescheduled interest-rate sensitive annuity insurance is need to be added. In addition, a system testing needs to be conducted by re-compiling the COBOL program after these works. The maintenance-ability of the business application program decreases because those works on the business application program are still required.

In the conventional technology (3), the formats under transaction need to be changed for each product class because the combination of the constituent element used for every product class differs. As a consequence, unification of the transaction data becomes difficult and there is a problem that a system configuration is complicated.

An object of the present invention is to provide a data management system capable of (1) doing a system change without imposing a heavy burden on the operator, (2) avoiding decrease of maintenance-ability of the business application program and (3) making unification of the transaction data easy and making the system configuration simple.

SUMMARY OF THE INVENTION (1)(2)(57) In the data management apparatus according to the present invention comprising:
 a data storage part storing at least a data ID, a class ID and a data content ID;
 a data definition part recording data content corresponding to the data content ID for each data item; and
 data processing means for implementing processing of determining a data content corresponding to a predetermined data item of a class ID representing a data class specified by the data ID in accordance with a data content ID stored in the data definition part which conform to the data content ID recorded in the data storage part.

It is, therefore, possible to record data contents in the data item to be managed using a data content ID. In this way, system configuration can be simplified as a result of managing with the same format in an integrated fashion even when data has different data item.

(3) In the data management apparatus according to the present invention, the data definition part stores a data item to be managed for each class ID, and wherein the data processing means specifies a data item corresponding to the class ID.

In this way, it is possible to easily specify a data item corresponding to the data content ID of the recorded data.

(4) In the data management apparatus according to the present invention, the data storage part respectively stores a plurality of data content IDs correspondingly to a plurality of data item numbers commonly used for each combination of a data ID and the class ID, and wherein the data definition part stores data items respectively corresponding to a plurality of data item numbers, for each class ID.

In this way, data contents corresponding to a plurality of data items can be managed.

(5) In the data management apparatus according to the present invention, the data definition part stores at least two or more of data contents corresponding to the data content ID, for each data item corresponding to a data item number stored for each class ID.

Consequently, a data content selected from a plurality of data contents for one data item can be managed.

(6) In the data management apparatus according to the present invention, the data processing means acquires all combinations of data content IDs and data contents recorded for data items corresponding to data item numbers stored by the data definition part,
 and wherein the data processing means determines a data content ID corresponding to one of data content corresponding to a predetermined data content ID and a data content ID corresponding to a predetermined data content in accordance with combinations of the acquired data content IDs and the data contents.

It is, therefore, possible to compose information on data item and data processing separately. In this way, there is no need to care about the data content IDs on data items and/or data contents at the data processing means.

(7) In the data management apparatus according to the present invention, the data definition part describes a processing code for executing processing for handling one of a data content ID and a data content together with a combination of a data ID and a data content, for each data item, wherein the data processing means acquires from the data definition part the processing code together with the combination of the data content ID and the data content, and wherein the data processing means determines a data content ID corresponding to one of data content corresponding to a predetermined data content ID and a data content ID corresponding to a predetermined data content in accordance with a combination of the acquired processing code, the data content ID and the data content.

Consequently, one of the data content ID and the data content can selectively be determined in accordance with the processing code and the combination data to be set for each class ID. Additionally, it is possible to compose information on data item and data processing separately.

(8) In the data management apparatus according to the present invention, the data definition part describes a processing code for checking a combination of data contents corresponding respectively to more than two classes of data items, wherein the data processing means acquires from the processing code together with the combination of the data content ID and the data content, and wherein the data processing means judges whether or not the combination of the data contents corresponding respectively to more than the two classes of data items is correct one in accordance with the acquired processing code and a combination of the data content ID and the data content.

In this way, more than the two classes of data content IDs can be checked in accordance with the processing code and the combination data prior to recording into the data storage part.

(9) In the data management apparatus according to the present invention, the data processing means comprises a main processing part, a processing program requesting/execution part requesting a processing program to the data definition part and executing the program and a processing program generation part generating a processing program in accordance with the processing code and the combination data, and wherein the data definition part comprises a processing code storage part storing a processing code for implementing processing of handing data content ID and data content and a combination data storage part recording a combination of the data content ID and the data content.

Consequently, processing of determining one of the data content ID and the data content can be aggregated in the data processing means, as a result, process of generating a processing program can be aggregated in accordance with the processing code and the combination data at the data definition part.

(10) In the data management apparatus according to the present invention, the processing program requesting/execution part of the data processing means comprises a processing program requesting part requesting a processing program to the processing program generation part and a processing program execution part executing the processing program received from the processing program generation part, and wherein the processing program requesting part is composed as a wrapper program.

It is, therefore, processing of requesting a processing program can be aggregated into one program in the data processing means. Consequently, program processing necessary for data management can be unitized.

(11) In the data management apparatus according to the present invention, the data processing means acquires all combinations of data content IDs and data contents in all data items stored by the data definition part for predetermined class IDs, and wherein the data processing means outputs one of the data content ID and the data content capable of being selected for each data item of the predetermined class ID in accordance with a combination of the acquired data content IDs and the data contents.

Consequently, a screen-image responding to product's features/its clause for each contract can automatically be generated. The development costs of software development may be reduced because there is no need to prepare screen-image for each product. Additionally, both the customization cost for introduction and the maintenance cost for change may be suppressed in package software industry.

(12) In the data management apparatus according to the present invention, the data definition part records a combination of a data content ID and data content capable of being selected for each data item and describes a processing code for executing processing for handling one of the data content ID and the data content capable of being selected for all data items of a class ID, and wherein the data processing means acquires from the data definition part the processing code for the predetermined class ID together with all combinations of data content IDs and data contents capable of being selected in all data items for predetermined class IDs and outputs one of the data content ID and the data content capable of being selected for each data item of the predetermined class ID in accordance with all combinations of data content IDs and data contents and the data contents capable of being selected and the processing code.

17. One of the data management apparatus and the program according to claim 16, wherein a display formant definition part recording a display format for one of the data content ID and the data content for each data item is further provided thereto, and wherein the data processing means outputs one of the data content ID and the data content capable of being selected in accordance with the display format acquired from the display formant definition part.

18. The data management apparatus and the program according to claim 16, wherein the data processing means acquires data contents corresponding to all data items for a class ID of the data ID in accordance with the class ID and the data content ID of a predetermined data ID stored in the data storage part and outputs one of the data content ID and the data content capable of being selected using the acquired data content as an initial value Consequently, a screen-image corresponding to product's features/its clause for each contract can automatically be generated. The development costs of software development may be reduced because there is no need to prepare screen-image for each product. Additionally, both the customization cost for introduction and the maintenance cost for change may be suppressed in package software industry.

(13) In the data management apparatus according to the present invention, a display formant definition part recording a display format for one of the data content ID and the data content for each data item is further provided thereto, and wherein the data processing means outputs one of the data content ID and the data content capable of being selected in accordance with the display format acquired from the display formant definition part.

It is, therefore, display format of data may be designated in desired conditions. In this way, a highly-flexible image-screen design can be realized depending upon the environment for the usage and/or their taste for companies and users.

(14) In the data management apparatus according to the present invention, the data processing means acquires data contents corresponding to all data items for a class ID of the data ID in accordance with the class ID and the data content ID of a predetermined data ID stored in the data storage part and outputs one of the data content ID and the data content capable of being selected using the acquired data content as an initial value.

In this way, a screen-image corresponding to product's features/its clause for each contract can automatically be generated at the stage of individual adjustment.

(15) In the data management apparatus according to the present invention, the data definition part separately records a processing code for executing processing for handling one of, a combination of the data content ID and the data content, and, the data content ID and the data content in hierarchy according to the class ID.

As a consequence, management of the combination data and the processing code can be done hierarchically. This increases the maintenance-ability on processing codes, data content IDs and data contents.

(16) In the data management apparatus according to the present invention, the data storage part records transaction data including product data,
   wherein the data definition part records data representing feature of a product as data content,
   and wherein the data processing means determines data content of a product according to the product data upon receipt of an instruction for processing to the transaction data.

It is, therefore, possible to carry out unify management of transaction data containing product data having different data items under the same format.

(17) In the data management apparatus according to the present invention, the product data is data on a product defined based on a clause,
   and wherein data representing feature of the product is data representing content thereof defined in the clause.

It is, therefore, possible to carry out unify management of transaction data under the same format even when data relating to products having complicated data item structure to be defined its coverage depending upon clause.

(18) In the data management apparatus according to the present invention, the data definition part separately records a processing code for executing processing for handling one of data content corresponding to the data content ID, the data content ID and data content in hierarchy defined respectively by product category in which a product determined based on the clause belongs thereto, a class of clause and a version of clause.

Consequently, management of the combination data and the processing code can be done under each hierarchy of product category, clause class and clause version. In this way, data on life insurance policy can be managed easily and effectively even when such data is composed of complicated contract conditions.

(19) In the data management apparatus according to the present invention, the class of clause in the data definition part is composed of a company code representing nature of a company and a clause code representing class of clause for the company.

It is, therefore, possible to carry out unify management of product data in a plurality of companies, using one data management apparatus. In this way, the data management apparatus according to the present invention can be applied to outsourcing businesses and/or ASP businesses.

(20) In the data management apparatus according to the present invention, a group definition part recording a set-up condition of predetermined data for each group combining a plurality of class IDs is further provided thereto.

Consequently, set-up conditions of data to be recorded on the record can be imposed for each predetermined group composed of combination of two or more records. In this way, the consistency of data within the record can be maintained.

(21) In the data management apparatus according to the present invention, the data processing means specifies the group combining a plurality of class IDs according to the data ID,
   and wherein processing for determining whether or not a data content ID to be stored in the data storage part is recordable in accordance with a set-up condition of the predetermined data recorded in the group definition part.

It is, therefore, possible to check the consistency between the records in accordance with the data content ID.

(22) In the data management apparatus according to the present invention, the set-up condition of the predetermined data includes a data content ID capable of being recorded in the data storage part and a processing code for checking whether or not the predetermined data content ID conforms to the data content ID capable of being recorded in the data storage part.

It is, therefore, possible to check the consistency of data between the records in accordance with the data content ID and the processing code.

(23) In the data management apparatus according to the present invention, the set-up condition of the predetermined data includes data content corresponding to data content ID storable in the data storage part and a processing code for checking whether or not the predetermined data content has data content corresponding to the data content ID recordable in the data storage part.

It is, therefore, possible to check the consistency of data between the records in accordance with data content corresponding to the data content ID and the processing code.

(24) In the data management apparatus according to the present invention, the predetermined data content is data acquired from the data definition part in accordance with data content ID to be recorded in the data storage part.

Consequently, a relationship in one of the data content ID and the data content unify managed at the data definition part can effectively be used. In this way, an efficient data structure excluding data redundancy may be employed.

(25) In the data management apparatus according to the present invention, the data processing means specifies a group composed of combining a plurality of class IDs in accordance with the data ID and implements processing for determining whether or not a data value to be recorded in the data storage part is recordable in accordance with the set-up condition of predetermined data stored in the group definition part.

It is, therefore, possible to check the consistency of data between the records in accordance with the data value.

(26) In the data management apparatus according to the present invention, the set-up condition of predetermined data includes condition of a data value capable of being recorded in the data storage part and a processing code for checking whether or not the predetermined data value conforms to the data value capable of being recorded in the data storage part.

It is, therefore, possible to check the consistency of data between the records in accordance with the data value and the processing code.

(27) In the data management apparatus according to the present invention, the data processing means specifies a group composed of combining a plurality of class IDs in accordance with the data ID and acquires name of the group in accordance with the set-up condition of predetermined data stored in the group definition part.

Consequently, name of group for output can be defined for predetermined group unit composed of combinations of a plurality of records. In insurance industry assuming that plurality of insurance policies are made, the name of insurance may be defined for each contract, for example.

(28) In the data management apparatus according to the present invention, the data storage part is composed so that a unique data value according to a data ID is recordable therein,
  wherein the data definition part records a processing code describing a method of set-up the unique data value for each class ID,
  wherein the data processing means specifies a second class ID relating to a first class ID in accordance with the first class ID to be recorded in the data storage part and acquires from the data definition part a processing code according to the specified second class ID,
  and wherein the data processing means sets a unique data value according to the first class ID in accordance with the acquired processing code.

In this way, information on definition related to other class IDs may be referred while setting up unique values such as data on date and the like.

(29) In the data management apparatus according to the present invention, the data storage part records transaction data containing insurance product data defined in accordance with a clause,
  wherein when data on date according to transaction data of a class ID representing of a rider is set, the data definition part records a processing code describing a method of set-up data on date according to transaction data representing the basic policy corresponding to the rider,
  and wherein the data processing means sets up the data on date according to the transaction data of the class ID representing of the rider in accordance with the processing code acquired from the data definition part.

As a consequence, unique values such as data on date and the like may be set up using the relationship between the rider and the basic policy in an insurance product. No item(s) undefined in the rider can be handled application of the basic policy. In addition, even when the same rider(s) is added to different main clause (the clause of the basic policy), a rider may be set up based on the same method of the basic policy.

(30) In the data management apparatus according to the present invention, the data storage part records a data item ID corresponding to a predetermined data item,
  wherein the data definition part correspondingly records a combination of data item ID and data content ID with data item and data content,
  and wherein the data processing means implements processing of determining a data item and a data content corresponding thereto in accordance with a combination of the data item ID and the data content ID stored in the data definition part which conform to a combination of the data item ID and the data content ID recorded in the data storage part.

The versatility of data to be stored in the data storage part can be increased by recording the data item IDs, data items, data content IDs and data contents so that each of them respectively correspondence one another. In this way, effective use of the data area can be done while expanding applicable area of the data to be managed handled by the data management apparatus.

(31) In the data management apparatus according to the present invention, wherein the data storage part records plural combinations of data item IDs and data content IDs.

It is, there fore, possible to define the data items to be managed varyingly.

(32) In the data management apparatus according to the present invention, the data item represents a processing status on data to be recorded at the data storage part.

As a consequence, processing can be implemented smoothly without defining definition of data on the processing state that varies depending on one of users and data to be managed. In this way, the applicable scope of the data management may be expanded.

(33) In the data management apparatus according to the present invention, the data storage part records an attribution ID representing attribution of data specified by a data ID,
  wherein the data definition part records a combination of a data item ID and a data content ID for each attribution ID,
  and wherein the data processing means implements processing of determining a data item and a data content corresponding thereto for each attribution ID.

It is, therefore, possible to manage data record having different attribute IDs on the same database. For example, data records on a plurality of companies can be managed in one data management apparatus when a company is identified by an attribution ID, for example.

(34) In the data management apparatus according to the present invention, the data storage part records a combination of a data item ID and a data content ID corresponding to a predetermined data item,
  wherein the data definition part records a combination of a data item ID and a data item,
  and wherein the data processing means implements processing of determining a data item corresponding to the data content stored in the data storage part in accordance with the data item ID stored in the data definition part which conform to the data item ID recorded in the data storage part.

In this way, the versatility of data to be stored in the data storage part can be increased as a result of designating by the data definition part a data item corresponding to the data content recorded in the data storage part.

(35) In the data management apparatus according to the present invention, the data storage part records plural combinations of data item IDs and data contents.

It is, there fore, possible to define the data items to be managed varyingly.

(36) In the data management apparatus according to the present invention, the data storage part records a combination of a data item ID and a data item for each data-type in the data content to be recorded in the data storage part.

As a consequence, data with the same data-type previously designated on a database with different data items can be effectively managed.

(37) In the data management apparatus according to the present invention, the data-type includes one of a date-type, a value-type, a character-type and a binary-type.

In this way, data having different data items can be managed regardless of their data-type.

(38) In the data management apparatus according to the present invention, the data storage part records an attribute ID representing data specified by a data ID, wherein the data definition part records a combination of a data item ID and a data item for each attribution ID,
and wherein the data processing means implements processing of determining a data item for each attribution ID.

It is, therefore, possible to manage data record having different attribute IDs on the same database. For example, data records on a plurality of companies can be managed in one data management apparatus when a company is identified by an attribution ID, for example.

(39) In the data management apparatus according to the present invention, the data processing means comprises a condition set-up part for setting up a calculation condition used at a calculation processing part and the calculation processing part for executing predetermined calculation processing in accordance with the calculation condition, and wherein access to one of the data definition part and the group definition part is carried out only at the condition set-up part.

Consequently, the difference in the calculation condition between data to be handled can be absorbed by describing in the calculation processing part a universal calculation processing using input/output items commonly used and by appropriately handling the input/output items at the condition set-up part.

(40) In the data management apparatus according to the present invention, the data processing means comprises a combination of the condition set-up part and the calculation processing part for each calculation processing.

It is, therefore, possible to quickly respond to variation of process in each of calculation processing steps and to increase the maintenance-ability.

(41) In the data management apparatus according to the present invention, a processing data storage part containing all data potentially to be handled is further provided, and wherein the condition set-up part at the data processing means implements data input and data output of data to the processing data storage part.

Consequently, a common interface can be used for each program. In this way, the development cost can be suppressed by decreasing man-hours in designing of interface.

(42) In the data management apparatus according to the present invention, the processing data storage part comprises transaction data, screen image input data and calculation result data.

It is, therefore, possible to understand the status of processing in data processing while integrating the interface in each program.

(43)(44)(58) According to the present invention, there is provided an insurance policy data management apparatus for managing data on insurance policy in which contract conditions to be managed are respectively different depending on a clause, the apparatus comprising:

a data storage part storing at least a policy ID for specifying a insurance policy, a clause ID for specifying a clause of the insurance policy and a contractual coverage ID for specifying contractual coverage of the clause;
a data definition part recording contractual coverage corresponding to the contractual coverage ID for each data item; and data processing means for implementing processing of determining contractual coverage corresponding to a predetermined contract condition of insurance policy data specified by the policy ID in accordance with a contractual coverage ID stored in the data definition part which conform to the contractual coverage ID recorded in the data storage part.

Consequently, contractual coverage in the contract condition to be managed can be recorded using a contractual coverage ID. In this way, system configuration can be simplified as a result of managing with the same format in an integrated fashion even when data has different contract condition(s).

(45) According to the present invention, there is provided a data structure for managing data in which data items to be managed are respectively different, the structure comprising:

a data storage part storing at least a data ID for identifying data, a class ID for representing class of data contents specified by the data ID and a data content ID corresponding to data content of data item according to the class ID; and
a data definition part recording data content corresponding to the data content ID for each data item.

Consequently, data contents in the data item to be managed can be recorded using a contractual coverage ID. In this way, system configuration can be simplified as a result of managing with the same format in an integrated fashion even when data has different data item(s).

(46) In the data structure according to the present invention, the data definition part stores a data item to be managed for each class ID. It is, therefore, a data item corresponding to the data content ID of the recorded data can easily be specified.

(47) In the data structure according to the present invention, the data storage part respectively stores a plurality of data content IDs correspondingly to a plurality of data item numbers commonly used for each combination, for each combination of a data ID and a class ID, and wherein the data definition part stores data items respectively corresponding to a plurality of data item numbers, for each class ID. Consequently, data contents related to a plurality of data items can be managed.

(48) According to the present invention, there is provided a data structure for managing data in which data items to be managed are respectively different, the structure comprising:

a data storage part storing at least a policy ID for specifying a insurance policy, a clause ID for specifying a clause of the insurance policy and a contractual coverage ID for specifying contractual coverage of the clause; and
a data definition part recording contractual coverage corresponding to the contractual coverage ID for each clause ID and each contract condition.

Consequently, contractual coverage in the contract condition to be managed can be recorded using a contractual coverage ID. In this way, system configuration can be simplified as a result of managing with the same format in an integrated fashion even when data has different contract condition(s).

(49) In the data structure according to the present invention, the data storage part respectively stores a plurality of contractual coverage IDs correspondingly to a plurality of contract condition numbers commonly used for each combination of the policy ID and the clause ID, and wherein the data definition part stores contract conditions respectively corresponding to a plurality of contract condition numbers, for each clause ID. As a consequence, contract coverage related to a plurality of contract conditions can be managed.

(50)(51)(59) According to the present invention, there is provided a program generation apparatus for generating a program for implementing designated processing for designated data, the apparatus comprising:

a data definition part recording a correspondence table representing correspondence between a data content ID and data content for each data item;

a processing definition part storing a processing code for processing;

correspondence table acquisition means acquiring from the data definition part a correspondence table on a data item specified by a class ID contained in the designated data and content of the designated processing;

processing code acquisition means acquiring from the processing definition part a processing code on the designated processing; and a program generation means generating a program in accordance with the acquired correspondence table and the processing code.

In this way, a program for selectively determining one of the data content ID and the data content can be generated in accordance with the correspondence table of the data content ID and the data content set-up for each class ID. It is, therefore, possible to compose information on data item and data processing separately.

(52)(53) According to the present invention, there is provided a program generation apparatus for generating a program for implementing designated processing for designated data, the apparatus comprising:

a data definition part recording a correspondence table representing correspondence between a data content ID and data content for each data item;

a processing definition part storing a processing code for processing;

correspondence table acquisition means acquiring from the data definition part a correspondence table on a data item specified by a class ID contained in the designated data and content of the designated processing;

processing code acquisition means acquiring from the processing definition part a processing code on the designated processing; and a program generation means generating a program in accordance with the acquired correspondence table and the processing code.

Consequently, a program for determining data content on the data content ID can be provided while storing the data content in the data item to be managed using a data content ID. In this way, system configuration can be simplified as a result of managing with the same format in an integrated fashion even when data has different data item (s).

(54)(55) According to the present invention, there is provided a screen-image generation apparatus for generating a screen-image for implementing designated processing according to a predetermined class ID, the apparatus comprising:

a data definition part recording a correspondence table representing correspondence between a data content ID and data content for each data item;

a processing definition part storing a processing code for processing;

correspondence table acquisition means acquiring from the data definition part a correspondence table on a data item specified by a class ID contained in the designated data and content of the designated processing;

processing code acquisition means acquiring from the processing definition part a processing code on the designated processing; and a program generation means generating a program in accordance with the acquired correspondence table and the processing code;

wherein the data processing means generates a display screen by acquiring all combinations of data content IDs and data contents recorded for data items corresponding to data item numbers stored in the data definition part and by outputting one of the data content ID and the data content capable of being selected for each data item of the predetermined class ID in accordance with a combination of the acquired data content IDs and the data contents.

Consequently, a screen-image corresponding to product's features/its clause for each contract can automatically be generated. The development costs of software development may be reduced because there is no need to prepare screen-image for each product. Additionally, both the customization cost for introduction and the maintenance cost for change may be suppressed in package software industry.

(56) In the screen-image generation apparatus according to the present invention, one of a display format definition part storing display formats for one of data content IDs and data contents and means for accessing thereto, for each data item, is further provided, and wherein the data processing means outputs one of the data content ID and the data content capable of being selected in accordance with the display format acquired from the display format definition part.

It is, therefore, display format of data may be designated in desired conditions. In this way, a highly-flexible image-screen design can be realized depending upon the environment for the usage and/or their taste for companies and users.

CORRESPONDENCE TO EMBODIMENTS

The term "data storage part storing at least a data ID, a class ID and a data content ID" corresponds to a transaction database 2093 recording policy numbers, clause IDs and variables 1, 2 and so on in the embodiments. The term "a data definition part recording data content corresponding to the data content ID for each data item" corresponds to a processing code storage part, a combination data storage part or a combination thereof storing contractual coverage corresponding to contractual coverage ID for each contract condition in the embodiments.

The term "data processing means for implementing processing of determining a data content corresponding to a predetermined data item of a class ID representing a data class specified by the data ID in accordance with a data content ID stored in the data definition part which conform to the data content ID recorded in the data storage part" respectively corresponds to a processing program requesting/execution part 713 in embodiments 1 and 3, either of a processing program execution part 931b or a processing program request/execution part 931 in the second embodiment, a processing program request/execution part 2131 in fourth embodiment, a processing program execution part 3323 in fifth embodiment, a processing program generation/execution part 3927 in sixth embodiment, a processing program generation/execution part 4627 in seventh embodiment, a processing program generation/execution part 5327 in eighth embodiment and a processing program request/execution part 6423 in ninth embodiment so on.

The terms "data item to be managed" or "a data item corresponding to the class ID" corresponds to contract conditions corresponding to variable 1, variable 2 and so on recorded in the definition program for each clause ID in the embodiments. Also, the term "a plurality of data item numbers commonly used for each combination" corresponds to "1", "2", and son on of the variable 1, variable 2 and so on in the embodiments.

The phrase "all combinations of data content IDs and data contents recorded for data items corresponding to data item numbers stored by the data definition part" corresponds to a combination of all contractual coverage IDs and contractual coverage recording for contract conditions in the combination data storage part in the embodiments. The term "combinations of the acquired data content IDs and the data contents" corresponds to a combination of the contractual coverage ID and the contractual coverage recorded for each contract condition in the combination data storage part in the embodiments.

The term "a processing code for executing processing for handling one of a data content ID and a data content" corresponds to a processing code stored in the processing code storage part for executing processing according to the contract condition for each processing name in the embodiments. Also, the term "a processing code for checking a combination of data contents corresponding respectively to more than two classes of data items" corresponds to a processing code 1705 and check data 1706 for correlation check in the embodiments.

The terms "a main processing part, a processing program requesting/execution part, a processing program generation part" respectively correspond to a main processing part 711 of a business application program 2091, a processing program requesting/execution part 713 and a processing program generation part 731 of a product definition program 2094 shown in FIG. 7 in the embodiment, for example. Also, the phrase "one of the data content ID and the data content capable of being selected for each data item of the predetermined class ID" corresponds to "annuity certain" or "whole life annuity with guaranteed installment" as selectable data of a drop-down menu of annuity class shown in FIG. 68 in the embodiments, for example.

The term "a processing code for executing processing for handling one of the data content ID and the data content capable of being selected for all data items of a class ID" corresponds to a processing code which relates to a processing name "data item acquisition" in the processing code storage part shown in FIG. 64 in the embodiments, for example. Also, the term "a display formant definition part recording a display format for one of the data content ID and the data content" corresponds to a display format table recording display formats for contract conditions shown in FIG. 64 in the embodiments, for example. Further the phrase "separately records a processing code in hierarchy according to the class ID" corresponds to a processing code storage part to be stored separately in the first hierarchy "product category", the second hierarchy "clause class" and the third hierarchy "clause version" shown in FIG. 11 in the embodiments, for example.

The term "a group definition part recording a set-up condition of predetermined data for each group combining a plurality of class IDs" corresponds to a processing code storage part, a check data storage part or a combination thereof recorded in a contract rebundle definition program 2095 shown in FIG. 22 in the embodiments, for example. Also, the term "a set-up condition of the predetermined data recorded in the group definition part" corresponds to a processing code "contract rebundle check of annuity class—payment period" and check data "contract rebundle check of annuity class—payment period" shown in FIG. 22 in the embodiments, for example.

The term "processing for determining whether or not a data value to be stored in the data storage part is recordable" corresponds to processing which relates to "Minimum insurance premium check" shown in FIG. 22a in the embodiments, for example. Also, the term "acquires name of the group" corresponds to processing relates to Plan name (annuity A) shown in FIG. 22b in the embodiments, for example. Further, the term "a unique data value according to a data ID" corresponds to contract date 359 stored in the work record shown in FIG. 35 in the embodiments, for example.

The term "a processing code describing a method of set-up the unique data value "corresponds to a processing code "contract date" shown in FIG. 37 in the embodiments, for example. Also, the phrase "first class ID to be recorded in the data storage part" corresponds to clause ID "55555" shown in FIG. 33 in the embodiments, for example. Further, the term "second class ID relating to first class ID" corresponds to clause ID "00005" shown in FIG. 33 in the embodiments, for example.

The term "data item ID corresponding to a predetermined data item" corresponds to a pattern variable 1_631, a pattern variable 2_633 and so on shown in FIG. 40 in the embodiments, for example. Also, the phrase "a combination of data item ID and data content ID" corresponds to a combination data of "pattern variable" and "variable" stored in a pattern variable storage part shown in FIG. 39 in the embodiments, for example. Further, the term "processing of determining a data item and a data content corresponding thereto" corresponds to processing according to a processing code "preservation section requesting special attention" 3928a stored in the processing code storage part shown in FIG. 39 in the embodiments, for example.

The term "attribution ID representing attribution of data specified by a data ID" corresponds to company ID 630 shown in FIG. 40 in the embodiments, for example. Also, the phrase "combination of a data item ID and a data content ID corresponding to a predetermined data item" corresponds to a combination of pattern variable 1_651 "002" and variable 1_652 "2005 Sep. 1" shown in FIG. 47 in the embodiments, for example.

The term "a combination of a data item ID and a data item" corresponds to a pattern variable "002" and a pattern variable name "rate reference date" stored in the pattern variable data storage part shown in FIG. 46 in the embodiments, for example. The phrase "records . . . for each data-type in the data content" corresponds to setting-up column index of patter variable for each data format as described in column 7-5. in the embodiments.

The term "a condition set-up part for setting up a calculation condition used at a calculation processing part" corresponds to an I/F edit class 5323 of business application program 5301 shown in FIG. 53 in the embodiments, for example. Also, the phrase "calculation processing part for executing predetermined calculation processing in accordance with the calculation condition" corresponds to calculation model 5325 of business model 5301 shown in FIG. 53 in the embodiments, for example. Further, the term "calculation processing" of the term "each calculation processing" corresponds to one of the terms "withholding tax amount calculation" and "yen conversion calculation" and so on shown in FIG. 53 in the embodiments, for example. Still further, the term "a processing data storage part containing all data potentially to be handled" corresponds to a work region 5307 shown in FIG. 53 in the embodiments, for example.

The term "a data definition part recording a correspondence table representing correspondence between a data content ID and data content for each data item" corresponds to a combination data storage part 735 recording contractual coverage corresponding to contractual coverage ID for each contract condition shown in FIG. 7 in the embodiments, for example. The phrase "a processing definition part storing a processing code for processing" corresponds to a processing code storage part 733 storing processing code for each contract condition shown in FIG. 7 in the embodiments, for example.

The term "correspondence table acquisition means for acquiring from the data definition part a correspondence table on data item to be specified by class ID contained in data for specification and contents of specification processing" corresponds to the function describes in step S1323 shown in FIG. 13 in the embodiments, for example. Also, the phrase "processing code acquisition means acquiring from the processing definition part a processing code on the designated processing" corresponds to the function describes in step S1321 shown in FIG. 13 in the embodiments, for example. Further, the term "program generation means generating a program in accordance with the acquired correspondence table and the processing code" corresponds to the function describes in step S1325 shown in FIG. 13 in the embodiments, for example.

In the present invention the term " . . . means" is a concept that includes the function of CPU realized with a program(s). Here, the term "program(s)" is a concept not only include a program directly executable with a CPU but also including a program in source format, a compressed program(s), an encoded program(s) and so on.

The features of the present invention may be broadly described in the above, its structures and details will be more apparent as well as its features and advantages with reference to accompanying drawings.

BRIEF DESCRIPTION OF THE DRAWINGS

FIG. 2 is a hardware structure diagram of the data management apparatus according to the present invention;

FIG. 9a is another a functional diagram of the business application program, the wrapper program and the product definition program according to the present invention;

FIG. 11 is a functional block diagram he product definition program according to the present invention;

FIG. 12 is an example of business application of the present invention to other industries;

FIG. 13 is a flowchart of both the business application program and the product definition program according to the present invention;

FIG. 17a is another diagram illustrating another structural example of the processing program according to the present invention;

FIG. 18 is a diagram illustrating a conventional technology (1) to the present invention;

FIG. 19 is a diagram illustrating a conventional technology (2) to the present invention;

FIG. 23 is a diagram showing a flowchart of the business application program, wrapper program B, and contract rebundle definition program according to the present invention;

FIG. 24 is a flow chart of contract rebundle check processing according to the present invention;

FIG. 25 is a flowchart of contractual coverage acquisition processing according to the present invention;

FIG. 28 is a diagram showing a transaction database according to the present invention;

FIG. 29a is a diagram illustrating a structural example of the processing program according to the present invention;

FIG. 29b is another diagram illustrating another structural example of the processing program according to the present invention;

FIG. 41a is another diagram showing another flowchart of the business application program according to the present invention;

FIG. 42 is a diagram illustrating a flowchart of a pattern variable set-up processing according to the present invention;

FIG. 45a is another diagram illustrating another structural example of the processing program according to the present invention;

FIG. 47 is a diagram showing a work record according to the present invention;

FIG. 54a is another flowchart of the processing program according to this invention;

FIG. 56 is a flowchart of the withholding tax amount calculation processing (I/F edit class);

FIG. 56a is a flowchart of the withholding tax amount calculation processing (I/F edit class);

FIG. 58 is a diagram showing a work region according to the present invention;

FIG. 59a is another screen-image for calculating a cash surrender value amount according to the present invention;

FIG. 68a is another screen-image of an individual adjustment screen according to the present invention;

FIG. 70 is a diagram showing an example of generating a relation table according to the present invention;

FIG. 72 is shows a detailed flowchart of the UI screen-image generation processing according to the present invention.

REFERENCE NUMERALS

13: data recording part
15: data processing part
17: data definition part
18: group definition part

DETAILED DESCRIPTION OF DESIRED EMBODIMENTS

Embodiments of the present invention will be described herein with reference to drawings.

1. The First Embodiment

In this embodiment, a data management apparatus managing transaction data for administration of contracts of life insurance and product definition data on life insurance products will be described.

1-1. Functional Block Diagram

Figure 1:
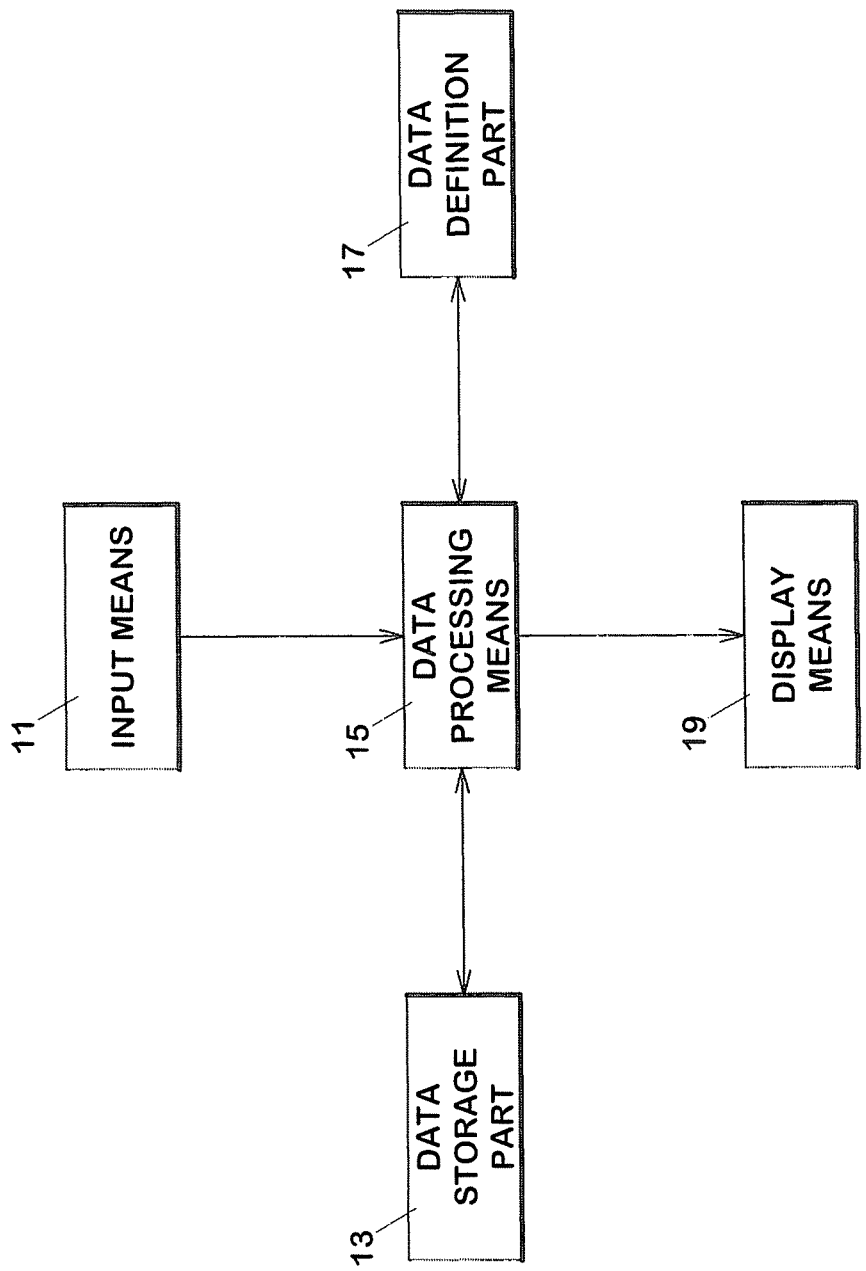
FIG. 1 is a functional block diagram of a data management apparatus according to the present invention.

FIG. 1 is a functional block diagram of a data management apparatus according to the present invention. In this drawing, the data management apparatus 1 comprises input means 11, a data storage part 13, data processing means 15, a data definition part 17 and display means 19. The data storage part 13 stores transaction data. The data definition part 17 records data contents IDs and data contents for each class ID representing a product class. For example, in the case of insurance products, a contractual coverage ID and contractual coverage are recorded for each clause ID representing a class of insurance products. The data processing means 15 acquires a data contents ID (a contractual coverage ID) and data content (contractual coverage) from the data definition part 17 in accordance with a class ID (clause ID) stored in the data storage part 13 and performs processing as to the data content (contractual coverage).

The input means 11 is means for initiating a processing on data content (contractual coverage) of a business application program upon receipt of operation of a user, and the display means 19 is used to display the result of a predetermined data processing according the business application program.

1-2. Hardware Structure

FIG. 2 shows an example of hardware structure of a computer apparatus realized by the data management apparatus shown in FIG. 1 using a CPU. As shown in FIG. 2, the data management apparatus 1 comprises a display 201, a CPU 203, a memory 205, a key board/mouse 207, a hard disk 209, a CD-ROM drive 211 and a communication circuitry 215.

The hard disk 209 stores a business application program (hereinafter referred to as a business program) 2091, a transaction database 2093 and a product definition program 2094. The business program 2091 is installed by reading out data stored on a CD-ROM 212 via the CD-ROM drive 211. Such installation may be carried out using data downloaded from a network 0 with the communication circuitry 215.

The data storage part 13 is realized by the transaction database 2093, and the data processing means 15 is implemented with the business program 2091 performed by the CPU 203 using the memory 205. Also the data definition part 17 is realized with a product definition program 2094 performed by the CPU 203 using the memory 205. The input means 11 is mainly realized with the key board/mouse 207 and the display means 19 is done by the display 201.

1-3. Processing Details

Processing details of this embodiment will be described with reference to FIGS. 3 through 8. In this embodiment, the business program 2091 is an application program for managing contractual data and product data of life insurance. FIG. 7 shows a functional block diagram of the business program 2091 and the product definition program 2094. The business program 2091 includes both a main processing part 711 implementing processing on a user interface such as display processing and processing related on database, and a processing program requesting/execution part 713 requesting a processing program to the product definition program 2094 and implementing such program.

In addition, the product definition program 2094 comprises a processing program generation part 731 for generating a processing program upon receipt of a request from the business program 2091, a processing code storage part 733 storing processing codes for every processing and a combination data storage part 735 recording combination data of contractual coverage and contractual coverage ID for each processing (when the clause ID is "11111").

Figure 3:
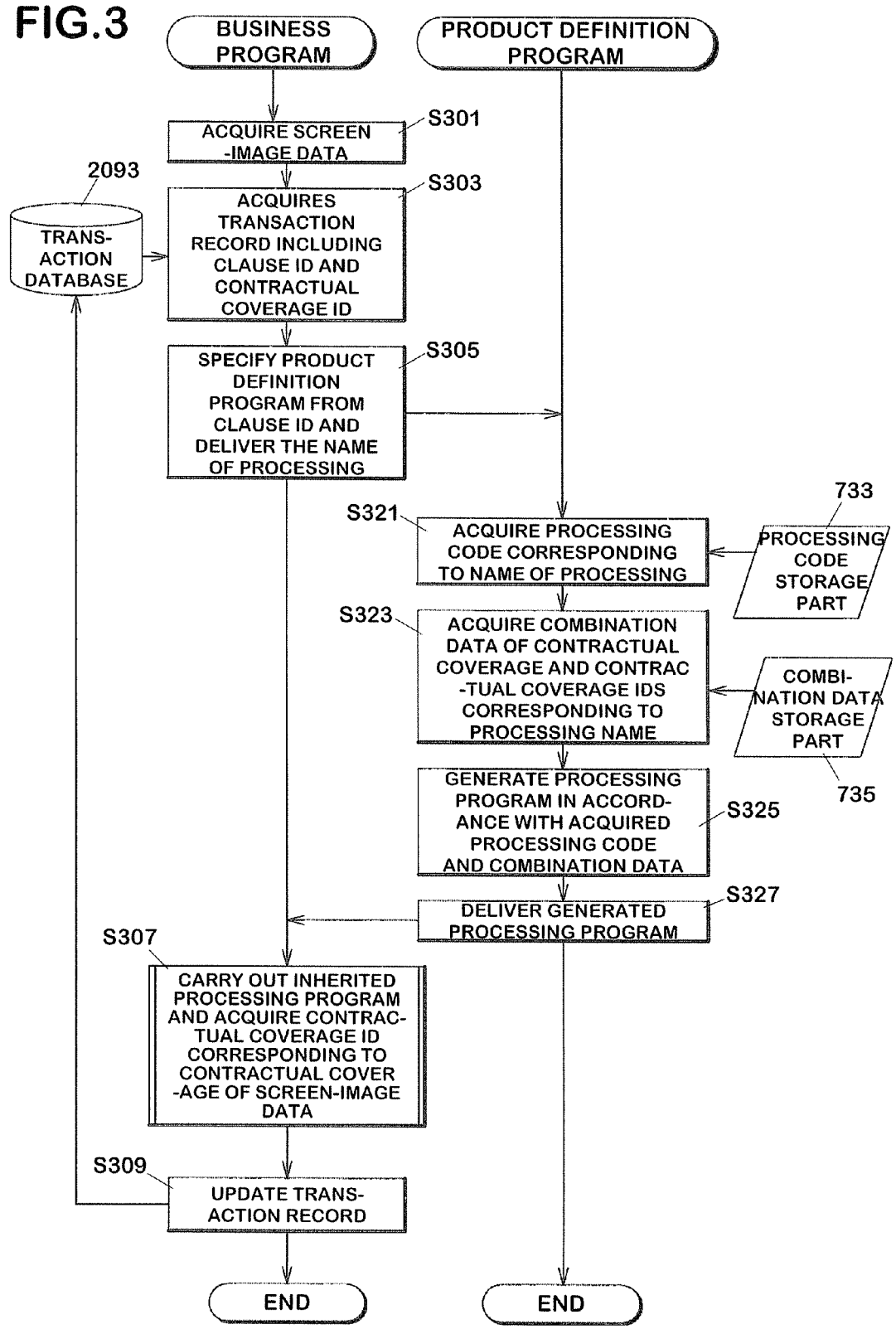
FIG. 3 is a flowchart of a business application program and a product definition program according to the present invention.

In this embodiment, a case in which a user instructs to change the class of annuity in a transaction data specified by policy number from "annuity certain" to "whole life annuity with guaranteed installment" will be described. FIG. 3 is a flowchart of a business program 2091 and a products definition program 2094 performed by the data management apparatus 1 in the above case.

1-3-1. Acquisition of Screen-Image Data

Figure 5:
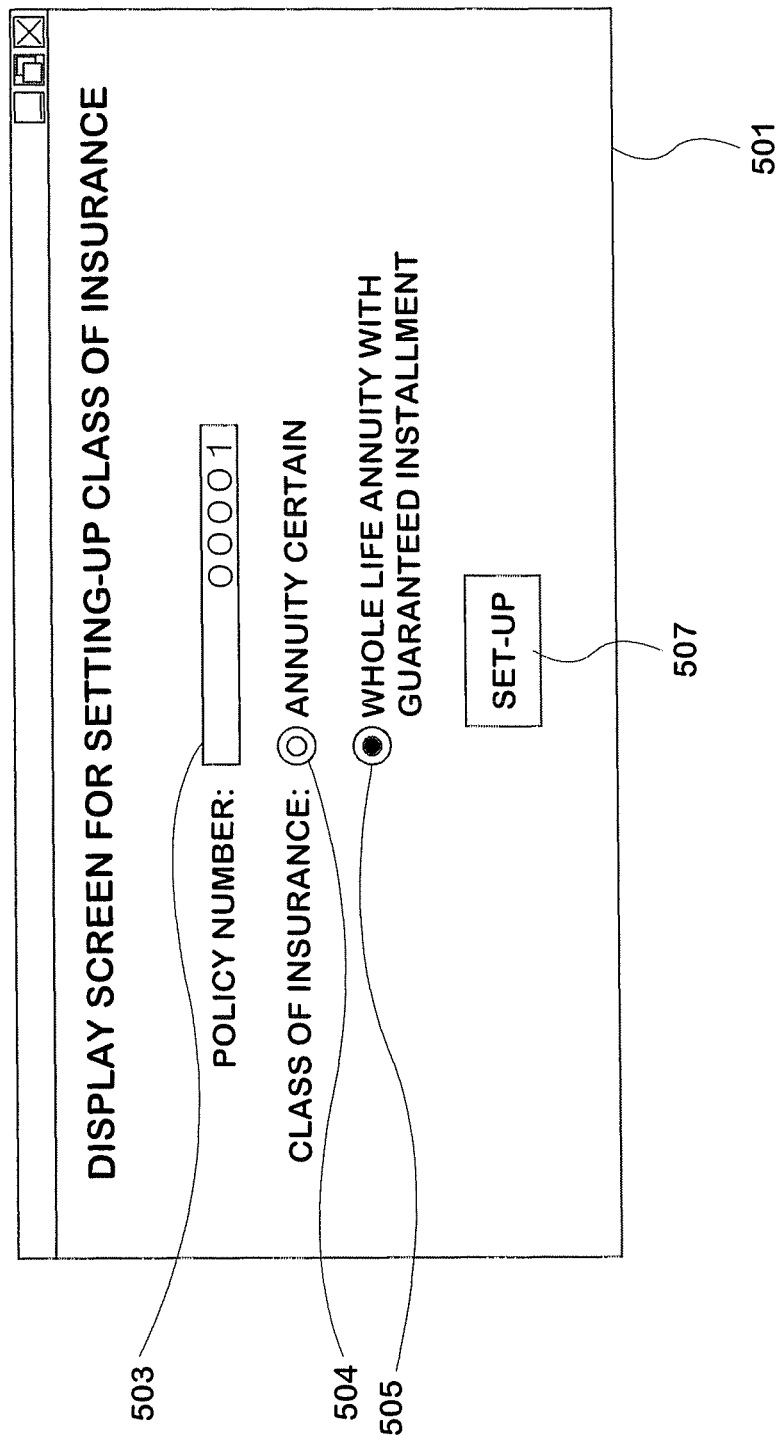
FIG. 5 is a diagram showing display screen for setting-up class of annuity according to the present invention.

FIG. 5 is a diagram showing a display screen for setting-up class of annuity 501 displayed on a display 201 as a result of carrying out the business program 2091 by a main processing part 711. In this display screen, an entry field of policy number 503, radio buttons 504 and 505 for setting-up class of annuity are displayed thereon, and an operator of the data management apparatus 1 can instruct change of insurance class for the transaction data on a life insurance contract specified by a predetermined policy number. For example, the operator instructs the apparatus 1 change of annuity class by inputting "00001" in the entry field 503 and selects the radio button 505 for whole life annuity with guaranteed installment and then clicking a set-up button 507 for setting-up using the key board/mouse 207.

Upon clicking the set-up button 507, the CPU 203 implementing the main processing part 711 acquires screen-image data (steps S301). For example, the CPU 203 acquires a policy number "00001" and the class of annuity "whole life annuity with guaranteed installment" as screen-image data.

1-3-2. Acquisition of Records

The CPU 203 implementing the main processing part 711 access to the transaction database 2093 and conducts a search in accordance with the policy number inputted as the screen-image data, and acquires a transaction record specified by the policy number in a work region generated on the memory 205 (step S303).

Figure 6:
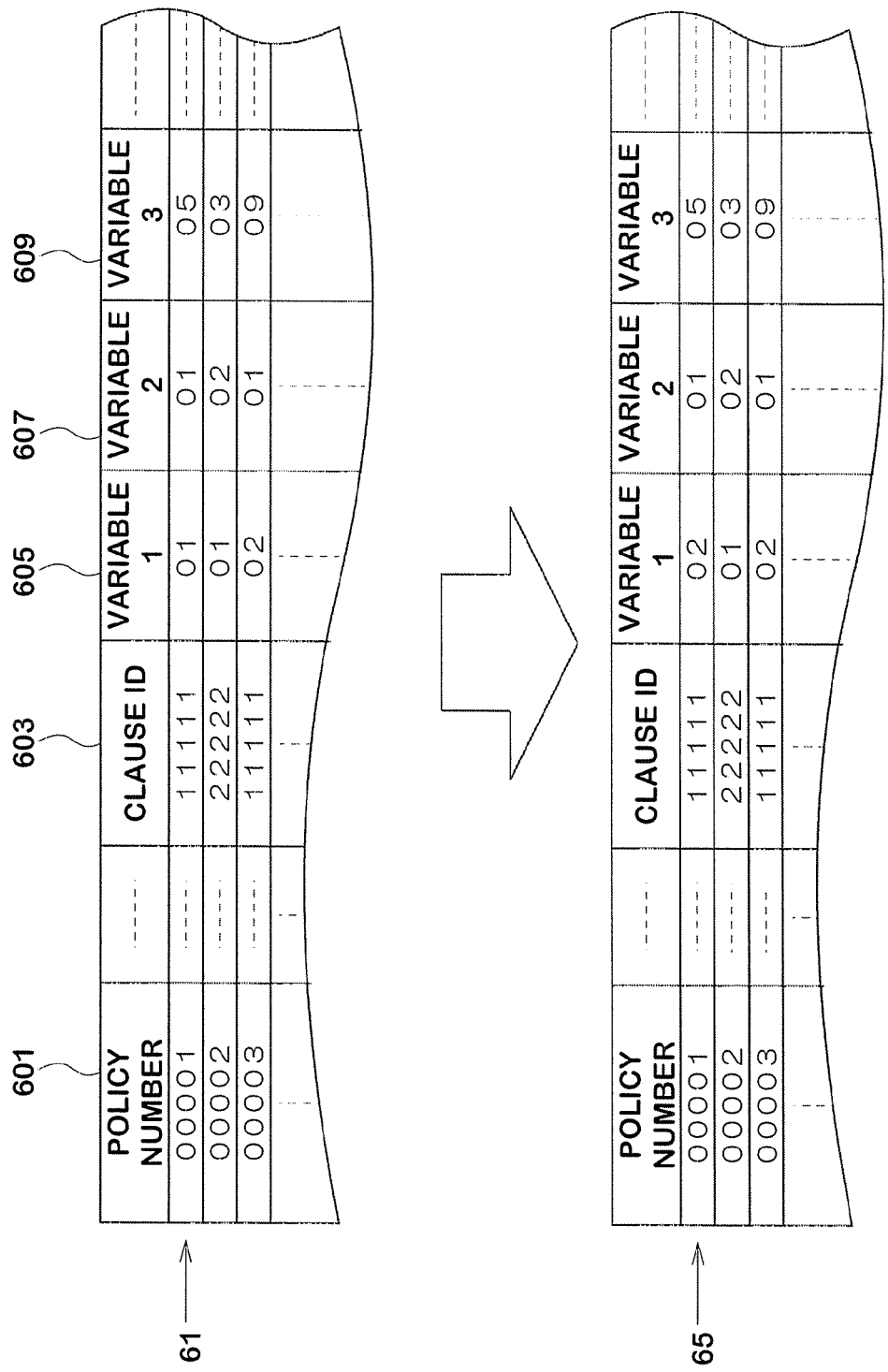
FIG. 6 is a diagram showing a transaction data base according to the present invention.
Figure 7:
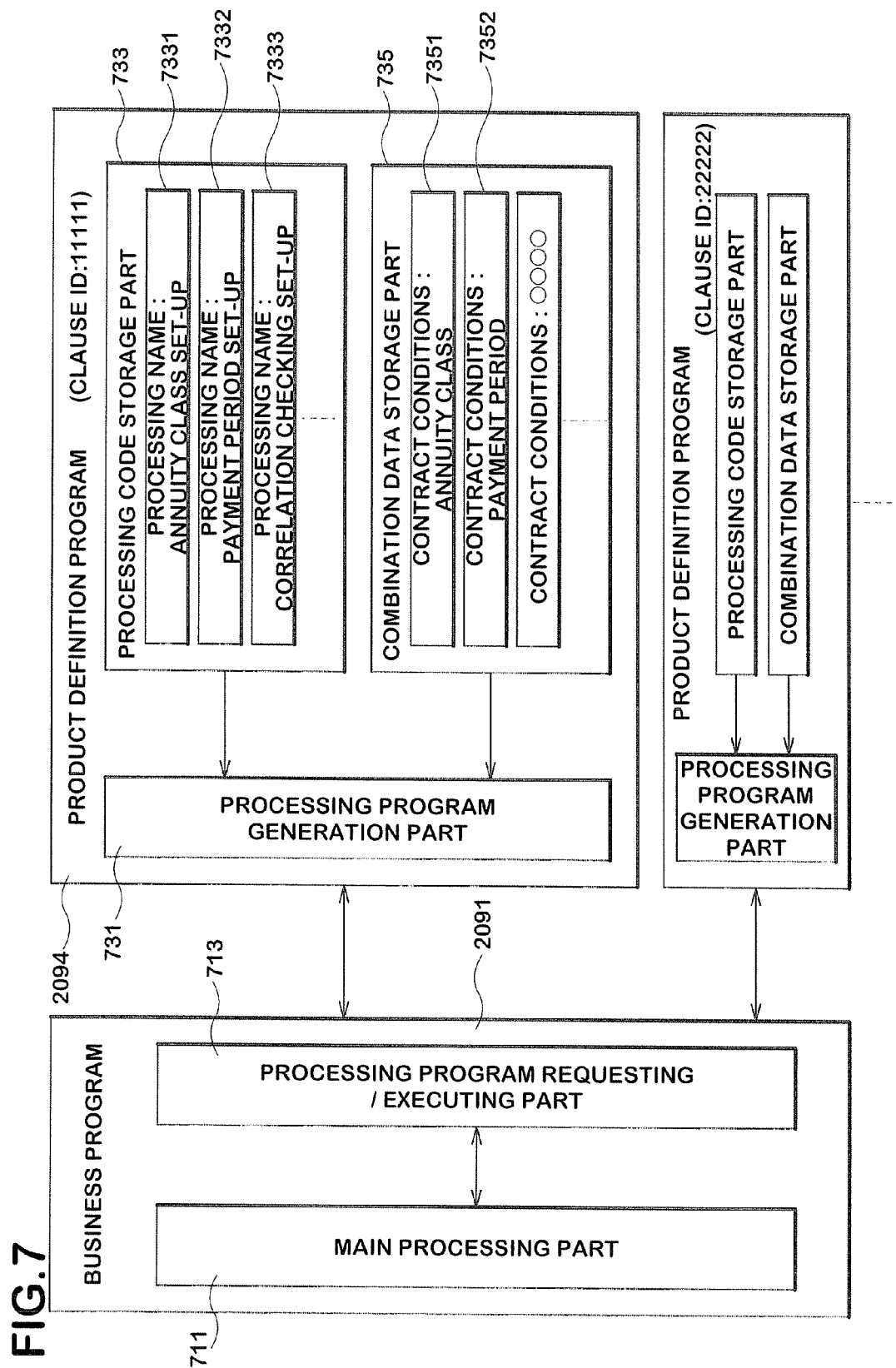
FIG. 7 is a block diagram of both the business application program and the product definition program according to the present invention.

FIG. 6 shows a diagram showing a transaction data base 2093. In this database, a policy number 601, a clause ID 603, a variable 1_605, a variable 2_607 and a variable 3_609 and so on are stored as transaction data regarding contractual management of life insurance. The recording format of the work region is the same as that of the transaction database. Here, the policy number 601 is a data ID for specifying a transaction record, the clause ID 603 is an ID for specifying a insurance product, the variable 1_605, the variable 2_607 and the variable 3_609 and so on are contractual coverage IDs for specifying respective contractual coverage.

For example, the CPU 203 acquires from the transaction database 2093 a transaction record 61 specified by a policy number "00001".

1-3-3. Request for a Processing Program

The CPU 203 implementing the processing program requesting/execution part 713 specifies the product definition program 2094 in accordance with the clause ID recorded in the transaction record which is acquired by carrying out of the main processing part 711 and delivers the name of processing to the product definition program (step S305).

When the product definition program 2094 is written in Java (Trademark) language, such program 2094 may be specified by a class file (11111.class) and the like recorded under the same name of the clause ID (11111). Also, the product definition program may be specified using a clause ID and a corresponding table of the product definition program 2094.

The name of processing delivered to the product definition program 2094 is determined according to an instruction from the operator. For example, the CPU 203 delivers the name of processing "setting-up class of annuity" acquired through implementing the main processing part 711 because an instruction to set up class of annuity is made on the annuity class set-up display screen in the above description.

1-3-4. Acquisition of Processing Data and Combination Data

Subsequently, the case in which a processing code is delivered to the product definition program 2094 having clause ID "11111", will be described hereunder. On receipt of delivery, the CPU 203 carries out the processing program generation part 731 of the program 2094 and acquires a processing code corresponding to the name of processing being delivered, by conducting a search of the processing code storage part 733 (step S321). In the processing code storage part 733, processing codes are recorded for each processing name. For example, the CPU 203 acquires a processing code 7331 which has a processing name of "annuity class set-up" by conducting a search and the like.

Subsequently, the CPU 203 acquires combination data of contractual coverage and the contractual coverage IDs corresponding to the name of processing inherited by conducting a search of the combination data storage part (step S323). In the combination data storage part 735, combination data are stored for each of the contractual coverage (per data item). For example, the CPU 203 acquires combination data 7351 of which contract terms is "annuity class".

Figure 7A:
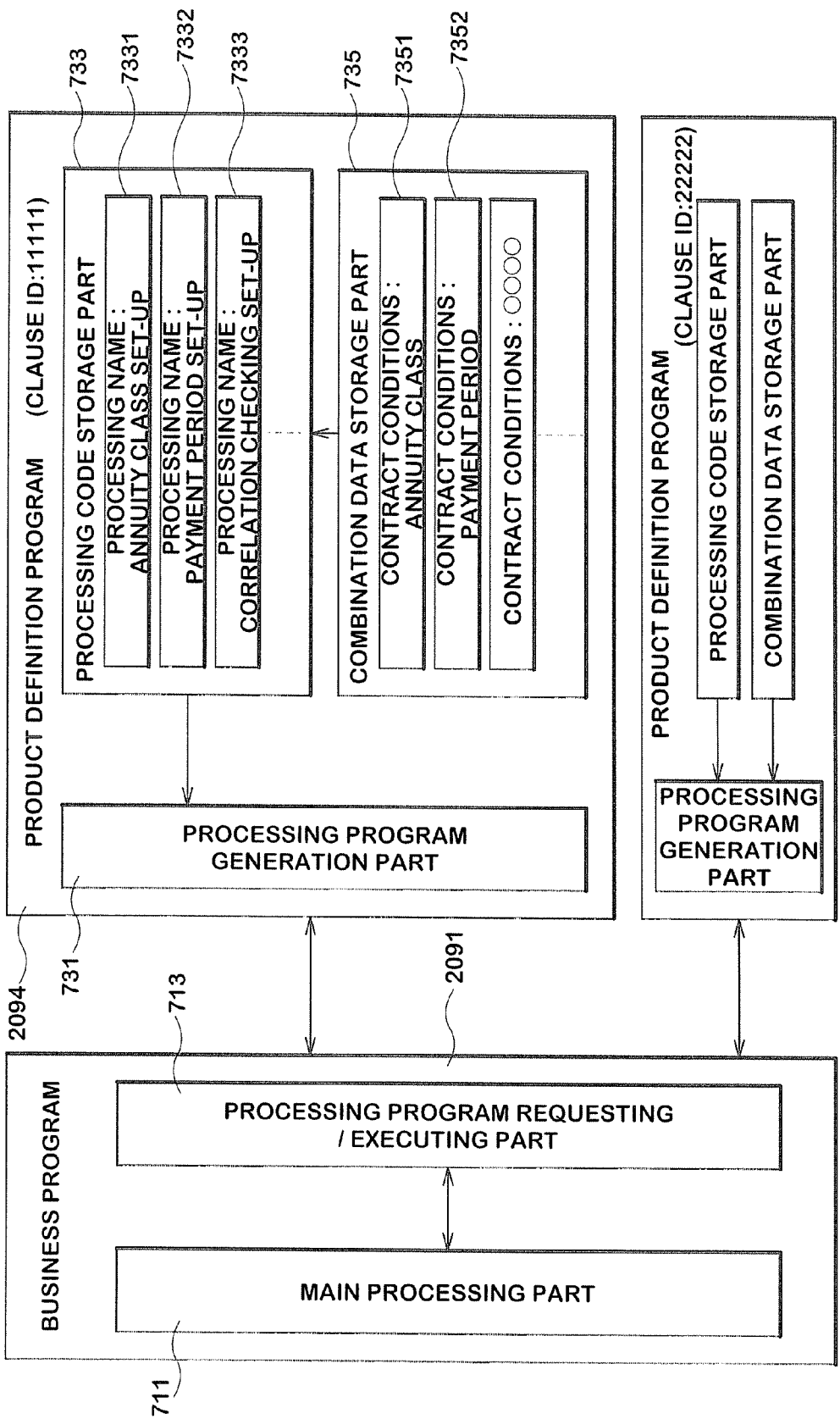
FIG. 7a is another block diagram of both the business application program and the product definition program according to the present invention.

As shown in FIG. 7a, it is possible to construct the programs so that a part of functions of the processing program generation part 731 is provided to the processing code storage part 733, and conduct a search for the combination data storage part 735 from the processing code storage part 733, and then acquires contractual coverage corresponding to the name of processing and combination data of the contractual coverage ID.

1-3-5. Generation of Processing Program

Figure 8:
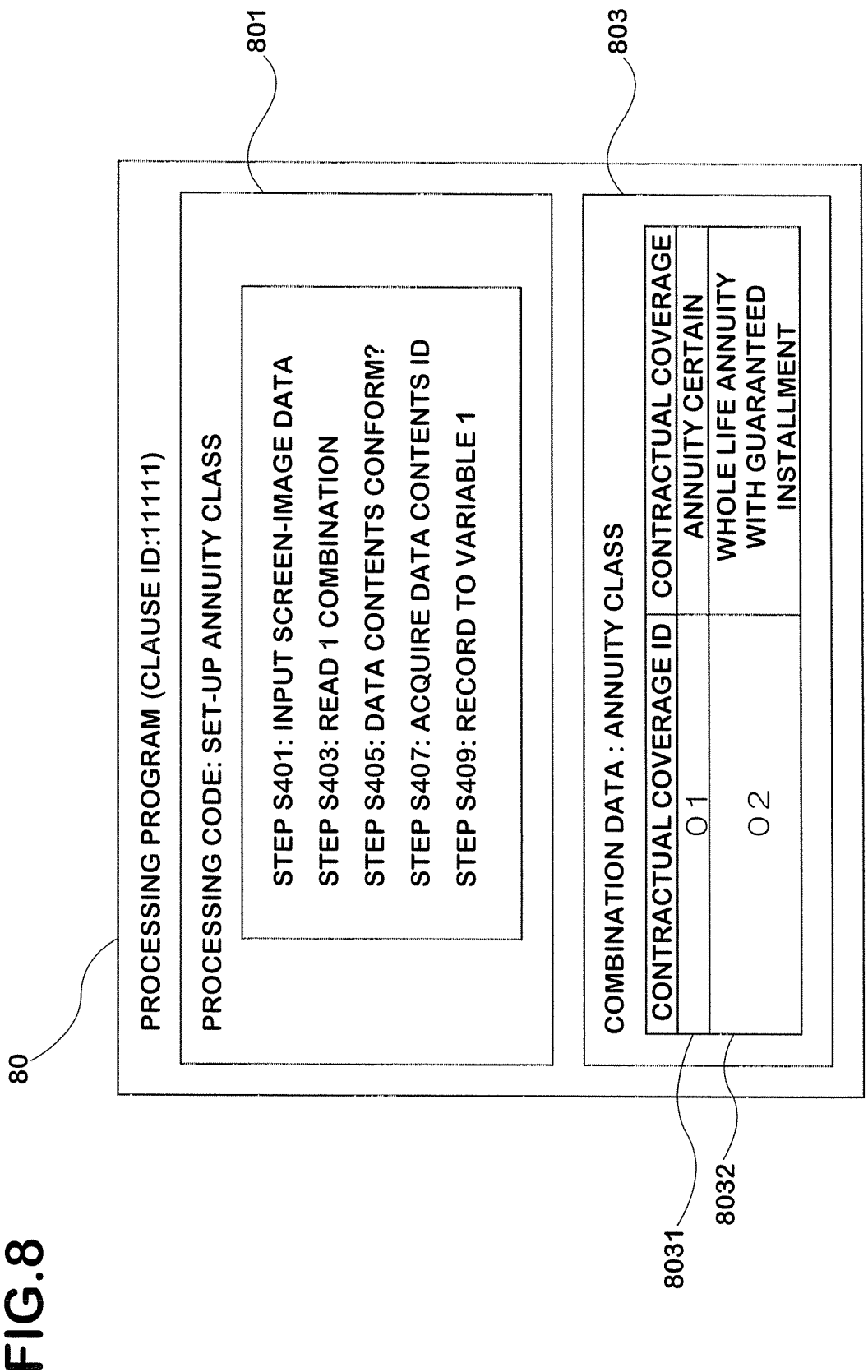
FIG. 8 shows a diagram illustrating a structural example of the processing program.

The CPU 203 generates a processing program in accordance with the processing code acquired from the processing code storage part and combination data acquired from the combination data storage part (step S325). FIG. 8 shows a diagram illustrating a structural example of the processing program thus generated. Such processing program 80 comprises a processing code 801 and combination data 803. A program code for processing "setting-up annuity class" is described in the processing code 801, for example. Such description format of the program code may either be a source code or an object code.

In the combination data 803, a contractual coverage ID used by the program code for processing "setting-up annuity class" and combination data of the contractual coverage are described. The description format of the combination data can be any format capable of identifying the contractual coverage corresponding to the contractual ID at the execution of the program code. Formats such as a sequence format and a table format and the like correspond to the description format.

1-3-6. Delivery of Processing Program

The CPU 203 carrying out the product definition program 2094 delivers the generated processing program 80 to the business program 2091 (step S327). For example, the CPU 203 carries out a processing for delivering the processing program 80 using a redirect function and a pipe function and so on.

1-3-7. Execution of Processing Program

Figure 4:
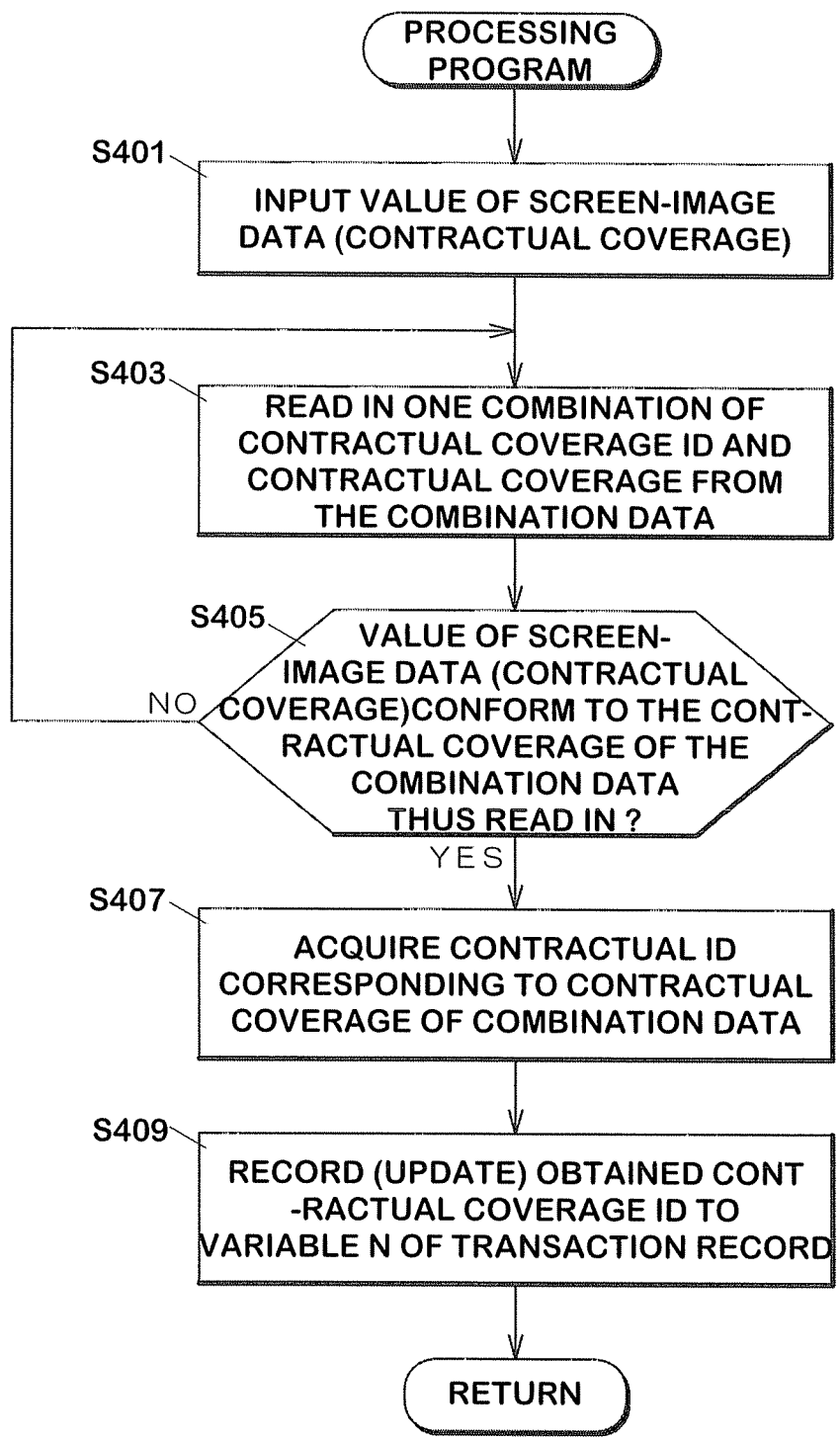
FIG. 4 is a flowchart of a processing program according to the present invention.

In implementing the business program 2091, the CPU 203 carries out the processing program 80 received from the product definition program 2094, and acquires the contractual coverage ID corresponding to the contractual coverage acquired through the screen-image data (step S307). FIG. 4 shows a flowchart of a processing program 80 performed at that time. In implementing the processing program 80, the CPU 203 inputs contractual coverage acquired through the screen-image data acquired at step S301 in the flowchart of the business program 2091. (step S401). "Whole life annuity with guaranteed installment" is input as the contractual coverage, for example.

The CPU 203 reads in a piece of combination data of a contractual coverage ID and contractual coverage from the combination data 803 stored in the processing program 80 (step S403). For example a contractual coverage ID "01" and, the combination data 8031 of the contractual coverage ID and the contractual coverage "annuity certain" are read in from the combination data of the processing program 80 shown in FIG. 8.

Then the CPU 203 judges whether or not the inputted contractual coverage conforms to the contractual coverage of the combination data thus read in (step S405). For example, a judgment whether or not the contractual coverage "whole life annuity with guaranteed installment" thus inputted conforms to combination data of the contractual coverage "annuity certain" of the combination data initially read in.

If both the contractual coverage do not conform each other in step S405, the process returns to step S403 and reads in the subsequent combination data and carries out the step 405 again (step S405, NO). When both conform each other, the process proceeds to step S407 and acquires the contractual coverage ID corresponding to the contractual coverage of the combination data (step S407). For example, since the contractual coverage "whole life annuity with guaranteed installment" conforms to that of the combination data 8032 read in secondly (contractual coverage ID "02" and contractual coverage "whole life annuity with guaranteed installment"), the contractual coverage ID "02" corresponding to that contractual coverage is obtained.

The CPU 203 records the contractual coverage ID thus obtained to a predetermined position of variable in the work region obtained from the transaction record (step S409). For example, a contractual coverage "02" is recorded in a variable 1 of the work region representing a position in variable of annuity class. Here, information on the variable position to which the contractual coverage is recorded, is previously set-up within the processing code originating the processing program 80.

Alternatively, the variable position may also be set up at out of the processing code. For example, the variable position may be set up at the combination data or independent variable position data and so forth and may incorporate into a processing program 80 during the generation thereof.

When the processing program 80 is written in Java™, the processing program 80 may configured to generate the processing program 80 so that combination data of the contractual coverage ID and the contractual coverage data to be set to Key and Value of HashMap class in JavaAPI, and the contractual coverage so on may be handled by specifying a method of acquiring data within the processing program 80.

1-3-8. Updating Record

Upon completion of implementing the processing program 80, the CPU 203 updates the record of the transaction database 2093 in accordance with the data recorded in the work region (step S309). For example, the transaction 61 record shown in FIG. 6 becomes a transaction record 65 as a result of the update. As show in FIG. 6, "01" of the variable 1 of the record 61 is updated as "02" of the variable 1 of the record 65.

1-4. Conclusion

As described in the above, contractual coverage based on a plurality of contract conditions can be managed using one item in the transaction data in accordance with the present invention. As a consequence, it is possible to acquire contractual coverage in a desired contract condition and carry out processing according to a contractual coverage based on the acquired coverage without managing the contractual coverage for each contract condition of insurance product data in the transaction database. In this way, system configuration can be simplified by unitizing the format even when transaction data containing data having a plurality of data items is handled.

It is not necessary to describe characteristics based on the product in the business program by specifying the product definition program according to class ID (clause ID) representing the product class as well as setting up so that data processing is carried out with a processing program 80 generated using a predetermined processing code and combination data in the specified product definition program. In this way, maintenance-ability of the business program can be increased.

In addition, appropriate operation is carried out by just adding a product definition program and setting up necessary processing code and necessary combination data even when a new product(s) is added. Consequently, systemic change can be carried out flexibly without impose a heavy burden on system engineers who develop such programs.

The present invention can build computer software capable of increasing versatility of a business program by independently configuring both a judgment logic determined according to the contents of product data and the business program calling up the judgment logic. As a consequence, it is necessary is to design only the processing code and combination data in the product definition program so that the such code and data are suitable for the business of each company when the present invention is applied to a software package which customizes in accordance with operational setup of each introductory company. By doing that, the development costs and the introductory costs may be reduced because of no customization of the business program is needed.

2. Second Embodiment

Although, the business program 2091 comprises the main processing part 711 and the processing program requesting/execution part 713, and the product definition program 2094 includes the processing program generation part 731, the processing code storage part 733 and the combination data storage part 735 in the first embodiment as shown in FIG. 7, in this embodiment, an example in which processing according to the request of the processing program requesting/execution part 713 is configured using a wrapper program independent from the business program will be described herein. The wrapper program is a program intensively implementing a predetermined processing in response to a request from the outside.

Figure 9:
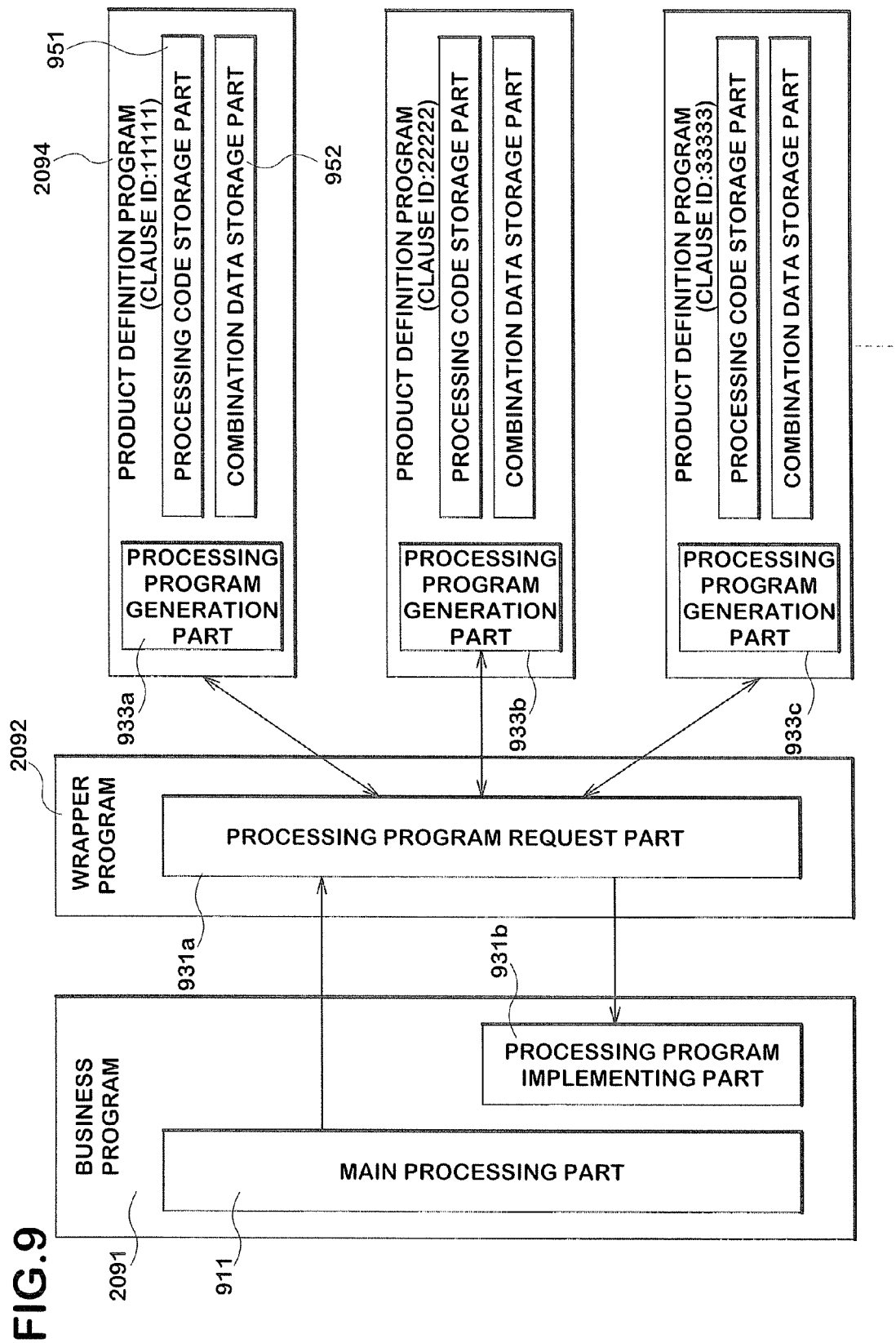
FIG. 9 shows a functional diagram of the business application program, the wrapper program and the product definition program according to the present invention.

FIG. 9 shows a functional diagram of the business program 2091, the wrapper program 2092 and the product definition program 2094. The business program 2091 comprises a main processing part 911 for implementing processing on user interface such as image processing and a database and a processing program execution part 931b for implementing the processing program. The wrapper program 2092 includes a processing program request part 931a for requesting the processing program to the product definition program 2094 and so on. The product definition program 2094 comprises processing program generating parts 933a, 933b, 933c and so on for generating the processing program on receipt of a request, a processing code recording part 951 and a combination data recording part 952 recording combination data of contractual coverage ID and contractual coverage for each processing name (for example, when the clause ID="11111").

Similar to the first embodiment, this embodiment will describe a data management apparatus managing transaction data on contract management and product defining data on life insurance products as well.

2-1. Functional Block Diagram

The functional block diagram of the data management apparatus 1 is the same as that used in the first embodiment show in FIG. 1.

2-2. Hardware Structure

A hardware structure of a computer device with a CPU which realizes the data management apparatus 1 according to the present invention is basically the same as that in the first embodiment shown in FIG. 2. The difference between the structures is in that the wrapper program is stored in the hard disk 209.

2-3. Processing Details

Details of processing according to this embodiment will be described using FIG. 10. In this embodiment, the business program 2091 is an application program for managing contract data of life insurance and products data of life insurance.

Similar to the first embodiment, a case in which a user instructs to change the class of annuity in a transaction data specified by policy number from "annuity certain" to "whole life annuity with guaranteed installment" will be described in this embodiment as well. FIG. 10 is a flowchart of the business program 2091, the wrapper program 2092 and the product definition program 2094 executed by the data management apparatus 1 in the above mentioned case.

2-3-1. Acquisition of Screen-Image Data

Similar to the first embodiment, a case in which the operator inputs "00001" in the entry field 503 of the policy number and selects the radio button 505 for whole life annuity with guaranteed installment and then clicks a set-up button 507 for set-up in the display screen for setting-up class of annuity 501 shown in FIG. 5 will be described.

Upon clicking the set-up button 507, the CPU 203 implementing the main processing part 911 acquires screen-image data (steps S1001). For example, the CPU 203 acquires a policy number "00001" and the class of annuity "whole life annuity with guaranteed installment" as screen-image data.

2-3-2. Acquisition of Records

The CPU 203 implementing the main processing part 911 access to the transaction database 2093 and conducts a search in accordance with the policy number inputted as the screen-image data, and acquires a transaction record specified by the policy number in a work region generated on the memory 205 (step S1003). An example of transaction database 2093 and that of the work region are the same as shown in FIG. 6 in the first embodiment. For example, the CPU 203 acquires the transaction record 61 specified by a policy number "00001" from the transaction database 2093.

The CPU 203 executing the business program 2091 delivers to the wrapper program 2092 the clause ID stored in the transaction record 61 and a processing name specified according to the operator's instruction (step S1005). For example, the CPU 203 delivers the name of processing "setting-up class of annuity" acquired through implementing the main processing part 911 because an instruction to set up class of annuity is made on the annuity class set-up display screen in the above description.

In the step S1005, variables 1, 2, 3 of the contractual coverage IDs of the transaction data record 61 may be delivered to the wrapper program 2092 simultaneously. Thus, processing based on contractual coverage ID can be executed in the wrapper program 2092 or the product definition program 2094.

2-3-3. Execution of Wrapper Program

The CPU 203 executing the wrapper program 2092 in the processing program request part 931*a* specifies a product definition program in accordance with the clause ID inherited from the business program 2091 and delivers the processing name by accessing the specified product definition program 2094 (step S1021).

2-3-4. Acquisition of Processing Data and Combination Data

Upon delivery, the CPU 203 carries out the processing program generating part 933*a* of the product definition program 2094 and acquires a processing code corresponding to the inherited processing name from the processing code recording part (step S1041). In the processing code recording part 951, processing codes are recorded for each processing name. For example, the CPU 203 acquires a processing code named as "setting-up class of annuity".

Subsequently, the CPU 203 acquires from the combination data recording part 952 combination data of both contractual coverage and contractual coverage ID corresponding to the inherited processing name (step S1043). In the combination data recording part 952, combination data is recorded for each contract condition. For example, the CPU 203 acquires combination data whose contract condition is "class of annuity".

2-3-5. Generation/Execution of Processing Program

The CPU 203 carrying out the product definition program 2094 generates a processing program 80 according to the acquired processing code and the combination data (step S1045). An example of the generated processing program 80 is the same as the one described in the first embodiment and shown in FIG. 8.

The CPU 203 executing the product definition program 2094 delivers the generated processing program 80 to the wrapper program 2092 (step S1047). On receipt of such program, the CPU 203 carrying out the wrapper program 2092 further delivers the processing program 80 to the business program 2091 (step S1023).

The CPU 203 executing the business program 2091 carries out the inherited processing program 80 and acquires a contractual coverage ID corresponding to the contractual coverage obtained from the screen-image data (step S1007). The flowchart of the processing program 80 performed at this time is the same as that shown in FIG. 4 described in the first enforcement.

As shown in FIG. 4, the CPU acquires, for example, a contractual coverage ID "02" corresponding to a contractual coverage "whole life annuity with guaranteed installment" and records the acquired contractual coverage ID on the variable 1 in the work region of the transaction record.

2-3-6. Updating Record

Upon completion of implementing the processing program 80, the CPU 203 updates the record of the transaction database 2093 in accordance with the data recorded in the work region (step S1009). For example, the transaction record 61 shown in FIG. 6 of the first embodiment becomes a transaction record 65 as a result of the update. As show in FIG. 6, "01" of the variable 1 of the record 61 is updated as "02" of the variable 1 of the record 65.

2-4. Conclusion

As described in the above, it is possible to combine programs for requesting a desired processing program into a single program by determining a product definition program corresponding to the clause ID and to according to the present invention. In other words, request processing of the processing program which should be executed together with a specific processing of the product definition body can be independent from the business program. Thus, the wrapper program can be used general-purpose to all instructions. This leads to the fact that, system configuration can be simplified and maintenance-ability of the business program can be increased because it is unnecessary to generate programs executing the specific processing of the product definition body and the request processing of the processing program for every instruction of the operator in the business program.

FIG. 9*a* shows another embodiment in which a wrapper program is used. In this embodiment, the wrapper program constitutes both the processing program request/execution part 931 and the processing program generating part 933. In addition, FIG. 10*a* is a flowchart of the business program 2091, the wrapper program 2092 and the product definition program 2094 executed by the data management apparatus 1 in the above-described cases. Processing steps S1001 through S1003 and S1009 in the business program 2091 and processing step S1021 in the wrapper program 2092 are the same as that shown in FIG. 10.

Figure 10:
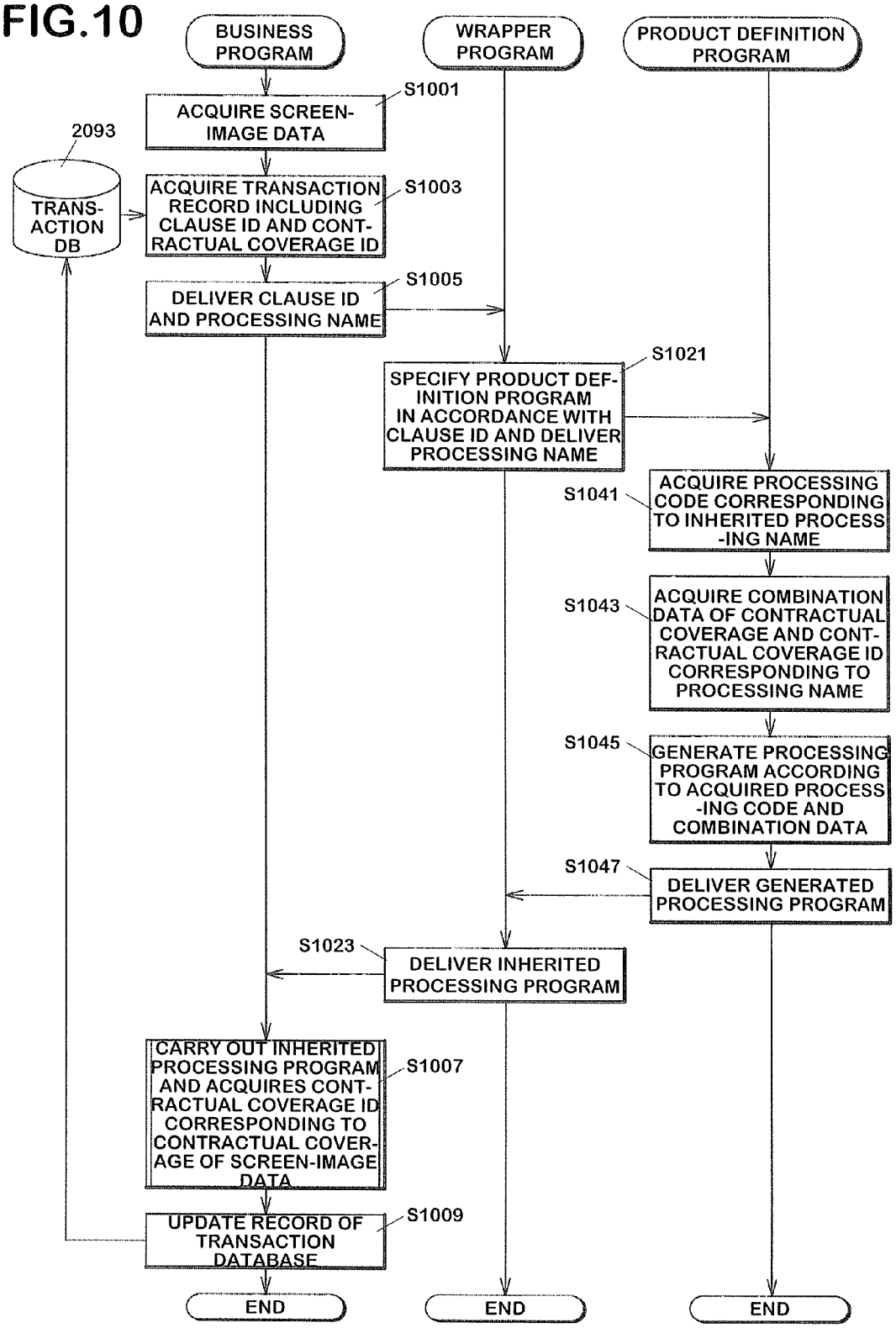
FIG. 10 is a flowchart of the business application program, the wrapper program and the product definition program according to the present invention.
Figure 10A:
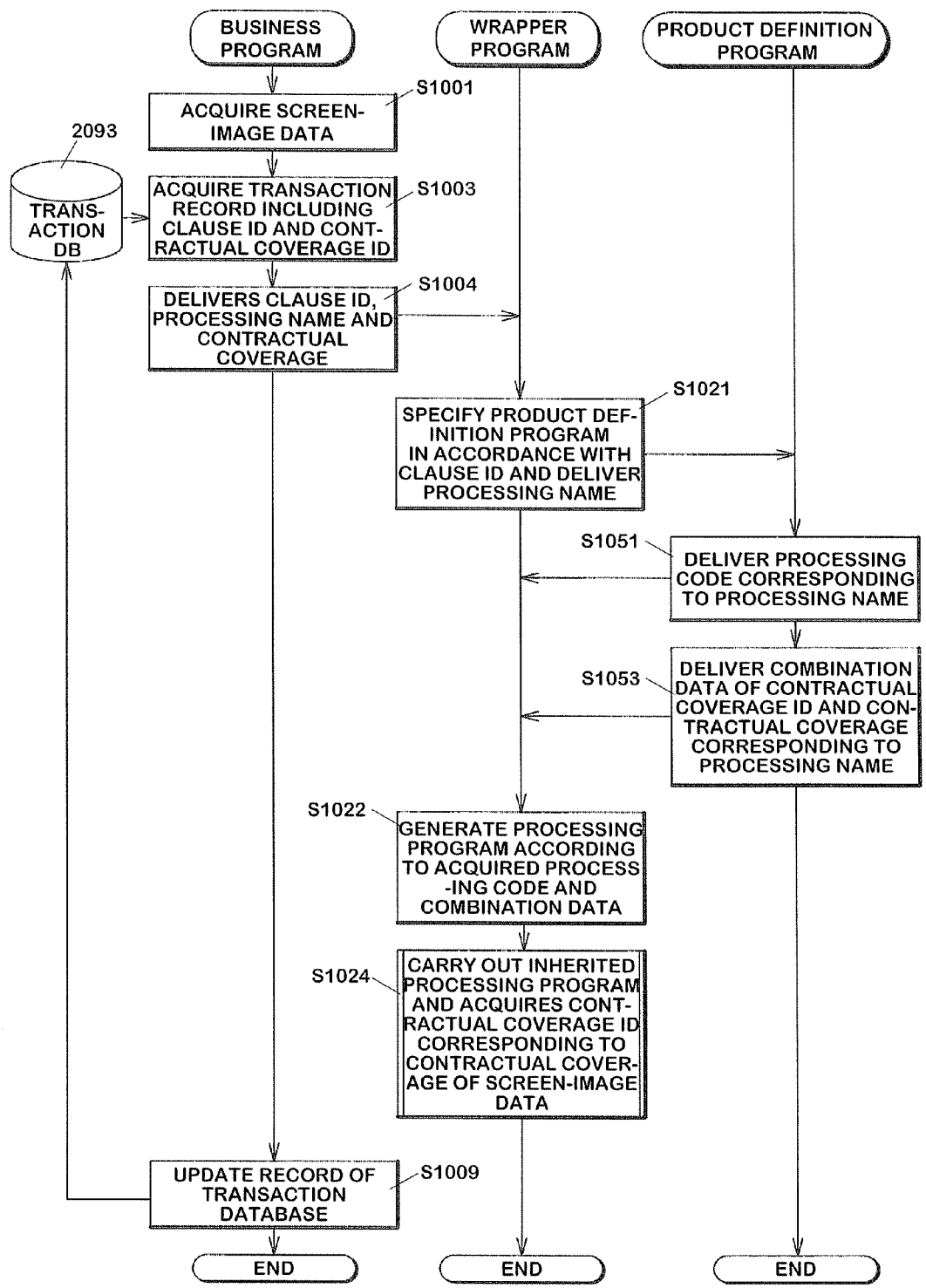
FIG. 10a is another a flowchart of the business application program, the wrapper program and the product definition program according to the present invention.

In step S1004 shown in FIG. 10, the CPU 203 executing the business program 2019 delivers clause ID stored in the transaction record 61, the specified processing name under the instruction of the operator and contractual coverage acquired from the screen image data to the wrapper program 2092.

The CPU 203 implementing the wrapper program 2092 specifies the product definition program 2094 in accordance with the clause ID inherited from the business program 2091 in the processing program request/execution part 931 and delivers to the processing program generating part 933 the specified name of the product definition program 2094 and a processing name simultaneously inherited. In addition, the processing program generating part 933 delivers the processing name to the specified product definition program 2094 inheriting such processing name (step S1021).

Upon receipt of the delivery, the CPU 203 acquires a processing code corresponding to the processing name inherited from the processing code recording part 951 by executing the specified product definition program 2094 and delivers the code to the wrapper program 2092 (step S1051). In the processing code recording part 951, processing codes are recorded for every processing name. For example, the CPU 203 acquires a processing code named as "setting-up class of annuity".

The CPU 203 acquires combination data of the contractual coverage and the contractual coverage ID corresponding to the processing name inherited from the combination data recording part and delivers them to the wrapper program 2092 (step S1053). In the combination data recording part 952, combination data are recorded for every contract condition. For example, the CPU 203 acquires combination data whose contract condition is "class of annuity".

The CPU 203 carrying out the wrapper program 2092 generates a processing program according to the processing code inherited from the product definition program 2094 and the combination data (step S1022). An example of the generated processing program is the same as the one described in the first embodiment and shown in FIG. 8.

Subsequently, the CPU 203 implementing the wrapper program 2092 carries out the inherited processing program 80 which is generated at the processing program generating part 933 and acquires a contractual coverage ID corresponding to the contractual coverage obtained from the screen-image data (step S1024). The flowchart of the processing program 80 performed at this time is the same as that shown in FIG. 4 described in the first enforcement.

As shown in FIG. 4, the CPU acquires, for example, a contractual coverage ID "02" corresponding to a contractual coverage "whole life annuity with guaranteed installment" and records the acquired contractual coverage ID on the variable 1 in the work region of the transaction record.

As described in the above, it is possible to combine the processing for determining the contractual coverage ID or the contractual coverage into a single program according to the present invention. In other words, a program which performs both generation and implementation of a processing program which should be implemented in response to predetermined instruction may be independent of the business program.

Thus, the wrapper program can be used general-purpose to all instructions. This leads to the fact that, system configuration can be simplified and maintenance-ability of the business program can be increased because it is unnecessary to generate programs executing the specific processing of the product definition body and the request processing of the processing program for every instruction of the operator in the business program.

3. Third Embodiment In the first embodiment, an example in which after acquiring a contractual coverage ID (data contents ID) corresponding to the one contractual coverage (data contents) inputted into the screen-image data, such contractual coverage ID is stored into the transaction database is described. In this embodiment, however, a case in which a contractual coverage ID corresponding to the two or more contractual coverage (data contents) are acquired, and after implementing processing which confirms whether the combination of these contractual coverage IDs is appropriate or not, the two or more contractual coverage ID are stored in the transaction will be described.

3-1. Functional Block Diagram

The functional block diagram of the data management apparatus 1 is the same as that used in the first embodiment.

3-2. Hardware Structure

A hardware structure of a computer device with a CPU which realizes the data management apparatus 1 according to the present invention is basically the same as that in the first embodiment shown in FIG. 2.

3-3. Processing Details

Details of processing according to this embodiment will be described using FIGS. 13 through 17. The functional block diagram of the business program 2091 and the product definition program 2094 is the same as that shown in FIG. 7 of the first embodiment. A case in which a user instructs to change the class of annuity in a transaction data specified by policy number from "annuity certain" to "whole life annuity with guaranteed installment" and to change the annuity payment period from "5 years" to "whole life annuity with guaranteed installment" will be described in this embodiment as well. FIG. 13 is a flowchart of the business program 2091 and the product definition program 2094 executed by the data management apparatus 1 in the above mentioned case.

3-3-1. Acquisition of Screen-Image Data

Figure 15:
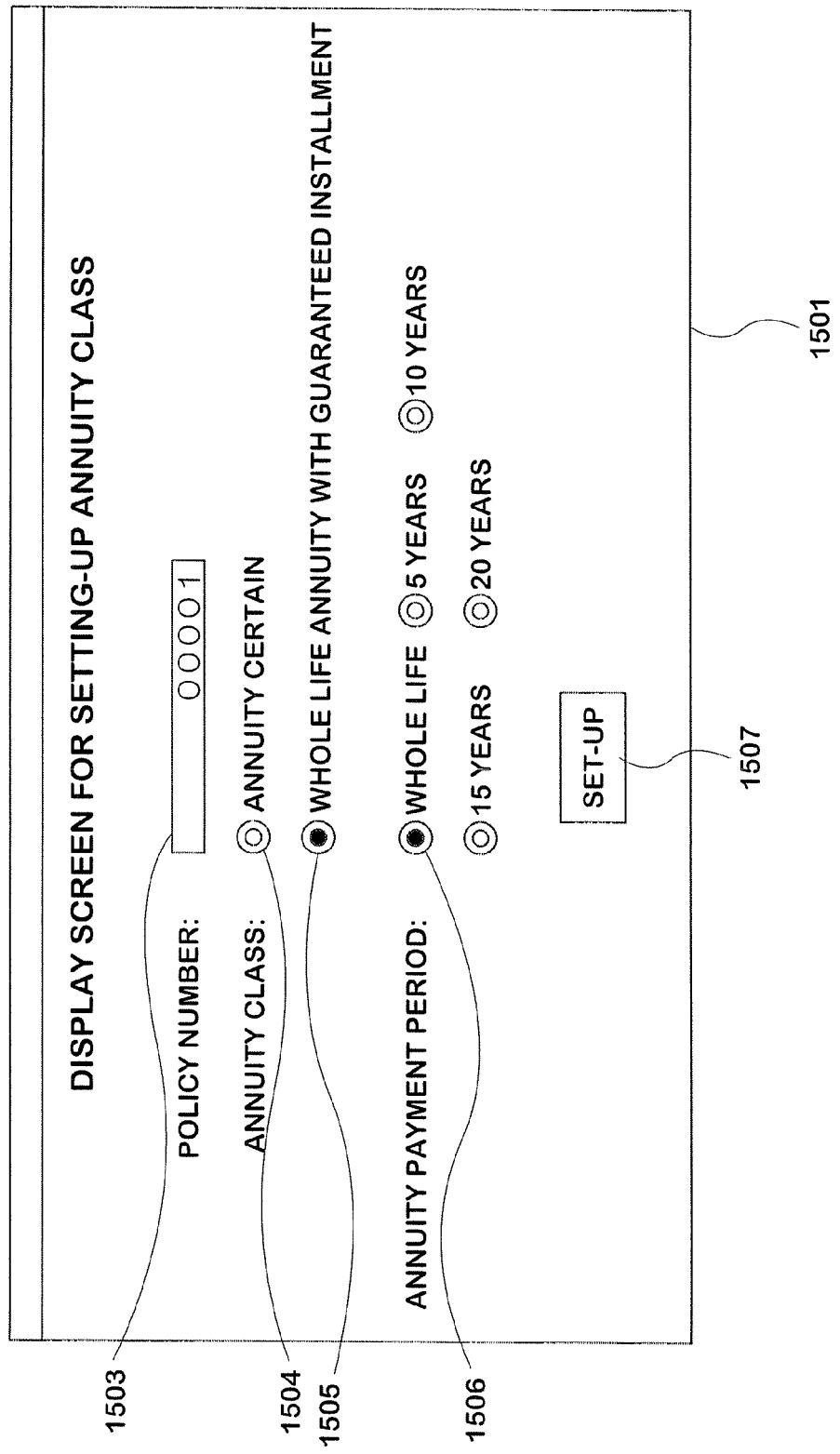
FIG. 15 is a diagram showing screen-image of an ammity-class set-up screen according to this invention.

FIG. 15 shows a screen-image of an annuity-class set-up screen 1501 displayed on the display 201 under the execution of the main processing part 711 (FIG. 7) in the business program 2091. An entry field for policy number 1503, a radio buttons for setting-up class of annuity 1504 and 1505 and a radio button for setting-up annuity payment period 1506 and so on are displayed on this screen. The operator of the data management apparatus 1 can instruct change of annuity class and of annuity payment period on the transaction data for life insurance specified by a predetermined policy number. For example, the operator inputs "00001" into the entry field for policy number 1503 with the key board/mouse 207 and selects the radio button 1505 for set-up "whole life annuity with guaranteed installment" into the annuity class field and further selects the radio button 1506 for set-up "whole life" into the annuity payment period field and then sets up the change of annuity class and of annuity payment period by clicking the set-up button 1507.

Upon clicking the set-up button 1507, the CPU 203 implementing the main processing part 711 acquires screen-image data (step S1301). For example, the CPU 203 acquires a policy number "00001" and the class of annuity "whole life annuity with guaranteed installment" and the annuity payment period as screen-image data.

3-3-2. Acquisition of Record

The CPU 203 implementing the main processing part 711 access to the transaction database 2093 and conducts a search in accordance with the policy number inputted as the screen-image data, and acquires a transaction record specified by the policy number in a work region generated on the memory 205 (step S1303).

Figure 16:
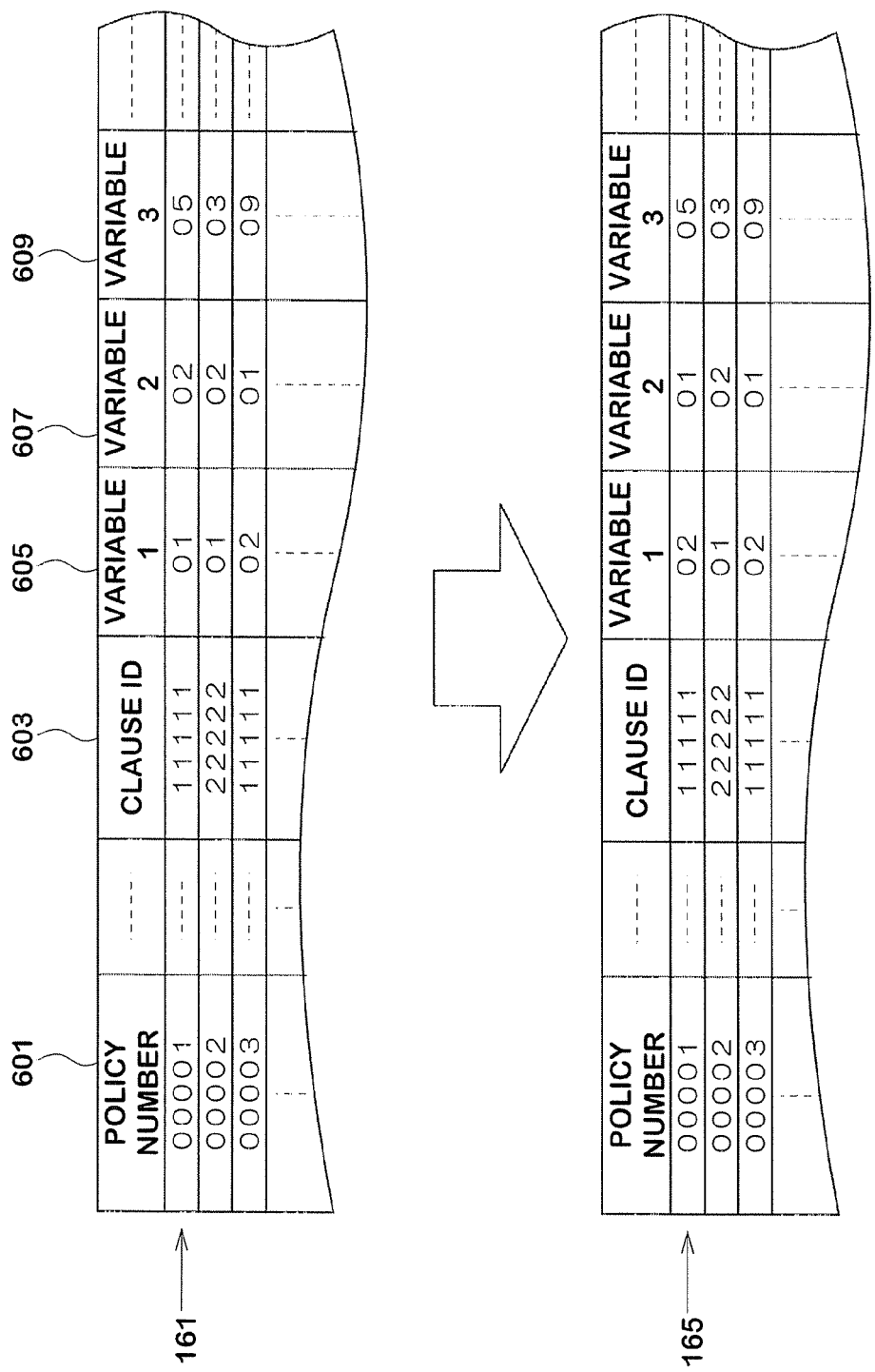
FIG. 16 is a diagram showing a transaction data base according to the present invention.

FIG. 16 shows a diagram showing a transaction data base 2093. In this database the transaction data regarding contractual management of life insurance is managed therein similar to FIG. 6 described in the first embodiment. The record format of the work region is identical with that of the transaction database. For example, the CPU 203 acquires a transaction record 161 specified by the policy number "00001" from the transaction database 2093.

3-3-3. Request for a Processing Program

The CPU 203 implementing the processing program requesting/execution part 713 specifies the product definition program 2094 in accordance with the clause ID recorded in the transaction record which is acquired by carrying out of the main processing part 711 and delivers the name of processing to the product definition program (step S1305).

For example, the product definition program 2094 is specified by a class file (11111.class) and the like written in Java™ language. The name of processing delivered to the product definition program 2094 is determined according to an instruction from the operator. For example, the CPU 203 delivers the names of processing "setting-up class of annuity", "setting-up payment period" and "checking correlation" acquired through implementing the main processing part 711 because an instruction to set up class of annuity is made on the annuity class set-up display screen in the above description. In other words, plural processing codes are delivered in this embodiment.

3-3-4. Acquisition of Processing Data and Combination Data

Subsequently, the case in which a processing name is delivered to the product definition program 2094 having clause ID "11111", will be described hereunder. On receipt of delivery, the CPU 203 carries out the processing program generation part 731 of the program 2094 and acquires a processing code corresponding to the name of processing inherited by conducting a search of the processing code storage part 733 (step S1321). In the processing code storage part 733, processing codes are recorded for each processing name. For example, the CPU 203 acquires a processing code 7331 having a processing name of "annuity class set-up", processing code 7332 having a processing name of "payment period set-up" and another processing code 7333 having a processing name of "correlation checking set-up".

Subsequently, the CPU 203 acquires combination data of the contractual coverage and the contractual coverage IDs corresponding to the name of processing inherited by conducting a search of the combination data storage part (step S1323). In the combination data storage part 735, combination data are stored for each of the contractual coverage (per data item). For example, the CPU 203 acquires both combination data 7351 and 7352 whose contract conditions are respectively "annuity class" and "payment period".

3-3-5. Generation of Processing Program

Figure 17:
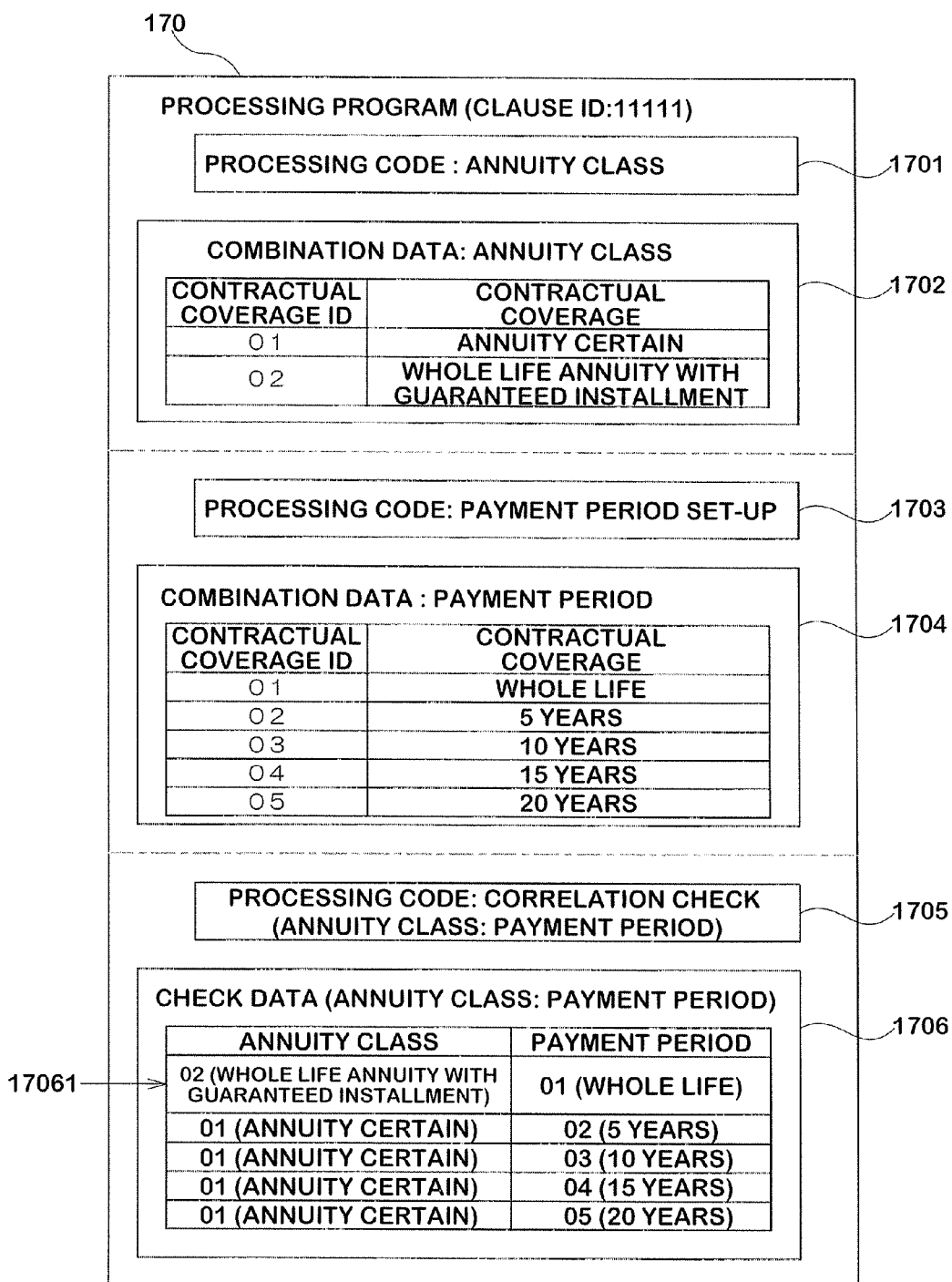
FIG. 17 is a diagram illustrating a structural example of the processing program according to the present invention.

The CPU 203 generates a processing program in accordance with the processing code acquired from the processing code storage part and combination data acquired from the combination data storage part (step S1325). FIG. 17 shows a diagram illustrating a structural example of the processing program thus generated. Such processing program 170 comprises a processing code 1701 and combination data 1702 for "annuity class set-up", another processing code 1703 and combination data 1704 for "payment period" and another processing code 1705 and check data 1706 for "correlation check".

In this case, it is assumed that the check data 1706 is stored in the same region to the processing code 1705 in the product definition program 2094. Such check data is data storing all combinations of the annuity class and payment period, the description format of the combination data can be any format capable of identifying at the execution of the processing code. For example, formats such as a sequence format and a table format and the like correspond to the description format. Data stored in the check data may be either of the contractual coverage ID and the contractual coverage.

As shown in FIG. 17*a*, the processing program may be generated for each processing code. For example, a processing program 171 for "annuity class setting-up" generated from a processing code and combination data for "annuity class set-up", another processing program 173 for "payment period setting-up" generated from a processing code and combination data for "payment period setting-up" and another processing program 175 for "correlation check" generated from a processing code and check data for "correlation checking" can respectively be generated.

3-3-6. Delivery of Processing Program

The CPU 203 carrying out the product definition program 2094 delivers the generated processing program 170 to the business program 2091 (step S1327). For example, the CPU 203 carries out a processing for delivering the processing program 170 using a redirect function and a pipe function and so on.

3-3-7. Execution of Processing Program

Figure 14:
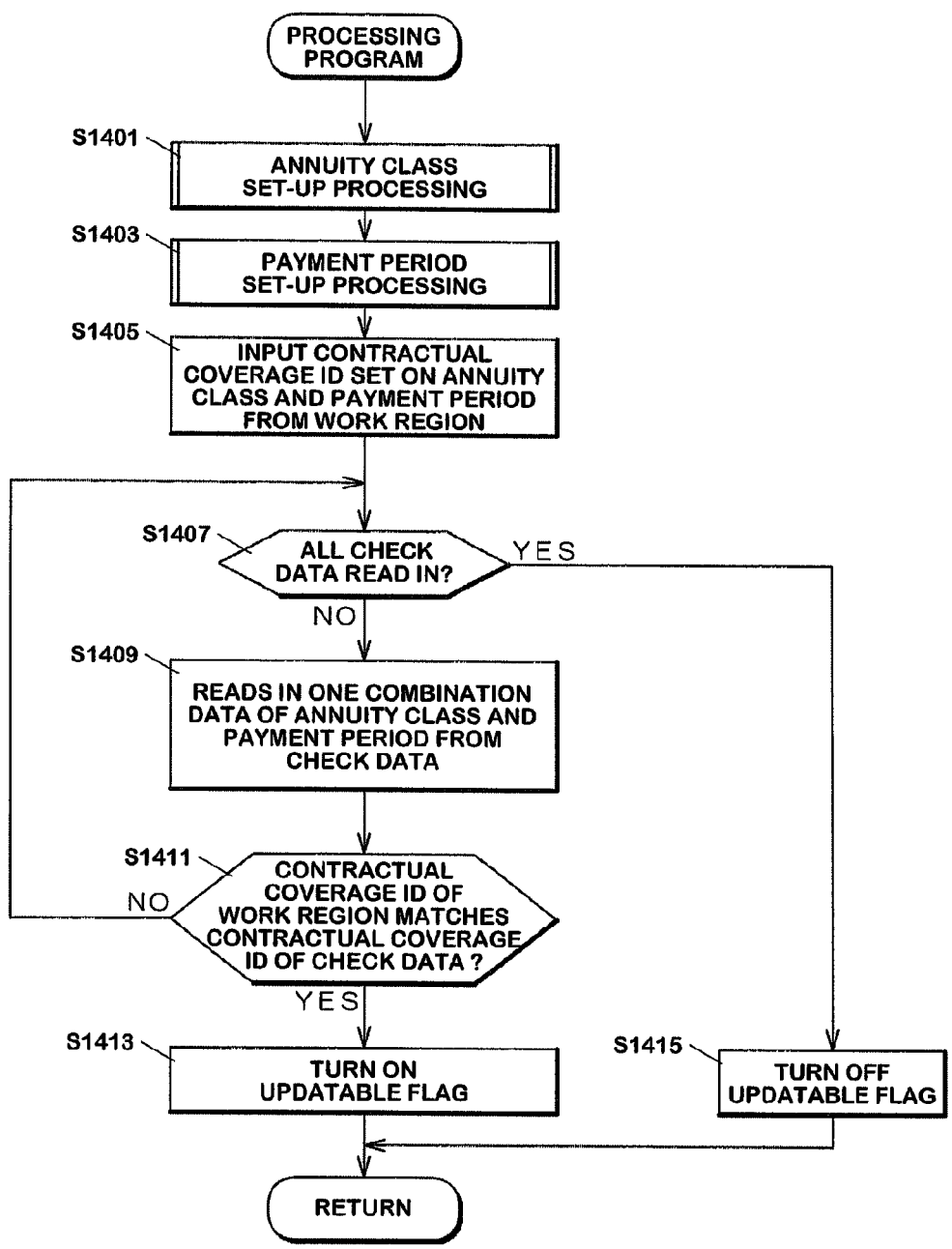
FIG. 14 is a flowchart of the processing program according to this invention.

In the business program 2091, the CPU 203 carries out the processing program 170 inherited from the product definition program 2094 (step S1307). FIG. 14 shows a flowchart of the processing program 170 performed at that time.

In implementing the processing program 170, the CPU 203 updates a contractual coverage ID on a predetermined variable position of the work region by carrying out annuity class set-up processing using the processing code 1701 and the combination data 1702 (step S1401). For example, "01" of the variable 1 is updated as "02". The flowchart of the annuity class set-up processing is similar to that shown in FIG. 4 described in the first embodiment.

Similar to step S1401, the CPU 203 updates a contractual coverage ID on a predetermined variable position of the work region by carrying out annuity period set-up processing using the processing code 1703 and the combination data 1704 (step S1403). For example, "02" of the variable 2 is updated as "01".

Subsequently, the CPU 203 carries out correlation check processing to check whether or not a preset value between the annuity class and the payment period is correct using the processing code 1705 and the check data 1706. (S1405~1415). The CPU 203 inputs contractual coverage IDs which are set on the annuity class and the payment period from the work region (step S1405). For example, a contractual coverage ID "02" representing "whole life annuity with guaranteed installment" and another contractual coverage ID "01" showing "whole life" are respectively input from the set variable 1 at step S1401.

Then, the CPU 203 judges read-in of the check data (step S1407, NO), and reads in one combination data of the annuity class and the payment period from the check data 1706 (step S1409). For example, combination data 1706 of the annuity class "02 (whole life annuity with guaranteed installment)" and the payment period "01 (whole life)" is read in from combination data of the check data 1706 in the processing program 170 shown in FIG. 17.

Next, the CPU 203 judges whether or not a combination data of the contractual coverage ID inputted from the work region matches the combination data read in from the check data 1706 (step S1411). For example, it is judged whether or not a combination of the contractual coverage ID "02" representing "whole life annuity with guaranteed installment" and another contractual coverage ID "01" showing "whole life" matches the combination data 17061 of the first annuity class "02 (whole life annuity with guaranteed installment)" and the payment period "01 (whole life)".

If no match of the contractual coverage IDs is judged in step S1411, the process returns to step S1407 and repeats similar processing (step S1411, NO). On the other hand, the process proceeds to step S1413 and flags an updatable flag if the combination of contractual coverage IDs matches each other (step S1413). For example, the updatable flag is turned on and terminates the processing because the inputted contractual coverage ID "02" representing "whole life annuity with guaranteed installment" and another contractual coverage ID "01" showing "whole life" matches the combination data 17061 initially read in.

The CPU 203 turns off the updatable flag when all combination of the check data 1706 is read in at step S1047 (step S1415). That is, in this case, it is judged that there is no check data which matches combination of the inputted contractual coverage IDs and no set up of contractual coverage IDs of the annuity class and the payment period defined in the work region can be carried out.

As described in the above, each processing program is just performed one by one basis in the above-mentioned step S1307 when plural processing programs are generated for every processing code. In this case, the processing in the processing program 171 for "annuity class setting-up" is the same as that of step S1401 (FIG. 14), the processing in the processing program 173 for "payment period setting-up" is the same as that of step S1403 and the processing in the processing program 175 for "correlation check" is the same as that of steps S1405 through S1415.

3-3-8. Updating Record

Upon completion of implementing the processing program, the CPU 203 judges whether or not update of the transaction data based on the data recorded in the work region can be executed in accordance with the updatable flag (step S1309). The CPU 203 updates the transaction data record of the transaction database 2093 when the updatable flag is in an on-state (step S1313). For example, the transaction record 161 shown in FIG. 16 becomes a transaction record 165 as a result of the update. As show in FIG. 16, "01" of the variable 1 and "02" of the variable 2 in the record 161 are updated as "02" of the variable 1 and "01" of the variable 2 in the record 165.

Further, the CPU 203 outputs an error message indicating that no update can be done to the display 201 as a result of judging non-update thereof when the updatable flag is in an off-state. The CPU 203 prompts the operator to change the input value of data (step S1311).

3-4. Conclusion

As described in the above, in accordance with the present invention, it is possible to acquire the contractual coverage IDs corresponding to the two or more contractual coverage (data contents) and carry out processing for checking whether or not the combination of these contractual IDs are correct. As a consequence, it is possible to acquire contractual coverage in a desired contract condition and carry out processing according to a contractual coverage based on the acquired coverage without managing the contractual coverage for each contract condition of insurance product data in the transaction database.

It is not necessary to describe characteristics based on the product in the business program by specifying the product definition program according to class ID (clause ID) representing the product class as well as setting up so that data processing is carried out with a processing program generated using a predetermined code and combination data in the specified product definition program. In this way, maintenance-ability of the business program can be increased.

4. The Fourth Embodiment

In the first through the third embodiment, data handling for a single transaction is described. This embodiment describes data handling of mutually related plural transactions.

In life insurance, it is common to sell one insurance product in which two or more riders are added to one basic policy. When transaction of the basic policy and that of riders are managed on the same database, it is necessary to ensure consistency with contractual coverage data of other transaction included in the same insurance product if the contractual coverage data is stored in a specific transaction.

(1) For example, in the case of the basic policy is "flat-rate annuity" and add "term insurance rider" thereto, the annuity class capable of setting up to the basic policy is limited to "annuity certain". And similarly, there might be a case that the payment term of annuity capable of setting to the basic policy is limited to "10 years".

(2) For example, in the case that the basic policy is "flat-rate annuity", there might be a case to require equal or more than 3000 yen of the minimum monthly premium if a policyholder wants to add "a rider for three major diseases security insurance".

(3) For example, in the case that the basic policy is "flat-rate annuity", the name of an insurance product is treated as "annuity A" when "term insurance rider" is added, and under the similar condition, the name of an insurance product is referred to as "annuity B" when "a rider for three major diseases security insurance" is added.

Similar to the embodiments 1 trough 3, this embodiment describes a data management apparatus managing transaction data on contract management of life insurance and data on life insurance products as well.

The term "product definition data" described in the embodiments 1 through 3 is read as "clause definition data". In other words, "clause definition program" corresponds to such term. This is because product's features of a life insurance depend on its clause, defining a clause means defining insurance coverage. Also, data for defining an insurance product in which a plurality of riders are added to one basic policy is referred to as "contract rebundle definition data". In other words, "contract rebundle definition program" corresponds to such term.

Consequently, the data management apparatus according to this embodiment is a data management apparatus for managing "clause definition data" and "contract rebundle definition data".

4-1. Functional Block Diagram

Figure 20:
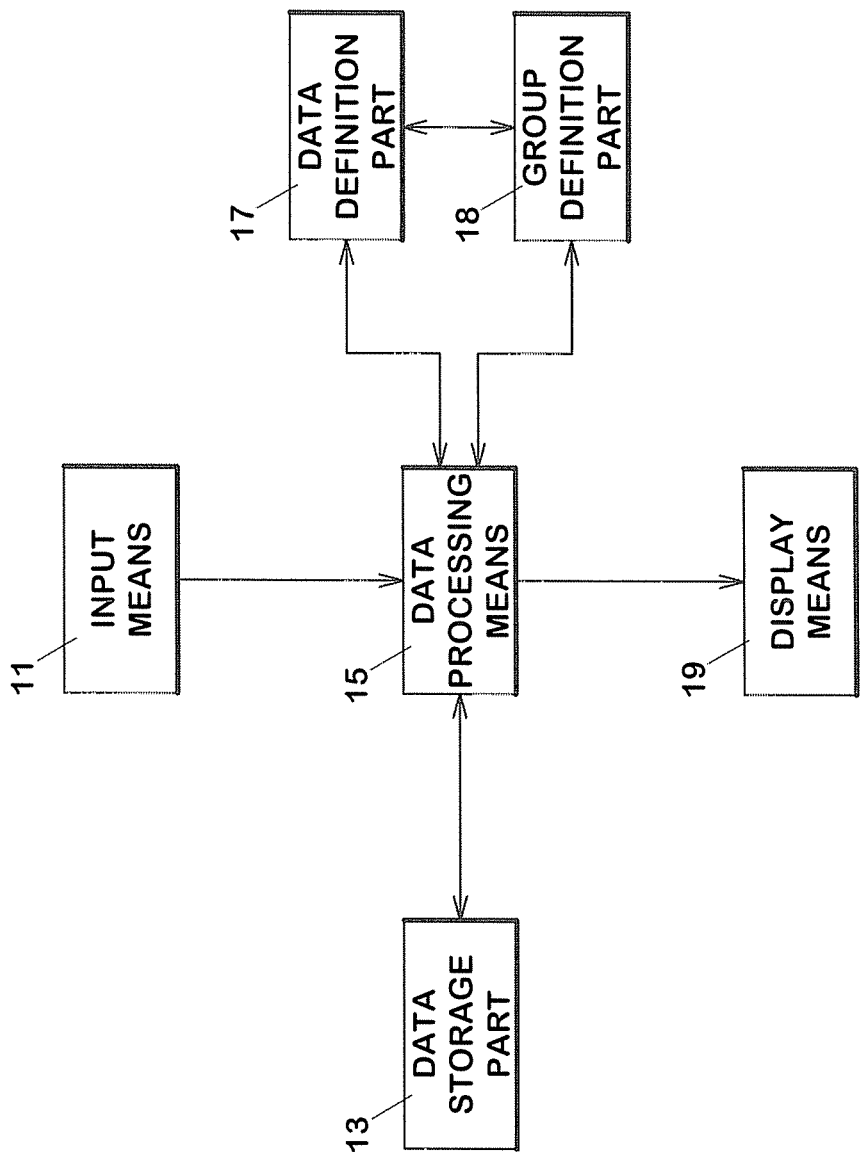
FIG. 20 is a diagram illustrating a functional block diagram of a data management apparatus according to the present invention.

FIG. 20 shows a functional block diagram of a data management apparatus 1 according to this embodiment. The data management apparatus shown in the drawing is differ from the one shown in FIG. 1 described in the first embodiment in that a group definition part 18 is added thereto. The group definition part 18 stores one of a combination of data contents ID and that of data contents, capable of being stored in the data storage part for each combination of plural kind of IDs. For example, in the case of an insurance product, one of a combination of contractual coverage IDs and a combination of contractual coverage that can handle, is stored for each combination pattern of the rider to the main insurance policy.

4-2. Hardware Structure

Figure 21:
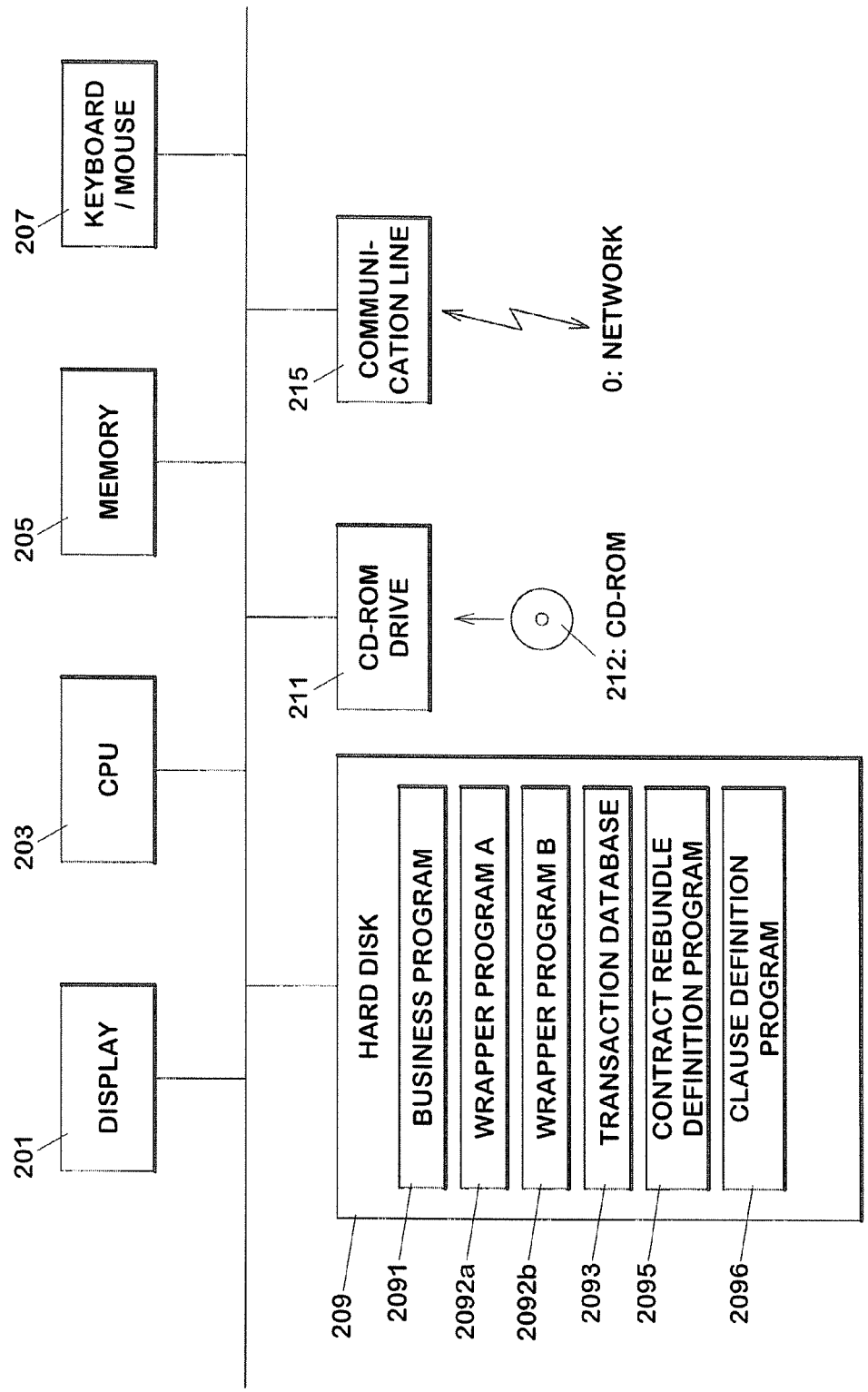
FIG. 21 is a diagram illustrating a hardware structure of the data management apparatus according to the present invention.

FIG. 21 shows an example of hardware structure of the data management apparatus 1 according to the present invention realized using a CPU. The structure of the drawing is basically the same as that in the first embodiment shown in FIG. 2. The difference between these is in that the hard disk 209 stores the business program 2091, a wrapper program A2092a, a wrapper program B2092b, the transaction database 2093, the contract rebundle definition program 2095 and the clause definition program 2096.

4-3. Processing Details (1)

Figure 22:
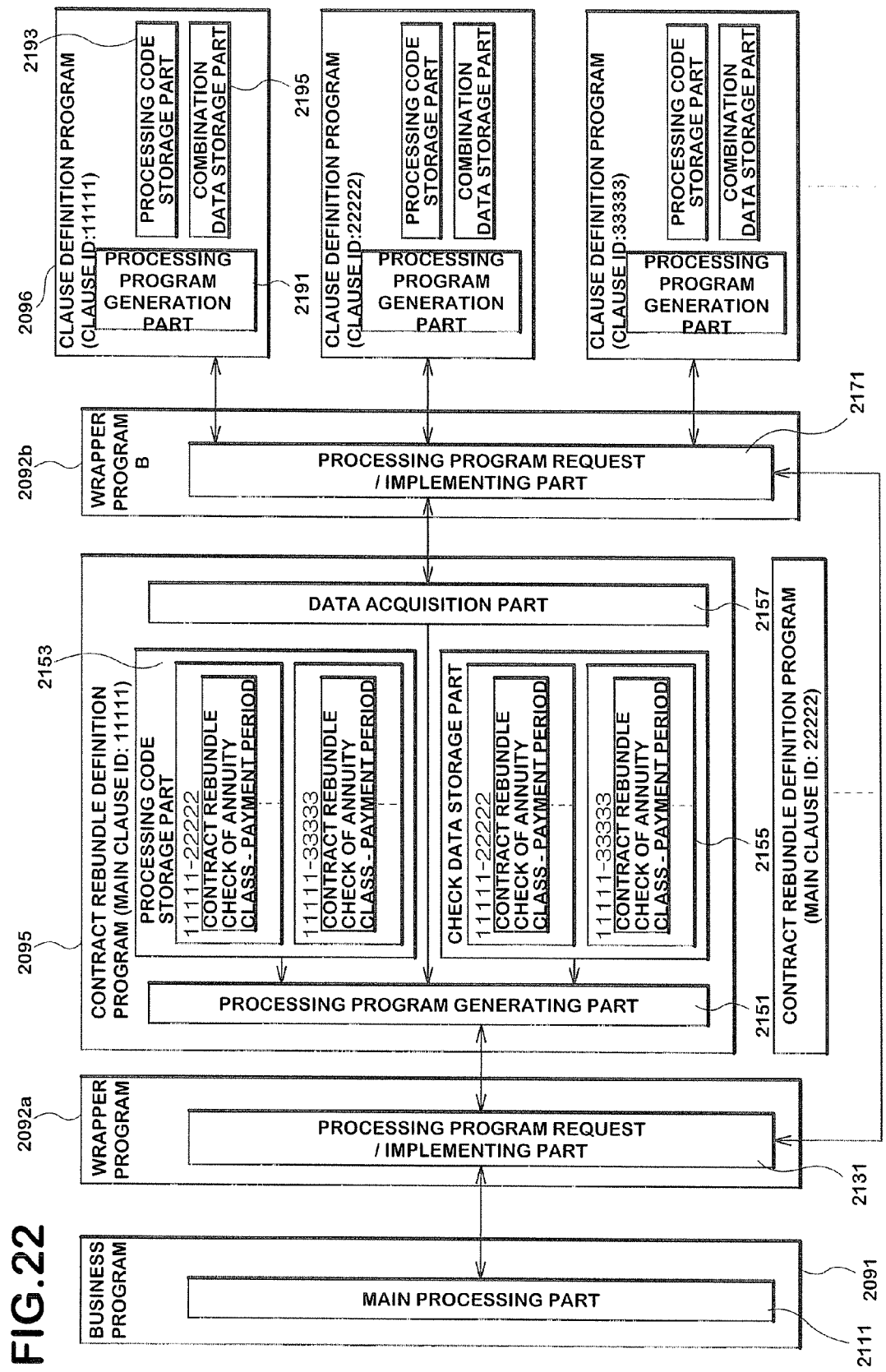
FIG. 22 is a diagram showing examples of functional block diagrams of the business application program, wrapper program A, contract rebundle definition program, wrapper program B and clause definition program according to the present invention.

Processing details (1) of this embodiment will be described with reference to FIGS. 22 through 30. In this embodiment, the business program 2091 is an application program for managing contractual data of life insurance and product data. FIG. 22 shows a functional block diagram of the business program 2091, a wrapper program A2092a, a wrapper program B2092b, the contract rebundle definition program 2095 and the clause definition program 2096.

The business program 2091 includes a main processing part 2111 for executing processing on user interface such as image processing and a database.

The wrapper program A2092a comprises a processing program request/execution part 2131 requesting a processing program to the contract rebundle definition program 2095 and implementing the program.

The contract rebundle definition program 2095 comprises a processing program generation part 2151 for generating a processing program on receipt of a request from the wrapper program A2092a, a processing code storage part 2153 storing processing codes for each processing name, a check data storage part 2155 storing predetermined check data for each processing name and a name data acquisition part 2157 for acquiring data recorded in the clause definition program 2096 via the wrapper program B2092b (in the case that main clause ID is "11111" for example).

In this embodiment, a case that the user respectively instructs the changes of annuity class in the transaction data specified by policy number to "whole life annuity with guaranteed installment" from "annuity certain" and the change of annuity payment period from "5 years" to "whole life" will be described similar to the third embodiment. FIG. 23 is a flowchart of the business program 2091, the wrapper program B2092b and the clause definition program 2096 executed by the data management apparatus 1 in the above cases.

4-3-1. Acquisition of Image-Screen Data

Acquisition of Screen-Image Data

FIG. 15 is a diagram showing a display screen for setting-up class of annuity 1501 displayed on a display 201 as a result of carrying out the main processing part 2111 (FIG. 22) of the business program 2091. In this display screen, an entry field of policy number 1503, radio buttons 1504 and 1505 for setting-up class of annuity and another radio button 1506 for setting-up a payment period and so on are displayed thereon, and an operator of the data management apparatus 1 can instruct change of annuity class and that of annuity payment period for the transaction data on a life insurance contract specified by a predetermined policy number. For example, the operator instructs the apparatus 1 change of payment period and that of payment period of annuity by inputting "00001" in the entry field 1503 and selecting the radio button 1505 for setting-up "whole life annuity with guaranteed installment" as an insurance class and the radio button 1506 for setting-up "whole life" as a payment period of annuity and then clicking a set-up button 1507 using the key board/mouse 207.

Upon clicking the set-up button 1507, the CPU 203 implementing the main processing part 2111 acquires screen-image data (steps S2201 FIG. 23). For example, the CPU 203 acquires a policy number "00001" and the class of annuity "whole life annuity with guaranteed installment" as screen-image data.

4-3-2. Acquisition of Records

The CPU 203 implementing the main processing part 2111 access to the transaction database 2093 and conducts a search in accordance with the policy number inputted as the screen-image data, and acquires in a work region generated on the memory 205 a transaction record specified by the policy number (step S2203).

FIG. 28 shows a diagram showing a transaction data base 2093. In this database, the policy number 601, a branch number 611, a main-rider-identifying-section 613, the clause ID 603, a variable 1_605, a variable 2_607 and a variable 3_609, insurance premiums 615 and so on are stored as transaction data regarding contractual management of life insurance. The recording format of the work region is the same as that of the transaction database.

Here, the policy number 601 is a data ID for specifying a transaction record, the clause ID 603 is an ID for specifying a insurance product, the branch number 611 is a data ID for uniquely specifying plural clauses managed by the same policy number, the main-rider-identifying-section 613 is a sectional data for indicating the insurance policy is either "basic policy" or "rider". In this case, the "basic policy" and "rider" are respectively indicated as "1" and "2". The only one "basic policy exists in the same policy number, but a plurality of "riders" can exist therein. The clause ID 603 is an ID for specifying a insurance product, the variable 1_605, the variable 2_607, the variable 3_9 so on are contractual coverage IDs specify respective contractual coverage.

For example, the CPU 203 acquires into the work region a transaction record 281 specified by the policy number "00001" from the transaction database 2093.

4-3-3. Request for a Processing Program

The CPU 203 implementing the processing program 2091 delivers to the wrapper program B2092b the clause ID recorded in the transaction record 281 and processing name specified under the instruction of the operator (step S2205). For example, the CPU 203 delivers the names of processing "setting-up class of annuity", "setting-up payment period" and "correlation check" acquired through implementing the main processing part 2111 because an instruction to set up class of annuity is made on the annuity class set-up display screen in the above description. In other words, plural processing codes are delivered in this embodiment.

4-3-4. Execution of Wrapper Program

The CPU 203 executing the wrapper program B2092a specifies a clause definition program in accordance with the clause ID inherited from the business program 2091 in the processing program request/execution part 2131 and delivers the processing name by accessing the specified clause definition program 2096 (step S 2221).

4-3-5. Acquisition of Processing Data and Combination Data

Subsequently, the case in which a processing code is delivered to the clause definition program 2096 having clause ID "11111", will be described hereunder. Upon delivery, the CPU 203 carries out a processing program generating part 2191 of the clause definition program 2096 and acquires a processing code corresponding to the inherited processing name by conducting a search of a processing code storing part 2193 (step S2241). In the processing code storing part 2193, processing codes are recorded for each processing name. For example, as shown in FIG. 7, the CPU 203 acquires a processing code 7331 named as "setting-up class of annuity", a processing code 7332 named as "setting-up payment period" and a processing code 7333 named as "correlation check".

Subsequently, the CPU 203 acquires combination data of both contractual coverage and the contractual coverage ID corresponding to the inherited processing name as a result of the search in a combination data storage part (step S2243). In the combination data storage part 2195, combination data is recorded for each contract condition. For example, the CPU 203 acquires combination data 7351 whose contract condition is "class of annuity" and another combination data 7352 whose contract condition is "payment period" as shown in FIG. 7.

4-3-6. Generation-Execution of Processing Program

The CPU 203 generates a processing program in accordance with the processing code acquired from the processing code storage part and combination data acquired from the combination data storage part (step S2245). FIG. 17 shows a diagram illustrating a structural example of the processing program thus generated. Such processing program 170 comprises a processing code 1701 and combination data 1702 for "annuity class set-up", another processing code 1703 and combination data 1704 for "payment period" and another processing code 1705 and check data 1706 for "correlation check".

In this case, it is assumed that the check data 1706 is stored in the same region to the processing code 1705 in the product definition program 2094. Such check data is data storing all combinations of the annuity class and payment period, the description format of the combination data can be any format capable of identifying at the execution of the processing code. For example, formats such as a sequence format and a table format and the like correspond to the description format. Data stored in the check data may be either of the contractual coverage ID and the contractual coverage.

As shown in FIG. 17a, the processing program may be generated for each processing code. For example, a processing program 171 for "annuity class setting-up" generated from a processing code and combination data for "annuity class set-up", another processing program 173 for "payment period setting-up" generated from a processing code and combination data for "payment period setting-up" and another processing program 175 for "correlation check" generated from a processing code and combination data for "correlation checking" can respectively be generated.

4-3-7. Execution of Processing Program

The CPU 203 carrying out the clause definition program 2096 delivers the generated processing program 170 to the wrapper program B2092b (step S2247). On receipt of the program, the CPU 203 executing the wrapper program B2092b delivers the processing program 170 to the business program 2091 (step S2223).

4-3-8. Execution of Processing Program

In implementing the business program 2091, the CPU 203 carries out the processing program 170 inherited from the clause definition program 2096 (step S2207). The flowchart of the program executed that time is the same as that shown in FIG. 14.

4-3-9. Processing of Contract Rebundle Check

Upon completion of implementing the processing program, the CPU 203 judges whether or not update of the transaction data based on the data recorded in the work region can be executed in accordance with the updatable flag (step S2209). The CPU 203 carries out the contract rebundle check processing when the updatable flag is in an on-state as a result of the judgment such as updatable (step S2211).

Further, the CPU 203 outputs an error message indicating that no update can be done on the display 201 as a result of judging non-update thereof when the updatable flag is in an off-state. The CPU 203 prompts the operator to change the input value of data (step S2214).

4-3-9-1. Acquisition of Record and Delivery (Business Program)

Contract rebundle check processing described in step 2211 of FIG. 23 will be described with reference to FIG. 24.

The CPU 203 acquires all the transaction record under the same contract (step S2401). For example, in step 2093 shown in FIG. 28, the transaction records 281 and 282 specified by the policy number "00001" indicating that both are the same contract, are extracted respectively. Here, the record 281 and the record 282 are records having the same contract number 601 and different branch number 611.

Upon acquisition of all the records, the CPU 203 delivers all the acquired record data and the predetermined processing name(s) to the wrapper program A2092a (step S2403). For example, since processing regarding "setting-up class of annuity" and "setting-up payment period" have been executed in the above description, the CPU 203 delivers them under a processing name of "contract rebundle check of annuity class—payment period" in order to carry out the contract rebundle check processing corresponding to these processing.

4-3-9-2. Specification of Contract Rebundle Definition Body (Wrapper Program A)

Upon delivery, the wrapper program A2092a specifies a basic policy record in accordance with the main-rider-identifying-section 613 of the entire record and delivers the entire record and processing name to the contract rebundle definition program 2095 specified based on a clause ID of the basic policy record (step S2421).

For example, in the record 281 shown in FIG. 28, the contract rebundle definition program 2095 is specified in accordance with a clause ID 603 "11111" of the record 281 because the main-rider-identifying-section 613 indicates the basic policy ("1"). Further, the CPU 203 delivers the "contract rebundle check of annuity class—payment period" as a processing name.

4-3-9-3. Generation of Processing Program (Contract Rebundle Definition Program)

The CPU 203 executing the contract rebundle definition program 2095 carries out the processing program generation part 2151 and acquires a processing code corresponding to the inherited processing name by conducting a search of the processing code storage part 2153 (step S2441). Processing codes are written in the processing code storage part 2153 for each combination group of the clause IDs and for each processing name. For example, the CPU 203 implementing the contract rebundle definition program 2095 acquires a processing code whose processing name "contract rebundle check of annuity class—payment period" out of the processing code group whose combination group of clause ID is a combination of "11111" and "22222".

Subsequently, the CPU 203 further acquires check data corresponding to the inherited processing name by conducting a search for the check data storage part 2155 (step S2433). Check data is recorded on the check data storage part 2155 for each combination group of each processing name and each clause ID. For example, the CPU 203 acquires the "contract rebundle check of annuity class—payment period" out of the processing code group whose combination group of clause ID is a combination of "11111" and "22222".

The CPU 203 generates a processing program based on a processing code obtained from processing code storage part 2153 and check data acquired from the check data storage part 2155 (step S2455).

FIG. 29a shows a structural example of the processing program thus generated. The processing program 291 is a processing program for executing the "contract rebundle check of annuity class—payment period" when the combination group of clause ID is "11111-22222". Such check data means only the data in which the insurance class is "whole life annuity with guaranteed installment" and the payment period is "whole life" can be stored. In other words, it is indicated that the annuity class and payment and payment period capable of being stored in the transaction database 2093 are limited to a combination of "whole life annuity with guaranteed installment and "whole life" in relationship between the clause ID "11111" and the clause ID "22222". In this way, sales, maintenance and handling conditions can be set up in an appropriate manner in a relation to other contracts (the basic policy or rider) which are sold as the same insurance product considering 4-3-9-4. Acquisition of Contractual Coverage to be Checked (Contract Rebundle Definition Program)

The CPU 203 executing the contract rebundle definition program 2095 acquires contractual coverage corresponding to the contractual ID recognized as data to be checked for the data stored in the work region (step S2447). For example, in the above step S2207, "annuity class" and "payment period" are recognized as data to be checked and processing for acquiring contractual coverage is performed in accordance with a contractual coverage ID representing these because set-up processing of "annuity class" and "payment period" has been executed. FIG. 25 shows a flowchart of the contractual coverage acquisition processing.

The CPU 203 executing the contract rebundle definition program 2095 delivers to the wrapper program B the clause ID, the processing name and the contractual coverage ID stored in the record in which the contractual ID to be checked (step S2501). For example, clause ID "11111", processing name "acquisition of annuity class" and "acquisition of payment period", contractual coverage ID "02(annuity class)" and "01(payment period" are delivered thereto.

In a processing program request/execution part 2171, the CPU 203 executing the wrapper program B2092b specifies a clause definition program in accordance with the clause ID inherited from the contract rebundle definition program 2095 and delivers the processing name to the clause definition program 2096 (step S2521). For example, the clause definition program 2096 is specified in accordance with the clause ID "11111" and delivers the processing name "acquisition of annuity class" and "acquisition of payment period" thereto.

4-3-9-5. Acquisition of Contractual Coverage to be Checked (Clause Definition Program)

Upon delivery, the CPU 203 carries out the processing program generating part 2191 of the clause definition program 2096 and acquires a processing code corresponding to the inherited processing name from the processing code storing part 2193 (step S2541). In the processing code recording part 2193, processing codes are recorded for each processing name. For example, the CPU 203 acquires a processing code named as "acquisition of annuity class".

Subsequently, the CPU 203 acquires from the combination data storage part 2195 combination data of both contractual coverage and contractual coverage ID corresponding to the inherited processing name (step S2543). In the combination data storage part 2195, combination data is recorded for each contract condition. For example, the CPU 203 acquires combination data whose contract condition is "class of annuity".

4-3-9-6. Generation of Processing Program (Clause Definition Program)

Figure 30:
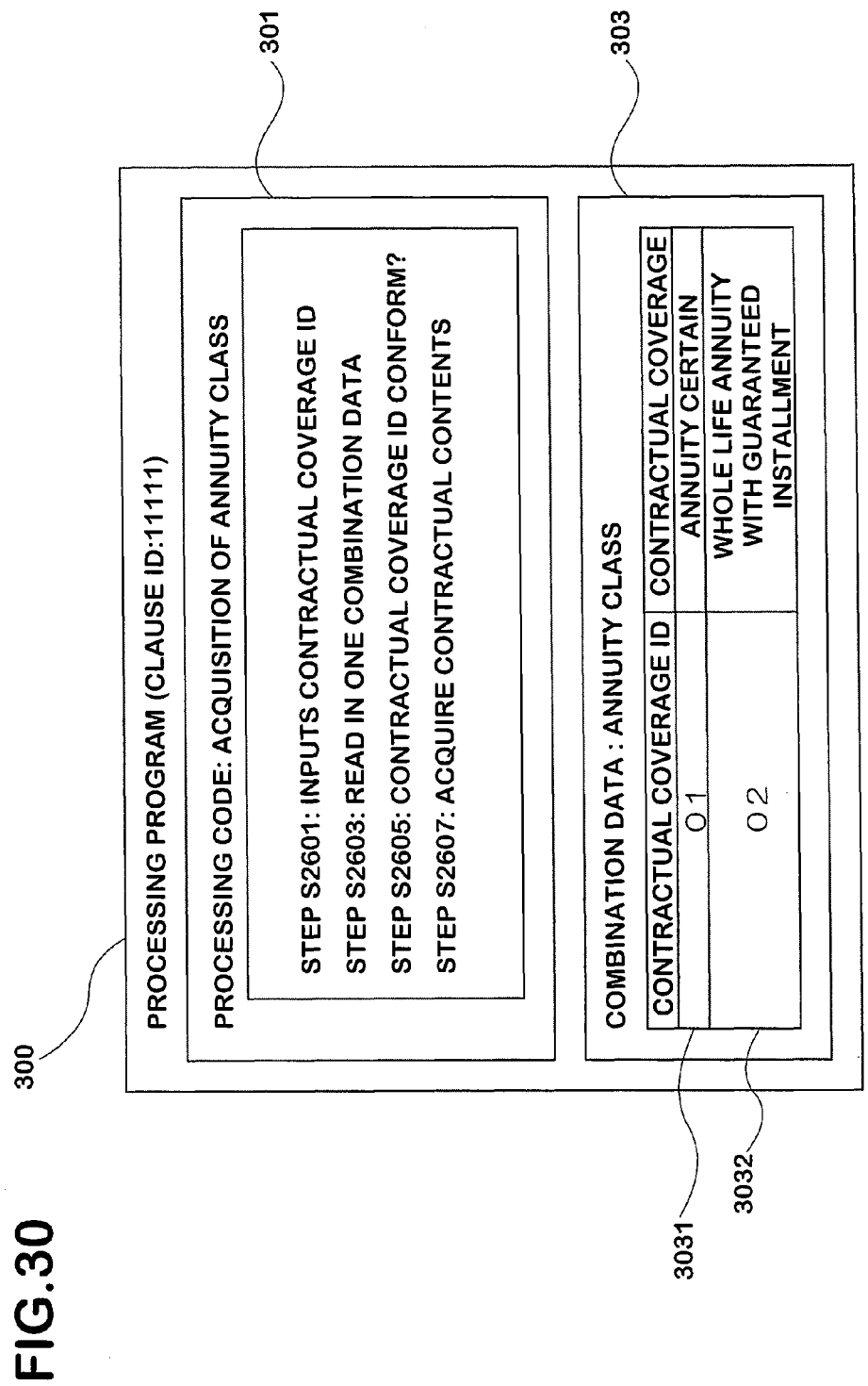
FIG. 30 is another diagram illustrating another structural example of the processing program according to the present invention.

The CPU 203 executing the clause definition program 2096 generates a processing program in accordance with both the processing code and combination data being acquired (step S2545). FIG. 30 shows a diagram illustrating a structural example of the processing program thus generated. Such processing program 300 comprises a processing code 301 and combination data 303. A program code for carrying out processing "acquisition of annuity class" is described in the processing code 301, for example. Such description format of the program code may either be a source code or an object code.

In the combination data 303, a contractual coverage ID and combination data of the contractual coverage used by the program code for processing "annuity class acquisition" are described. The description format of the combination data can be any format capable of identifying the contractual coverage corresponding to the contractual ID at the execution of the program code. Formats such as a sequence format and a table format and the like correspond to the description format.

Similarly, the CPU 203 generates a processing program on "acquisition of payment period".

The CPU 203 implementing the clause definition program 2096 delivers the processing program 300 thus generated to the wrapper program B2092b (step S2547). For example, the CPU 203 carries out steps for delivering the processing program 300 using a redirect function and a pipe function and so on.

4-3-9-7. Execution of Processing Program

Figure 26:
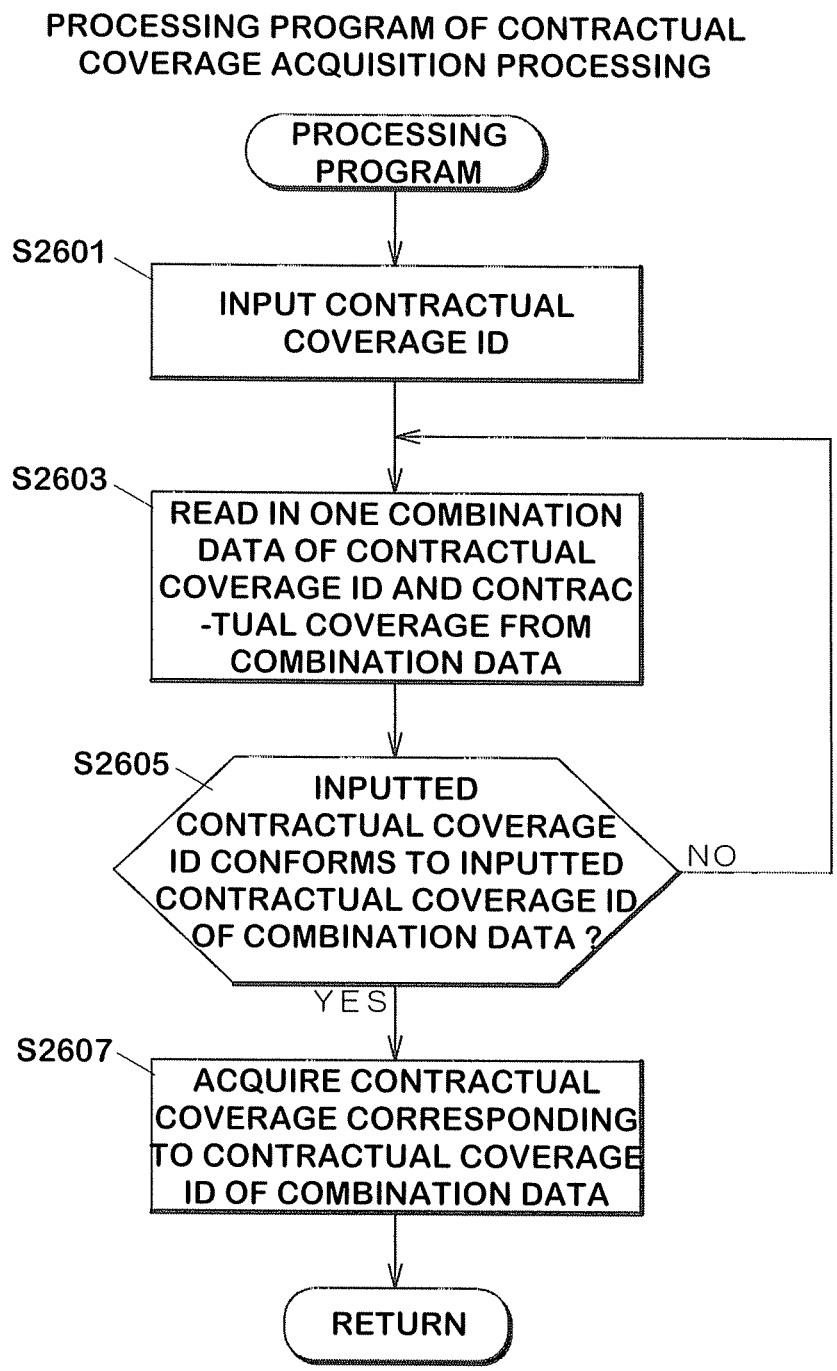
FIG. 26 is a flowchart of the processing program according to the present invention.

In the wrapper program B2092b, the CPU 203 executes the processing program 300 inherited from the clause definition program 2096, and acquires contractual coverage corresponding to the contractual coverage ID obtaining from the work region (step S2523). FIG. 26 shows a flowchart of the processing program 300 executed at that time. In execution of the processing program 300, the CPU 203 inputs a contractual coverage ID from the work region (step S2601). For example, "02" is inputted as the contractual coverage ID.

The CPU 203 reads in a piece of combination data of a contractual coverage ID and the contractual coverage from the combination data 303 stored in the processing program 300 (step S2603). For example, a contractual coverage ID "01" and the combination data 803 of combination data 3031 of the contractual coverage "annuity certain" are read in from the combination data of the processing program 300 shown in FIG. 30.

Then the CPU 203 judges whether or not the inputted contractual coverage conforms to the contractual coverage of the combination data thus read in (step S2605). For example, a judgment whether or not the contractual coverage ID "02" thus inputted conforms to the contractual coverage ID "01" of the combination data initially read in.

The process returns to step S2603 and carries out the step S2605 again if both the contractual IDs do not conform in steps S2605 (step S2605, NO). The process proceeds the step S2607 when both he contractual IDs conform and acquire the contractual coverage correspondently stored to the contractual coverage ID of the combination data (step S2607). For example, since the contractual coverage ID "02" conforms to the contractual coverage ID of the combination data 3023 (combination of the contractual coverage ID "02" and the contractual coverage "whole life annuity with guaranteed installment") secondly read in, the contractual coverage ID "02" acquires a contractual coverage "whole life annuity with guaranteed installment" corresponding to the result.

In FIG. 25, the CPU 203 carrying out the wrapper program B delivers the acquired contractual coverage to the contract rebundle definition program 2095 (step S2525). For example, a contractual coverage "whole life annuity with guaranteed installment" is delivered to the contractual coverage ID "02" and a contractual coverage "whole life" is delivered to the contractual coverage ID "01".

In FIG. 24, the CPU 203 executing the contract rebundle definition program 2095 sets up so that the above-described contractual coverage is incorporated as a part of the processing program (step S2449). For example, contractual coverage according to data to be checked is incorporated into a processing program 291 shown in FIG. 29a and makes it to another processing program 293 shown in FIG. 29b. Hence, the CPU 203 reads in data to be checked 2931 and may judge whether or not the data 2931 conforms to data to be checked 2933 at the execution of the processing program 293.

The CPU 203 implementing the contract rebundle definition program 2095 delivers to the wrapper program A2092a the processing program thus generated (step S2451).

4-3-9-8. Execution of Processing Program (Wrapper Program A)

Figure 27:
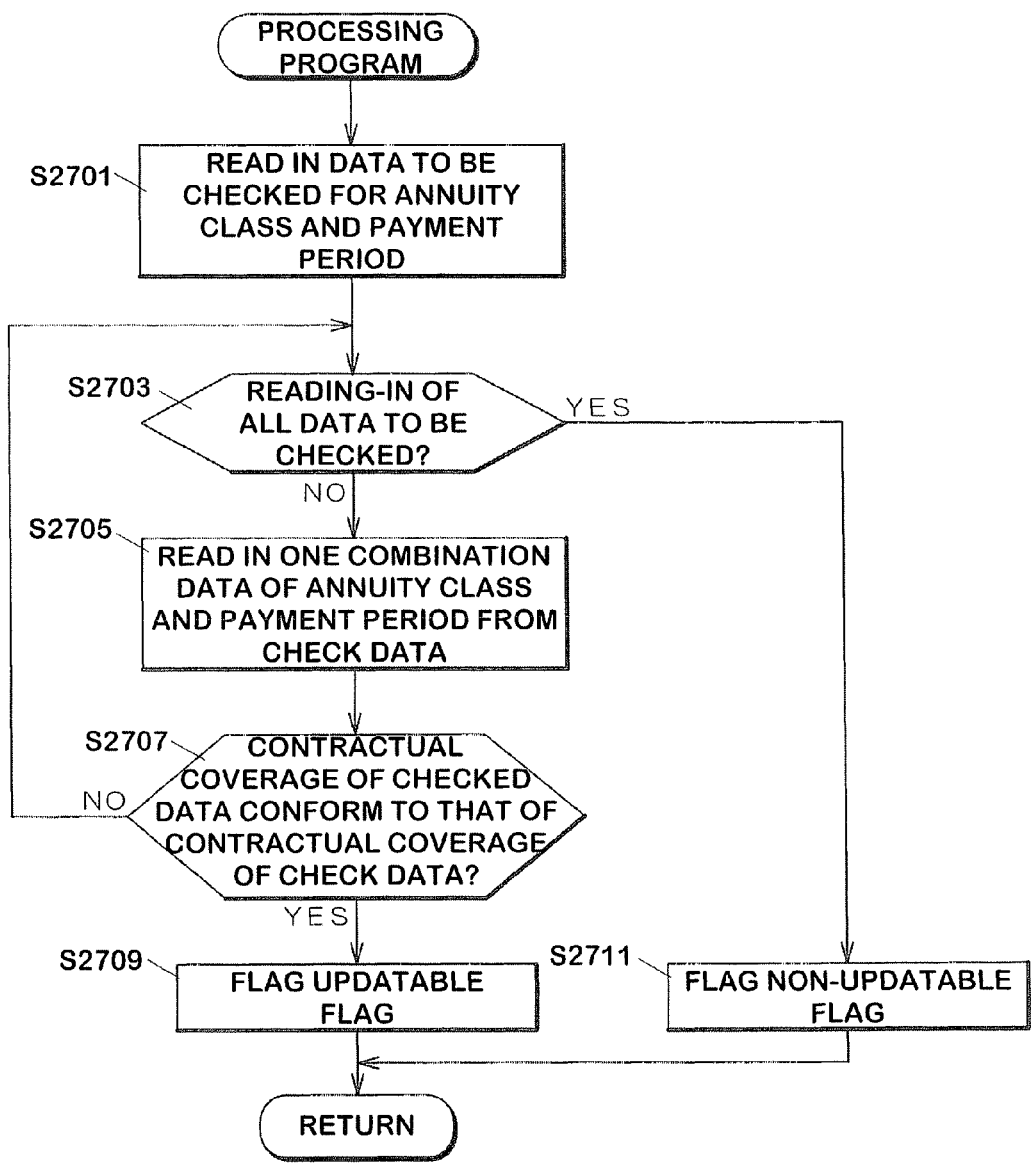
FIG. 27 is another flowchart of the processing program according to the present invention.

In the wrapper program A2092a, the CPU 203 carries out the processing program 293 inherited from the contract rebundle definition program 2095 and judges whether or not the contractual coverage corresponding to the contractual coverage ID as data to be checked stored in the work region conforms to the contractual coverage of the data to be checked (step S2423, FIG. 24). FIG. 27 shows a flowchart of the processing program 293 executed at that time.

In execution of the processing program 293, the CPU 203 reads in data to be checked for annuity class and that of payment period incorporated into and set-up into the processing program (step S2701). For example, combination data 2931 (FIG. 29*b*) of annuity class "whole life annuity with guaranteed installment" and a contractual coverage "whole life" is read in.

The CPU 203 judges reading-in of the data to be checked (step S2703, NO), and reads in one combination data of the annuity class and the payment period from check data 2933 (step S2705). For example, combination data 2933 of the annuity class "whole life annuity with guaranteed installment" and the payment period "whole life" is read in from the check data 2933 in the processing program 293 shown in FIG. 29*b*.

The CPU 203 judges whether or not combination data of contractual coverage read in from the checked data conforms to that of contractual coverage read in from the check data 2931 (step S2707). For example, it is judged whether or not the combination data 2931 (annuity class "whole life annuity with guaranteed installment", payment period "whole life") read in at step S2701 conforms to the combination data 2933 (annuity class "whole life annuity with guaranteed installment", payment period "whole life") of the initial contractual coverage of the checked data.

In step S2707, no match is found for the combination data of the contractual coverage, the process returns to step S2703 and repeats the same processing (step S2707, NO). On the other hand, the process proceeds to step S2709 and flags an updatable flag when the combination data of the contractual coverage ID matches (step S2709). For example, since the combination data 2931 representing the contractual coverage "whole life annuity with guaranteed installment" and "whole life" in the data to be checked conforms to the combination data 2933 initially read in, the updatable flag is turned ON and the processing ends. There is only one combination data to be the data to be checked in this embodiment, but a plurality of combination data may exit.

The CPU 203 turns the updatable flag OFF when the CPU 203 judges that the combination data of all the check data 2933 is read in at step S2703 (step S2711). In other words, since combination data of contractual data in the checked data does not exist in the combination data of contractual data in the check data in this case, it is judged that a combination of contractual IDs of annuity class and payment period defined in the work region can not be set.

Figure 24A:
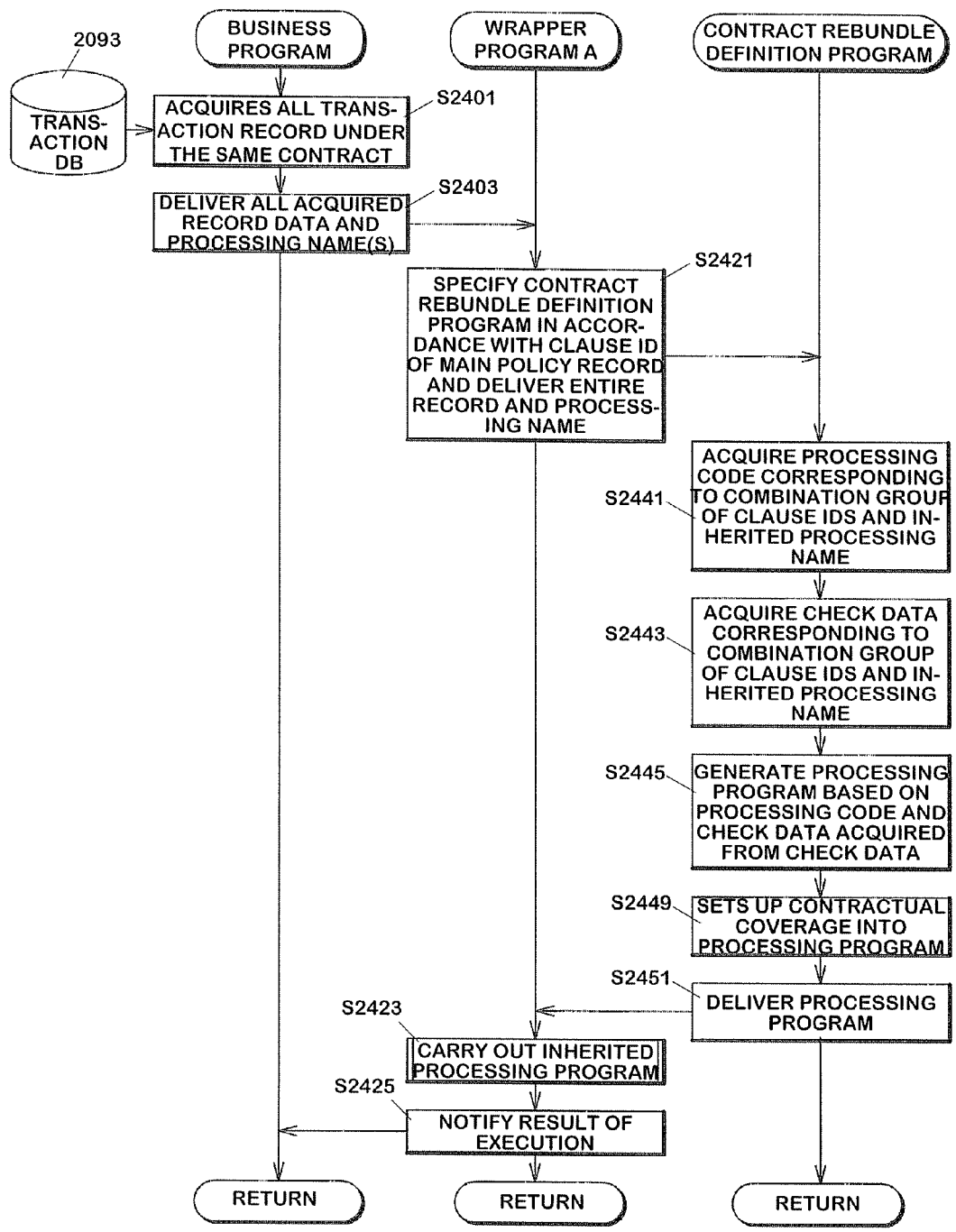
FIG. 24a is another flow chart of contract rebundle check processing according to the present invention.
Figure 24B:
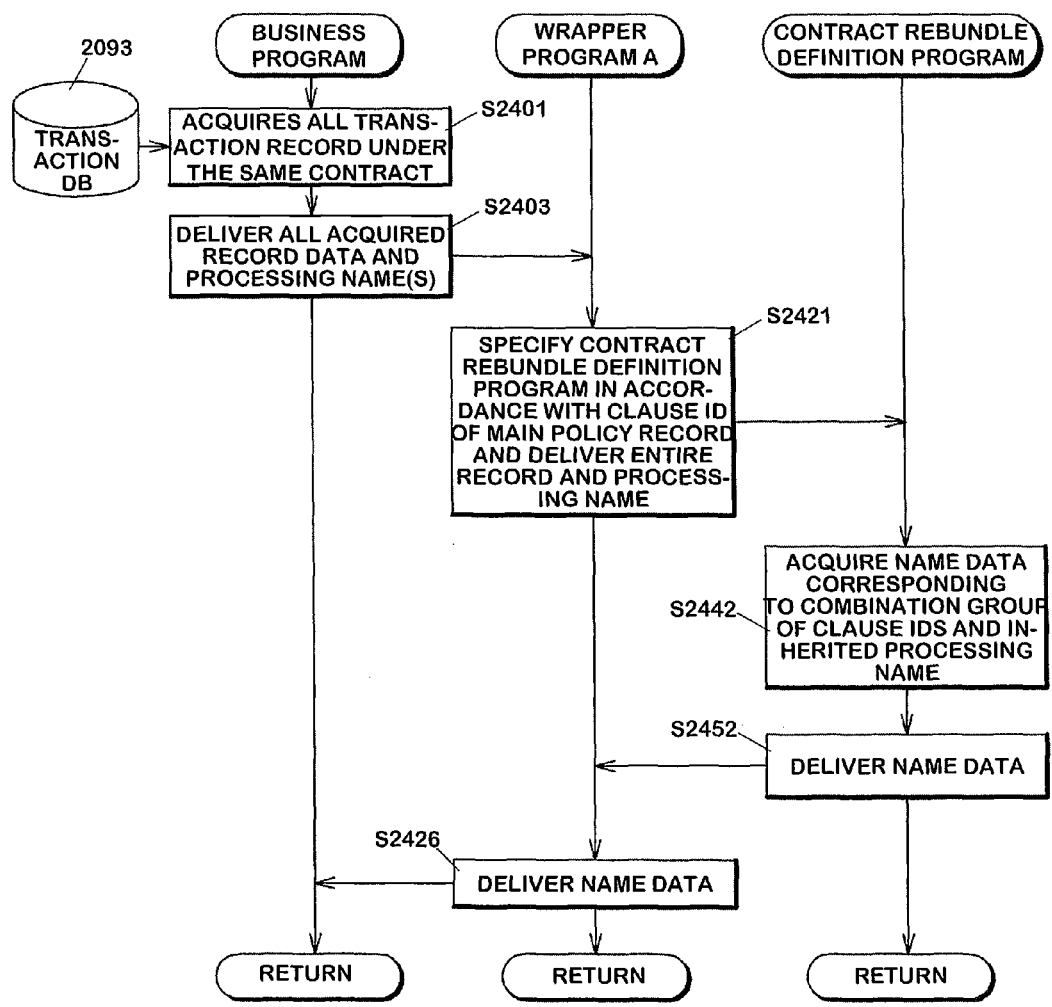
FIG. 24b is another flow of contract rebundle check processing according to the fourth embodiment.

The CPU 203 executing the wrapper program A2092*a* notifies a result of execution to the business program 2091 (step S2425, FIG. 24*a*). For example, processing to return the updatable flag "1 (ON)" to a program thread of the business program 2091 as a return value is carried out.

4-3-9-9. Updating Record

Upon completion of implementing contract rebundle check processing (step 2211) in FIG. 23, the CPU 203 executing the business program 2091 judges whether or not update of the transaction data based on the data recorded in the work region can be executed in accordance with the updatable flag (step S2213). The CPU 203 updates the transaction data of the transaction database 2093 as a result of a judgment that it can be updated when the updatable flag is in an on-state (step S2215).

For example, the transaction record 281 shown in FIG. 28 becomes a transaction record 285 as a result of the update. As show in FIG. 28, "01" of the variable 1_605 and "02" of the variable 2_607 in the record 281 are updated as "02" of the variable 1_605 and "01" of the variable 2_607 in the record 285.

Further, the CPU 203 outputs an error message indicating that no update can be done on the display 201 as a result of judging non-update thereof when the updatable flag is in an off-state. The CPU 203 prompts the operator to change the input value of data (step S2214).

4-4. Processing Details (2)

Although, an example for limiting the contractual coverage ID capable of setting-up in relation to other contracts of the same insurance product is described in the processing details (1), an example for limiting data values capable of setting-up in relation to other contracts of the same insurance product will be described in processing details (2).

Figure 22A:
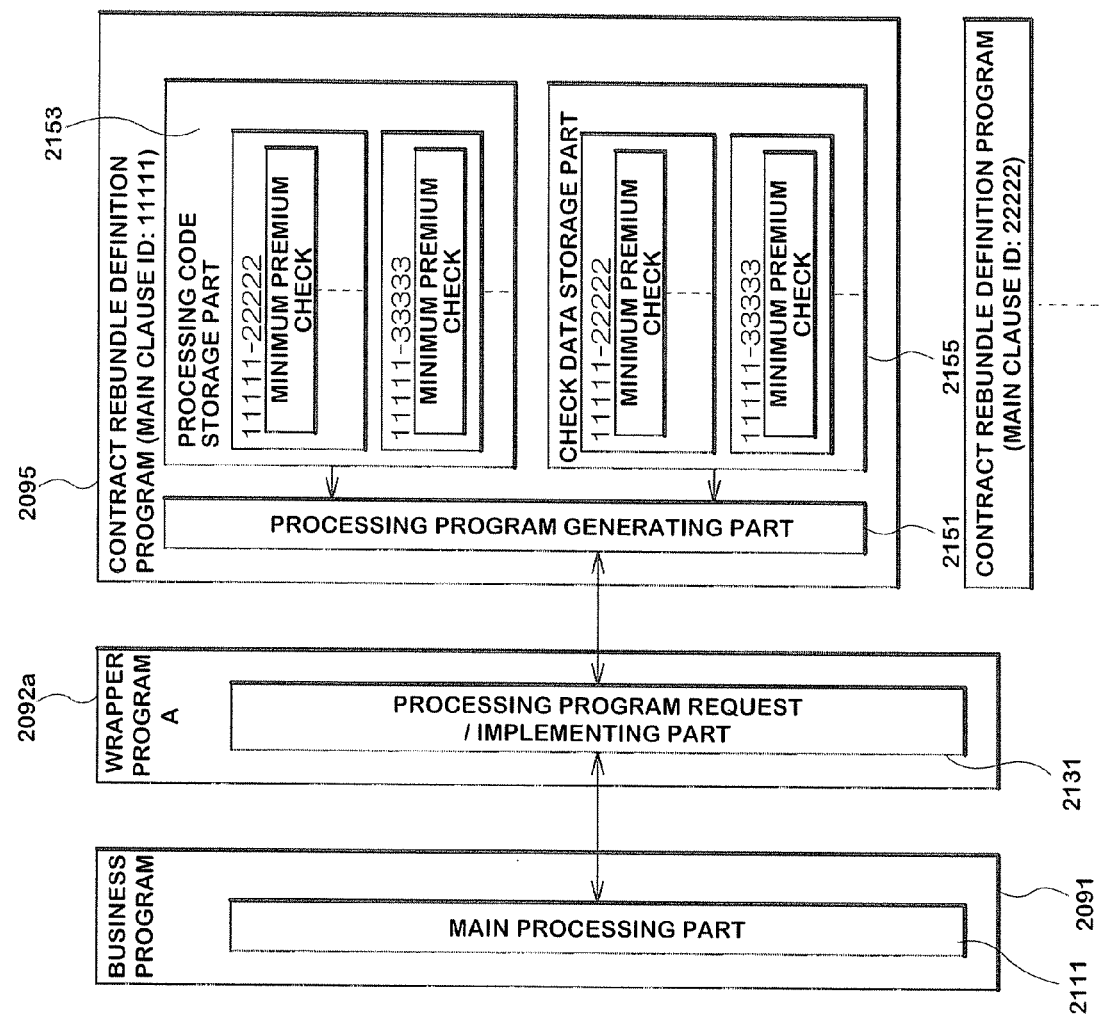
FIG. 22a is another diagram showing examples of functional block diagrams of the business application program, wrapper program A, and contract rebundle definition program according to the present invention.

Processing details (2) of this embodiment will be described with reference to FIGS. 22*a*, 23*a*, 24*a*, 27*a*, 31 and 32 and so on. In this embodiment, the business program 2091 is an application program for managing contractual data of life insurance and product data. FIG. 22*a* shows a functional block diagram of the business program 2091, a wrapper program A2092*a*, the contract rebundle definition program 2095.

The business program 2091 includes a main processing part 2111 for executing processing on user interface such as image processing and a database.

The wrapper program A2092*a* comprises a processing program request/execution part 2131 requesting a processing program to the contract rebundle definition program 2095 and implementing the program.

The contract rebundle definition program 2095 comprises a processing program generation part 2151 for generating a processing program on receipt of a request from the wrapper program A2092*a*, a processing code storage part 2153 storing processing codes for each processing name, a check data storage part 2155 storing predetermined check data for each processing name (in the case that main clause ID is "11111" for example).

In this embodiment, an example of checking whether or not data to be stored in the transaction database 2093, the data on insurance premium is in a predetermined range will be described when a command to reducing the insurance premium of an insurance product is input by a user.

Figure 23A:
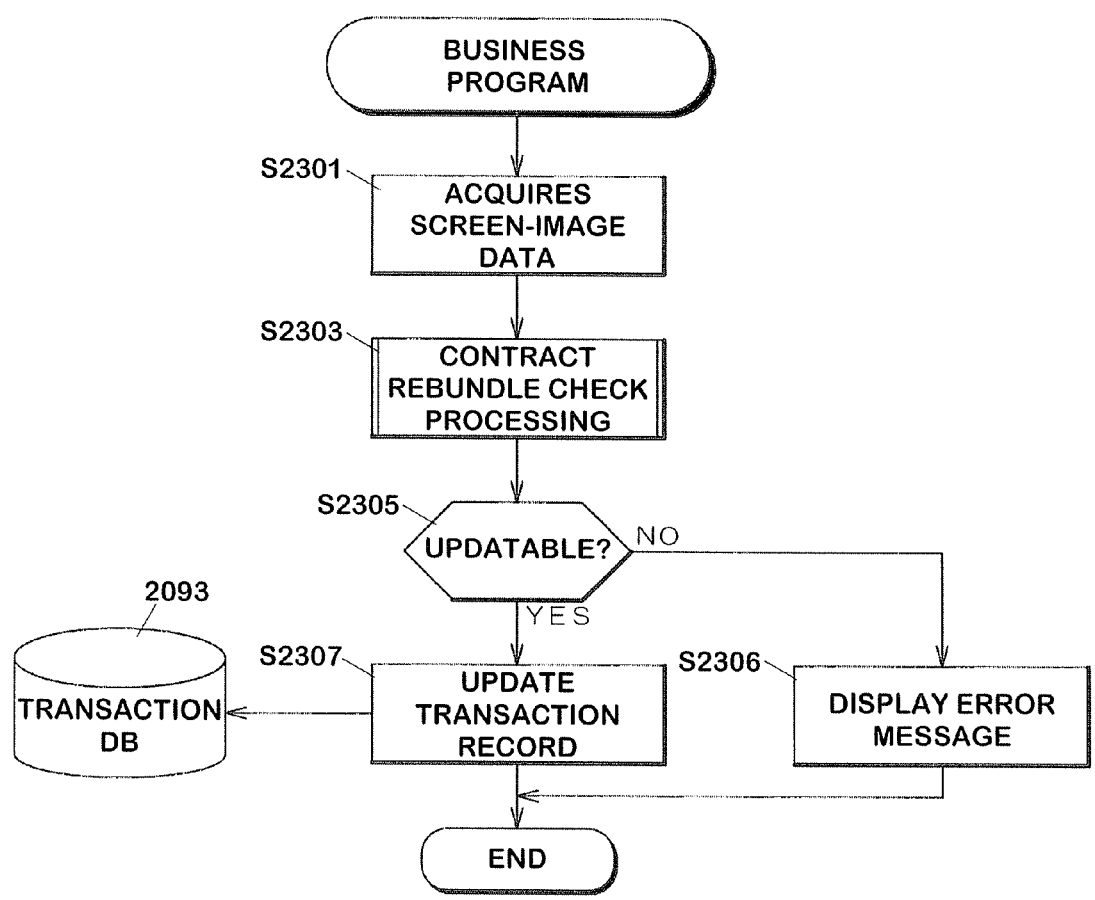
FIG. 23a is a diagram showing a flowchart of a business application program according to this invention.

FIG. 23*a* is a flowchart of a business program 2091 executed by the data management apparatus 1 in the above cases.

4-4-1. Acquisition of Screen-Image Data

Figure 31:
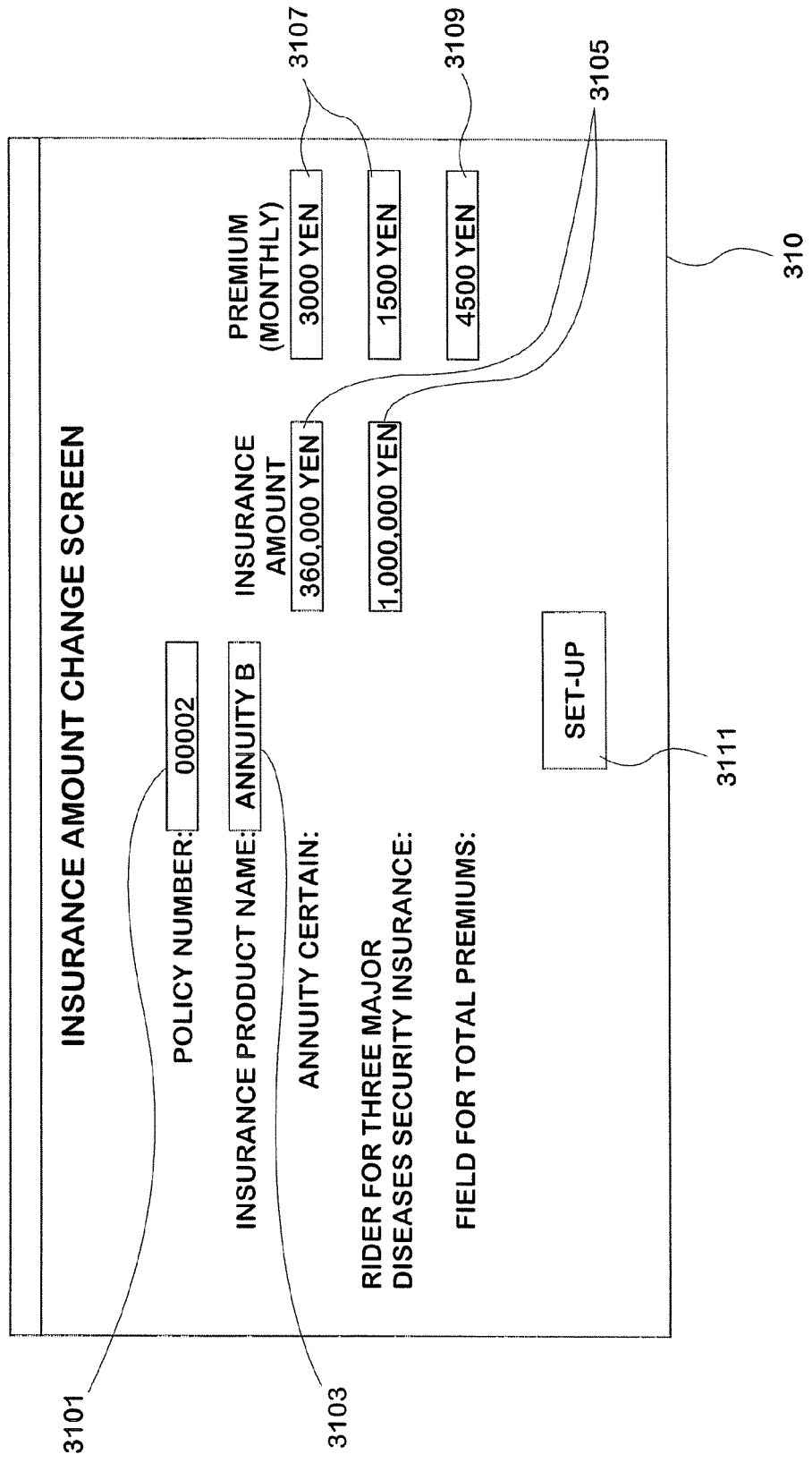
FIG. 31 is a diagram showing a screen-image of an insurance amount change screen according to the present invention.

FIG. 31 shows a screen-image of an insurance amount change screen 310 displayed on the display 201 under the execution of the main processing part 2111 (FIG. 22*a*) in the business program 2091. An entry field for policy number 3101, a display field for plan name 3103, an entry field for insurance amount 3105, a display field for monthly premium 3107 and a display field for total insurance premiums 3109 and so on are displayed on this screen.

The operator of the data management apparatus 1 can instruct change of insurance amount for life insurance specified by a predetermined policy number. For example, the operator inputs "00002" into the entry field for policy number 3101 with the key board/mouse 207, the CPU 203 executing the business program 2091 accesses to and conduct a search for the transaction database 2093 for displaying plan name, insurance amount and total insurance premiums on the insurance amount change screen 310. Here, total insurance premiums are calculated by adding up monthly premium of each insurance policy with the CPU 203.

Once the operator performs an operation for changing the insurance amount, the CPU 203 implementing the business program 2091 detects the operation and automatically displays a total amount of insurance premiums of the display field for monthly premium 3107 and the display field for total insurance amount again. Such operator instructs the update to the transaction database 2093 by pressing a set-up button 3111 upon confirmation of the insurance premiums displayed again.

Upon the depression of the set-up button 3111, the CPU 203 implementing the main processing part 2111 acquires screen-image data (steps S2310, FIG. 23*a*). For example, the CPU 203 acquires a policy number "00002" and the total insurance premiums "4500 yen" as screen-image data.

4-4-2. Processing of Contract Rebundle Check

The CPU 203 acquiring the screen-image data carries out contract rebundle check processing (step S2303). The contract rebundle check processing shown in step S2303 in FIG. 23*a* will be described with reference to FIG. 24*a*. FIG. 24*a* is a view from which step S2447 is eliminated from the steps shown in FIG. 24, basically, similar steps are carried out. Difference between the steps of FIG. 24 and that of FIG. 24*a* will be described hereunder.

4-4-2-1. Start-Up of Wrapper Program (Business Program)

In the business program 2091, the CPU 203 acquires all the transaction record under the same contract (step S2401). For example, in the transaction database 2093 shown in FIG. 32, the transaction records 321 and 323 specified by the policy number "00002" indicating that both are the same contract, are extracted respectively. Here, the records 321 and 323 are records having the same contract number 601 and different branch number 611.

Upon acquisition of all the records, the CPU 203 delivers all the acquired record data and the predetermined processing name(s) to the wrapper program A2092*a* (step S2403). Since the processing for changing insurance amount has been performed in the above-description, the contract rebundle check processing for checking whether or not the monthly premium to be determined according to the change is executed, for example. Thus, the CPU 203 delivers to the wrapper program A2092*a* "contract rebundle check of insurance premiums".

4-4-2-2. Specification of Contract Rebundle Definition Body (Wrapper Program A)

Upon delivery, the wrapper program A2092*a* specifies a basic policy record in accordance with the main-rider-identifying-section 613 of the entire record and delivers the entire record and processing name to the contract rebundle definition program 2095 specified based on a clause ID of the basic policy record (step S2421).

Figure 32:
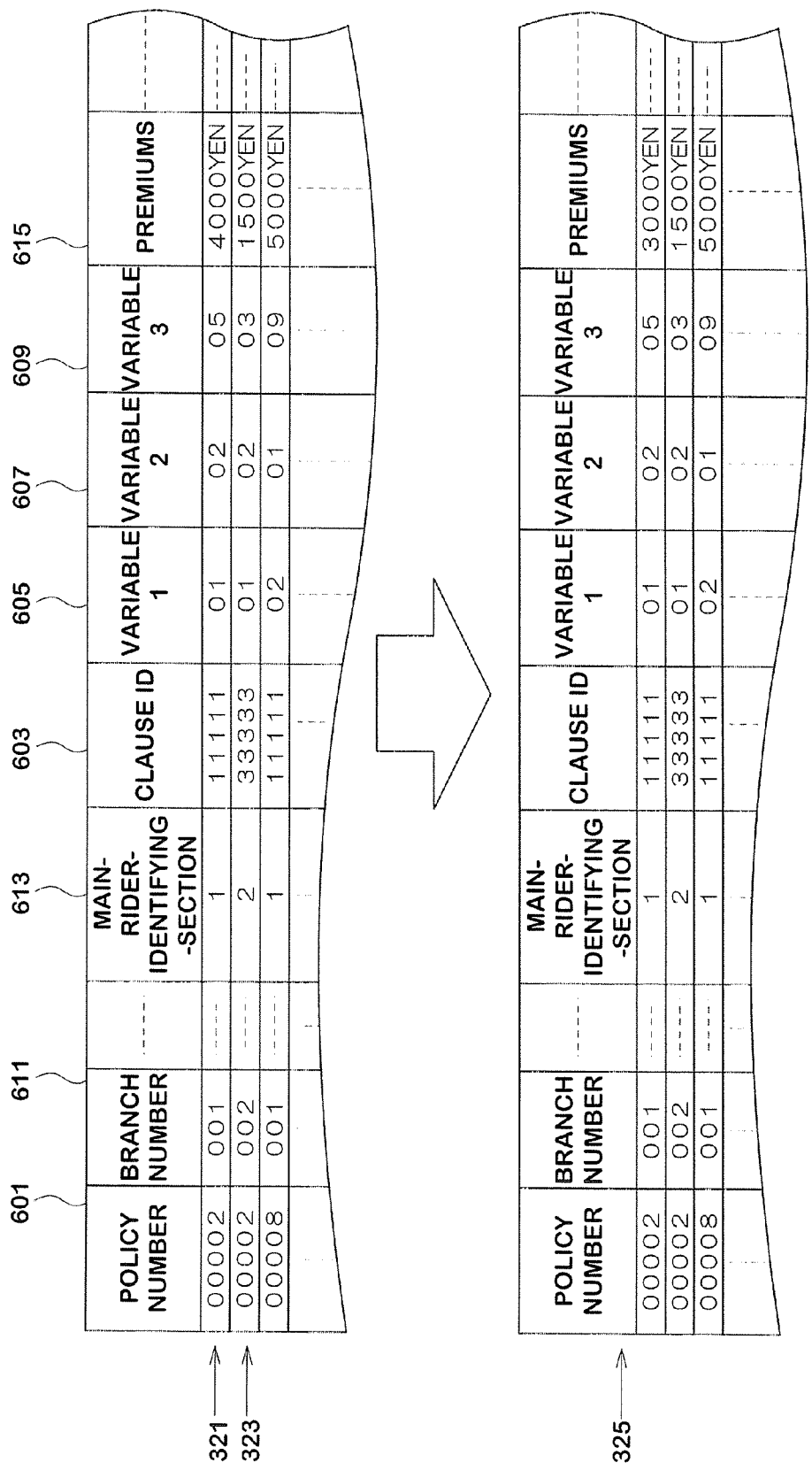
FIG. 32 is a diagram showing a transaction database according to the present invention.

For example, in the record 321 shown in FIG. 32, the contract rebundle definition program 2095 is specified in accordance with a clause ID 603 "11111" of the record 321 because the main-rider-identifying-section 613 indicates the basic policy ("1"). Further, the CPU 203 delivers the "contract rebundle check of insurance premiums" as a processing name.

4-4-2-3. Generation of Processing Program (Contract Rebundle Definition Program)

The CPU 203 executing the contract rebundle definition program 2095 carries out the processing program generation part 2151 and acquires a processing code corresponding to the inherited processing name by conducting a search of the processing code storage part 2153 (step S2441). Processing codes are written in the processing code storage part 2153 for each combination group of the clause IDs and for each processing name. For example, the CPU 203 implementing the contract rebundle definition program 2095 acquires a processing code whose processing name "contract rebundle check of insurance premiums" out of the processing code group whose combination group of clause ID is a combination of "11111" and "33333".

Subsequently, the CPU 203 further acquires check data corresponding to the inherited processing name by conducting a search for the check data storage part 2155 (step S2443). Check data is recorded on the check data storage part 2155 for each combination group of each processing name and each clause ID. For example, the CPU 203 acquires the "contract rebundle check of insurance premiums" out of the processing code group whose combination group of clause ID is a combination of "11111" and "33333".

The CPU 203 generates a processing program based on a processing code obtained from processing code storage part 2153 and check data acquired from the check data storage part 2155 (step S2445).

Figure 29C:
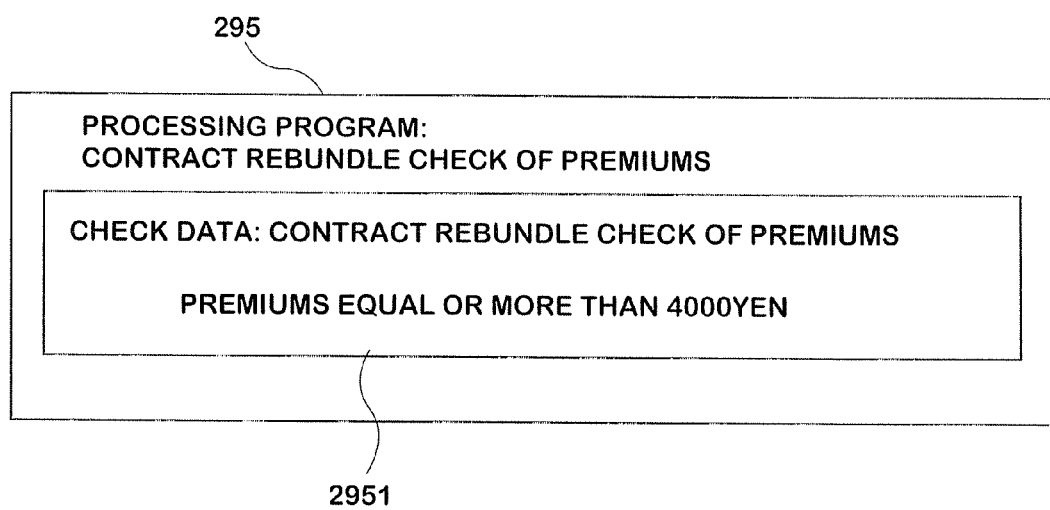
FIG. 29c is another diagram illustrating another structural example of the processing program according to the present invention.

FIG. 29*c* shows a structural example of the processing program thus generated. The processing program 295 is a processing program for executing the "contract rebundle check of insurance premiums" when the combination group of clause ID is "11111-33333". Such check data means only the data in which a sum total of monthly premium is equal or more than "4000 yen" can be stored. In this way, the total insurance premiums as a part of sales-handling conditions can be set up in an appropriate manner in a relation to other contracts (the basic policy or rider) which are sold as the same insurance product considering.

The CPU 203 implementing the contract rebundle definition program 2095 delivers to the wrapper program A2092*a* the processing program thus generated (step S2451).

4-4-2-4. Execution of Processing Program (Wrapper Program A)

Figure 27A:
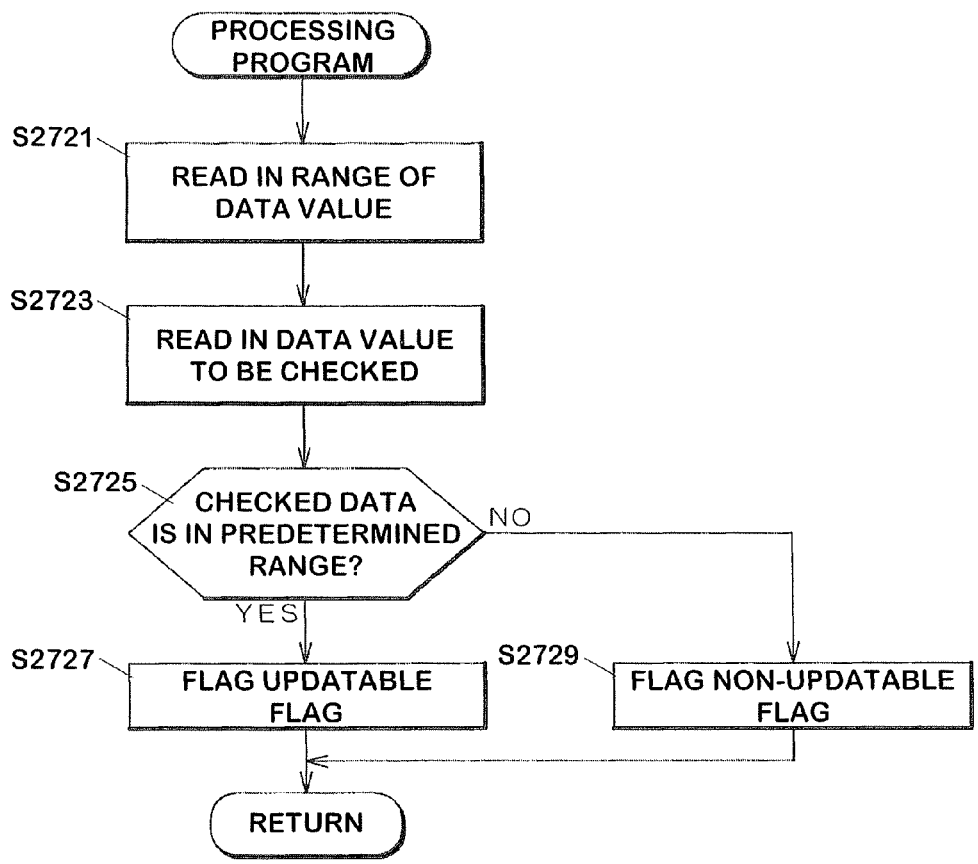
FIG. 27a is another flowchart of the processing program according to the present invention.

In the wrapper program A2092*a*, the CPU 203 carries out a processing program 295 inherited from the contract rebundle definition program 2095 and judges whether or not a sum total of monthly premium recorded in the work region is in a predetermined range (step S2423, FIG. 24*a*). FIG. 27*a* shows a flowchart of the processing program 295 executed at that time.

In execution of the processing program 295, the CPU 203 reads in check data of "insurance premiums equal or more than 4000 yen" incorporated into and set-up into the processing program (step S2721). Furthermore, the sum total of insurance premiums as a data value to be checked is read from the work region (step S2723). For example, a sum total of insurance premium "4500 yen" after implementing a change operation is read in.

The CPU 203 judges whether or not the checked data to be read in is in a data range in accordance with the data range read in the check data (step S2725). For example, it is judged whether or not the sum total premium "¥4500" is in the data range in accordance with the data range of "insurance premiums equal or more than ¥4000".

The process proceeds to step 2727 and flags an updatable flag when the checked data is in the predetermined data range in step S2725, (step S2727). For example, an updatable flag is flagged and then the process ends because the sum total insurance premiums "¥4500" conforms to the data range of "insurance premiums equal or more than ¥4000".

On the other hand, when the checked data is not in the range in step S2725, the process proceeds to step S2729 and flags a non-updatable flag (step S2729). For example, a non-updatable flag is flagged when the sum total insurance premiums is less than "¥4000"

In step S2423 shown in FIG. 24a, the CPU 203 executing the wrapper program A2092a notifies a result of execution to the business program 2091 (step S2425, FIG. 24a). For example, processing to return the updatable flag "1(ON)" to a program thread of the business program 2091 as a return value is carried out.

4-4-2-5. Updating Record

Upon completion of implementing contract rebundle check processing (step 2303) in FIG. 23a, the CPU 203 executing the business program 2091 judges whether or not update of the transaction data based on the data recorded in the work region can be executed in accordance with the updatable flag (step S2305). The CPU 203 updates the transaction data of the transaction database 2093 as a result of a judgment that it can be updated when the updatable flag is in an on-state (step S2307).

For example, the transaction record 321 shown in FIG. 32 becomes a transaction record 325 as a result of the update. As show in FIG. 32, "¥4000" of the insurance premiums 615 is updated as "¥3000" of the insurance premiums 615 in the record 325.

Further, the CPU 203 outputs an error message indicating that no update can be done on the display 201 as a result of judging non-update thereof when the updatable flag is in an off-state. The CPU 203 prompts the operator to change the input value of data (step S2306).

4-5. Processing Details (3)

Although, an example for limiting the contractual coverage ID capable of setting-up in relation to other contracts of the same insurance product is described in the processing details (1) and another example for limiting data values capable of setting-up in relation to other contracts of the same insurance product will be described in processing details (2), still another example for specifying name of an insurance product in relation to other contracts of the same insurance product will be described in processing details (3).

Figure 22B:
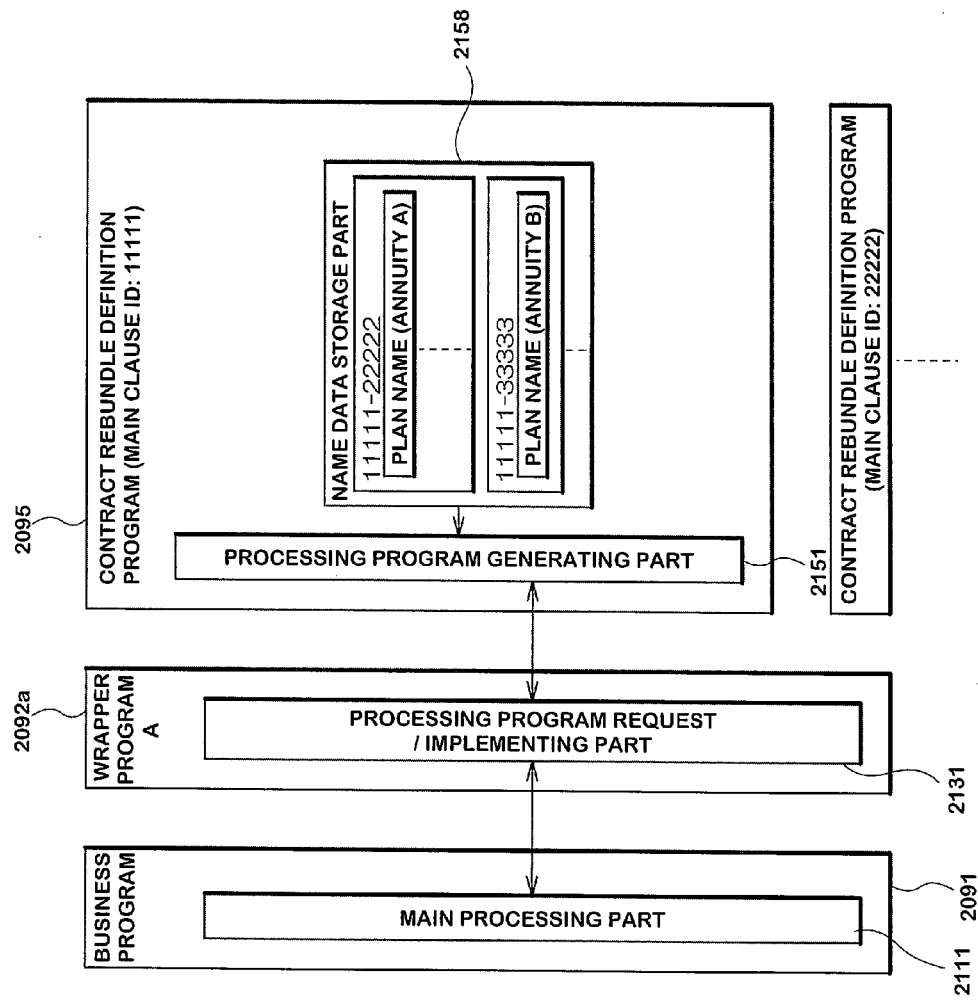
FIG. 22b is another diagram showing examples of functional block diagrams of the business application program, wrapper program A, and contract rebundle definition program according to the present invention.

Processing details (3) of this embodiment will be described with reference to FIGS. 22b, 23b, 24b, and 31 and so on. In this embodiment, the business program 2091 is an application program for managing contractual data of a life insurance and product data. FIG. 22b shows a functional block diagram of the business program 2091, a wrapper program A2092a and the contract rebundle definition program 2095.

The business program 2091 includes a main processing part 2111 for executing processing on user interface such as image processing and a database.

The wrapper program A2092a comprises a processing program request/execution part 2131 requesting a processing program to the contract rebundle definition program 2095 and implementing the program.

The contract rebundle definition program 2095 comprises a processing program generation part 2151 for generating a processing program on receipt of a request from the wrapper program A2092a storing processing codes for each processing name and the name data storage part 2158 storing predetermined name data for each processing name (in the case that main clause ID is "11111"for example).

In this embodiment, an example of acquiring name data indicating a predetermined insurance product specified in accordance with contract data in association with inputted policy number during display of insurance products will be described.

Figure 23B:
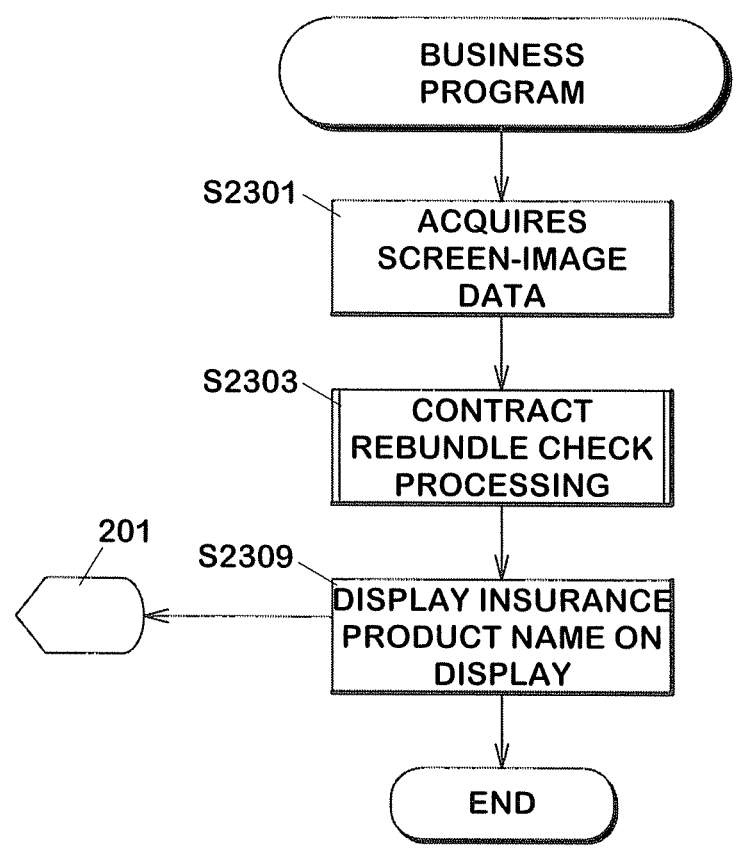
FIG. 23b is a diagram showing another flowchart of the business application program according to this invention.

FIG. 23b is a flowchart of a business program 2091 executed by the data management apparatus 1 in the above cases.

4-5-1. Acquisition of Screen-Image Data

FIG. 31 shows a screen-image of an insurance amount change image 310 displayed on the display 201 under the execution of the main processing part 2111 (FIG. 22b) in the business program 2091. The entry field for policy number 3101, the display field for plan name 3103, the entry field for insurance amount 3105, the display field for monthly premium 3107 and the display field for total insurance premiums 3109 and so on are displayed on this screen.

The operator of the data management apparatus 1 inputs a predetermined policy number in the entry field for policy number 3101 at a previous stage of instructing "changing insurance amount" described in the processing details (2) and makes to display the transaction data and the like on the display. In this embodiment, an example of simultaneously acquiring a plan name displayed on the display field for plan name 3103 of the insurance amount change image 310 at that time will de described.

When the operator inputs "00002" into the entry field for policy number 3101 with the key board/mouse 207, the CPU 203 executing the business program 2091 detects such operation and acquires data on a policy number (step S2301). For example, the CPU 203 acquires policy number data "00002" as screen-image data.

4-5-2. Processing of Contract Rebundle Check

The CPU 203 acquiring the screen-image data carries out contract rebundle check processing (step S2303). The contract rebundle check processing shown in step S2303 in FIG. 23b will be described with reference to FIG. 24b.

4-5-2-1. Start-Up of Wrapper Program (Business Program)

In the business program 2091, the CPU 203 acquires all the transaction record under the same contract (step S2401). For example, in the transaction database 2093 shown in FIG. 32, the transaction records 321 and 323 specified by the policy number "00002" indicating that both are the same contract, are extracted respectively. Here, the records 321 and 323 are records having the same contract number 601 and different branch number 611.

Upon acquisition of all the records, the CPU 203 delivers all the acquired record data and the predetermined processing name(s) to the wrapper program A2092a (step S2403). Since the processing for displaying information on insurance products in accordance with the policy numbers has been performed in the above-description, the contract rebundle check processing for acquiring plan name(s) to be displayed cooperatively with the display processing, is carried out, for example. Thus, the CPU 203 delivers to the wrapper program A2092a "plan name".

4-5-2-2. Specification of Contract Rebundle Definition Body (Wrapper Program A)

Upon delivery, the wrapper program A2092a specifies a basic policy record in accordance with the main-rider-identifying-section 613 of the entire record and delivers the entire record and processing name to the contract rebundle definition program 2095 specified based on a clause ID of the basic policy record (step S2421).

For example, in the record 321 shown in FIG. 32, the contract rebundle definition program 2095 is specified in accordance with a clause ID 603 "11111" of the record 321 because the main-rider-identifying-section 613 indicates the basic policy ("1"). Further, the CPU 203 delivers the "plan name" as a processing name.

4-5-2-3. Generation of Processing Program (Contract Rebundle Definition Program)

The CPU 203 executing the contract rebundle definition program 2095 carries out the processing program generation part 2151 and acquires name data corresponding to the inherited processing name by conducting a search on the name data acquisition part 2158 (step S2442). Name data is written in the name data acquisition part 2158 for each combination group of the clause IDs and for each processing name.

For example, the CPU 203 implementing the contract rebundle definition program 2095 acquires name data whose processing name "plan name" out of the processing code group whose combination group of clause ID is a combination of "11111" and "33333". An insurance product name "annuity B" is recorded in the "plan name" as an actual data.

The CPU 203 implementing the contract rebundle definition program 2095 delivers to the wrapper program A2092a the name data obtained from the name data acquisition part 2158 (step S2452). Further, the CPU 203 executing the wrapper program A2092a delivers to the business program 2091 the name data acquired from the contract rebundle definition program 2095 (step S2426).

4-5-2-4. Display of Name Data

In FIG. 23b, upon completion of the contract rebundle check processing (step S2303), the CPU 203 implementing the business program 2091 displays the acquired name data on the display 201 as insurance products name corresponding to the policy number obtained in step S2301 (step S2309).

For example, "annuity B" is displayed on the display field for plan name 3103 of the insurance amount change image 310 shown in FIG. 31 as an insurance product name.

4-6. Conclusion

As described in the above, in the case of handling data in interrelated plural transactions, it is possible to judge whether or not such data conform to predetermined conditions in accordance with the present invention. The present invention further enables to set-up and use predetermined data such as plan name and so on for each combination of the data during handling of data in interrelated plural transactions.

It is, therefore, possible to handle transaction data taking into consideration the consistency with a basic policy transaction and a rider transaction even when a plurality of riders are added to one basic policy, especially, in the field of the life insurance.

In addition, it is not necessary to describe any check logic according to merchantability of insurance policy at business program side by constructing so that a contract rebundle definition program is specified based on a clause ID of the basic policy record of an insurance contract, and implement check processing of data to be checked check with a processing program being generated using a processing code and check data of a check program in the specified clause definition program. In this way, maintenance-ability of the business program can be increased.

The construction in which contractual coverage (data contents) corresponding to contractual coverage IDs (data contents IDs) capable of being set-up to the contract rebundle definition program is recorded, is described in the processing details (1), instead of the contractual coverage (data contents), contractual coverage IDs capable of being set-up thereto can be recorded, alternatively. In that case, there is no need for acquiring contractual coverage from the clause definition program in accordance with the contractual coverage IDs recorded in the work region and whether or not recording the transaction data in the work region can be judged by directly comparing the contractual coverage IDs.

5. Fifth Embodiment

As described in the above, in life insurance, it is common to sell one insurance product in which two or more riders are added to one basic policy. When the basic policy transaction and a rider transaction are managed on the same database, and the basic policy transaction exists and a new rider transaction is added, it may be influenced of the product data applied to the basic policy transaction depending on the data item recorded on the database.

For example, when the basic policy is "insurance for life" and "rider for term insurance" is added, it is necessary to set up the contract date of "rider for term insurance" as "the same as that of a responsibility start date". Also, when the basic policy is an "individual annuity" and "rider for term insurance" is added as well, it is necessary to set up the contract date of "rider for term insurance" as "four days after a responsibility start date". Here, the "contract date" is a date of record of calculation, such as age at entry and an insurance period. Moreover, "the responsibility start date" is a day when security of the contract offered the "responsibility start date" is started.

Under the circumstances, considering the processing which add "rider for term insurance", it can respond by incorporating a judgment logic which sets a contract date into a clause definition program of the rider in accordance with the basic policy whenever basic policy of a new product is added. However, maintenance-ability decreased remarkably when the kind of basic policy increases in the case of selling new products because change arises in all clause definition programs of the rider capable of being added to the basic policy of new products.

Then, in this embodiment, a data management apparatus having a higher maintenance-ability without requiring the incorporation of the judgment logic even when a basic policy is added, will be described.

Similar to the fourth embodiment, the term "product definition data" described in the embodiments 1 through 3 is read as "clause definition data" in this embodiment.

5-1. Functional Block Diagram

A functional block diagram of a data management apparatus 1 according to the present invention is identical to that shown in either of FIG. 1 and FIG. 20.

5-2. Hardware Structure

A hardware structure of a computer device with a CPU which realizes the data management apparatus 1 according to the present invention is basically the same as that shown in either of FIG. 2 and FIG. 21.

5-3. Processing Details

Figure 33:
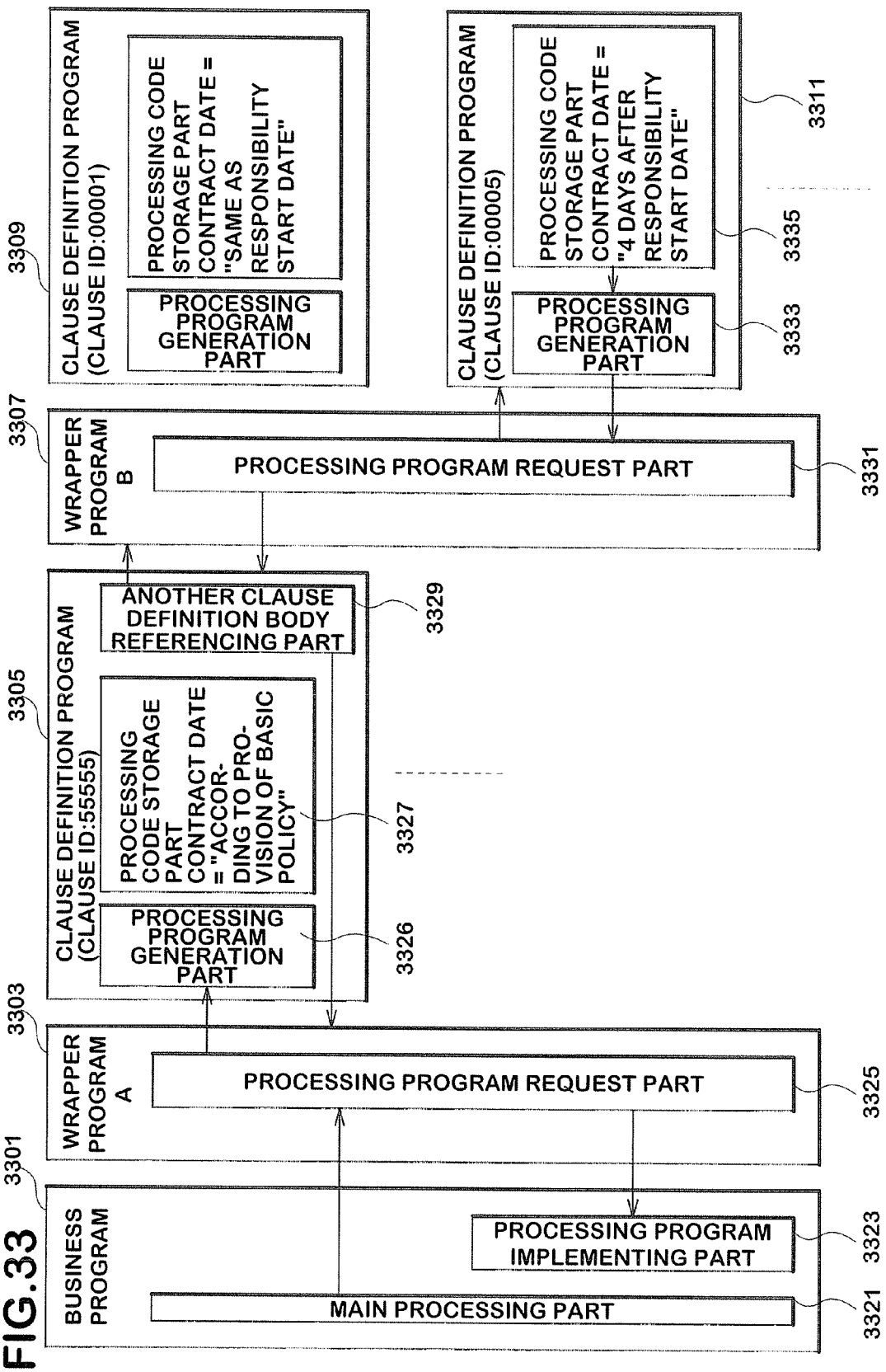
FIG. 33 is another diagram illustrating another structural example of the processing program according to the present invention.

Processing details according to this embodiment will be described with reference to FIGS. 33 through 38. In this embodiment, a business program 3301 is an application program for managing contractual data and product data of life insurance. FIG. 33 shows a functional block diagram of the business program 3301, a wrapper program A3303, a clause definition program 3305 for a rider and so on, a wrapper program B3307 and either of a clause definition program 3309 and 3311 of the basic policy.

The business program 3301 includes both a main processing part 3321 implementing processing on a user interface such as display processing and processing on database and a processing program execution part 3323 for implementing the processing program.

The wrapper program A3303 comprises a processing program request part 3325 for requesting the processing program to the clause definition program 3305.

The clause definition program 3305 comprises a processing program generation part 3326 for generating a processing program on receipt of a request from the wrapper program A3303, a processing code storage part 3327 storing processing codes for each processing name, and another clause definition body referencing part 3329 for acquiring a processing program from either of clause definition programs 3309 and 3311 and so on according to other clause IDs via the wrapper program B3307 (in the case that main clause ID is "55555" for example).

Figure 34:
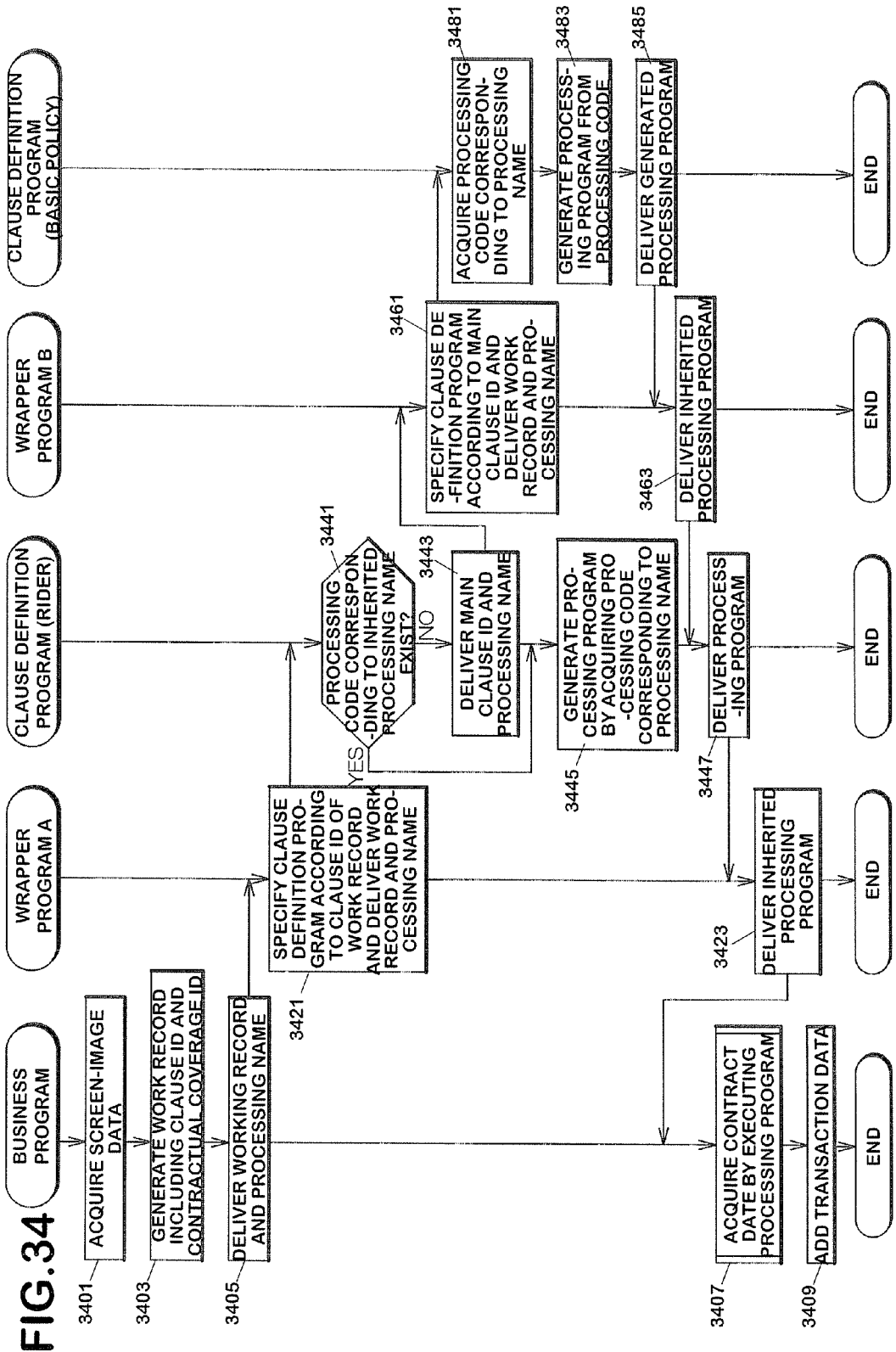
FIG. 34 is a functional diagram showing an example of block diagrams of the business application program, the wrapper program A, the clause definition program (clause of rider), the wrapper program B and another clause definition program (clause of basic policy) according to the present invention.

In this embodiment, a case in which a user instructs a command to add a rider "rider for term insurance" to the basic policy "individual annuity" specified by a policy number will be described. FIG. 34 is a flowchart of the business program 3301, the wrapper program A3303, the clause definition program 3305, the wrapper program B3307 and the clause definition programs 3311 of the basic policy, executed by the data management program.

5-3-1. Acquisition of Screen-Image Data

Figure 36:
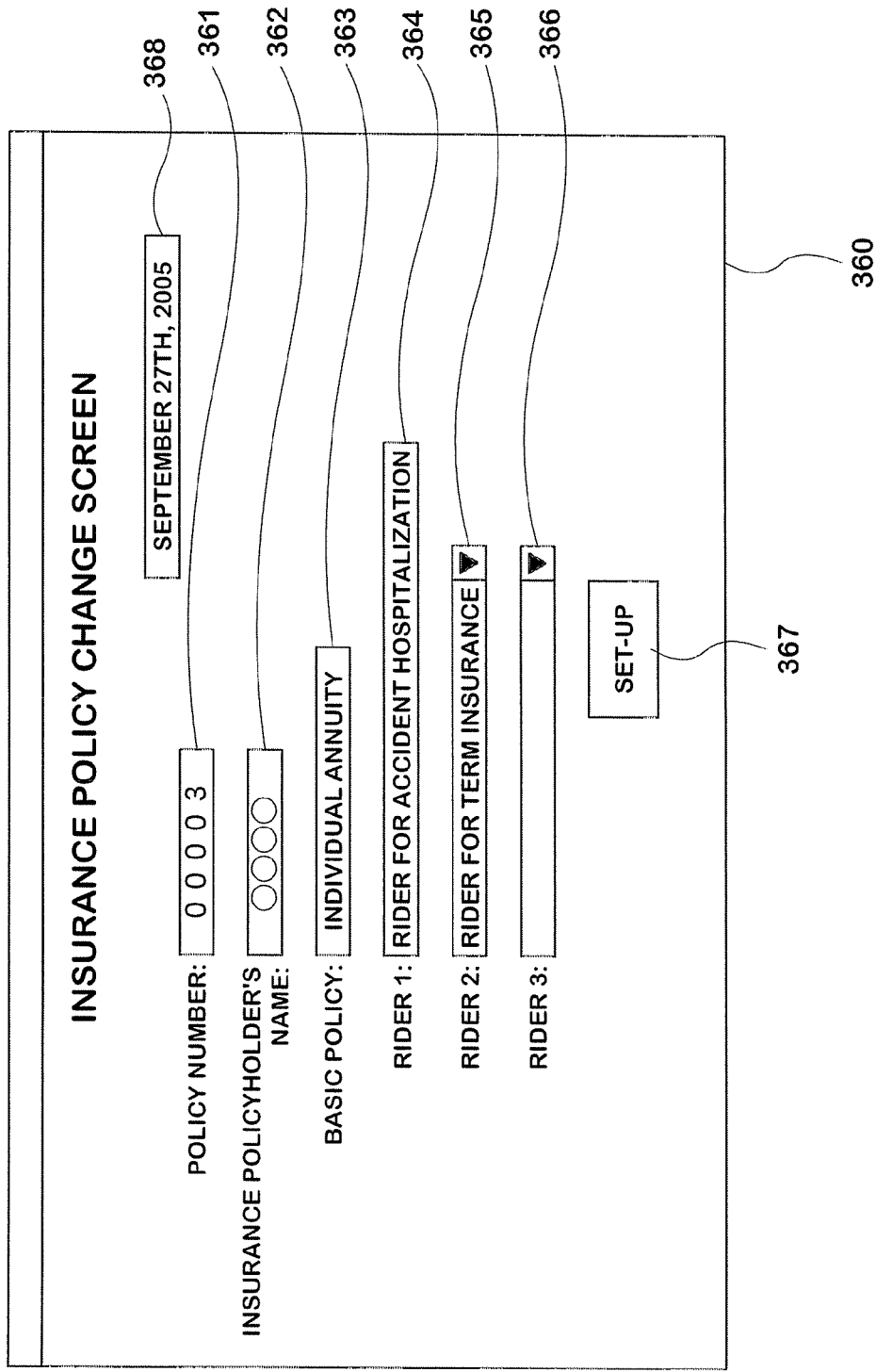
FIG. 36 is a diagram showing a screen-image of an insurance policy change screen according to the present invention.

FIG. 36 shows a screen-image of an insurance policy change screen 360 displayed on the display 201 under the execution of the main processing part 3321 (FIG. 33) in the business program 3301. An entry field for policy number 361, an entry field of insurance policyholder's name 362, a date coding field 368, a basic policy display field 363, a rider 1 display field 364, a rider 3 display field 365, a rider 2 display field 366 and a set-up button 367 and so on are displayed on this screen, and the operator of the data management apparatus 1 can instruct change in insurance contracts by adding rider(s) on the transaction data for life insurance specified by a predetermined policy number. For example, the operator inputs "00003" into the entry field for policy number 361 with the key board/mouse 207 and displays "individual annuity" on the basic policy display field 363 and "accident hospitalization" on the rider 1 display field 364 respectively. In other words, the insurance contract specified by "00003" shows that "accident hospitalization" is added to the basic policy "individual annuity".

Thereafter, the operator instructs execution of adding "rider for term insurance" to the basic policy of the insurance contract specified by "00003" by selecting "rider for term insurance" with a drop-down menu and clicking the set-up button 367.

Upon clicking the set-up button 367, the CPU 203 executing the main processing part 3321 acquires screen-image data (step S3401, FIG. 34). For example, the CPU 203 acquires policy number "00003" and rider "rider for term insurance" as the screen-image data.

5-3-2. Generation of Work Record

The CPU 203 executing the main processing part 3321 generates a work record for recording it as rider record into the transaction database 2093 in accordance with a policy number and information on rider and the like inputted as screen-image data (step S3403).

Figure 35:
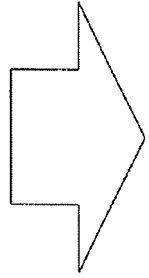
FIG. 35 is a diagram showing a work record according to the present invention.

FIG. 35 shows an example of the work record, Such work record consist of the same recording format to that of the transaction database 2093, a policy number 351, a branch number 352, a clause ID 353, variables 1 through 3_355, a main clause ID 357, contract date 359 and responsibility start date 311 so on are recorded therein.

Here, the policy number 351 is a data ID for specifying transaction record, the branch number 352 is a data ID for specifying the same insurance contract managed by the same policy number, the variables 1 through 3_355 are contractual coverage IDs for specifying respective contractual coverage, the contract date 359 is for recording the above-described "contract date" and the responsibility start date 311 is for recording the above mentioned "responsibility start date".

For example, the CPU 203 generates a work record 3501 shown in FIG. 35 in accordance with data acquired from the image screen data and the like in order to record transaction data specified by the policy number "00003". In FIG. 35, "00003" is recorded as the policy number 351, "003" is stored as its branch number 352, "55555" is recorded as the clause ID 353 corresponding to rider "rider for term insurance", "01", "01" and "05" are respectively stored as the variables 1 through 3_355 showing data contents IDs, "00005" is recorded as main clause ID indicating as basic policy such as "individual annuity" and "Sep. 27, 2005" is stored as the responsibility start date 311 according to the date coding field 368.

Here, with regard to the contract date 359, data is set with reference to the clause definition program 3305 because set-up conditions vary depending on a clause of the basic policy to which the rider is added. For example, the clause definition program 3305 of a clause ID "55555" is referred.

5-3-3. Execution of Wrapper Program

The CPU 203 executing the business program 3301 delivers to the wrapper program A3303 the working record 3501 including clause ID and the processing name specified according to operator's instruction (step S 3405). For example, processing for writing the generated work record 3501 into the transaction database 2093 need to be carried out as described in the above when an instruction to add rider "rider for term insurance" is made on the insurance policy change screen 360. As a consequence, the CPU 203 carries our processing for acquiring data stored on the contract date 359 in order to set up all the necessary data items in the work record 3501.

For example, the CPU 203 delivers a processing name such as "contract data calculation" acquired through the work record 3501 and the execution of the main processing part 3321.

5-3-4. Execution of Wrapper Program A

The CPU 203 executing the wrapper program A3303 specifies a clause definition program in accordance with the clause ID 353 of the work record 3501 inherited from the business program 3301 in the processing program request part 3325 and delivers the processing name to the specified clause definition program (step S3421).

For example, the clause definition program 3305 is specified in accordance with the clause ID 353 of "55555" and a processing name of "contract data calculation" is delivered.

5-3-5. Execution of Clause Definition Program (Rider)

The case where a processing code is delivered to the clause definition program 3305 having the clause ID of "55555" will be described hereunder. Upon delivery the CPU 203 conduct a search for the processing code storage part 3327 of the clause definition program 3305 and judges whether or not a processing code corresponding to the inherited processing name exists (step S3441).

If no processing code corresponding to the inherited processing name exist in the processing code storage part 3327 of the clause definition program 3305 and there is a description of referencing the main clause (step S3441, NO), the CPU 203 executes another clause definition body referencing part 3329 and delivers the main clause ID and the processing name stored in the work record to the wrapper program B3307 (step S3443). For example, the main clause ID 357 "00005" and processing name "contract data calculation" are delivered to the wrapper program B3307 when there is a description of "conform to the main clause" in the processing code storage part 3327 as shown in FIG. 33.

A processing program is generated at the processing program generation part (step S3445), when a processing code corresponding to the inherited processing name exists (step S3441, YES).

5-3-6. Execution of Wrapper Program B

The CPU 203 executing the business program B3307 specifies another clause definition program in accordance with the main clause ID inherited from the clause definition program 3305 in a processing program requesting part 3331 and delivers to the clause definition program thus specified the processing name (step S3461).

For example, the clause definition program 3311 is specified in accordance with the main clause ID 357 "00005" and the processing name "contract data calculation".

5-3-7. Execution of Clause Definition Program (Basic Policy)

Upon delivery, the CPU 203 executes the processing program generation part of the clause definition program and acquires a processing code corresponding to the inherited processing name by conducting a search for the processing code storage part (step S3481). For example, in a processing code storage part 3335 of the clause definition program 3311*a* description that calculation starts "four days after a responsibility start date" is made as a processing code indicating a method of calculating a contract date.

The CPU 203 performing a processing program generation part 3333 generates a processing program in accordance with the processing code acquired from the processing code storage part (step S3483).

Figure 37:
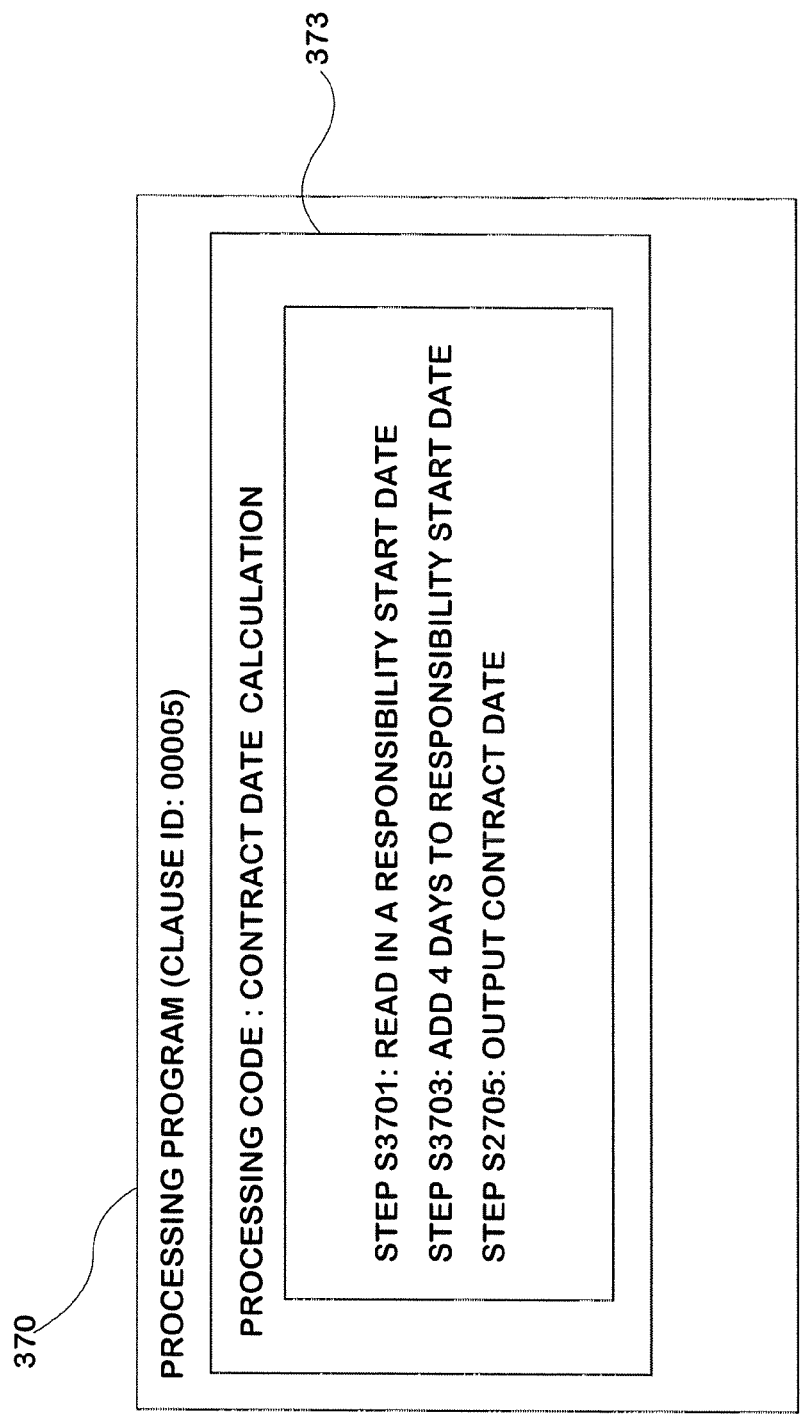
FIG. 37 is another diagram illustrating another structural example of the processing program according to the present invention.

FIG. 37 shows an example of structure of the processing program thus generated. For example, a program code for handling "contract data calculation" is described in the processing code 373. The description format of the processing program can either be a source code and an object code.

5-3-8. Delivery of Processing Program

The CPU 203 executing the clause definition program delivers the processing program thus generated to the wrapper program B3307 (step S3485). For example, the CPU 203 performing the clause definition program 3311 carries out processing program 370 (FIG. 37) using a redirect function and a pipe function and so on.

Upon delivery, the CPU 203 performing the wrapper program B3307 delivers the inherited processing program to the clause definition program 3305 (step S3463). Upon such delivery, the CPU executing the clause definition program 3305 delivers to the wrapper program A3303 the inherited processing program (step S3447). Upon such delivery of the processing program, the CPU carrying out the wrapper program A3303 delivers the inherited processing program to the business program 3301 (step S3423).

5-3-9. Execution of Processing Program

In the business program 3301, the CPU 203 performs the inherited processing program 370 and acquires a contract date for setting up transaction data for rider obtained via the image screen data (step S3407).

Figure 38:
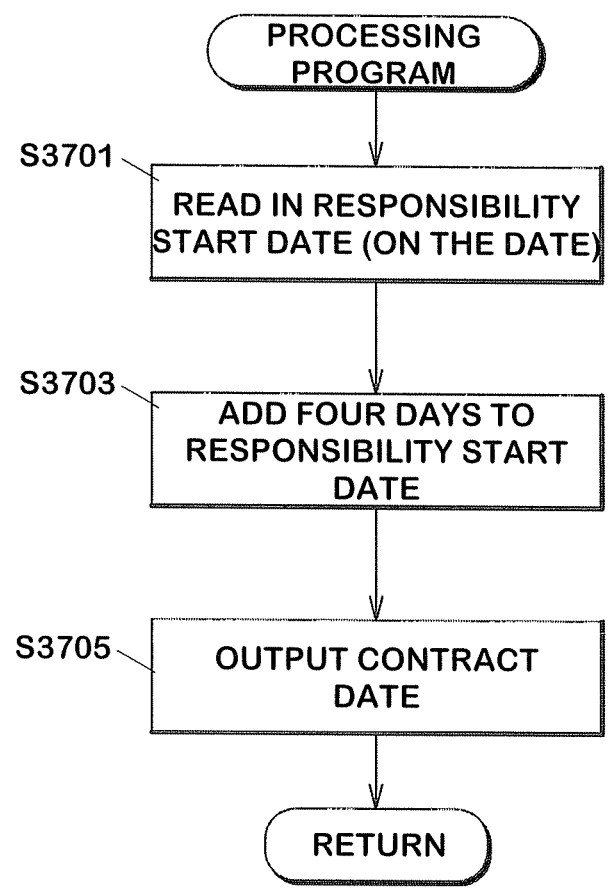
FIG. 38 is another flowchart of the processing program according to the present invention.

FIG. 38 shows a flowchart of the processing program 370 executed at that time. In implementing the business program 370, the CPU 203 reads in a responsibility start date via the screen image data acquired in the business program 3301 (step S3701).

For example, current day date data "Sep. 27, 2005" on the date coding field 368 in the screen-image of an change screen 360 shown in FIG. 36 is read in as a responsibility start date. Subsequently, the CPU 203 calculates the date of four days after a responsibility start date under a predetermined calendar calculation program (step S3703). For example, it calculates four days after the "Sep. 27, 2005" and acquires "Oct. 1, 2005". Further, the CPU 203 outputs the data of four days after a responsibility start date thus calculated (step S3705). For example, "Oct. 1, 2005" is output to the contract date 359 of the work area 3501 and makes it to the work record 3503 shown in FIG. 35.

5-3-10. Update of Record

Upon completion of the processing program, the CPU 203 adds record to the transaction database 2093 in accordance with the data stored in the work record (step S3409). The work record 3503 shown in FIG. 35 is added, for example.

5-3-11. Conclusion

A described in the above, it is not necessary for the present invention to previously incorporate logic for judging setup data depending on kinds of the basic policy in the clause definition program indicating rider. It is, therefore, rider(s) can appropriately be set up by just specifying the referenced basic policy even when kinds of basic policy are added. In this way, a higher maintenance-ability data management apparatus can be provided.

Although, the structure in which the processing program execution part 3323 is positioned in the business program 3301 is described in FIG. 33 of this embodiment, such processing program execution part 3323 may also be positioned any one of the programs such as the wrapper program A3303, the clause definition program 3305, the wrapper program B3307, and the clause definition program 3311. In other words, the processing program may be executed in any program as long as the contract date as an execution result is acquirable in the business program 3301.

6. Sixth Embodiment

Although, an example in which data items recorded on the transaction data are specified for each product and contractual coverage for plural contract conditions are managed with a record format commonly used for all the products, in this embodiment, a data management system capable of arbitrarily selecting data items recorded on the transaction data for each data to be stored and capable of expanding the versatility of record formats will be described.

For example, in the case of judging cancellation of contract with a conventional data management system, cancellation of a contract is judged with the business program by directly referencing a data item managing status of cancellation provided previously in transaction data.

However, the system needs to be designed to cover all the statuses in setting up a data item on the transaction data when statuses are managed therewith. Hence, in a field of packaging software in which statuses differ depending on each company is a premise thereof, a data management method having a high versatility is required. Considering the above described points, a data management system capable of reducing data redundancy and having a high versatility will be described in this embodiment.

6-1. Functional Block Diagram

A functional block diagram of the data management apparatus 1 according to the present invention is the same as that shown in either of FIGS. 1 and 20.

6-2. Hardware Structure

An example of hardware structure of the data management apparatus 1 according to the present invention realized using a CPU is basically the same as that shown in either of FIGS. 2 and 21.

6-3. Processing Details (1)

Processing details (1) of this embodiment will be described with reference to FIGS. 39 through 45. In this embodiment, the business program is an application program for managing contractual data and product data of life insurance.

Figure 39:
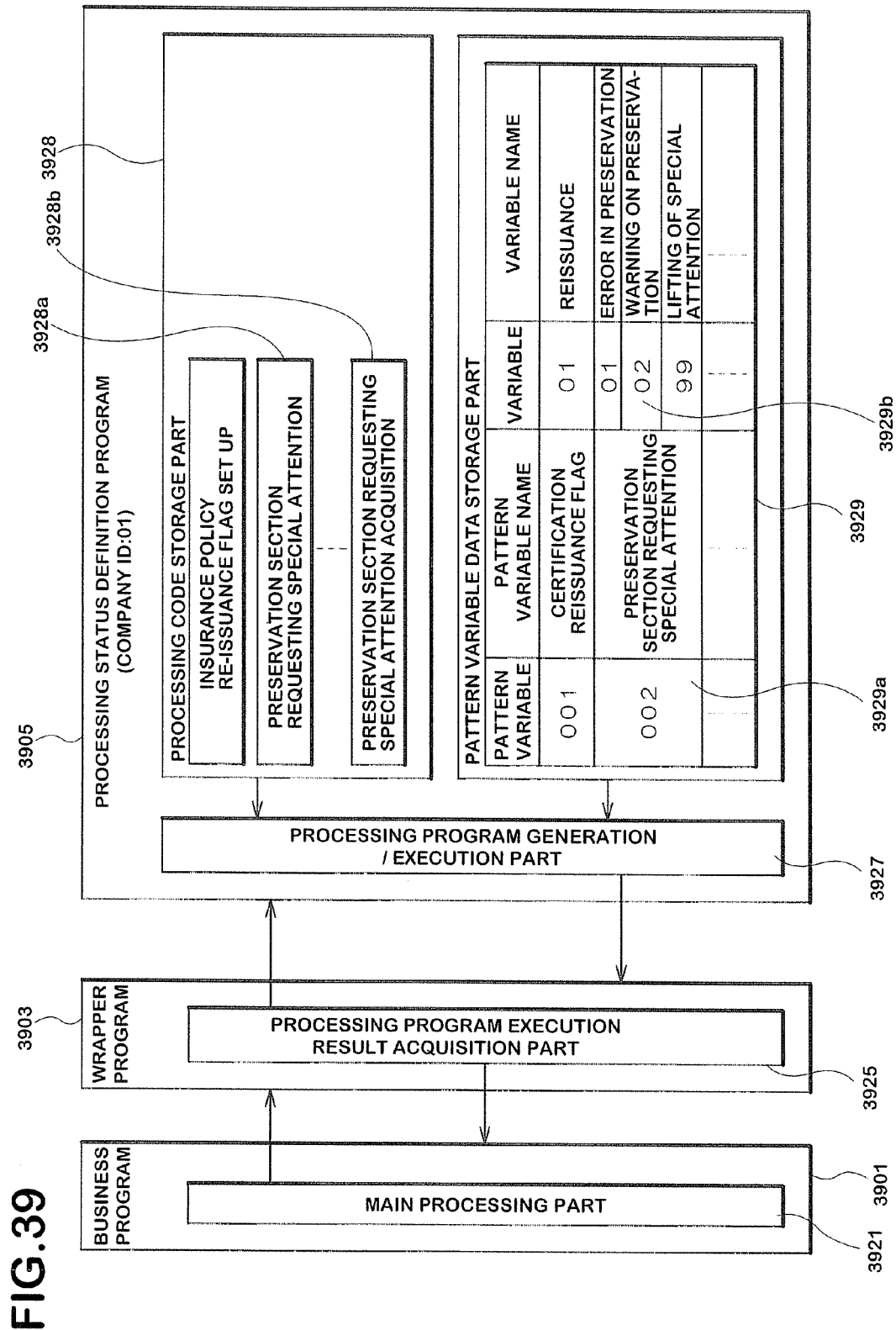
FIG. 39 is a functional diagram showing an example of the business application program, the wrapper program and a processing status definition program according to the present invention.

FIG. 39 shows a functional block diagram of the business program 3091, a wrapper program 3093 and a processing status definition program 3905, and so on.

The business program 3091 comprises a main processing part 3921 for implementing processing on user interface such as image processing and a database.

The wrapper program 3903 includes a processing program execution result acquisition part 3925 for acquiring a result of implementing a processing program generated by the processing status definition program 3905.

The processing status definition program 3905 comprises a processing program generation/execution part 3927 for generating a processing program on receipt of a request from the wrapper program 3903 and executes it, a processing code storage part 3928 storing processing codes for each processing name and a pattern variable data storage part 3929 for storing pattern variable data used for set up to the processing code (when a company ID is "01", for example). Here, the term pattern variable data is data defining combination of a pattern variable and a variable capable of setting up in the transaction data. For example, it is indicated that variables which can be combined with a pattern variable "002 (preservation section requesting special attention)" are "01(preservation error)", "02 (preservation warning)" and "99 (special attention no more needed).

In this embodiment, the case where a user instructs to set-up data content "preservation warning" in data item "preservation section requesting special attention" in order to invite special attention for handling of insurance policy data on the system by loss of an insurance policy will be described.

Figure 41:
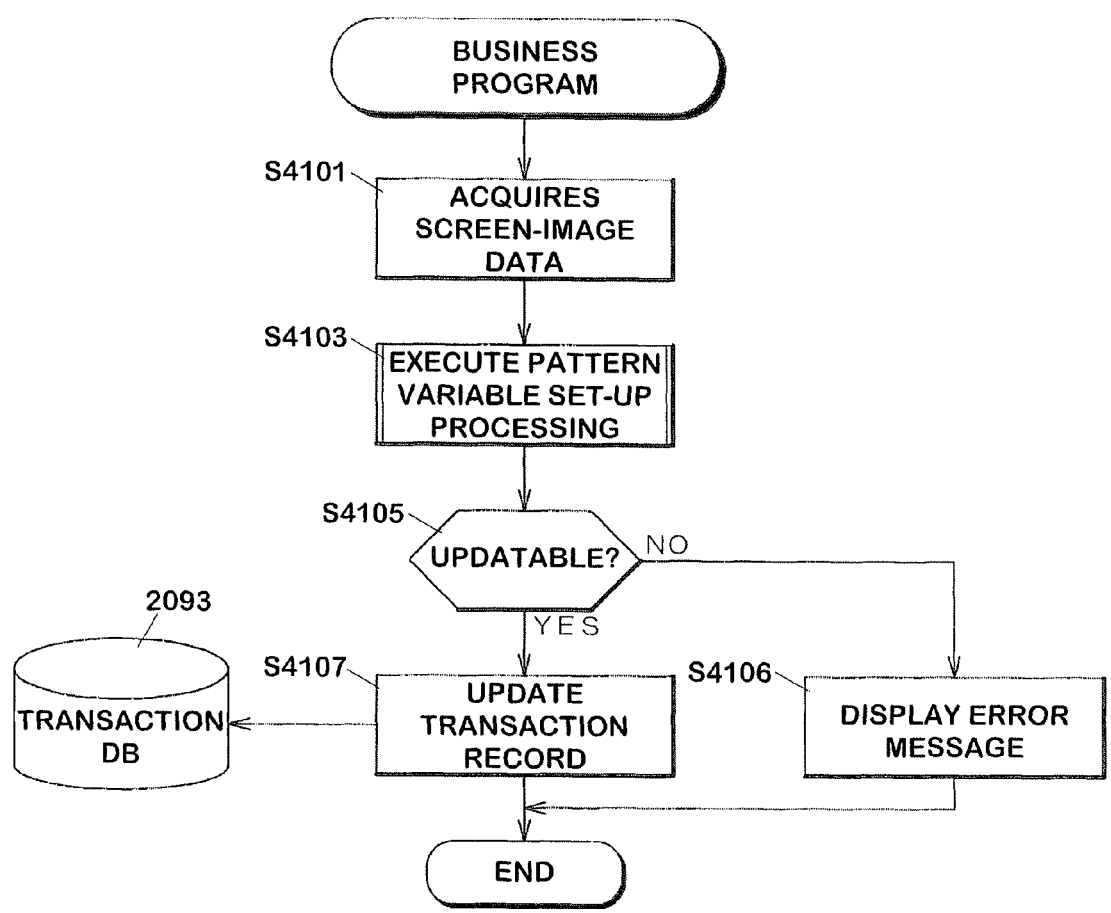
FIG. 41a diagram showing a flowchart of the business application program according to the present invention.
Figure 42A:
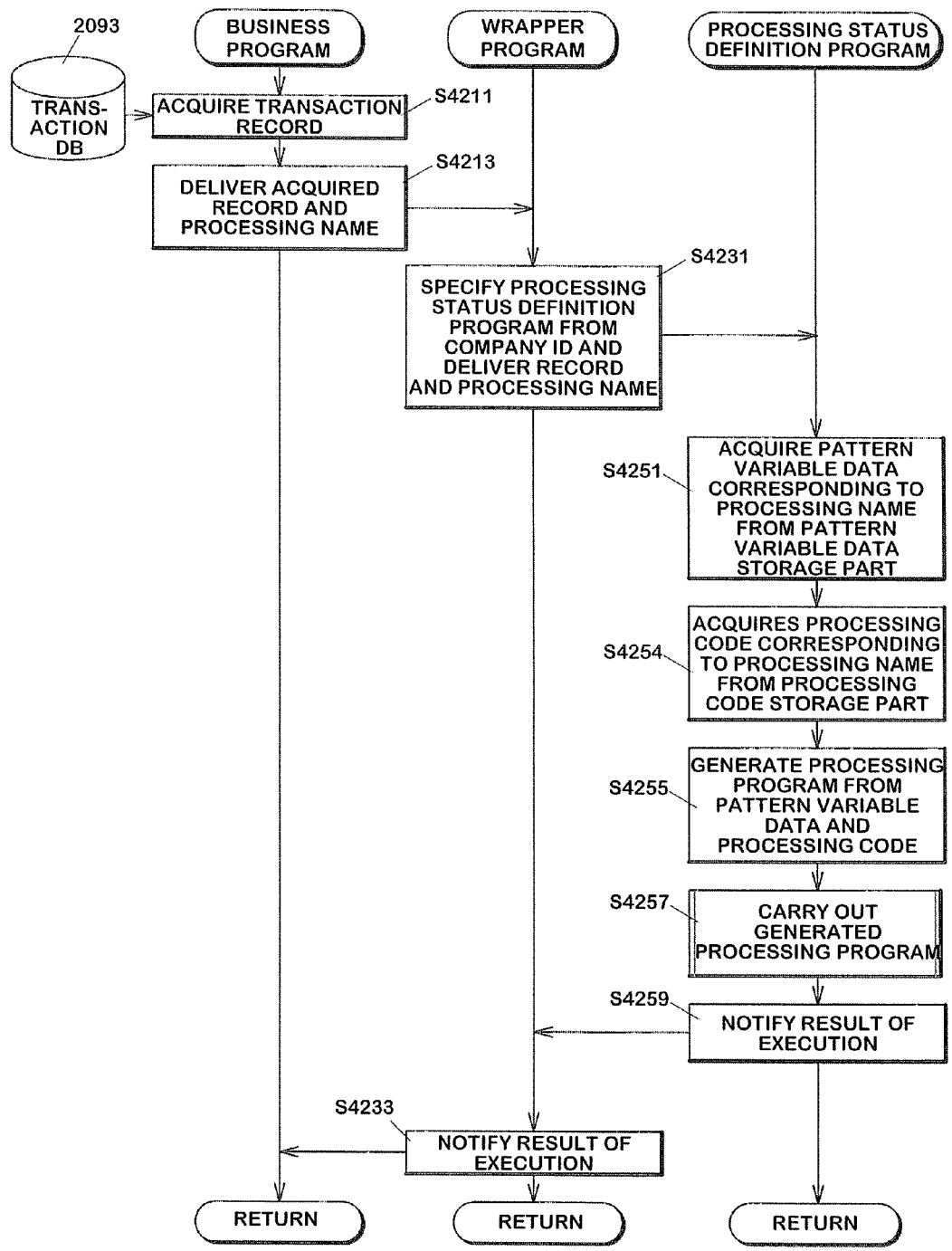
FIG. 42a is a diagram showing a flowchart of pattern variable acquisition processing according to the present invention.
Figure 43:
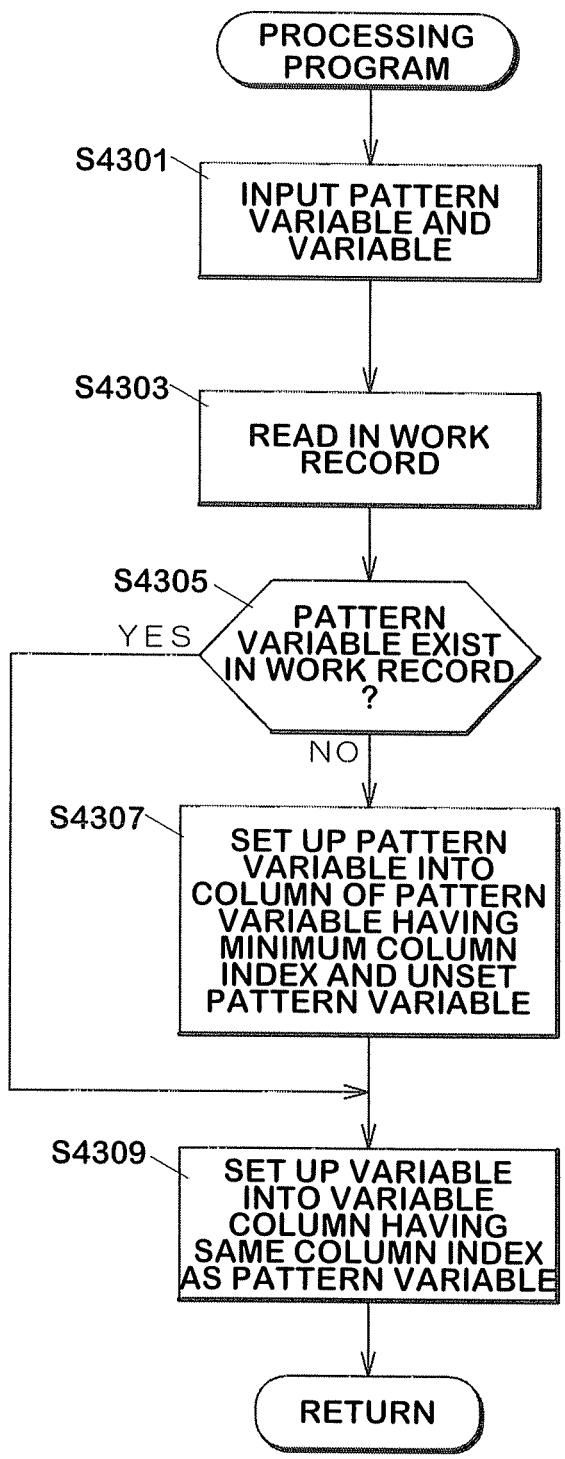
FIG. 43 is a diagram showing a flowchart of the processing program according to this invention.

FIGS. 41 through 43 are flowchart of the business program 3091, the wrapper program 3903 and the processing status definition program 3905 executed on the data management apparatus 1.

6-3-1. Acquisition of Screen-Image Data

Figure 44:
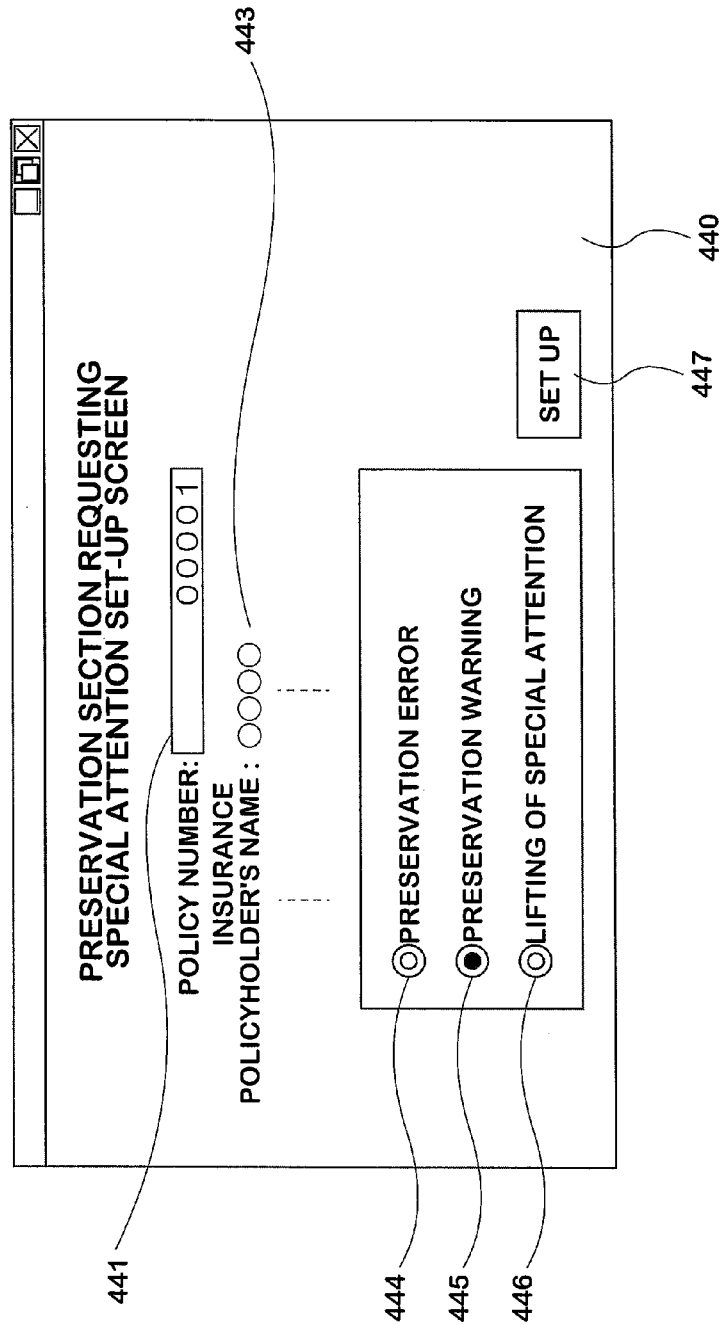
FIG. 44 is a diagram showing a screen-image of a preservation section requesting special attention set-up screen according to the present invention.

FIG. 44 shows a screen-image of a preservation section requesting special attention set-up screen 440 displayed on the display 201 under the execution of the main processing part 3921 (FIG. 39) in the business program 3091. An entry field for policy number 441, display fields of insurance policyholder's name 443 and so on, a radio button for setting-up "preservation error" 444, a radio button for setting-up "preservation warning" 445, a radio button for setting-up "special attention no more needed" 446 and a set-up button 447 and so on are displayed on this screen.

The operator of the data management apparatus 1 can instruct the set-up of preservation sections requesting special attention indicated such as "preservation error", "preservation warning" and "special attention no more needed" and so on for the transaction data for life insurance specified by a predetermined policy number. For example, the operator inputs "00001" into the entry field for policy number 441 with the key board/mouse 207 and makes the set-up status of insurance policyholder's name and preservation section requesting special attention and the like to be displayed. If none of the preservation section requesting special attention is set in the transaction data, the radio button for setting-up "preservation error" 444, the radio button for setting-up "preservation warning" 445 and the radio button for setting-up "special attention no more needed" 446 are all unselected.

Thereafter, the operator instructs execution of setting-up "preservation warning" to the preservation section requesting special attention of transaction data specified by "00001" by selecting the radio button for setting-up "preservation warning" 445 and clicking the set-up button 447.

Upon clicking the set-up button 447, the CPU 203 implementing the main processing part 3921 acquires screen-image data (steps S4101, FIG. 41). For example, the CPU 203 acquires a policy number "00001", the processing name "preservation sections requesting special attention set up" and the variable name preservation warning" as screen-image data.

6-3-2. Pattern Variable Set-Up Processing

The CPU 203 acquiring the screen-image executes pattern variable set-up processing (step S4103). The pattern variable set-up processing shown in step S4103 of FIG. 41 will be described using FIG. 42

6-3-2-1. Start-Up of Wrapper Program (Business Program)

In the business program 3091, the CPU 203 acquires the transaction record of insurance contracts and stores the data on a predetermined work record (step S4201). For example, the record whose policy number "00001" is extracted from the transaction database 2093 and acquires the record s a work record 4001 shown in FIG. 40.

Upon acquisition of such record, the CPU 203 delivers to the wrapper program 3903 the acquired record, predetermined processing name and predetermined variable name (step S4203). For example, in the above case, in addition to carrying out processing for set up "preservation sections requesting special attention", pattern variable set-up processing for setting-up a variable corresponding to data contents "preservation warning" to be set up in conjunction with the previous processing is performed. Thus, the CPU 203 respectively delivers "preservation sections requesting special attention" as a processing name and "preservation warning" as a variable name to the wrapper program 3903.

6-3-2-2. Specification of Processing Status Definition Body (Wrapper Program)

Upon delivery, the wrapper program 3093 delivers the above-mentioned record, the processing name and the variable name to the processing status definition program 3905 specified according to a company ID in the record (step S4221).

Figure 40:
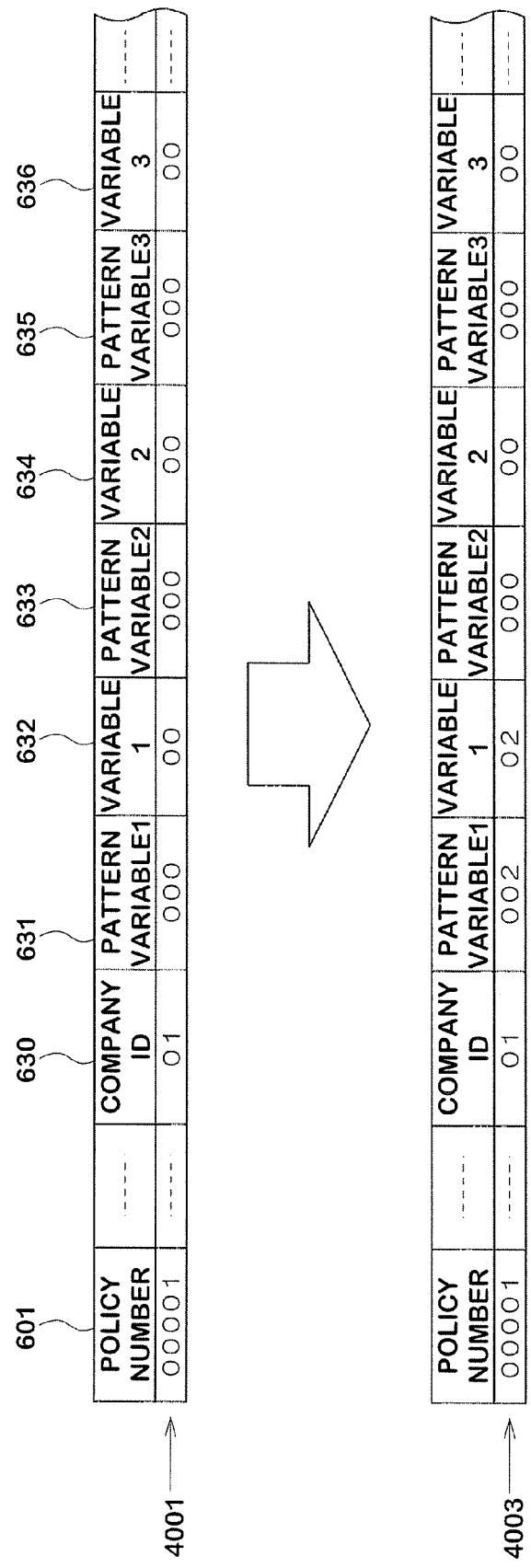
FIG. 40 is another diagram showing a work record according to the present invention.

For example, in the work record 4001 shown in FIG. 40, the processing status definition program 3905 is specified according to a company ID "01". Also, the CPU 203 respectively delivers the "preservation sections requesting special attention set up" as a processing name and "preservation warning" as a variable name.

6-3-2-3. Generation of Processing Program (Processing Status Definition Program)

In the processing program generation/execution part 3927 the CPU 203 executing the processing status definition program 3905 acquires a pattern variable corresponding to the processing name inherited by conducting a search for the pattern variable data storage part 3929 (step S4241). For example, a pattern variable "002" 3929a corresponding to the pattern variable name "preservation sections requesting special attention" based on the processing name "preservation sections requesting special attention set up" is acquired.

Subsequently the CPU 203 acquires a variable corresponding to the variable name inherited by conducting a search for the pattern variable data storage part 3929 (step S4243). For example, a variable "02" 3929b corresponding to the pattern variable name "preservation warning" in the pattern variable name "preservation sections requesting special attention" is acquired.

The CPU 203 further acquires processing code corresponding to the processing name inherited by conducting a search for the processing code storage part 3928 (step S4244). In the processing code storage part 3928, processing code is recorded for each company ID. For example, the CPU executing the processing status definition program 3905 acquires a processing code 3928a whose processing name "preservation sections requesting special attention set up".

The CPU 203 executing processing program generation/execution part 3927 generates a processing program in accordance with the processing code acquired from the processing code storage part 3928 and the pattern variable data obtained from the pattern variable data storage part 3929 (step S4245).

Figure 45:
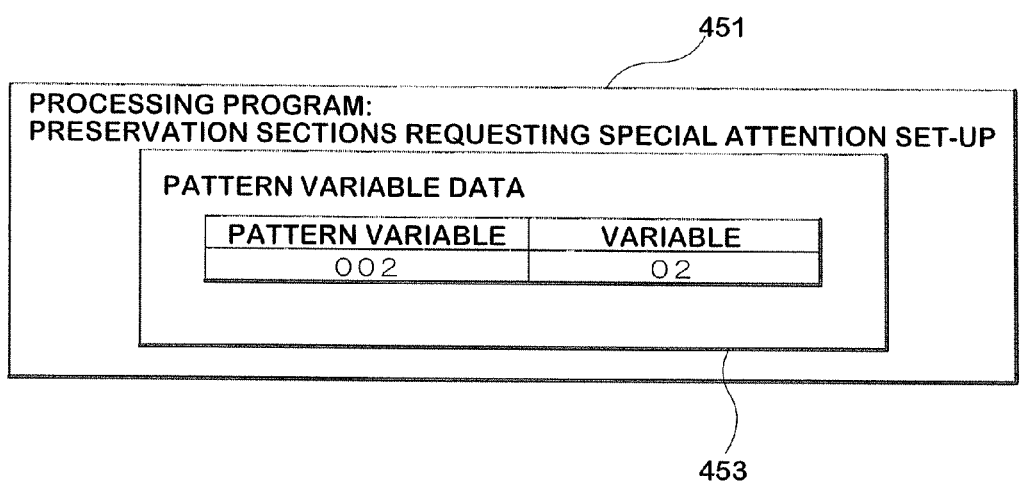
FIG. 45 is a diagram illustrating a structural example of the processing program according to the present invention.

FIG. 45 shows structure of a processing program thus generated. The processing program 451 is a program for executing "preservation sections requesting special attention set up". Pattern variable data 453 is combination data of a pattern variable and a variable to be set up in the transaction data that that time. In other words, by performing such processing program, a pattern variable "002" and a variable "02" corresponding to the pattern variable name "preservation sections requesting special attention" and the pattern variable name "preservation warning" can be set at a predetermined position of the work record 4001.

6-3-2-4. Execution of Processing Program (Processing Status Definition Program)

The CPU 203 carries out the processing program 451 thus generated (step S4247). FIG. 43 shows a flowchart of the processing program 451 executed at that time.

In execution of the processing program 451, the CPU 203 reads in data indicating a pattern variable and a variable from the pattern variable data incorporated and set up in the processing program (step S4301). Further, it reads in the work record stored in the memory 205 (step S4303). For example, the pattern variable "002" and the variable "02" are read as well as reading in the work record 4001 (FIG. 40).

The CPU 203 judges whether or not the pattern variable read from the pattern variable data exist in the work record (step S4305). For example, it is judged whether or not the same pattern variable is recorded by conducting a sequential search for pattern variable 1, pattern variable 2, pattern variable 3 and so on in accordance with the pattern variable "002".

When the same data as the pattern variable read into any pattern variable of the work record is not recorded in step S4307, the CPU 203 sets up into a column of the pattern variable having the minimum column index which has not set up a pattern variable yet the pattern variable read in (step S4307). Here, the column index is a data item of work record specifying a column n indicated by "pattern n" or "variable n" and column index of "pattern variable 1" or "variable 1" are respectively represented as "1".

For example, unset-up pattern variable is indicated as "0000" in the work record 4001, the variable in that case is "00". Hence, the CPU 203 sets up the pattern variable "002" at the position of "pattern variable 1" 631 in the work record 4001.

Upon set up the pattern variable, the CPU 203 further set up the variable read in at the position of a variable column having the same column index as the set-up pattern variable (step S4309).

For example, since the pattern variable "002" is set at the pattern variable 1_631, a variable "02" is set at the variable 1_632 which has the same column index "1" and make it like the work record 4003.

When the same data as the pattern variable read into any pattern variable of the work record is recorded in step S4305, the CPU 203 sets up the variable thus read in at the position of variable column which has the same column index as the pattern variable (step S4309).

In step S4249 shown in FIG. 42, the CPU 203 executing the processing status definition program 3905 notifies to the wrapper program 3903 a result of execution of the step S4247 (step S4249, FIG. 42). Also, the CPU 203 performing the wrapper program 3903 in step S4223 of FIG. 42 notifies to the business program 3901a result of execution of the inherited step S4247 (step S4223, FIG. 42). For example, processing to return the updatable flag "1(ON)" to a program thread of the business program 3091 as a return value is carried out. If an error occurs during the execution of the processing program. A return value "0(OFF)" is retuned.

6-3-2-5. Update of Record

In FIG. 41, upon completing execution of the pattern variable set-up processing (step S4103) the CPU 203 carrying out the business program 3901 judges whether or not the transaction data is updatable according to the data recorded in the work record, in accordance with an updatable flag (step S4105). Such CPU 203 judges that it is updatable when the updatable flag is in ON state and updates the transaction record of the transaction database 2093 (step S4107).

Also, the CPU 203 judges that it is un-updatable when the updatable flag is in OFF state and outputs an error message indicating that no update can be done to the display 201 (step S4106).

6-4. Processing Details (2)

An example of setting up a pattern variable and a variable to the transaction data is described in the processing details (1), an example of handling transaction data to which a pattern variable and a variable are preliminarily set up will be described in this processing details (2).

Processing details (2) of this embodiment will be described with reference to FIGS. 41a, 42a, 43a, 44a, 45a, 39 and 40 and so on. In this embodiment, the business program is an application program for managing contractual data and product data of life insurance as well.

In this embodiment, an example of checking whether or not cancellation of a contract is possible by referencing preservation sections requesting special attention during execution of cancellation processing of insurance contract will be described. In other words, an example of acquiring the name of variable in pattern variable name "preservation section requesting special attention" in accordance with the pattern variable and the variable set up in the transaction data specified by policy number will be described.

FIGS. 41a through 43a are flowcharts of the business program 3091, the wrapper program 3903 and the processing status definition program 3905 all executed by the data management apparatus 1 in the above mentioned case.

6-4-1. Acquisition of Screen-Image Data

Figure 44A:
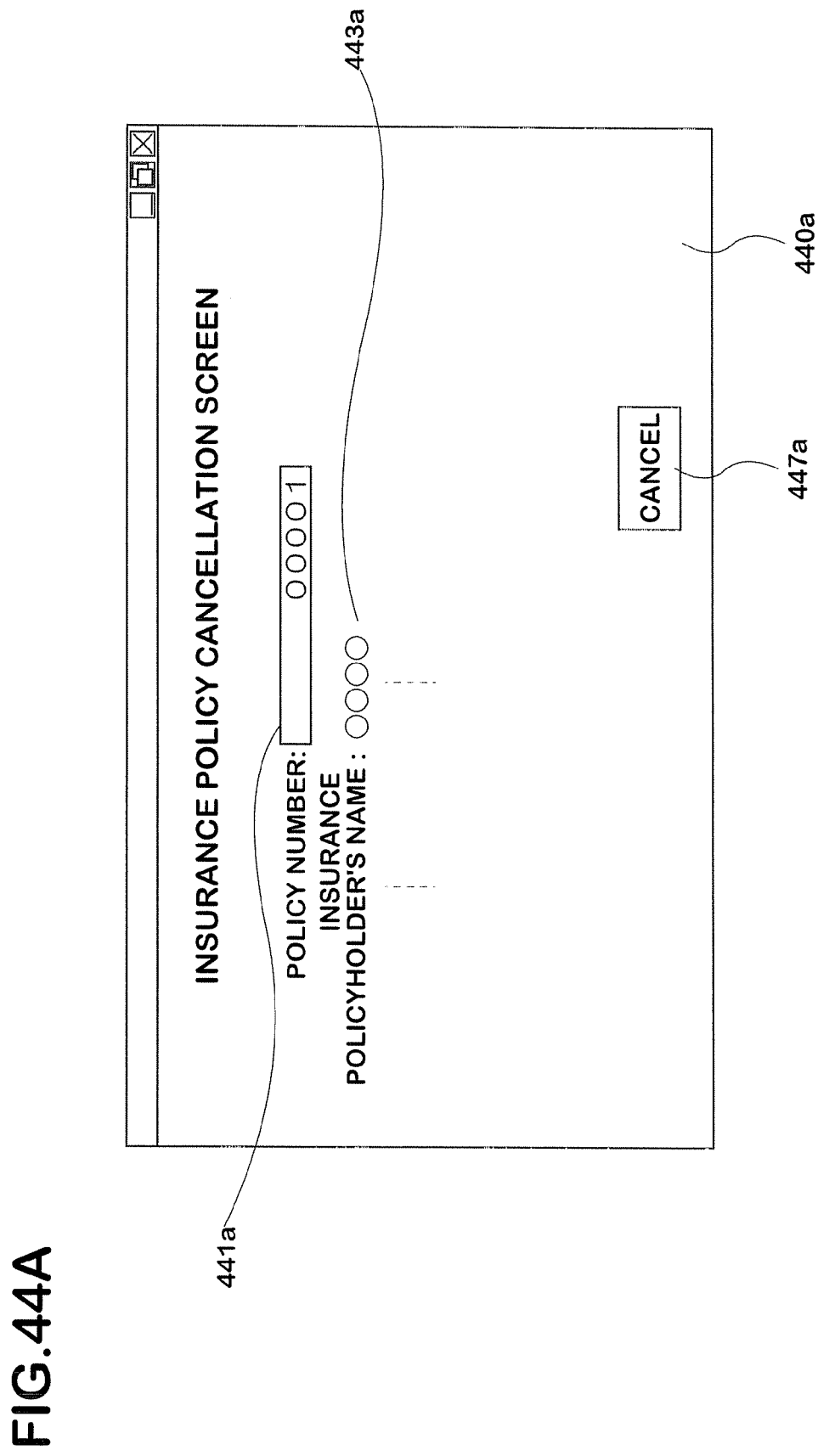
FIG. 44a is a diagram showing a display screen for insurance policy cancellation screen according to the present invention.

FIG. 44a is a diagram showing a display screen for insurance policy cancellation screen 440a displayed on a display 201 as a result of carrying out the business program 3091 by the main processing part 3921 (FIG. 39). In this display screen, an entry field of policy number 441a, display fields of insurance policyholder's name 443a and so on and a cancellation button 447a and so on are displayed on this screen. The operator of the data management apparatus 1 can instruct execution of cancellation processing regarding the transaction data for life insurance specified by a predetermined policy number. For example, the operator inputs "00001" into the entry field for policy number 441a with the key board/mouse 207 and makes insurance policyholder's name and the like to be displayed.

Thereafter, the operator acquires data being set as preservation sections requesting special attention in accordance with the pattern variable and the variable recorded in the transaction data of a policy number "00001" by clicking the cancellation button 447a.

Figure 41A:
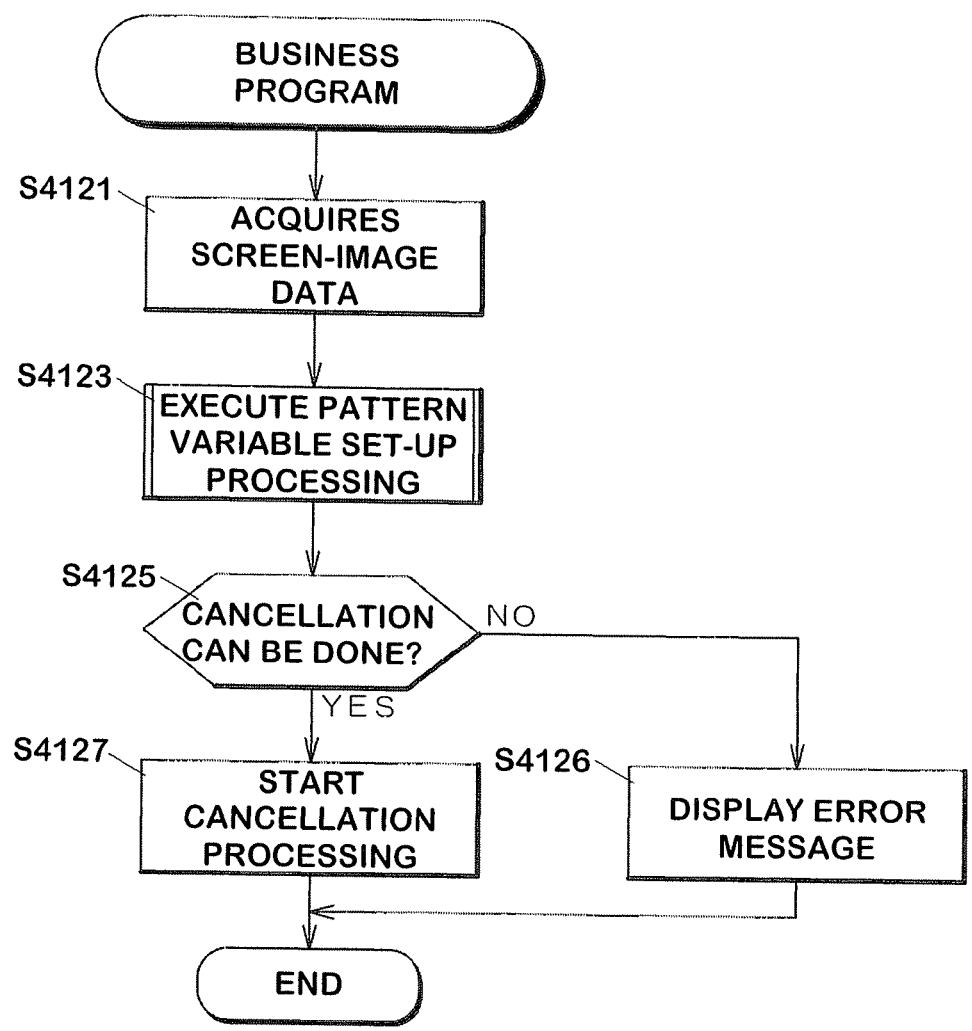

Upon clicking the cancellation button 447a, the CPU 203 implementing the main processing part 3921 acquires screen-image data (steps S4121, FIG. 41a). For example, the CPU 203 acquires a policy number "00001" as screen-image data.

6-4-2. Pattern Variable Acquisition Processing

The CPU 203 acquiring the screen-image executes pattern variable set-up processing (step S4123). The pattern variable set-up processing shown in step S4123 of FIG. 41a will be described using FIG. 42a.

6-4-2-1. Start-Up of Wrapper Program (Business Program)

In the business program 3091, the CPU 203 acquires the transaction record of insurance contracts and stores the data on a predetermined work record (step S4211). For example, the record whose policy number "00001" is extracted from the transaction database 2093 and acquires the records as a work record 4003 shown in FIG. 40.

Upon acquisition of such record, the CPU 203 delivers to the wrapper program 3903 the acquired record and predetermined processing name (step S4213). For example, in the above case, pattern variable set-up processing for acquiring is implemented in accordance with the pattern variable and the variable stored in the transaction data. Thus, the CPU 203 delivers "preservation sections requesting special attention" as a processing name to the wrapper program 3903.

6-4-2-2. Specification of Processing Status Definition Body (Wrapper Program A)

Upon delivery, the wrapper program 3903 delivers the record to the processing status definition program 3905 specified according to a company ID in the record (step S4231).

For example, in the record 4003 shown in FIG. 40, the processing status definition program 3905 is specified in accordance with a company ID 630 "01". Further, the CPU 203 delivers the "preservation sections requesting special attention" as a processing name.

6-4-2-3. Generation of Processing Program (Processing Status Definition Program)

The CPU 203 executing the processing status definition program 3095 acquires pattern variable data related to pattern variables corresponding to the inherited processing name by conducting a search of the pattern variable data storage part t 3929 (step S4251). For example, it acquires the pattern variable data related to a pattern variable "002" 3929a corresponding to a processing name "preservation sections requesting special attention acquisition" in accordance with the processing name "preservation sections requesting special attention acquisition".

Subsequently, the CPU 203 further acquires processing code corresponding to the inherited processing name by conducting a search for the processing code storage part 3928 (step S4254). Processing code is recorded on the processing code storage part 3928 for each company ID. For example, the CPU 203 executing the processing status definition program 3905 acquires a processing code 3928b whose processing name is "preservation sections requesting special attention acquisition".

The CPU 203 implementing the processing program generation/execution part 3927 generates a processing program based on a processing code obtained from the processing code storage part 3928 and pattern variable data acquired from the pattern variable data storage part t 3929 (step S4255).

FIG. 45a shows a structural example of the processing program thus generated. The processing program 451a is a processing program for executing the "preservation sections requesting special attention acquisition". In addition, pattern variable data 453a is a combination data of pattern variable and variable to be acquired according to the pattern variable and the variable stored in the transaction data at that time. In other words, by executing such processing program, it may judge whether or not the pattern variable "preservation sections requesting special attention" is recorded in the work record 4003 and variable name corresponding to the recorded variable name can be acquired, if recorded.

6-4-2-4. Execution of Processing Program (Processing Status Definition Program)

Figure 43A:
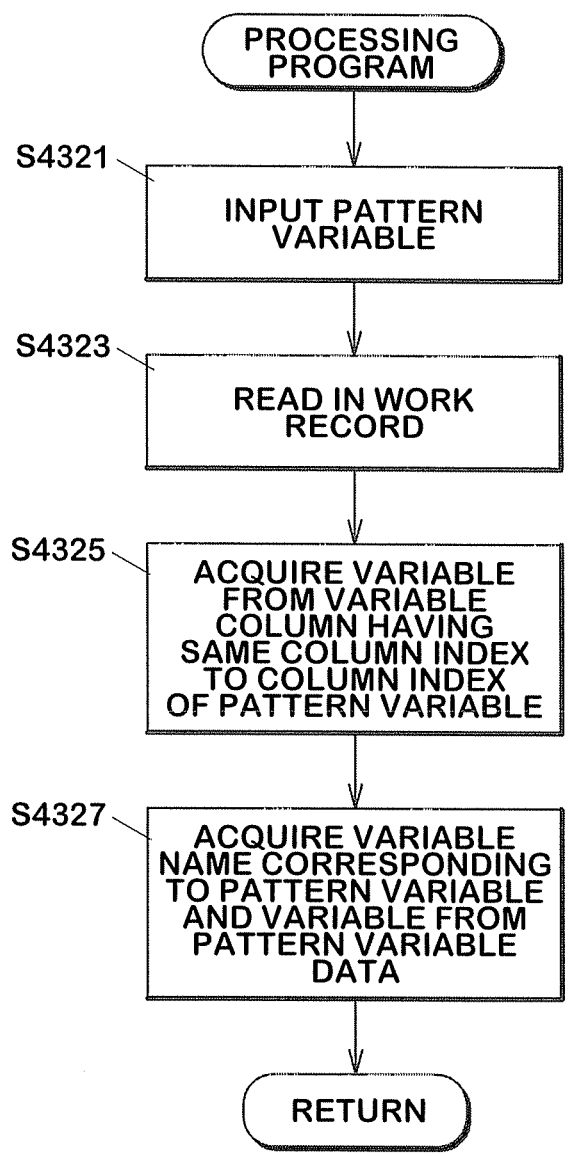
FIG. 43a is a diagram showing a flowchart of the processing program according to this invention.

The CPU 203 carries out the processing program 451a thus generated (step S4257). FIG. 43a shows a flowchart of the processing program 451a executed at that time.

In execution of the processing program 451a, the CPU 203 reads in data indicating a pattern variable from the pattern variable data incorporated and set up in the processing program (step S4321). Further, it reads in the work record stored in the memory 205 (step S4323). For example, the pattern variable "002" is read as well as reading in the work record 4003 (FIG. 40).

The CPU 203 finds a pattern variable which is the same as that read in from the pattern variable data and acquires a variable having the same column index to the column index of the pattern variable (step S4325).

For example, it is judged whether or not the same pattern variable is recorded by conducting a sequential search for pattern variable 1, pattern variable 2, pattern variable 3 and so on in accordance with the pattern variable "002" and such column index of such pattern variable is acquired when the same data is recorded. Since pattern variable 1 in the work record 4003 are "002", a variable 1 "02" having column index 1 is acquired.

The CPU 203 conducts a search for the pattern variable data 453a of the processing program in accordance with the variable acquired from the work record and acquires a variable name corresponding to such variable data (step S4327). For example, when the variable 1 "02" is acquired from the work record, a variable name "preservation warning" corresponding to the variable "02" is acquired from the pattern variable data 453a.

The CPU 203 executing the processing status definition program 3905 at step S4259 in FIG. 42a notifies a result of execution of the step S4257 to the wrapper program 3903 (step S4259, FIG. 42a). In step S4233 shown in FIG. 42a, the CPU 203 performing the wrapper program 3903 notifies a result of execution of the inherited step S4257 to the business program 3901 (step S4233).

For example, processing in which the variable name "preservation warning" acquired at step S4257 is returned to a program thread of the business program 3901 as a return value is carried out. If it is judged that no preservation sections requesting special attention is set up in the transaction data during the execution of the program, a return value "un-setup" is returned under exceptional processing.

6-4-2.5. Update of Record

Upon completion of the pattern variable acquisition processing (step S4123) in FIG. 41a, the CPU 203 executing the business program 3901 judges whether or not cancellation of the transaction data can be done in accordance with the return value (step S4125).

For example, the CPU 203 starts cancellation processing as a result of judgment when the value is either "un-setup" or "special attention no more needed" (step S4127).

On the other hand, when the return value is either "preservation error" or "preservation warning", the CPU displays an error message on the display 201 and terminates the processing (step S4126). Since the return value is "preservation warning" and no cancellation processing can not be done, the CPU 203 notifies the fact to the operator.

6-5. Conclusion

As described in the above, data items recorded on the transaction data for each data to be stored can be selected arbitrarily for data management in accordance with the present invention. This leads to the fact that the versatility of record formats in the transaction data can further be extended as well as further increasing maintenance-ability by eliminating business logics from the business program in accordance with data characteristics. Especially, in a field of packaging software, no customization of business program is required, so that plurality of companies can use package software by just executing customization of record formats. Hence, it is possible to remarkably decrease the development cost and cost for introduction.

An example for generating a processing status definition program for each company ID is described in the above description, the processing status definition program may also be generated in accordance with other factor(s). For example, the processing status definition program may also be generated in accordance with each of product code or business group.

7. Seventh Embodiment

Although, an example in which data item IDs and data contents IDs are recorded in the transaction data and acquire data item and data contents corresponding thereto is described in the above described sixth embodiment, a data management system capable of recording data contents instead of the data contents IDs in the transaction data and capable of arbitrarily setting up data items to the data contents will be described in this embodiment.

For example, in the case of managing plural kinds of pre-determined data (data on amount, data on dates so on, for example) with a convention data management system, it is necessary to define each data item into a database schema which comprises all transaction databases. However, defining all the data items considered to be required in the schema extends its versatility but makes a data structure redundant and this causes a factor of reducing the use efficiency of database.

Hence, in a field of packaging software in which data items differ depending on each company is a premise thereof, a data management method having a high versatility and a high efficiency in use is required. In this embodiment, a data management system capable of reducing data redundancy and having a high versatility will be described in this embodiment.

7-1. Functional Block Diagram

A functional block diagram of the data management apparatus 1 according to the present invention is the same as that shown in either of FIGS. 1 and 20.

7-2. Hardware Structure

An example of hardware structure of the data management apparatus 1 according to the present invention realized using a CPU is basically the same as that shown in either of FIGS. 2 and 21.

7-3. Processing Details (1)

Processing details of this embodiment will be described with reference to FIGS. 46 through 52. In this embodiment, the business program is an application program for managing contractual data and product data of life insurance.

Figure 46:
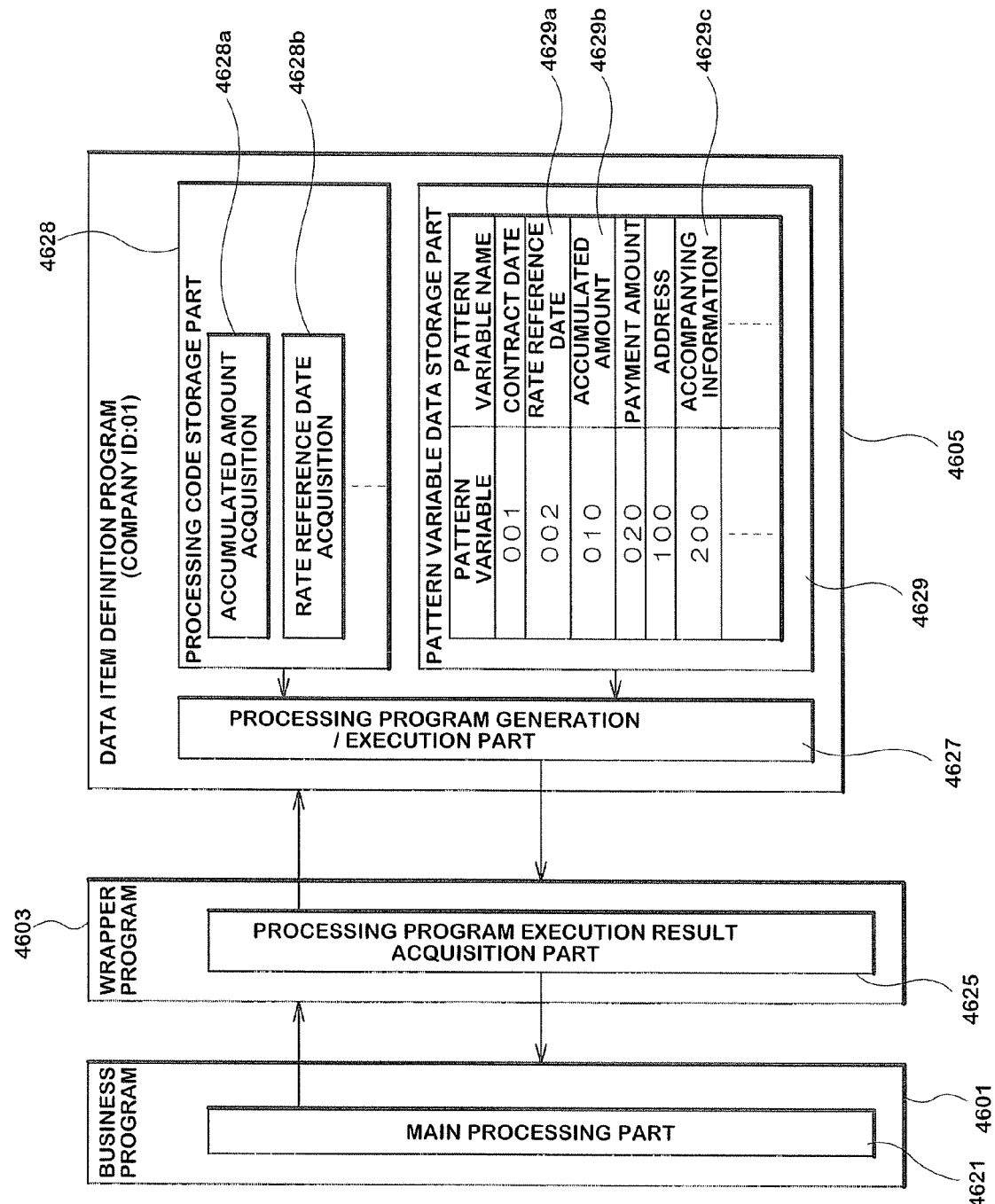
FIG. 46 is a diagram showing examples of functional block diagrams of the business application program, the wrapper program and data item definition program according to the present invention.

FIG. 46 shows a functional block diagram of a business program 4601, a wrapper program 4603 and a data item definition program 4605, and so on.

The business program 4601 comprises a main processing part 4621 for implementing processing on user interface such as image processing and a database.

The wrapper program 4603 includes a processing program execution result acquisition part 4625 for acquiring a result of implementing a processing program generated by the data item definition program 4605.

The processing status definition program 4605 comprises a processing program generation/execution part 4627 for generating a processing program on receipt of a request from the wrapper program 4603 and executes it, a processing code storage part 4628 storing processing codes for each processing name and a pattern variable data storage part 4629 for storing pattern variable data used for set up to the processing code (when a company ID is "01", for example). Here, the term pattern variable data is data for defining data item in the transaction data using pattern variable and pattern variable name corresponding thereto. For example, data item corresponding to the pattern variable "002" is defined in accordance with a pattern variable name "rate reference date".

Figure 48:
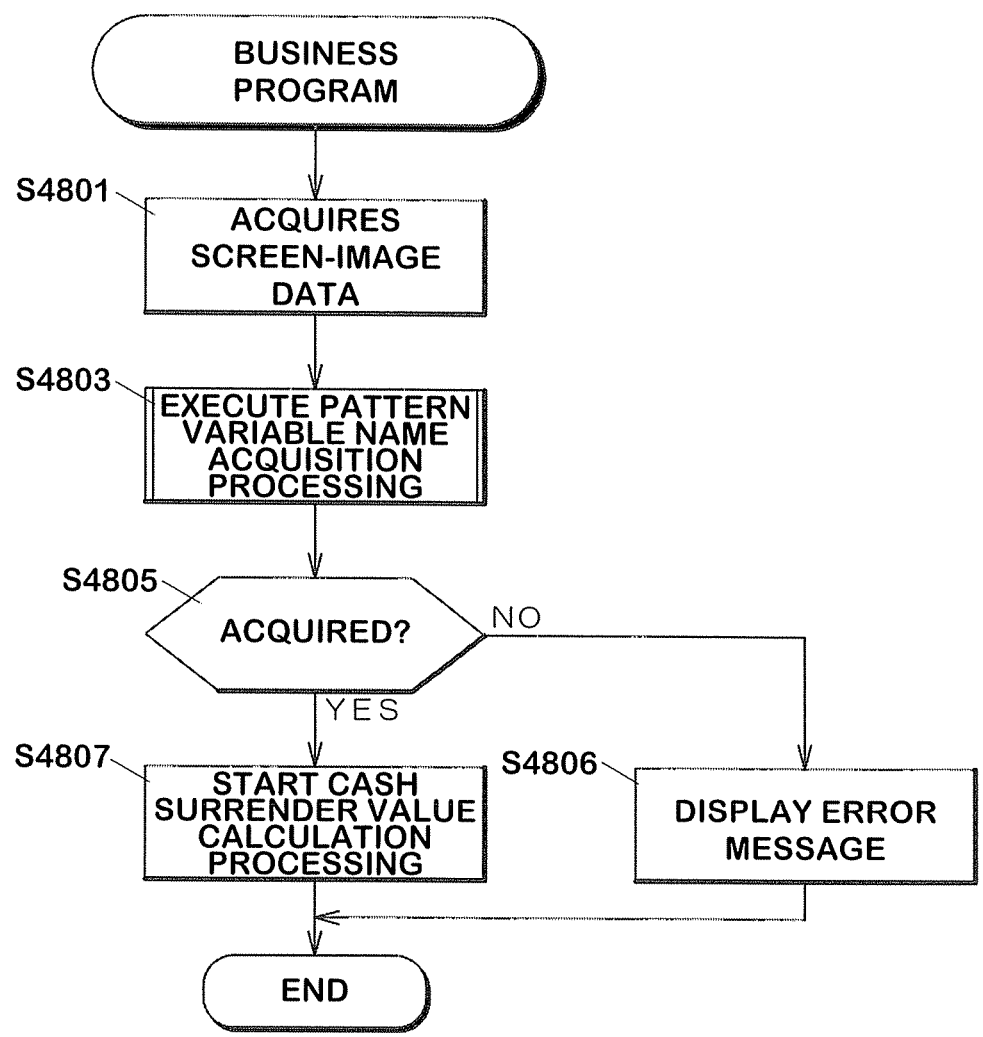
FIG. 48 is a diagram showing a flowchart of the business application program according to the present invention.
Figure 49:
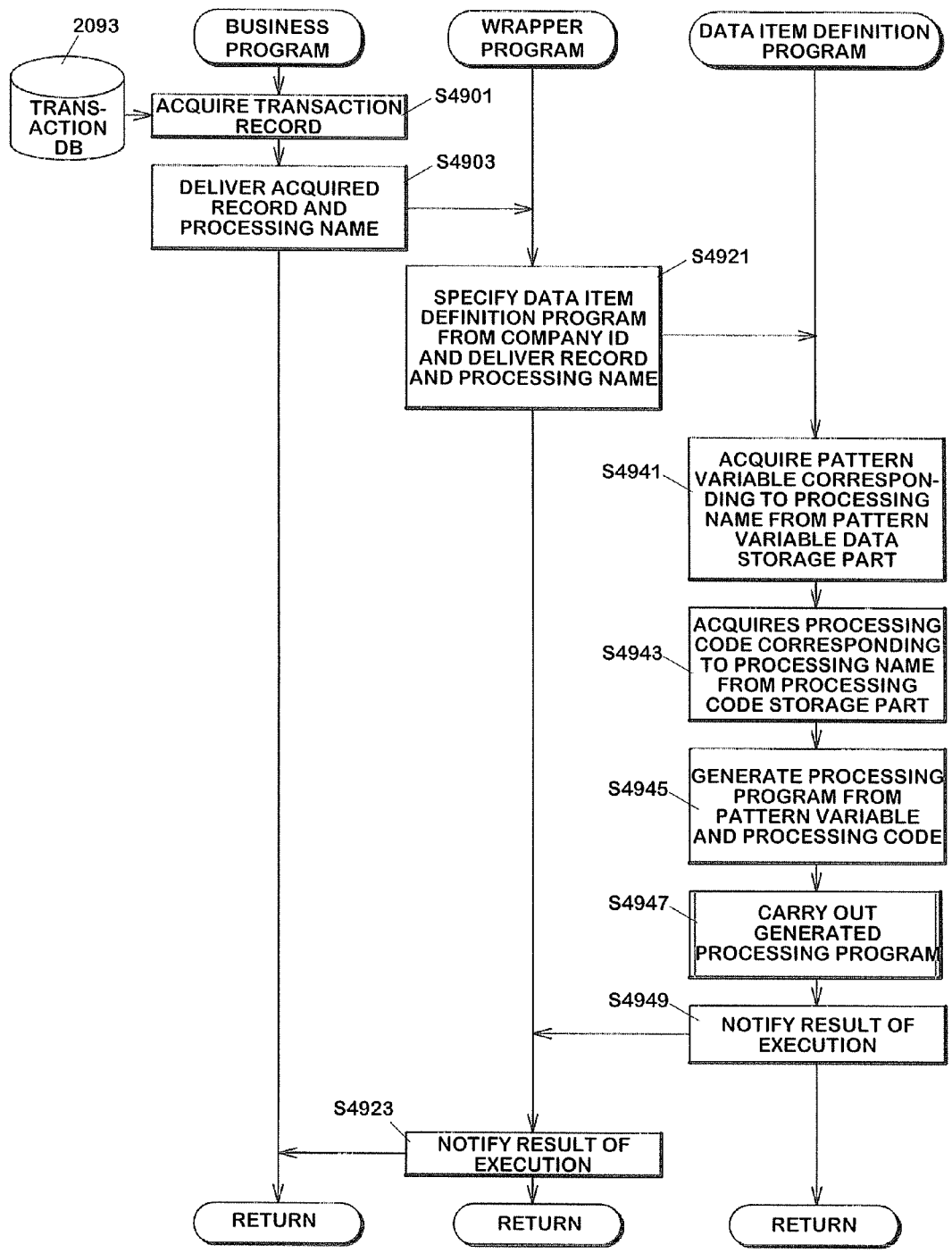
FIG. 49 is a flowchart of the pattern variable acquisition processing according to the present invention.
Figure 50:
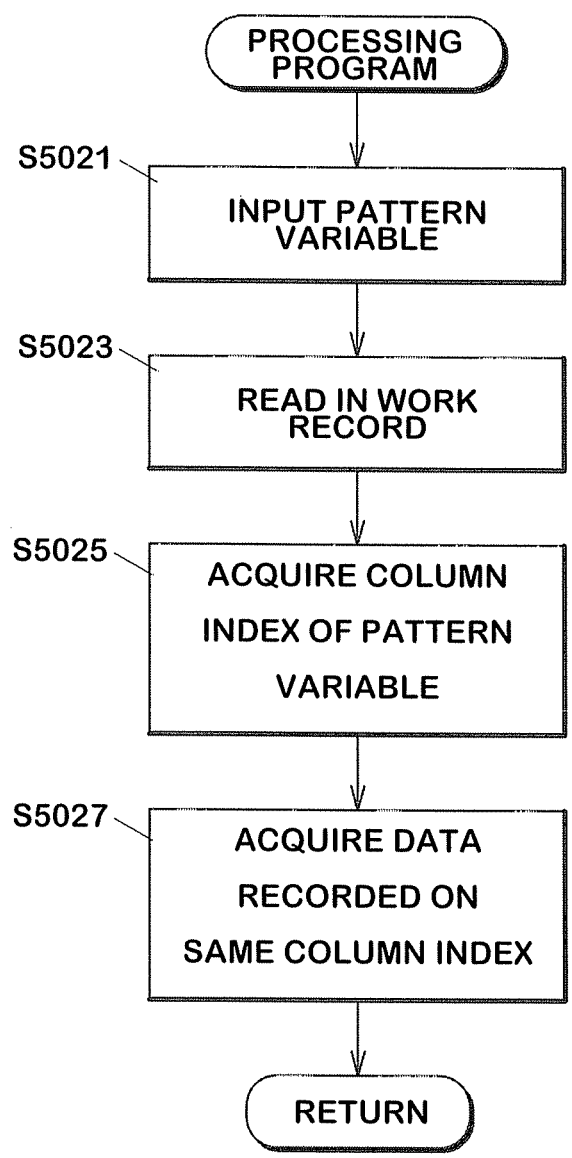
FIG. 50 is a flowchart of the processing program according to this invention.

In this embodiment, the case where a user instructs to carry out calculation of a cash surrender value of insurance contract will be described. FIGS. 48 through 50 are flowcharts of the business program 4601, the wrapper program 4603 and the data item definition program, 4605 executed by the data management apparatus 1.

7-3-1. Acquisition of Screen-Image Data

Figure 51:
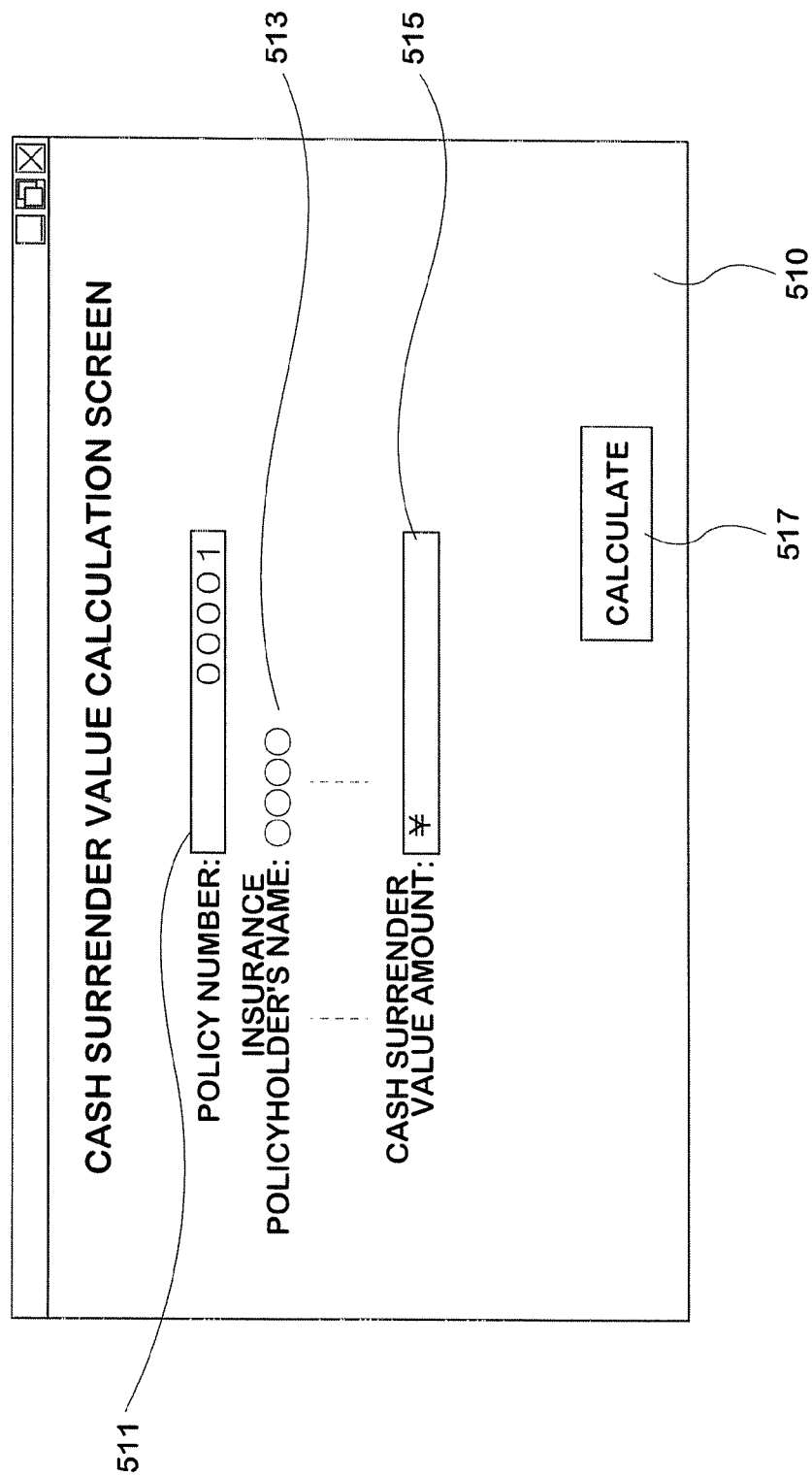
FIG. 51 is a diagram showing a screen-image of cash surrender value calculation screen according to the present invention.

FIG. 51 shows a screen-image of cash surrender value calculation screen 510 displayed on the display 201 under the execution of the main processing part 4621 (FIG. 46) in the business program 4601. An entry field for policy number 511, the entry field for insurance policyholder's name 513 so on, display field for cash surrender value 515 and a calculation button 517 are displayed on this screen.

The operator of the data management apparatus 1 inputs a predetermined policy number for calculation of cash surrender value in the entry field 511 and clicks the calculation button 517 for an instruction to display the calculation result of the cash surrender value on the display. For example, the operator inputs "00001" into the entry field for policy number 511 with the key board/mouse 207 and makes insurance policyholder's name and the like to be displayed.

Thereafter, the operator instructs execution of calculation of cash surrender value specified by policy number "00001" by clicking the calculation button 517.

Upon clicking the calculation button 517, the CPU 203 executing the main processing part 4621 acquires screen-image data (step S4801, FIG. 48). For example, such CPU 203 acquires a policy number "00001" as screen-image data.

7-3-2. Pattern Variable Name Acquisition Processing

The CPU 203 acquiring the screen-image executes pattern variable name acquisition processing (step S4803). The pattern variable name acquisition processing shown in step S4803 of FIG. 48 will be described using FIG. 49

7-3-2-1. Start-Up of Wrapper Program (Business Program)

In the business program 4601, the CPU 203 acquires the transaction record of insurance contracts and stores the data on a predetermined work record (step S4901). For example, the record whose policy number "00001" is extracted from the transaction database 2093 and acquires the records as a work record 4701 shown in FIG. 47.

Upon acquisition of such record, the CPU 203 delivers to the wrapper program 4603 the acquired record and predetermined processing name (step S4903). For example, in the above case, pattern variable name acquisition processing for specifying data such as "rate reference date" and "accumulated amount" used for cash surrender value calculation processing is implemented in accordance with the pattern variable and the data stored in the transaction data. Thus, the CPU 203 respectively delivers to the wrapper program 4603 "rate reference date acquisition" and "accumulated amount acquisition" as processing name.

7-3-2-2. Specification of Data Item Definition Body (Wrapper Program)

Upon delivery, the wrapper program 4603 delivers the record to the data item definition program 4605 specified according to a company ID in the record (step S4921).

For example, in the record 4701 shown in FIG. 47, the data item definition program 4605 is specified in accordance with a company ID 630 "01". Further, the CPU 203 delivers the "rate reference date acquisition" and "accumulated amount acquisition" as processing name.

7-3-2-3. Generation of Processing Program (Data Item Definition Program)

In a processing program generation/execution part 4627, the CPU 203 executing the data item definition program 4605 acquires pattern variable data related to pattern variables corresponding to the inherited processing name by conducting a search of the pattern variable data storage part 4629 (step S4941). For example, it acquires a pattern variable "002" 4629a corresponding to the pattern processing name "rate reference date" according to the processing name "rate reference date acquisition" and a pattern variable "010" 4629b corresponding to the pattern processing name "accumulated amount" according to the processing name "accumulated amount acquisition".

Subsequently, the CPU 203 further acquires processing code corresponding to the inherited processing name by conducting a search for the processing code storage part 4628 (step S4943). Processing code is recorded on the processing code storage part 4628 for each company ID. For example, the CPU 203 executing the data items definition program 4605 acquires a processing code 4628b whose processing name is "rate reference date acquisition" and a processing code 4628a whose processing name is "accumulated amount acquisition".

The CPU 203 implementing the processing program generation/execution part 4627 generates a processing program based on a processing code obtained from the processing code storage part 4628 and pattern variable data acquired from the pattern variable data storage part 4629 (step S4945).

Figure 52:
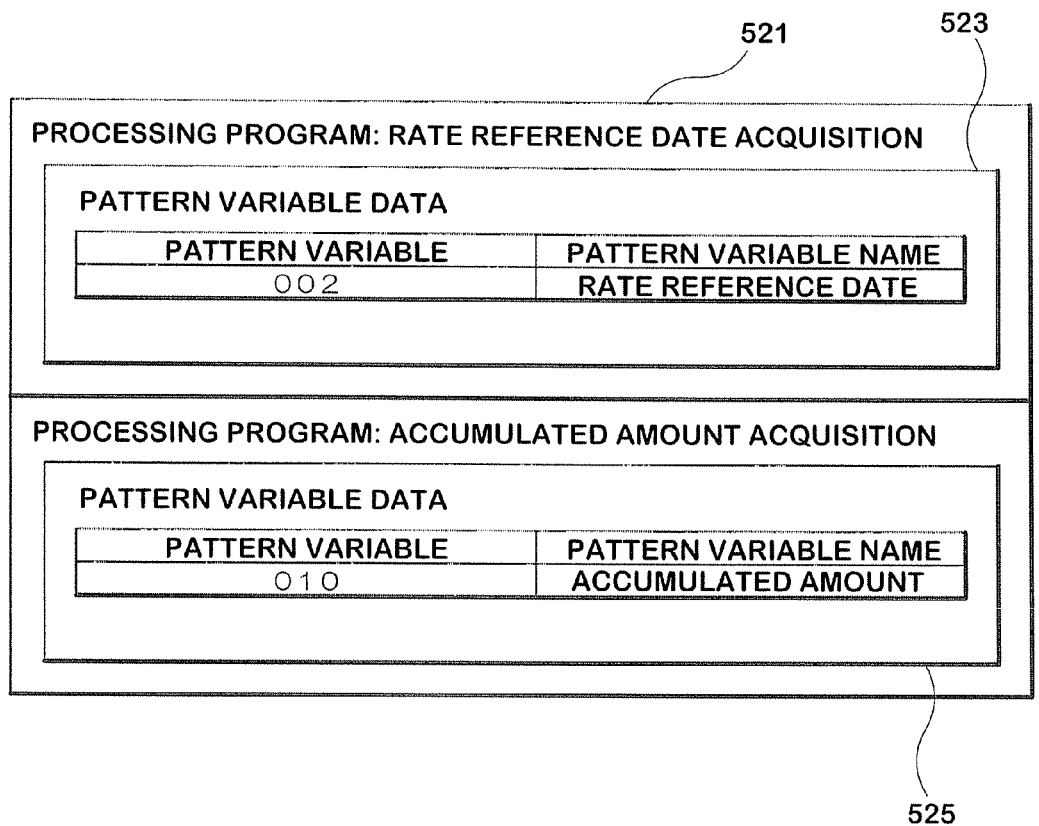
FIG. 52 is a diagram illustrating a structural example of the processing program according to the present invention.

FIG. 52 shows a structural example of the processing program thus generated. The processing program 521 includes a processing program for executing processing "rate reference date acquisition" and the "accumulated amount acquisition". In addition, pattern variable data 523 and 525 are combination data of pattern variable and variable name to be acquired according to the pattern variable stored in the transaction data at that time. In other words, by executing such processing program, it may judge whether or not the pattern variable names "rate reference date" and the "accumulated amount" are recorded in the work record 4701 and data itself corresponding to the recorded variable name can be acquired, if recorded.

7-3-2-4. Execution of Processing Program (Data Item Definition Program)

The CPU 203 carries out the processing program 521 thus generated (step S4947). FIG. 50 shows a flowchart of the processing program 521 executed at that time.

In execution of the processing program 521, the CPU 203 reads in data indicating a pattern variable from the pattern variable data incorporated and set up in the processing program (step S5021). Further, it reads in the work record stored in the memory 205 (step S5023). For example, the pattern variable 1 "002" is read as well as reading in the work record 4701 (FIG. 47).

The CPU 203 finds a pattern variable which is the same as that read in from the pattern variable data and acquires a column index of the pattern variable (step S5025). For example, in execution of a processing program related to "rate reference date acquisition", it is judged whether or not the same pattern variable is recorded by conducting a sequential search for pattern variable 1, pattern variable 2, pattern variable 3 and so on in accordance with the pattern variable "002" and such column index of such pattern variable is acquired when the same data is recorded. Because pattern variable 1 in the work record 4701 is "002", column index "1" is acquired.

Further, the CPU 203 acquires data having the acquired column index from the work record (step S5027). For example, data 1 "2005 Sep. 1" having the column index 1 is acquired.

Similarly, in execution of a processing program related to "rate reference date acquisition", it is judged whether or not the same pattern variable is recorded by conducting a sequential search for pattern variable 1, pattern variable 2, pattern variable 3 and so on in accordance with the pattern variable "010" and such column index of such pattern variable is acquired when the same data is recorded. Because pattern variable 2 in the work record 4701 is "010", column index "2" is acquired. In addition, the CPU 203 acquires data 2 "¥100,000" having column 2.

The CPU 203 executing the data item definition program 4605 at step S4949 in FIG. 49 notifies a result of execution of the step S4947 to the wrapper program 4603 (step S4949). In step S4923 shown in FIG. 49, the CPU 203 performing the wrapper program 4603 notifies a result of execution of the inherited step S4947 to the business program 4601 (step S4923).

For example, processing in which the data 1 "2005 Sep. 1" acquired at step S4947 and the data 2 "¥100,000" are respectively returned as the "rate reference data" and the "accumulated amount" to a program thread of the business program 4601 is carried out. If it is judged that no pattern variable is set up in the transaction data during the execution of the processing program, a return value "un-setup" is returned under exceptional processing.

7-3-2-5. Calculation of Cash Surrender Value of Insurance Contract

Upon completion of the pattern variable acquisition processing (step S4803) in FIG. 48, the CPU 203 executing the business program 4601 judges whether or not data needed for the calculation of cash surrender value of insurance contract is acquired in accordance with the return value (step S4805). Whenever such data is acquired calculation of cash surrender value of insurance contract starts in accordance with the data (step S4807).

For example, once the CPU 203 acquires data related to "rate reference date" and "accumulated amount" as a return values, the CPU 203 calculates a cash surrender value of insurance contract according to the policy number "00001" in accordance with the above data 1 "2005 Sep. 1" and the above data 2 "¥100,000" and displays the calculation result on the display field for cash surrender value 515 of the screen-image of cash surrender value calculation screen 510 (FIG. 51).

On the other hand, if the return value is "un-setup", the CPU 203 displays an error message on the display 201 and terminates the processing as a result of judgment that cancellation processing can not be done (step S4806). In this case, since calculation processing of the cash surrender value can not be executed, such fact is notified to the operator and terminates the process.

7-4. Others

Although, en example of using data format on date (rate reference date) recorded on the transaction data and data format on amount (accumulated amount) in the above, the present may applicable to data with other data format(s) and other data. For example, a text format data and binary format data may also be used. In FIG. 47, data 3 in text format such as "Chuou-ku, Osaka-city and so on" is stored therein and data item of such data 3 is handled as "address" according to pattern variable 3 "100".

7-5. Conclusion

As described in the above, data items recorded on the transaction data for each data to be stored can be selected arbitrarily for data management in accordance with the present invention. This leads to the fact that a data management apparatus capable of reducing redundancy of the data format in the transaction data as well as having a high versatility and a high maintenance-ability can be provided.

The present invention may further increase maintenance-ability by eliminating business logics from the business program in accordance with data characteristics. Especially, in a field of packaging software, no customization of business program is required, so that plurality of companies can use package software by just executing customization of record formats. Hence, it is possible to remarkably decrease the development cost and cost for introduction.

An example for generating a data item definition program for each company ID is described in the above description, the data item definition program may also be generated in accordance with other factor(s). For example, the data item definition program may also be generated in accordance with each of product code or business group.

In addition, column index of pattern variable can be set for each data format. In this way, one of processing speed and processing efficiency can be increased as a result of grouping data items having the same data formats and that of the schema design.

8. Eighth Embodiment

Although, an example in which a data contents ID corresponding to a predetermined data contents of a predetermined data item is set up in the transaction data is described in the above described embodiment, another example in which data contents is acquired in accordance with the data contents ID stored in the transaction data and a predetermined processing is executed in accordance with the acquired data contents will be described in this embodiment.

For example, in the data management system shown in the conventional art (1), when the withholding tax amount at the time of cancellation of an insurance product is calculated, it is necessary to at least judge whether or not the insurance contract represented by the transaction data is "predetermined annuity insurance" and insurance class of such annuity is "annuity certain", if it is "predetermined annuity".

However, when the structure to which the above described the judgment logic is incorporated in each business program is adopted, it will be necessary to correct the judgment logic and operation check of the system for the correction is needed, if the kind of insurance class which is subject to the calculation is added. Hence, the maintenance cost to the system change will be enormous. Especially in package software industry in which insurance products and functional requirements differ depending on each company is a premise thereof, the adoption of a versatility data management technique capable of suppressing not only the maintenance cost at the time of employment but also the customize cost at the time of its introduction is desired.

In this embodiment, considering such disadvantages, a data management system capable of maintaining versatility and applicability under suppressing the influence range of correction to the judgment logic as minimum even when data having different data characteristics is handled will be described.

8-1. Functional Block Diagram

The functional block diagram of the data management apparatus 1 according to the present invention is the same as that show in FIGS. 1 and 20.

8-2. Hardware Structure

A hardware structure of a computer device with a CPU which realizes the data management apparatus 1 according to the present invention is basically the same as that shown in FIGS. 2 and 21.

8-3. Processing Details (1)

Processing details of this embodiment will be described with reference to FIGS. 53 through 59. In this embodiment, the business program is an application program for managing contractual data and product data.

Figure 53:
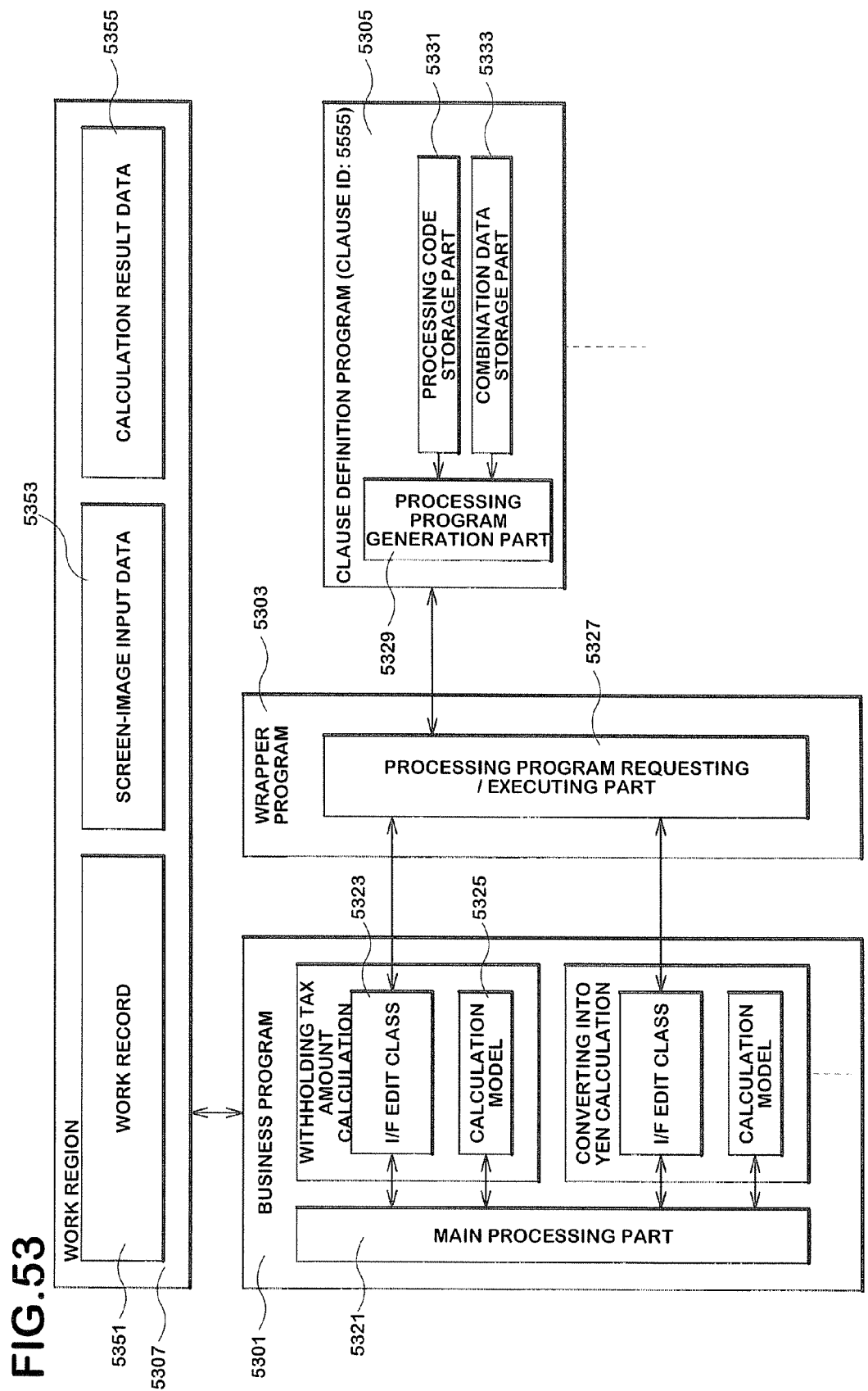
FIG. 53 is a diagram showing examples of functional block diagrams of the business application program, the wrapper program, the clause definition program and the work region according to the present invention.

FIG. 53 shows a functional block diagram of the business program 5301, a wrapper program 5303, a clause definition program 5305 so on and a work region 5307.

The business program 5301 comprises a main processing part 5321 for implementing processing on user interface such as image processing and at least a pair of a database an I/F edit class 5323 as a condition set up part for setting up conditions of calculation for a predetermined calculation process and a calculation model 5325 as a calculation processing part for implementing a predetermined calculation process in accordance with the calculation conditions. A combination of the I/F edit class and the calculation model is made of each of the processing such as withholding tax amount calculation processing, calculation processing for converting into yen, calculation processing for default interest and payment amount calculation processing and so on.

The wrapper program 5303 comprises a requires the clause definition program a processing program generation/execution part 5327 requesting a processing program to the clause definition program 5305 and implementing such program.

The clause definition program 5305 comprises a processing program generation part 5329 for generating a processing program on receipt of a request from the wrapper program 5303, a processing code storage part 5331 storing processing code for each processing name and a combination data storage part 5333 recording combination data used for setting up the processing code (in the case that clause ID is "55555" for example).

The work region 5307 is a data storage object containing all the data having possibilities of handled by each program including work record 5351 for storing the transaction data, a screen-image input data 5353 for recording data input or displayed on the user interface screen and a calculation result data 5355 for storing data output by each program.

In this embodiment, withholding tax amount calculation processing implemented simultaneous with the calculation of cash surrender value amount of a insurance product relating to annuity will be described.

FIGS. 54 through 57 are flowcharts of the business program 5301, the wrapper program 5303, the clause definition program 5305 executed by the data management apparatus 1.

8-3-1. Acquisition of Screen-Image

Figure 59:
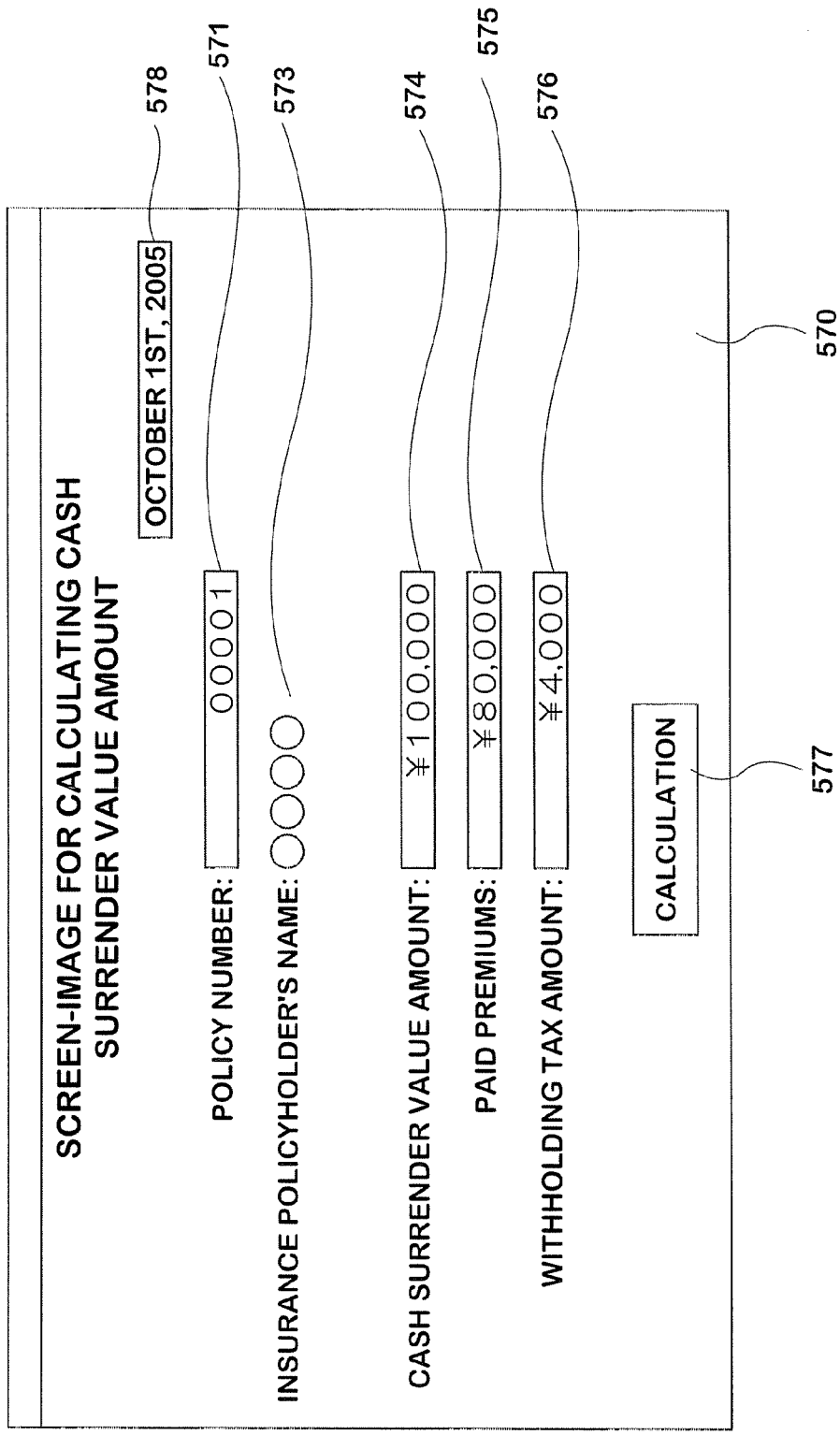
FIG. 59 is a screen-image for calculating a cash surrender value amount according to the present invention.

FIG. 59 shows a screen-image for calculating a cash surrender value amount 570 displayed on the display 201 under the execution of the main processing part 5321 (FIG. 53) in the business program 5301. A display field for date 578, an entry field for policy number 571, display fields for insurance policyholder's name 573, a display field of cash surrender value amount 574, a display field for paid insurance premiums 575, a display field for withholding tax amount 576 and a calculation button 577 and so on are displayed on this screen.

The operator of the data management apparatus 1 can instruct calculation of the cash surrender value amount, the paid insurance premiums and the withholding tax amount for the transaction data according to a life insurance contract specified by a predetermined policy number. For example, the operator inputs "00001" into the entry field for policy number 571 for displaying the insurance policyholder's name and so on.

Thereafter, the operator instructs execution of calculating the cash surrender value amount, the paid insurance premiums and the withholding tax amount of the transaction data for the policy number "00001" by clicking the calculation button 577.

Figure 54:
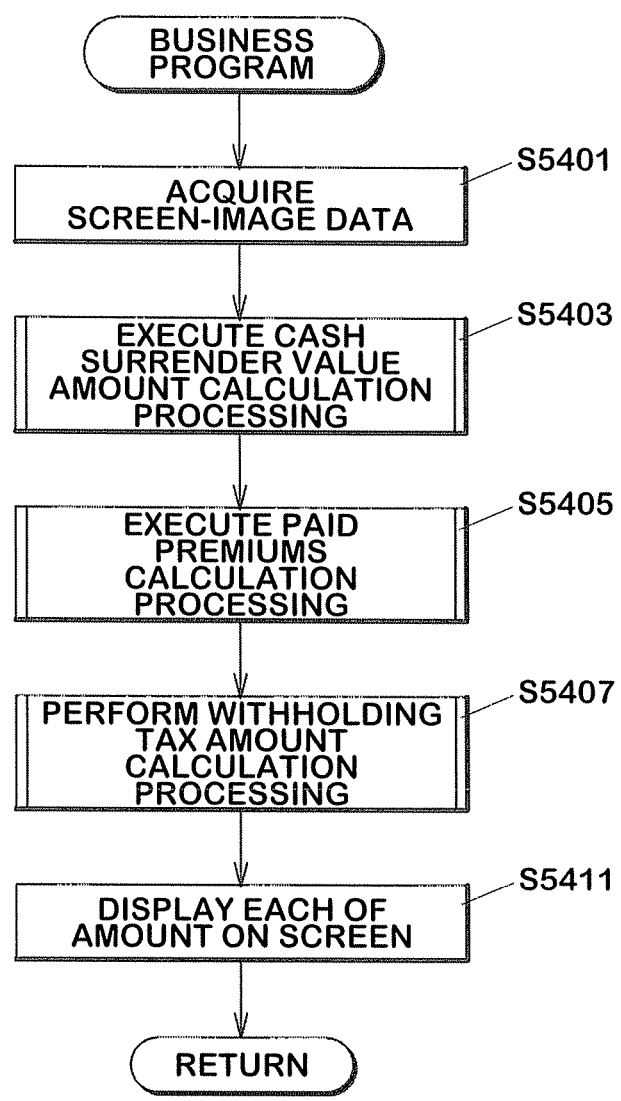
FIG. 54a flowchart of the processing program according to this invention.
FIG. 54b is another flowchart of the processing program according to this invention.

Upon clicking the calculation button 577, the CPU 203 executing the main processing part 3321 acquires screen-image input data 5353 (step S5401, FIG. 54). As described in the above, all the data displayed on the cash surrender value calculation screen 570 are recorded in the screen-image data 5353 of the work region 5307.

FIG. 58 shows a structural example of the work region 5307. The work record 5351 comprises a policy number 5811, a clause ID 5813, a variable 1_5815 and so on. The screen-image input data 5353 includes a policy number 5821, cancellation date 5823 and so on. Cancellation result data 5255 comprises paid insurance premiums 5833, a withholding tax amount 5839 and so on.

For example, the CPU 203 acquires from a record 5801 of the work region shown in FIG. 58 "00001" of a policy number 5821 and "Oct. 1, 2005" of cancellation date 5823. The "Oct. 1, 2005" of cancellation date 5823 is data obtained from the display field for date 578 of the cash surrender value calculation screen 570.

8-3-2. Cash Surrender Value Amount Calculation and Paid Insurance Premiums Calculation Processing The CPU 203 acquiring the screen-image input data performs the cash surrender value amount calculation processing and the paid insurance premiums calculation processing (steps S5403 through S5405). The CPU 203 stores the cash surrender value amount acquired through the cash surrender value amount calculation processing in the calculation result data 5355 of the work region 5307. For example, an amount "¥100,000" is recorded in the cash surrender value amount 5831 in the record 5801 shown in FIG. 58.

Also, the CPU 203 stores the paid insurance premiums acquired through the paid insurance premiums calculation processing in the calculation result data 5355 of the work region 5307. For example, an amount "¥80,000" is recorded in the paid insurance premiums 5833 in the record 5801 shown in FIG. 58.

8-3-3. Withholding Tax Amount Calculation Processing

Figure 55:
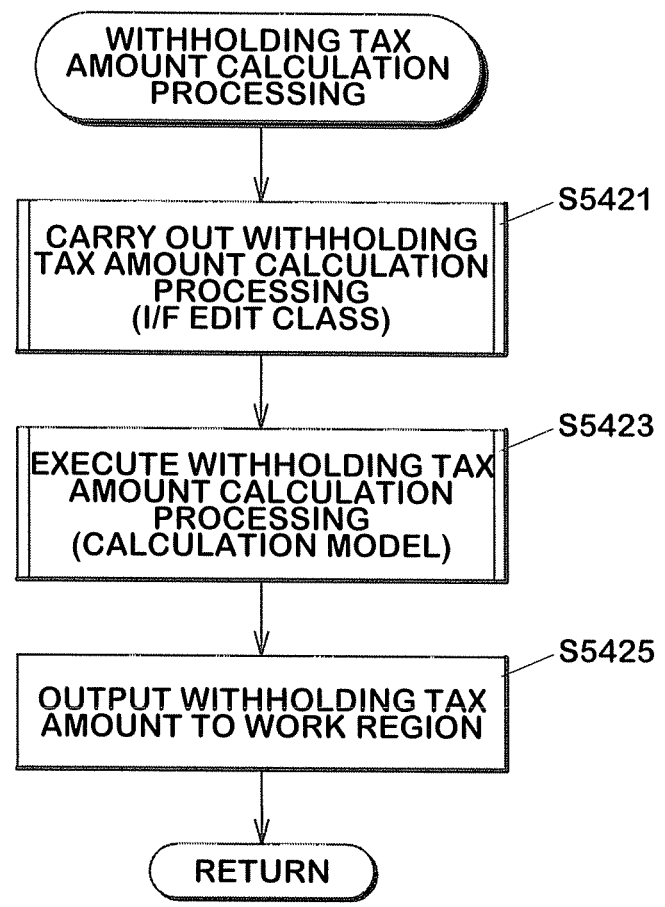
FIG. 55 is a flowchart of withholding tax amount calculation processing according to the present invention.

Upon completion of the cash surrender value amount calculation processing and the paid insurance premiums calculation processing, the CPU 203 executing the business program carries out the withholding tax amount calculation processing (step S5407). This processing is carried out by sequentially executing a withholding tax amount calculation processing (I/F edit class) and another withholding tax amount calculation processing (calculation model) (FIG. 55, step S5421 through S5425).

8-3-3-1. Withholding Tax Amount Calculation Processing (I/F Edit Class)

FIG. 56 shows a flowchart of the withholding tax amount calculation processing (I/F edit class).

8-3-2-1-1. Set-Up to Work Region

The CPU 203 reads in the cash surrender value amount 5831 from the calculation result data 5355 of the work region 5307 and set it up to a total income amount 5835 of input data in a work region 5891 for model (step S5501, FIG. 56). For example, as shown in the record 5803 of FIG. 58, "¥100,000" of the cash surrender value amount 5831 is set into "¥100,000" of the total income amount 5835.

The CPU 203 reads in the paid insurance premiums 5833 from the calculation result data 5355 of the work region 5307 and set it up to a legitimate expense 5837 in the work region 5891 for model (step S5503). For example, as shown in the record 5803 of FIG. 58, "¥80,000" of the paid insurance premiums 5833 is set into "¥80,000" of the legitimate expense 5837.

8-3-3-1-2. Start-Up of Wrapper Program (Business Program)

The CPU 203 acquires the transaction record related to the insurance contract by reading the work record 5351 of the work region 5307 and judges whether or not conditions such as the insurance contract is "lump-sum payment" and "cancelled within five years from the contract date" (steps S5505 through S5507). The CPU 203 performing the I/F edit class 5323 delivers the clause ID recorded in the work region 5307 and a predetermined processing name to the wrapper program 5303 (step S5509). For example, in order to calculate a withholding tax amount which arises during the calculation of the cash surrender value amount calculation processing, the CPU 203 delivers the processing name "annuity class acquisition" set up at the I/F edit class 5323 together with "55555" of the clause ID 5813 of the work region 5307 in the above example.

8-3-3-1-3. Wrapper Program

In the processing program generation/execution part 5327, the CPU executing the wrapper program 5303 specifies the clause definition program 5305 in accordance with the clause ID inherited from the business program 5301 and delivers the processing name by accessing the specified clause definition program 5305 (step S5521).

8-3-3-1-4. Clause Definition Program

On receipt of delivery, the CPU 203 carries out the processing program generation part 5329 of the clause definition program 5305 and acquires a processing code corresponding to the inherited processing name as well as acquiring combination data of contractual coverage and contractual coverage ID corresponding to the inherited processing name from the combination data storage part 5333. Further the CPU 203 executing the clause definition program 5305 generates a processing program in accordance with the acquired processing code and the combination data and delivers the processing program thus generated to the wrapper program 5303 (step S5541). The processing at step S5541 is the same as that of steps 2541 through S2547 of contractual coverage acquisition processing shown in FIG. 25.

8-3-3-1-5. Execution of Processing Program (Wrapper Program)

In the wrapper program 5303, the CPU 203 implements the processing program inherited from the clause definition program 2096 (step S5523). The flowchart of the processing program executed at that time is the same as that shown in FIG. 26. By execution of such processing program, the CPU 203 acquires contractual coverage corresponding to the contractual ID input via the work region 5307. For example, it acquires contractual coverage "annuity certain" corresponding to contractual coverage ID "01" from the combination data of processing program shown in FIG. 30.

Subsequently, the CPU 203 executing the wrapper program 5503 notifies a result of execution to the business program 5301 (step S5525, FIG. 55). For example, processing to return the "annuity class=annuity certain" to a program thread according to the I/F edit class 5323 of the business program 5301 as a return value is carried out. In this way, it is recognized that the "annuity class" for this insurance contract is "annuity certain".

8-3-3-1-6. Set Up of Taxation Withholding Tax Flag (I/F Edit Class)

Upon receipt of notification from the wrapper program 5303, the CPU 203 performing the I/F edit class 5323 judges whether or not the annuity class is an annuity certain (step S5511). It sets a taxation withholding tax flag 5841 in the work region 5891 for model to be ON-state when the "annuity class=annuity certain" is retuned as a return value as described in the above (step S5513).

The taxation withholding tax flag 5841 is set under OFF-state when the annuity class is other that annuity certain such as "annuity for life".

8-3-3-2. Processing of Withholding Tax Amount Calculation (Calculation Model)

Figure 57:
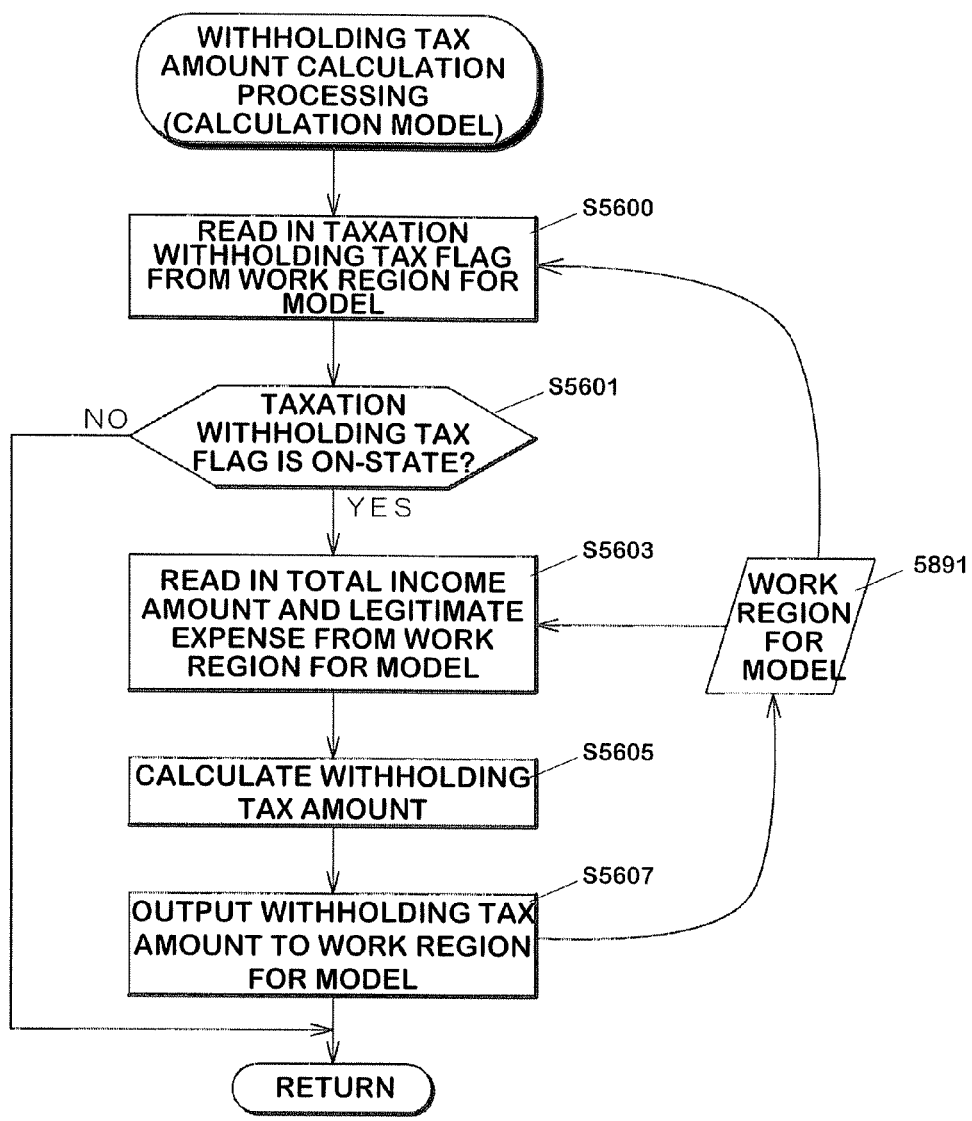
FIG. 57 is a flowchart of withholding tax amount calculation processing (calculation model) according to the present invention.

Upon completion of the cash surrender value calculation processing (I/F edit class), the CPU 203 performing the business program carries out withholding tax amount calculation processing (calculation model) (FIG. 55, step S5423). In FIG. 57, the CPU 203 reads in the taxation withholding tax flag 5841 from the work region 5891 for model, judges whether or not the taxation withholding tax flag is ON-state. It further reads in the total income amount and the legitimate expense from the work region 5307 when the flag is in ON-state (step S5600 through S5603). For example, the total income amount 5835 "¥100,000" and the legitimate expense 5837 "¥80,000" shown in FIG. 58 are read in.

Once the total income amount and the legitimate expense are read in, the CPU 203 calculates a withholding tax amount based on a predetermined calculation formula (step S5605). For example, a tax amount to the cash surrender value that is a taxation object of withholding tax is calculated based on a calculation formula "withholding tax amount=(total income−legitimate expense)×0.2".

The CPU 203 outputs the withholding tax amount thus calculated to a withholding tax amount 5843 of output data in the work region 5891 for model (step S5607). For example, the calculated withholding tax amount "¥4,000" as show in the record 5803 of FIG. 58 is stored in the withholding tax amount.

When the taxation withholding tax flag 5841 is set under OFF-state in step S5601, the above step is eliminated and ends the processing.

8-3-3-3. Output of Withholding Tax Amount

By sequentially implementing the withholding tax amount calculation processing (I/F edit class) and the withholding tax amount calculation processing (calculation model), the CPU 203 outputs to the withholding tax amount 5839 of the calculation result data 5355 in the work region 5307 the withholding tax amount 5843 being output to the work region 5891 for model (step S5425). For example, the withholding tax amount 5843 "¥4,000" read in from the record 5803 is stored in the withholding tax amount 5839 as shown in the record 5801 of FIG. 58.

8-3-4. Display of Screen-Image (Business Program)

The CPU 203 executing the main processing part 5321 of the business program 5301 displays on the cash surrender value calculation screen 570 the cash surrender value amount, the paid insurance premiums and the withholding tax amount stored in the work region 5307 (step S5411). For example, the cash surrender value amount 5831 "¥100,000", the paid insurance premiums 5833 "¥80,000" and the withholding tax amount 5839 "¥4,000" on the record 5801 shown in FIG. 58 are displayed respectively on the cash surrender value amount display field 574, the paid insurance premiums display field 575 and the withholding tax amount display field 576 on the screen 570 shown in FIG. 59.

8-3-5. Conclusion

A described in the above, it is unnecessary to judge insurance products at the main processing part side of the business application by acquiring desired contractual coverage(s) relating to desired clause ID(s) as a result of accessing the clause definition program 5305 in the I/F edit class 5323. In this way, usability and versatility of the system without receiving influence in the difference in the contract terms of the products. In other words, it is possible to continuously use the system without any adjustment in the judgment logic even when new insurance product(s) is added, so that the cost in maintenance and that in customization may be suppressed.

8-2. Processing Details (2)

In the processing details (1) above-described, it constitutes so that structural processing may be performed for one calculation processing using the "I/F edit class" performing set up of condition(s) and the "calculation model" implementing calculation processing. Consequently, the "calculation model" may be configured solely by a universal equation. For example, in the above processing details, the calculation formula "withholding tax amount=(total income−legitimate expense)×0.2" is used as a "calculation model" of withholding tax amount. Such calculation formula is defined by Act of Parliament and the like, and commonly used for any companies.

In the processing details (2), an example of common use of the I/F edit class and the calculation model represented by the withholding tax amount calculation processing carried out among different business applications will be described. For example, in the insurance industry, there exists a process so called "deduction" that is treated as only a partial cancellation of insurance by withdrawing a part of accumulated amount before the start date of payment. Cash surrender value also arises in the case of such "deduction", so that a withholding tax calculation is carried out. An example of executing a business application for processing of deduction will be described herein below.

Figure 54A:
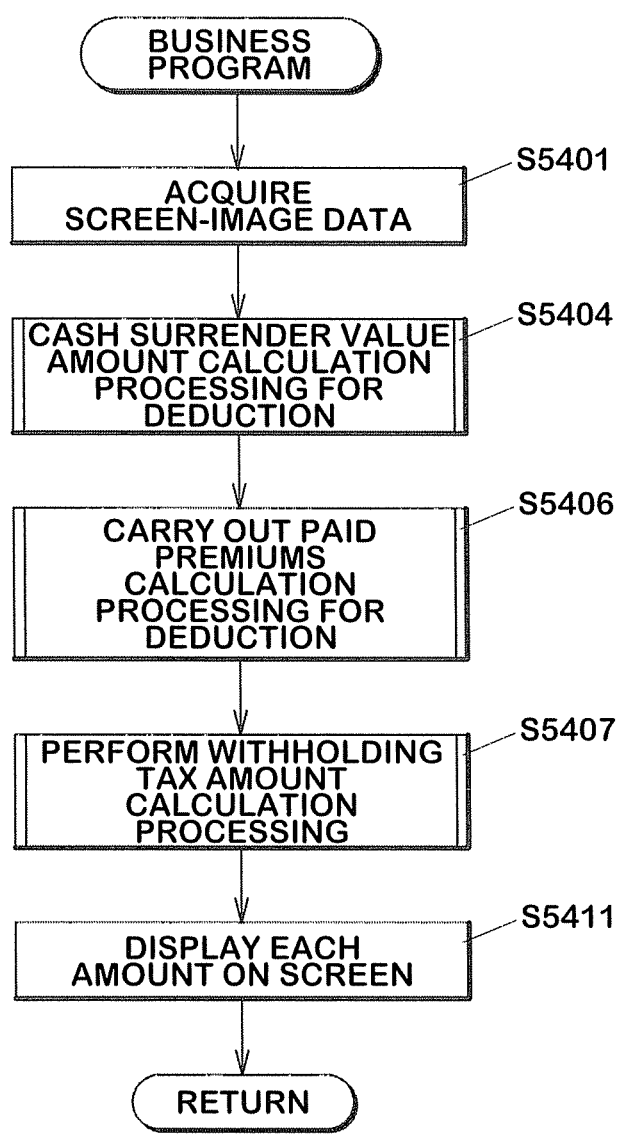

Details of the processing will described with further reference to FIGS. 54a and 59a. In this embodiment, the business program is also a business program for managing contract data and product data of life insurance. FIG. 54a is an example of flowchart of the business program 5301 for the above-mentioned deduction.

8-4-1. Acquisition of Screen-Image Data

FIG. 59a shows a screen image for calculating a cash surrender value amount for deduction 590 displayed on the display 201 as a result of execution of the main processing part 5321 in the business program 5301. An display field for date 598, an entry field of policy number 591, a display field of insurance policyholder's name 593 and display fields of accumulated amount after deduction 598, a display field for cash surrender value amount for deduction 594, a display field for paid insurance premiums for deduction 595, a display field for withholding tax amount 596 and calculation button 597 and so on are displayed on this screen.

The operator of the data management apparatus 1 can instruct calculation of the cash surrender value amount, the paid insurance premiums and the withholding tax amount for the transaction data according to a life insurance contract specified by a predetermined policy number. For example, the operator inputs "00001" into the entry field for policy number 591 for displaying the insurance policyholder's name and so on.

Thereafter, the operator the operator instructs execution of calculating cash surrender value amount for deduction, paid insurance premiums for deduction and withholding tax amount for the transaction data specified by the policy number "00001" by clicking the calculation button 597.

Upon clicking the calculation button 597, the CPU 203 executing the main processing part 5321 acquires screen-image input data 5353 (step S5401, FIG. 54*a*). As described in the above, all the data displayed on the screen 590 is acquired in the screen-image input data 5353 of the data region 5307.

FIG. 58 shows a structural example of the work region 5307. The work record 5351 comprises the policy number 5811, the clause ID 5813, and the variable 1_5815 and so on. The screen-image input data 5353 includes the policy number 5821, the cancellation date 5823 and son on. The calculation result data 5355 comprises the cash surrender value amount 5831, the paid insurance premiums 5833 and the withholding tax amount 5839 and so on.

For example, the CPU 203 acquires from the record 5801 of the work region shown in FIG. 58 "00001" of a policy number 5821 and "Oct. 1, 2005" of cancellation date 5823. The "Oct. 1, 2005" of the cancellation date 5823 is data obtained from the display field 598 of the screen 590.

8-4-2. Cash Surrender Value Amount Calculation and Paid Insurance Premiums Calculation Processing The CPU 203 acquiring the screen-image input data performs the cash surrender value amount calculation processing for deduction and the paid insurance premiums calculation processing for deduction in accordance with the accumulated amount after deduction input in the display field 598 (steps S5404 through S5406). The CPU 203 stores the cash surrender value amount for deduction acquired through the cash surrender value amount for deduction calculation processing in the calculation result data 5355 of the work region 5307. For example, an amount "¥100,000" is recorded in the cash surrender value amount 5831 in the record 5801 shown in FIG. 58.

Also, the CPU 203 stores the paid insurance premiums for deduction acquired through the paid insurance premiums for deduction calculation processing in the calculation result data 5355 of the work region 5307. For example, an amount "¥80,000" is recorded in the paid insurance premiums 5833 in the record 5801 shown in FIG. 58.

8-4-3. Withholding Tax Amount Calculation Processing

Upon completion of the cash surrender value amount calculation processing and the paid insurance premiums calculation processing, the CPU 203 executing the business program carries out the withholding tax amount calculation processing (step S5407, FIG. 54*a*). This processing is carried out by sequentially executing the withholding tax amount calculation processing (I/F edit class) and another withholding tax amount calculation processing (calculation model) (FIG. 55, step S5421 through S5425). Here, the flowchart of the withholding tax calculation processing including both of the withholding tax amount calculation processing (I/F edit class) and another withholding tax amount calculation processing (calculation model) are the same as that described in the processing details (1) shown in FIGS. 55 through 57.

8-4-4. Screen Display (Business Program)

The CPU 203 executing the main processing part 5321 of the business program 5301 displays on the screen 590 the cash surrender value amount, the paid insurance premiums and the withholding tax amount stored in the work region 5307 (step S5411). For example, the cash surrender value amount 5831 "¥100,000", the paid insurance premiums 5833 "¥80,000" and the withholding tax amount 5839 "¥4,000" shown in FIG. 58 are displayed respectively on the display field for cash surrender value amount for deduction 594, the display field for paid insurance premiums for deduction 595 and the display field for withholding tax amount 596 shown in FIG. 59A.

8-4-5. Conclusion

A described in the above, processing itself is totally different from each other in ordinary cancellation processing and the above-mentioned deduction processing, but calculation processing between the cancellation processing and the deduction processing can be commonly used by utilizing the calculation result data in the work region which is considered as the data storage object used in common with each processing. In other words, the I/F edit class and the calculation model representing the above-mentioned withholding tax amount calculation can commonly be used between different business applications.

In this way, it is unnecessary to judge insurance products at the main processing part side of the business application and capable of attaining common use of functional parts of processing. Consequently, a data management system capable of suppressing a range of the influence of adjustment minimum as well as maintaining usability and versatility of the system even when adjustment not only to difference in product features but also to difference in functional requirements can be provided.

8-5. Processing Details (3)

In the above-described processing details (2), both the usability and versatility are maintained by adjustment of the difference in functional requirements of the business applications by setting input/output data of the I/F edit class and the calculation model at the same area of work region considered as the data storage object while the system is configured so that structural processing may be performed for one calculation processing using the "I/F edit class" for setting up condition(s) and the "calculation model" for executing calculation processing.

In the processing details (3) described hereunder, a data management capable of increasing usability and versatility by employing a structure that adjusts the difference in functional requirements of the business applications even in the I/F edit class.

The processing details according to this embodiment will be described with further reference to FIGS. 54*b*, 56*a*, 58*a* and 60 through 63. In this embodiment, the business program is an application program for managing contractual data and product data of life insurance.

Figure 54B:
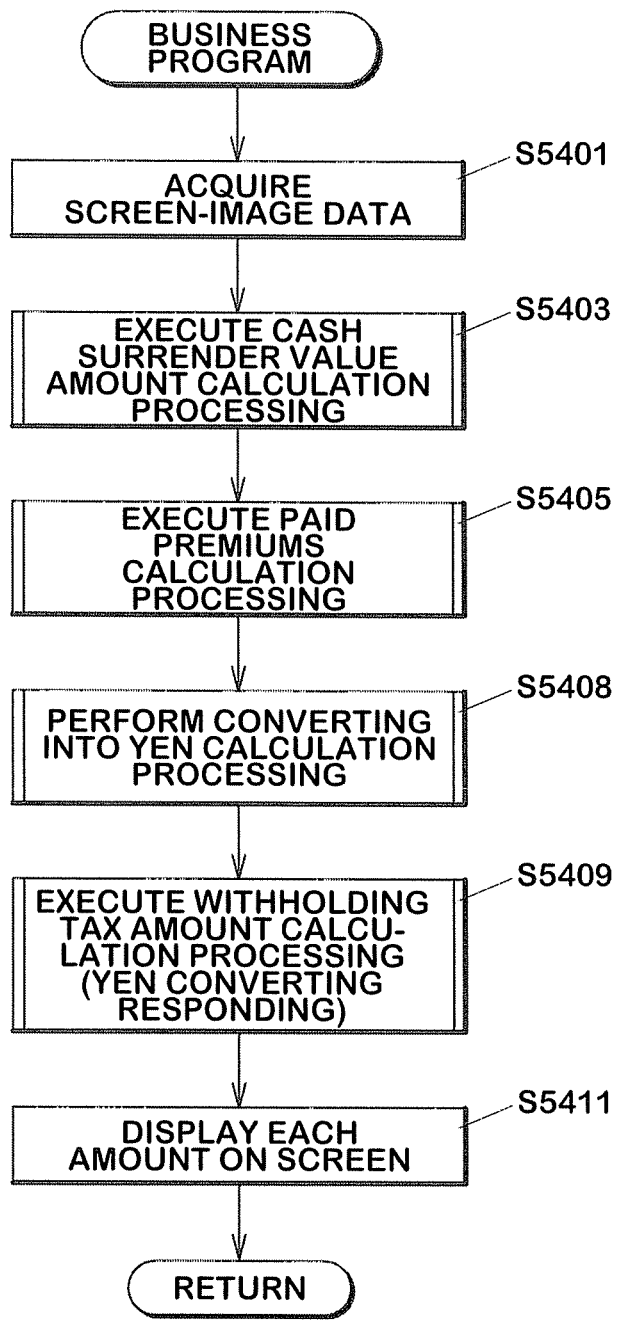

FIG. 54*b* is an example flowchart of the business program 5301 for handling "foreign currency annuity insurance". Such "foreign currency annuity insurance" is a foreign-currency-denominated individual annuity insurance and the like in which funds are managed with U.S. Treasury bonds and so on. The cash surrender value amount and the paid insurance premiums are calculated in a foreign currency, but the withholding tax is calculated in yen based on the cash surrender value amount and the paid insurance premiums after conversion into yen.

8-5-1. Acquisition of Screen-Image Data

Figure 60:
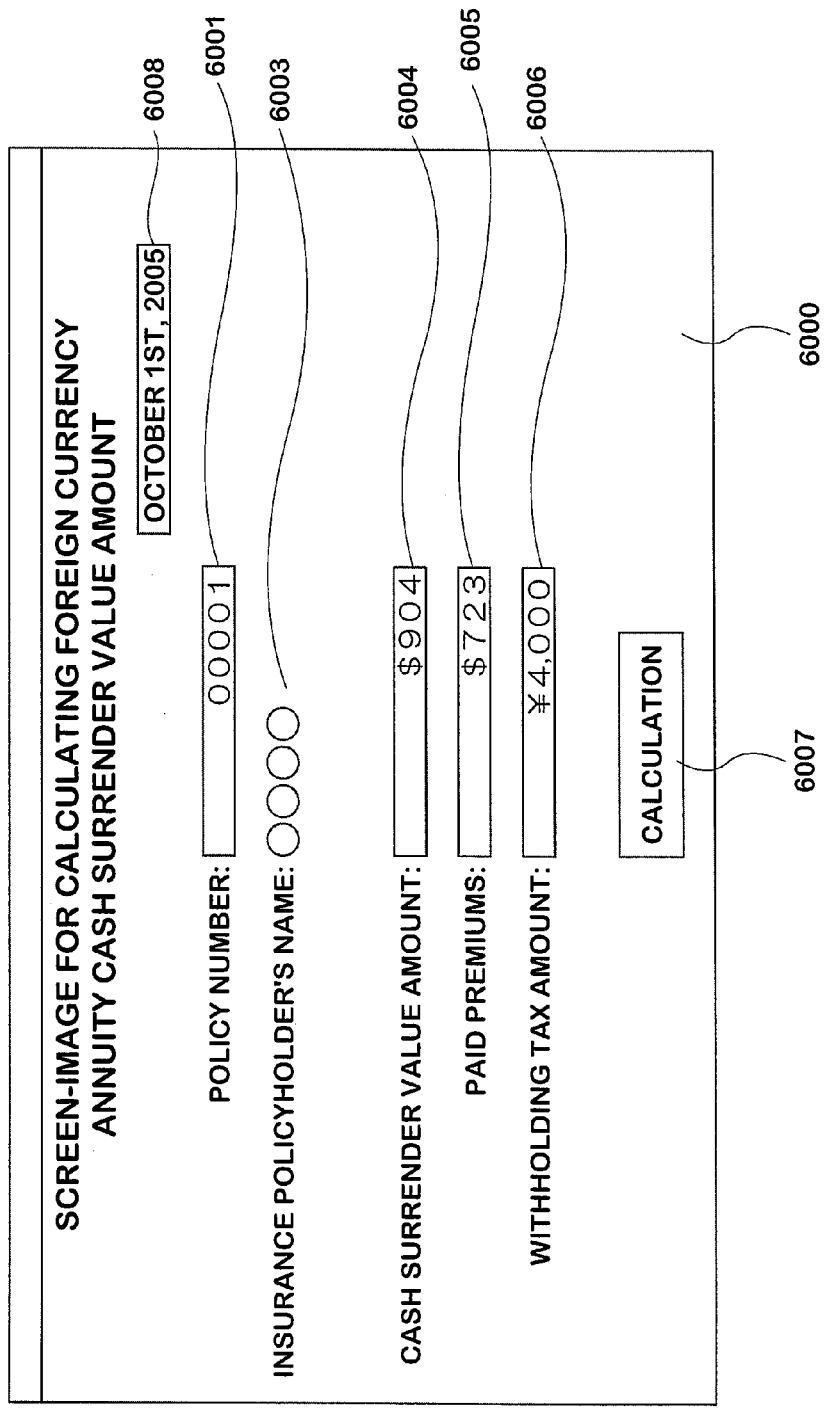
FIG. 60 is a flowchart of a screen-image for calculating a foreign currency annuity cash surrender value amount according to the present invention.

FIG. 60 shows a screen-image for calculating a foreign currency annuity cash surrender value amount 600 displayed on the display 201 under the execution of the main processing part 5321 (FIG. 53) in the business program 5301. A display field for date 608, an input field of policy number 601, display fields of insurance policyholder's name 603, a display field for cash surrender value amount 604, a display field for paid insurance premiums 605, a display field for withholding tax 606 and a calculation button 607 and the like are displayed on this screen.

The operator of the data management apparatus 1 can instruct execution of calculation a foreign-currency-denominated cash surrender value amount, a foreign-currency-denominated paid insurance premiums and a yen based withholding tax amount for the transaction data of the life insurance contract specified by a predetermined policy number. For example, the operator inputs "00001" into the entry field for policy number 601 with the key board/mouse 207 and makes insurance policyholder's name and the like to be displayed.

Thereafter, the operator instructs execution of calculating of the cash surrender value amount, the paid insurance premiums and the withholding tax amount for the transaction data specified by policy number "00001" by clicking the calculation button 607.

Upon clicking the calculation button 607, the CPU 203 executing the main processing part 5321 acquires screen-image input data 5353 (step S5401, FIG. 54b). As described in the above, all the data displayed on the screen 600 is acquired in the screen-image input data 5353 of the data region 5307.

Figure 58A:
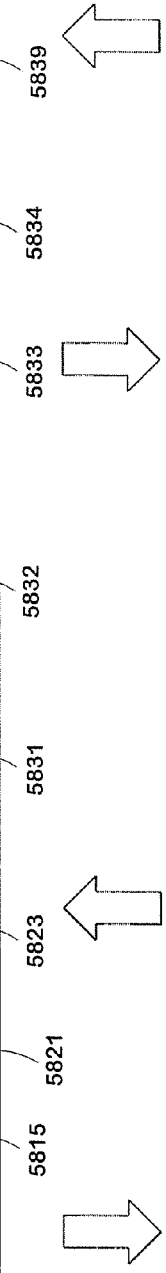
FIG. 58a is a diagram showing another work region according to the present invention.

FIG. 58a shows a structural example of the work region 5307. The work record 5351 comprises the policy number 5811, the cancellation date 5813 and the variable 1_5815 and so on. The screen-image input data 5353 includes the policy number 5821, the cancellation date 5823 and son on. The calculation result data 5355 comprises the cash surrender value amount 5831, the cash surrender value amount (yen equivalent amount) 5832, the paid insurance premiums 5833, the paid insurance premiums (yen equivalent amount) 5834 and the withholding tax amount 5839 and so on.

For example, the CPU 203 acquires from the record 5805 of the work region shown in FIG. 58a "00001" of a policy number 5821 and "Oct. 1, 2005" of cancellation date 5823. The "Oct. 1, 2005" of the cancellation date 5823 is data obtained from the display field 608 of the screen 600.

8-5-2. Cash Surrender Value Amount Calculation and Paid Insurance Premiums Calculation Processing The CPU 203 acquiring the screen-image input data performs the cash surrender value amount calculation processing and the paid insurance premiums calculation processing (steps S5403 through S5405, FIG. 54b). The CPU 203 stores the cash surrender value amount acquired through the cash surrender value amount calculation processing in the calculation result data 5355 of the work region 5307. For example, an amount "$904" is recorded in the cash surrender value amount 5831 in the record 5805 shown in FIG. 58a.

Also, the CPU 203 stores the paid insurance premiums acquired through the paid insurance premiums calculation processing in the calculation result data 5355 of the work region 5307. For example, an amount "$723" is recorded in the paid insurance premiums 5833 in the record 5805 shown in FIG. 58a.

Hence, in the case of foreign currency annuity managed with U.S dollars ($), both the cash surrender value amount and the paid insurance premiums are calculated in U.S dollars ($).

8-5-3. Yen Converting Calculation Processing

Figure 61:
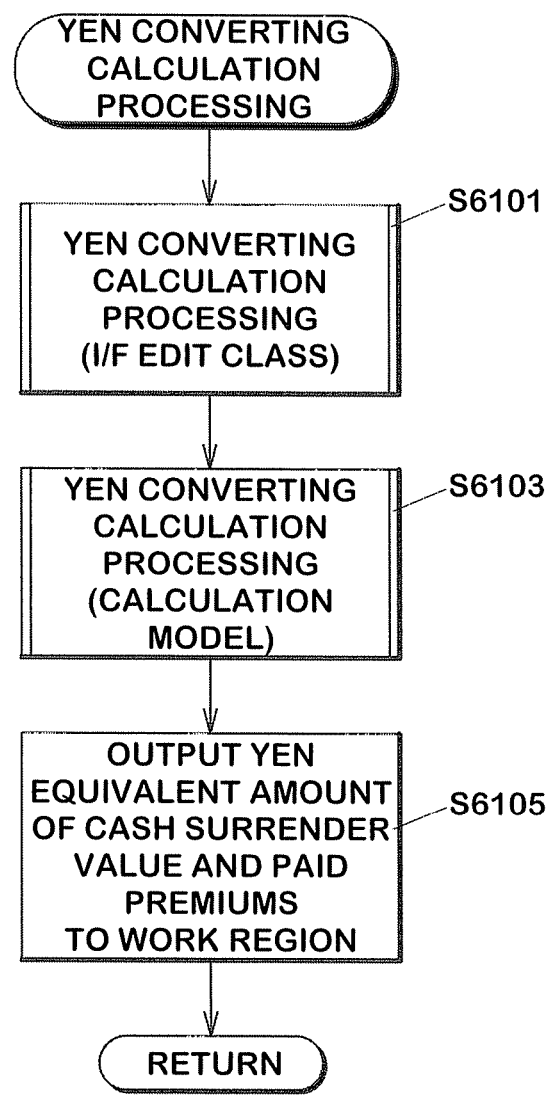
FIG. 61 is a flowchart of a yen converting calculation processing according to the present invention.

Upon completion of the cash surrender value amount calculation processing and the paid insurance premiums calculation processing, the CPU 203 executing the business program carries out a yen converting calculation processing (step S5408, FIG. 54b). This processing is carried out by sequentially executing the yen converting calculation processing (I/F edit class) and another yen converting calculation processing (calculation model) (FIG. 61, step S6101 through S6105). These processing are calculation processing for converting the foreign-currency-denominated cash surrender value amount and the paid insurance premiums into yen calculated in the above.

8-5-3-1. Yen Converting Calculation Processing (I/F Edit Class)

Figure 62:
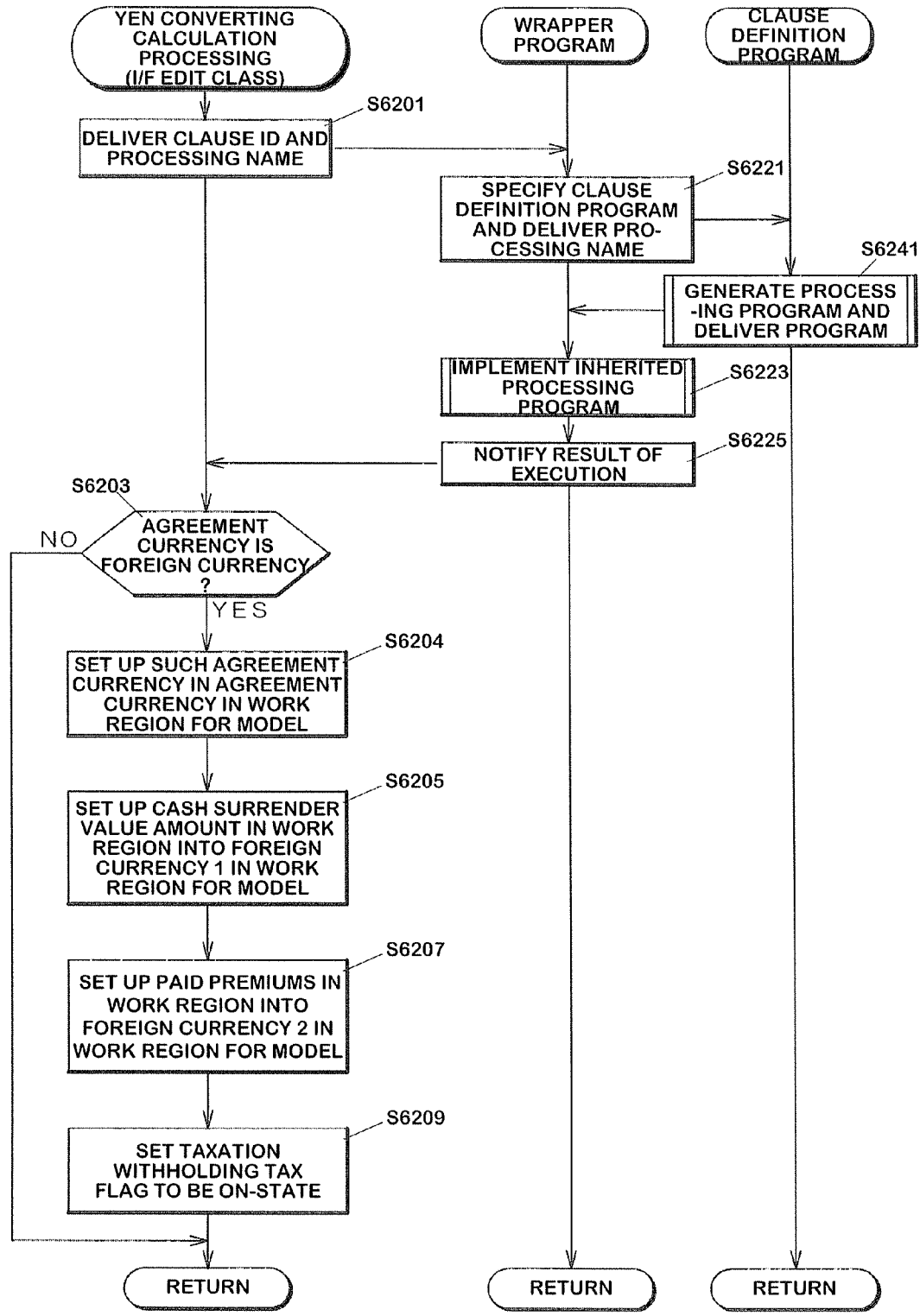
FIG. 62 is a flowchart of detailed yen converting calculation processing (I/F edit class) according to the present invention.

FIG. 62 shows a flowchart of the yen converting calculation processing (I/F edit class).

Start-Up of Wrapper Program (Business Program)

The CPU 203 performing the yen converting calculation processing acquires the transaction data related to the insurance contract by reading the work record 5351 of the work region 5307 and delivers to the wrapper program 5303 a clause ID and a predetermined processing name (step S6201). For example, in order to judge by which currency the annuity is managed for executing the yen converting processing, the CPU 203 delivers the processing name "agreement currency" set up at the I/F edit class of the yen converting calculation processing together with "55555" of the clause ID 5813 in the work region 5307.

8-5-3-1-2. Wrapper Program

In a processing program requesting/executing part 5327, the CPU 203 executing the wrapper program 5303 specifies the clause definition program 5305 in accordance with the clause ID inherited from the business program 5301 and delivers to the clause definition program 5305 the processing name by accessing thereto (step S6221).

8-5-3-1-3. Clause Definition Program

Upon delivery, the CPU 203 acquires from the processing code storage part 5331 the processing code corresponding to the inherited processing name by carrying out the processing program generation part 5329 of the clause definition program 5305 and further acquires from the combination data storage part 5333 combination data of the contractual coverage and the contractual coverage ID corresponding to the inherited processing name. The CPU 203 executing the clause definition program 5305 generates a processing program in accordance with the acquired program and the combination data and delivers the generated program to the wrapper program 5303 (step S6241). The processing in step S6241 is basically the same as that executed in steps S2541 through S2547 of the flowchart of the contractual coverage acquisition processing shown in FIG. 25, but such steps are different from the step S6241 in that a predetermined agreement currency (ies) is recorded as a contractual coverage.

8-5-3-1. Execution of Processing Program

In the wrapper program 5303, the CPU 203 carries out the processing program inherited from the clause definition program 2096 (step S6223). The flowchart of the processing program executed at that time is the same as that shown in FIG. 26.

By execution of the processing program, the CPU 203 acquires contractual coverage corresponding to the contractual coverage ID inputted through the work region 5307. For example, it acquires contractual coverage "U.S. dollar (USD)" corresponding to the contractual coverage ID "02" from combination data of the processing program.

Subsequently, the CPU 203 executing the wrapper program 5303 notifies a result of execution to the business program 5301 (step S6225). For example, processing to return the "agreement currency=U.S. dollar (USD)" to a program thread according to the I/F edit class 5323 of the business program 5301 as a return value is carried out. In this way, it is recognized that the "agreement currency" for this insurance contract is "U.S. dollar (USD)".

8-5-3-1-5. Set-Up to Work Region for Model

The CPU 203 sets up the agreement currency acquired from the wrapper program to a work region 2_5892 for model (step S6204, FIG. 62). For example, "U.S. dollar (USD)" is set into an agreement currency 5851 as shown in the record 5807 in FIG. 58a.

The CPU 203 reads in the cash surrender value amount 5831 from the calculation result data 5355 of the work region 5307 and set it up to a foreign currency amount 1_5853 of input data in the work region work region 2_5892 for model (step S6205). For example, as shown in the record 5807 of FIG. 58a, "904" of the cash surrender value amount 5831 is set into "904" of the foreign currency amount 1_5853.

The CPU 203 reads in the paid insurance premiums 5833 from the calculation result data 5355 of the work region 5307 and sets up to a foreign currency amount 2_5855 of input data in the work region work region 2_5892 for model (step S6207). For example, as shown in the record 5807 of FIG. 58a, "723" of the paid insurance premiums 5833 is set into "723" of the foreign currency amount 2_5855.

The CPU 203 sets up a yen converting object flag 5857 of input data in the work region 2_5892 into ON-state (step S6209).

When the agreement currency is not a foreign currency such as "yen", the yen converting object flag 5857 will be set up in OFF-state as an initial value.

8-5-3-2. Yen Converting Calculation Processing (Calculation Model)

Figure 63:
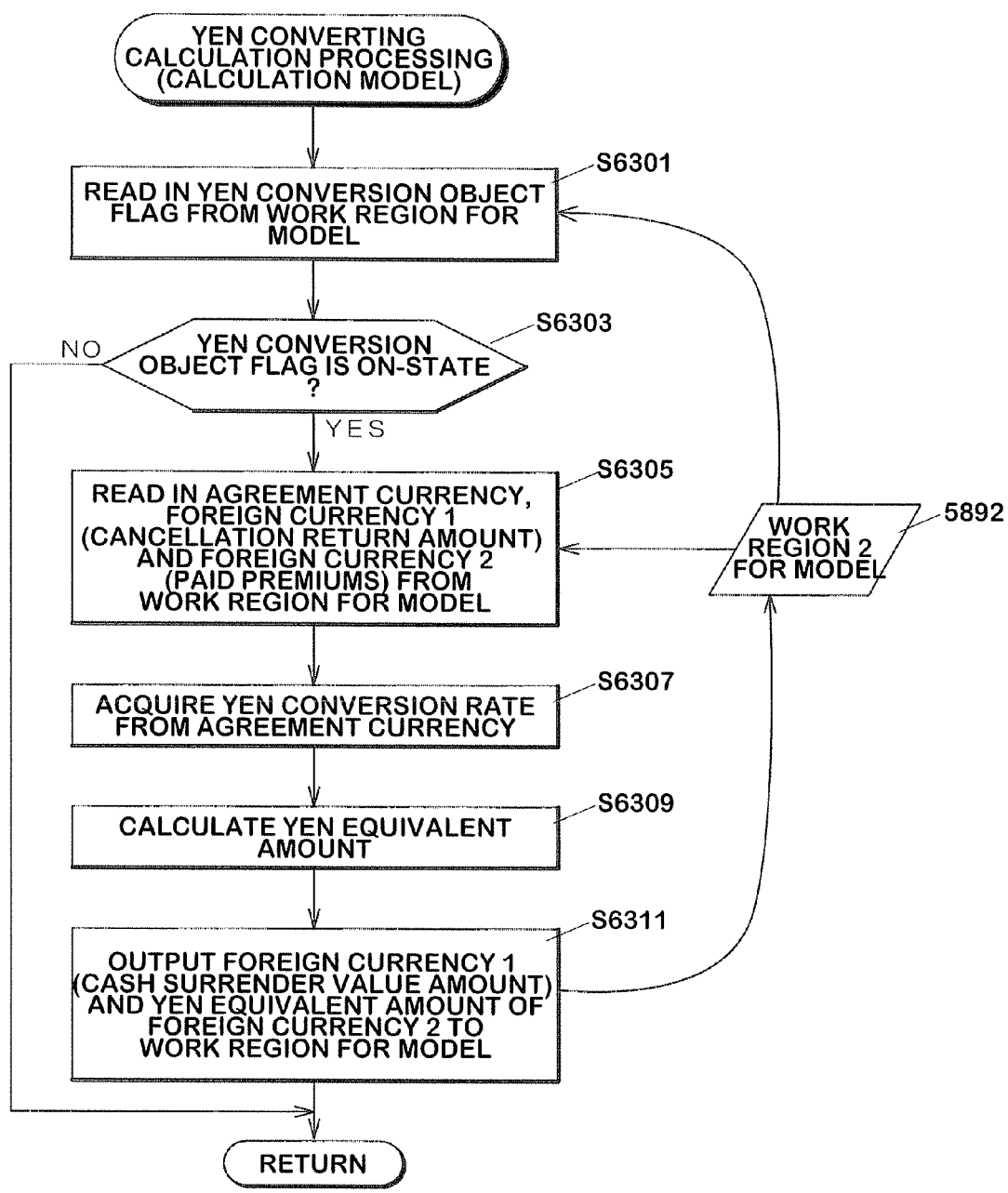
FIG. 63 is a flowchart of another detailed yen converting calculation processing (calculation model) according to the present invention.

Upon completion of the yen converting calculation processing (I/F edit class), the CPU 203 performing the business program carries out yen converting calculation processing (calculation model) (FIG. 61, step S6103). FIG. 63 shows a flowchart of the yen converting calculation processing (calculation model). In this drawing, the CPU 203 reads in the yen converting object flag from the work region 2_5892 and judges whether or not the flag is in ON-state and if On-state, then reads in amounts of foreign currencies 1, 2 and so on from work region 5307 (steps S6301 through S6305). For example, it reads in the foreign currency amount 1_5853 "904" and the foreign currency amount 2_5855 "723".

Upon reading in the foreign currency amounts, the CPU 203 further reads in the agreement currency 5851 from the work region 2_5892 and acquires a yen conversion rate from a predetermined table (step S6307). For example, a yen exchange rate corresponding to "U.S. dollar (USD)" is read in.

Subsequently, the CPU 203 calculates yen equivalent amounts for each of foreign currencies thus read in and outputs the amounts to the work region for model (steps S6309 through S6311). For example, a yen equivalent amount 1 corresponding to the foreign currency amount 1 is calculated by multiplying the foreign currency amount with the yen exchange rate acquired in step S6307. Hence, the CPU 203 can calculate yen equivalent amount (yen equivalent amount 1 or yen equivalent amounts 2) corresponding to the cash surrender value amount (foreign currency amount 1) and the paid insurance premiums (foreign currency amount 2).

The above processing is skipped and the process ends when the yen conversion object flag 5857 is set up in OFF-state in step S6303.

8-5-4. Withholding Tax Amount Calculation Processing (Yen Converting Responding)

Upon completion of the yen calculating processing, the CPU 203 executing the business program carries out withholds tax amount calculation processing (yen converting responding) (step S5409, FIG. 54b). This processing is performed by sequentially carrying out the withholding tax amount calculation processing (I/F edit class) and the withholding tax amount calculation processing (calculation model) (FIG. 55, S5421 through S5425) similar to that of the processing details (1).

8-5-4-1. Withholding Tax Amount Calculation Processing (I/F Edit Class)

FIG. 56a is a flowchart of the withholding tax amount calculation processing (I/F edit class) in the processing details (3).

8-5-4-1-1. Acquisition of Agreement Currency

Subsequently, the CPU 203 acquires the transaction data related to the insurance contract by reading in the work record 5351 of the work region 5307 and carries out processing to acquire agreement currency by delivering to the wrapper program 5303 the clause ID and a predetermined processing name (steps S5701, S5721 through S5725 and S5741). The processing are the same as that of steps 6201, S6221 through S6225, S6241 (FIG. 62) in the above-described conversion processing.

For example, the CPU carrying out the yen converting calculation processing (I/F edit class) acquires the "agreement currency=U.S. dollar (USD)" as a return value by delivering to the wrapper program 5303 the clause ID 5813 "55555" and the "agreement currency acquire" as processing name.

8-5-4-1-2. Set-Up to Work Region

The CPU 203 judges whether or not the agreement currency of the insurance contract relating to the work record 5351 is a foreign currency in accordance with the return value acquired from the wrapper program 5303 (step S5703).

When it is judged that the agreement currency is a foreign currency in step S5703, a cash surrender value amount (yen equivalent amount) 5832 of the calculation result data 5355 in the work region 5307 is read in and the amount is set up in a total income amount 5835 in the work region 5891 for model (step S5705, FIG. 56a). For example, as shown in the record 5803 of FIG. 58a, "¥100,000" of the cash surrender value amount (yen equivalent amount) 5832 is set into "¥100,000" of the total income amount 5835.

The CPU 203 reads in the paid insurance premiums 5834 from the calculation result data 5355 of the work region 5307 and set it up to a legitimate expense 5837 in the work region 5891 for model (step S5707). For example, as shown in the record 5803 of FIG. 58a, "¥80,000" of the paid insurance premiums 5833 is set into "¥80,000" of the legitimate expense 5837.

On the other hand, when it is judged that the agreement currency is not a foreign currency in step S5703, similar to the processing details (1), the cash surrender value amount 5831 of the calculation result data 5355 in the work region 5307 is read in and set it up to the total income amount 5835 of the input data in the work region 5891. And then the paid insurance premiums are read in and the insurance premiums 5833 are set into the legitimate expense 5837 of the input data in the work region 5891 for model (steps S5706, S5708).

8-5-4-1-3. Steps S5709 Through S5717 (FIG. 56a)

Processing of steps S5709 through S5717 is the same as that of steps S5505 through S5513 shown in FIG. 56 described in the processing details (1). In other words, the CPU 203 acquires another insurance class relating to the clause ID when both conditions such as the insurance contract is "lump-sum payment" and "cancelled within five years from the contract date" are satisfied and sets up the taxation withholding tax flag 5841 to ON-state in the work region 5891 when the insurance class is annuity certain.

8-5-4-2. Withholding Tax Amount Calculation Processing (Calculation Class)

Upon completion of the cash surrender value calculating processing (I/F edit class), the CPU 203 executing the business program carries out withholding tax amount calculation processing (calculation model) similar to the processing details (1) (FIG. 61, S6103).

The withholding tax amount calculation processing (calculation model) is the same as that described in the processing details (1) shown in FIG. 57. It is, therefore, the CPU 203 outputs to the withholding tax amount 5843 of the output data in the work region 5891 for model the withholding tax amount thus calculated (step S6105).

8-5-5. Display of Screen-Image (Business Program)

The CPU 203 executing the main processing part 5321 of the business program 5301 displays the cash surrender value amount, the paid insurance premiums and the withholding tax amount stored in the work region 5307 on a foreign currency annuity cash surrender value amount calculation screen 600 (step S5411, FIG. 54b). For example, the cash surrender value amount 5831 "$904", the paid insurance premiums 5833 "$723" and the withholding tax amount 5839 "¥4,000" recorded on the record 5805 are respectively displayed on the display field for cash surrender value amount 604, the display field for paid insurance premiums 605 and the display field for withholding tax 606 shown in FIG. 60.

8-5-6. Conclusion

As described in the above, in the business application, adjustment in the difference of product features and that of functional requirements can be localized by constituting the processing function executing a specific calculation is made to be independent of the main processing part such as the "I/F edit class" and "calculation model".

Consequently, proper adjustment can be carried out without giving influence on entire business programs even when a product having different product feature is added and further addition of a function(s) differ from the functional requirements. In this way, a data management system capable of increasing of usability and versatility can be provided.

The adjustment in difference of product features and that of functional requirements can be controlled in a hierarchical fashion by unifying the interface between each business application using data storage object.

9. Ninth Embodiment

Although, examples in which the transaction data including plural products with which the data items to deal with differ mutually is managed is described in the first through eighth embodiments, an application program dealing such transaction data will be described in this embodiment.

For example, an application for adjusting a screen by which each transaction data is adjusted individual basis will be discussed. As described in the above, since product features of an insurance product recorded on each transaction data are determined by clause ID, data item(s) to be displayed on the screen as an object(s) to be adjusted differ. Consequently, when a screen adjustment application is generated, a countermeasure of creating an adjustment screen for each clause ID or, creating an adjustment screen capable of responding in common with all clause IDs can be considered.

When such countermeasure is employed, however, the adjustment screen needs to be adjusted simultaneously with the variation of the insurance product and/or data item, so that the adjustment become complicated. Hence, such adjustment could be a factor of enormous increase of the maintenance cost to a system change. Especially, in package software industry in which insurance products and functional requirements differ depending on each company is a premise thereof, the adoption of a versatility data management technique capable of suppressing not only the maintenance cost at the time of employment but also the customize cost at the time of its introduction is desired.

Considering the above described points, a data management apparatus comprising an application program capable of easily responding variation of plural insurance products having different product features and that of their data items will be described in this embodiment.

Similar to the fourth embodiment, the term "product definition data" described in the first through the third embodiments is read as the term "clause definition data" in this embodiment.

9-1. Functional Block Diagram

Figure 1A:
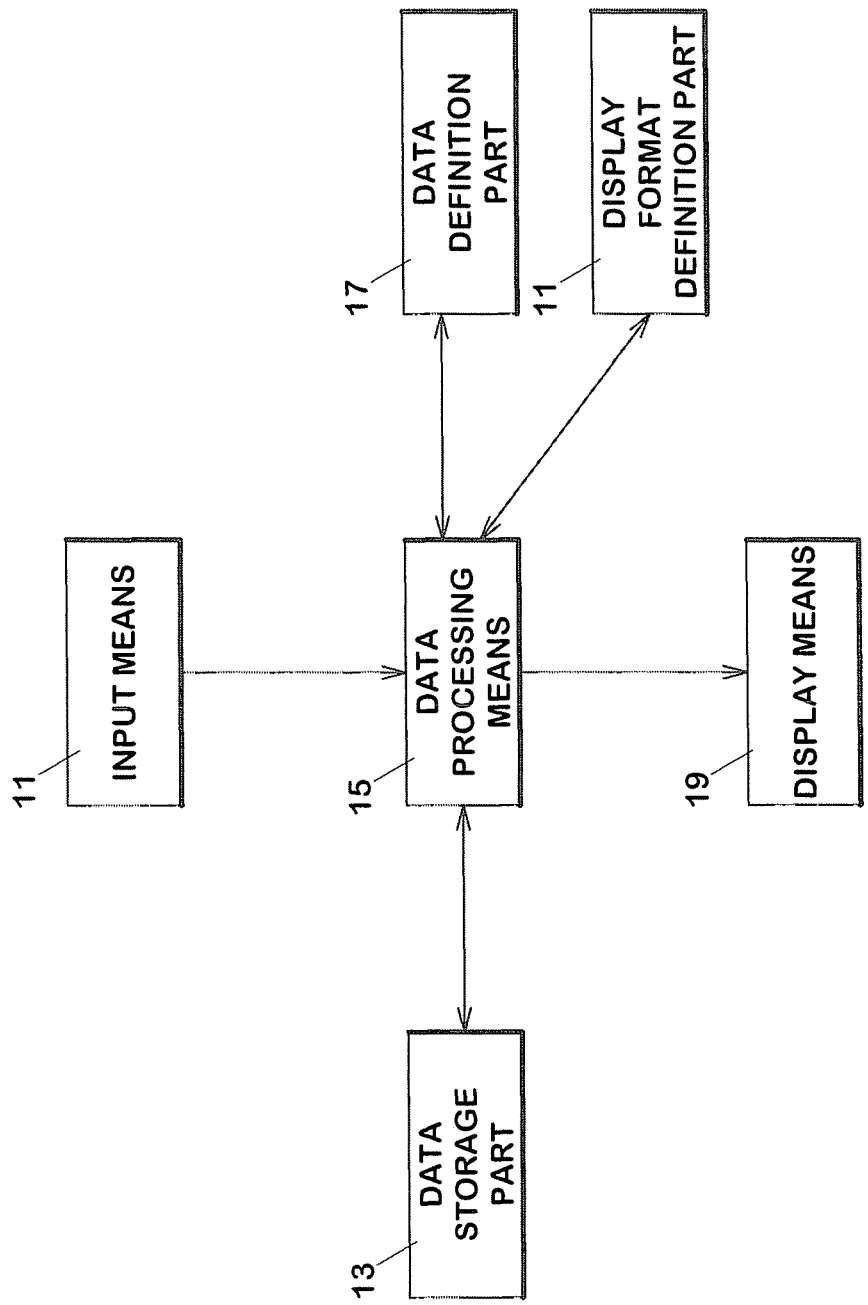
FIG. 1a is another functional block diagram of the data management apparatus according to the present invention.

FIG. 1a is a functional block diagram of a data management apparatus according to this embodiment. In this drawing, the data management apparatus 1 comprises a display format definition part 20 in addition to the input means 11, the data storage part 13, the data processing means 15, the data definition part 17 and the display means 19.

The display format definition part 20 records a display format for data contents or data contents IDs which are the processing result of the data processing means 15. The display means 19 displays thereon data contents or data contents IDs in accordance with the display format recorded on the display format definition part 20.

9-2. Hardware Structure

Figure 2A:
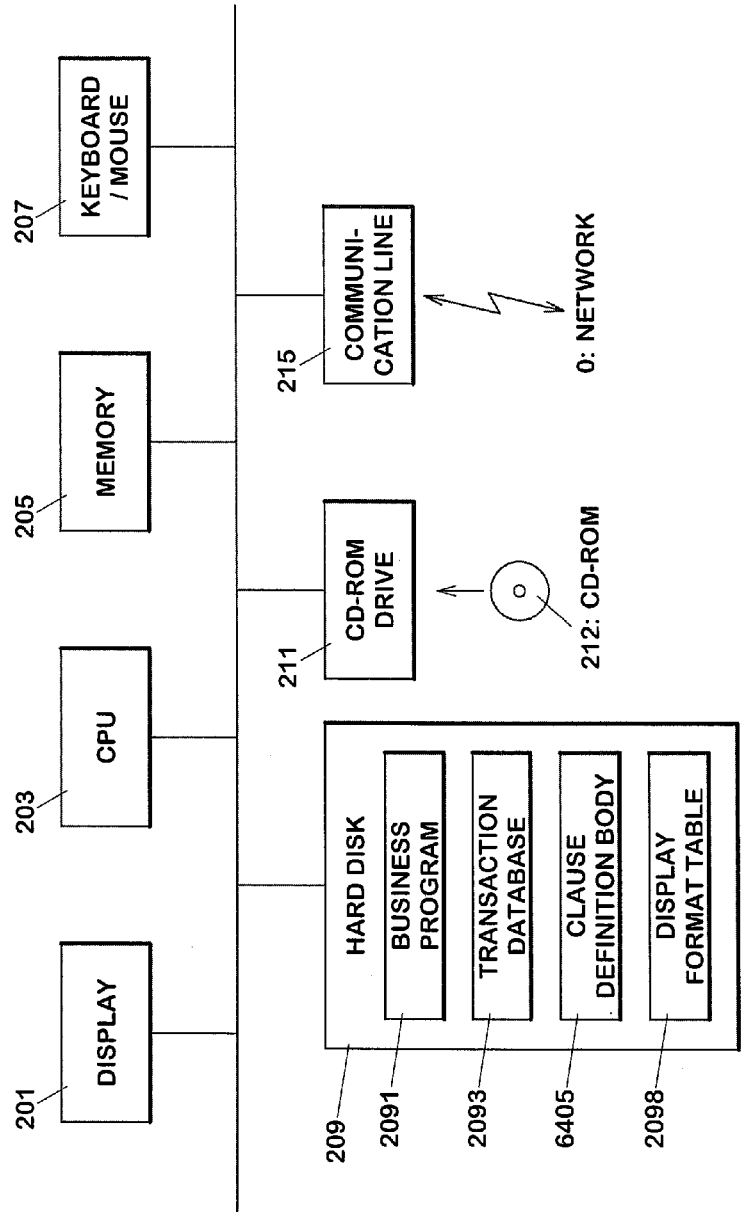
FIG. 2a is another hardware structure diagram of the data management apparatus according to the present invention.

FIG. 2a shows an example of hardware structure of a computer apparatus realized by the data management apparatus 1 according to the present invention using a CPU. In the drawing, the data management apparatus 1 comprises the display 201, the CPU 203, the memory 205, the key board/mouse 207, the hard disk 209, the CD-ROM drive 211 and the communication circuitry 215 similar to the one shown in FIG. 2.

The hard disk 209 stores a display format table 2098 in addition to the business program 2091, the transaction database 2093 and the clause definition program 6405.

9-3. Processing Details (1)

Processing details of this embodiment will be described with reference to FIGS. 64 through 72. In this embodiment, the business program is an application program for managing contractual data and product data of life insurance.

Figure 64:
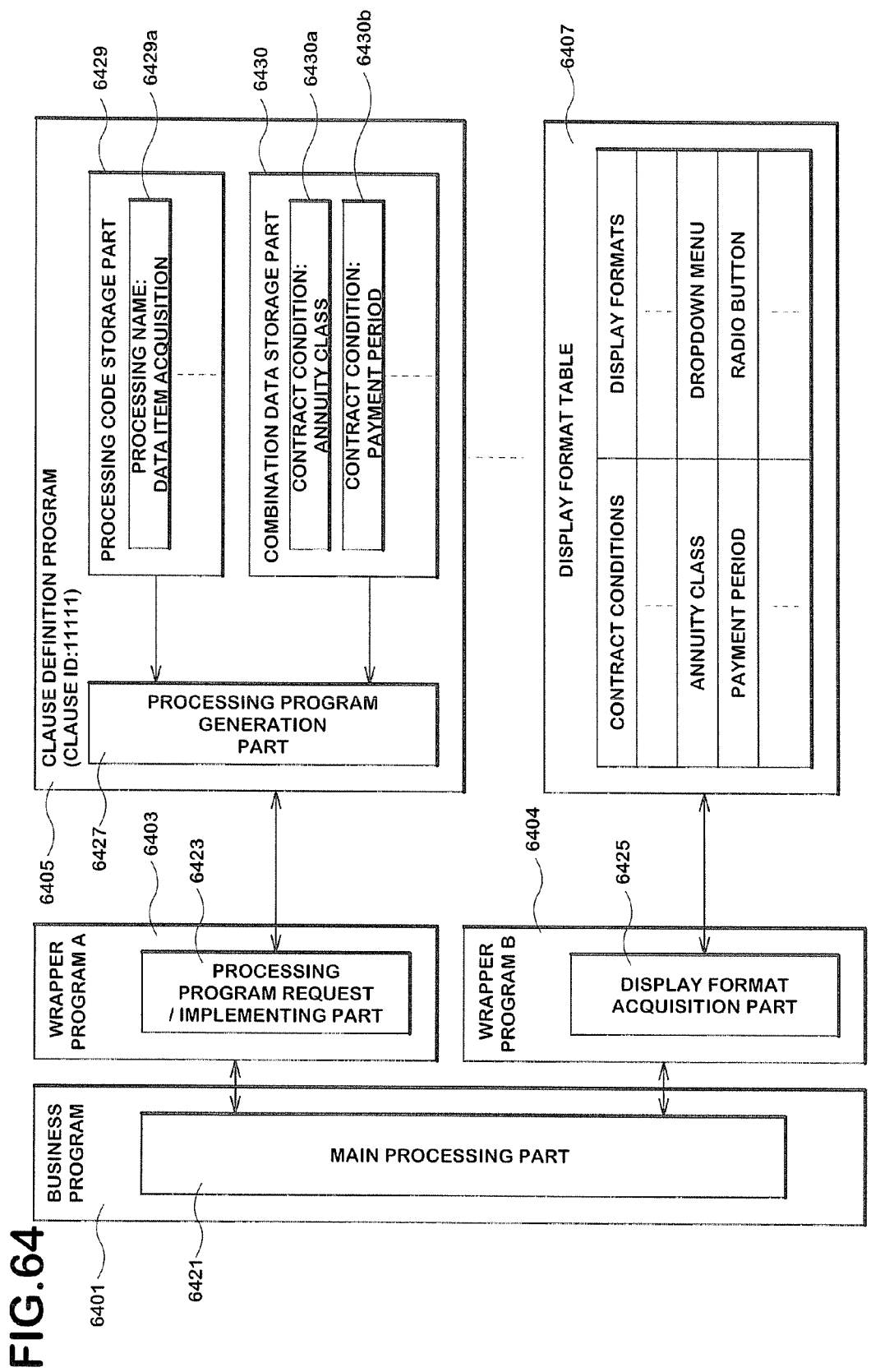
FIG. 64 is a diagram showing examples of functional block diagrams of the business application program, the wrapper programs A and B, the clause definition program and a display format table according to the present invention.

FIG. 64 shows a functional block diagram of a business program 6401, a wrapper program A6403 another wrapper program B6404, a clause definition program 6405 so on and a display format table 6407.

The business program 6041 comprises a main processing part 6421 for implementing processing on user interface such as image processing and a database.

The wrapper program A6403 includes the processing program request/execution part 6423 requesting a processing program to the clause definition program 6405 and implementing the program.

The clause definition program 6405 comprises a processing program generation part 6427 for generating a processing program on receipt of a request from the wrapper program A6403, a processing code storage part 6429 storing processing codes for each processing name and a combination data storage part 6430 recording combination data for set up to a processing code (when the clause ID is "11111").

The wrapper program B6404 comprises a display format acquisition part 6425 for acquiring from the display format table 6407 the display format 6423 for displaying predetermined contract conditions on the screen.

In this embodiment, screen display processing capable of directly adjusting arbitrary contract conditions recorded about the transaction data of a predetermined insurance contract will be described.

FIGS. 65 through 67 and 72 are flowcharts of the business program 6401, the wrapper program A6403 and another wrapper program B6404 or the clause definition program 6405 executed by the data management apparatus 1 in the above mentioned case.

9-3-1. Acquisition of Screen-Image Data

Figure 68:
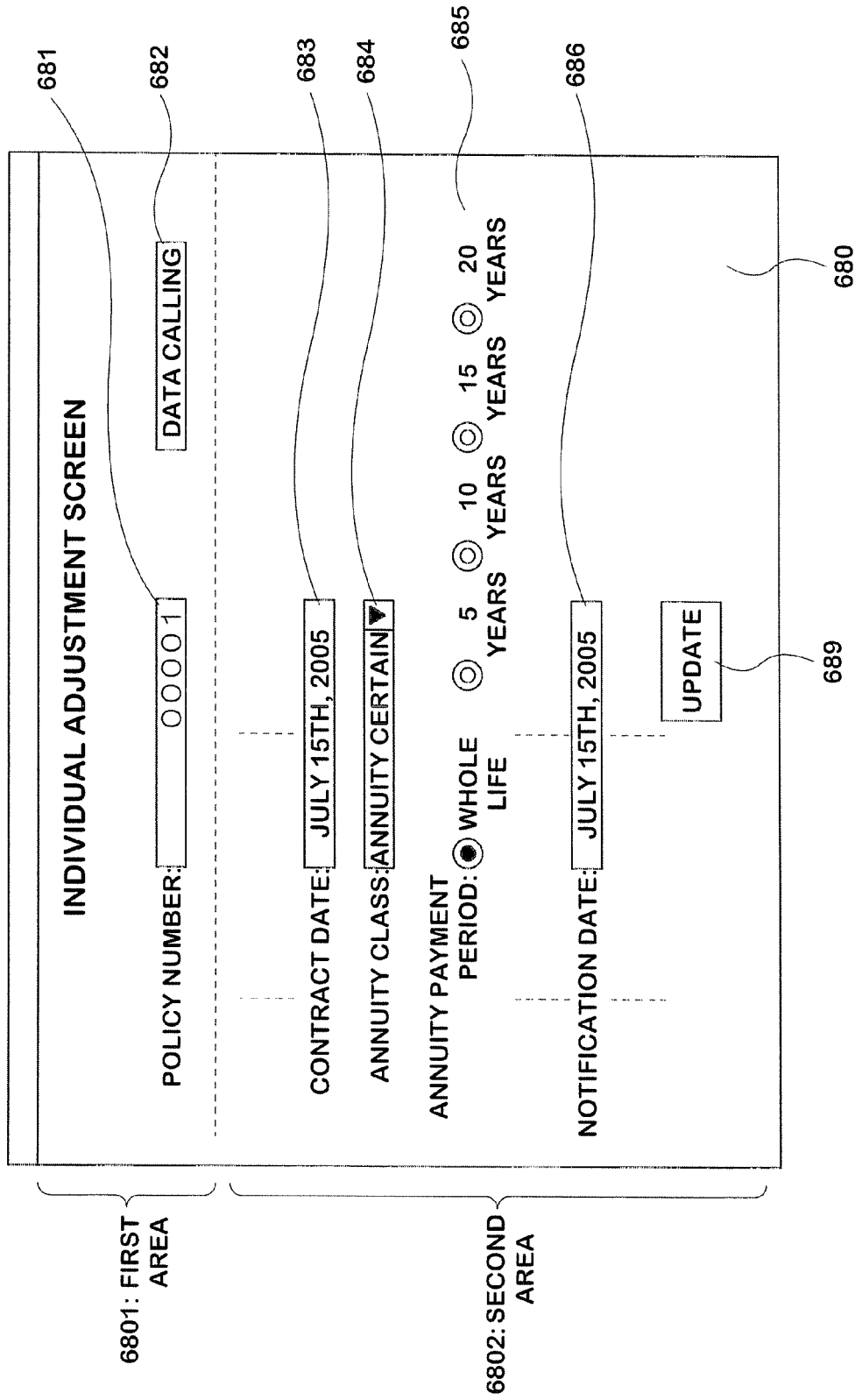
FIG. 68 is a screen-image of an individual adjustment screen according to the present invention.

FIG. 68 shows a screen-image of an individual adjustment screen 680 displayed on the display 201 under the execution of the main processing part 6421 (FIG. 64) in the business program 6401. On this screen, an entry field for policy number 681 is displayed on the first area 6801, a display field for contract date 683, a display field for insurance class 684, a display field for annuity payment period 685 and a display field for notification date 686 and so on is displayed on the second area 6802. On the initial display of the individual adjustment screen 680, data displayed only on the first area 6801, none of data is displayed on the second area.

The operator of the data management apparatus 1 can instruct display of the individual adjustment data according to the transaction data of inputted policy number by inputting a policy number to be individually adjusted into the entry field 681 and clicking a data calling button 682. For example, the operator instructs the execution of processing for calling the individual adjustment data on the policy number "00001" by inputting "00001" into the entry field 681 and clicking button 682.

Figure 65:
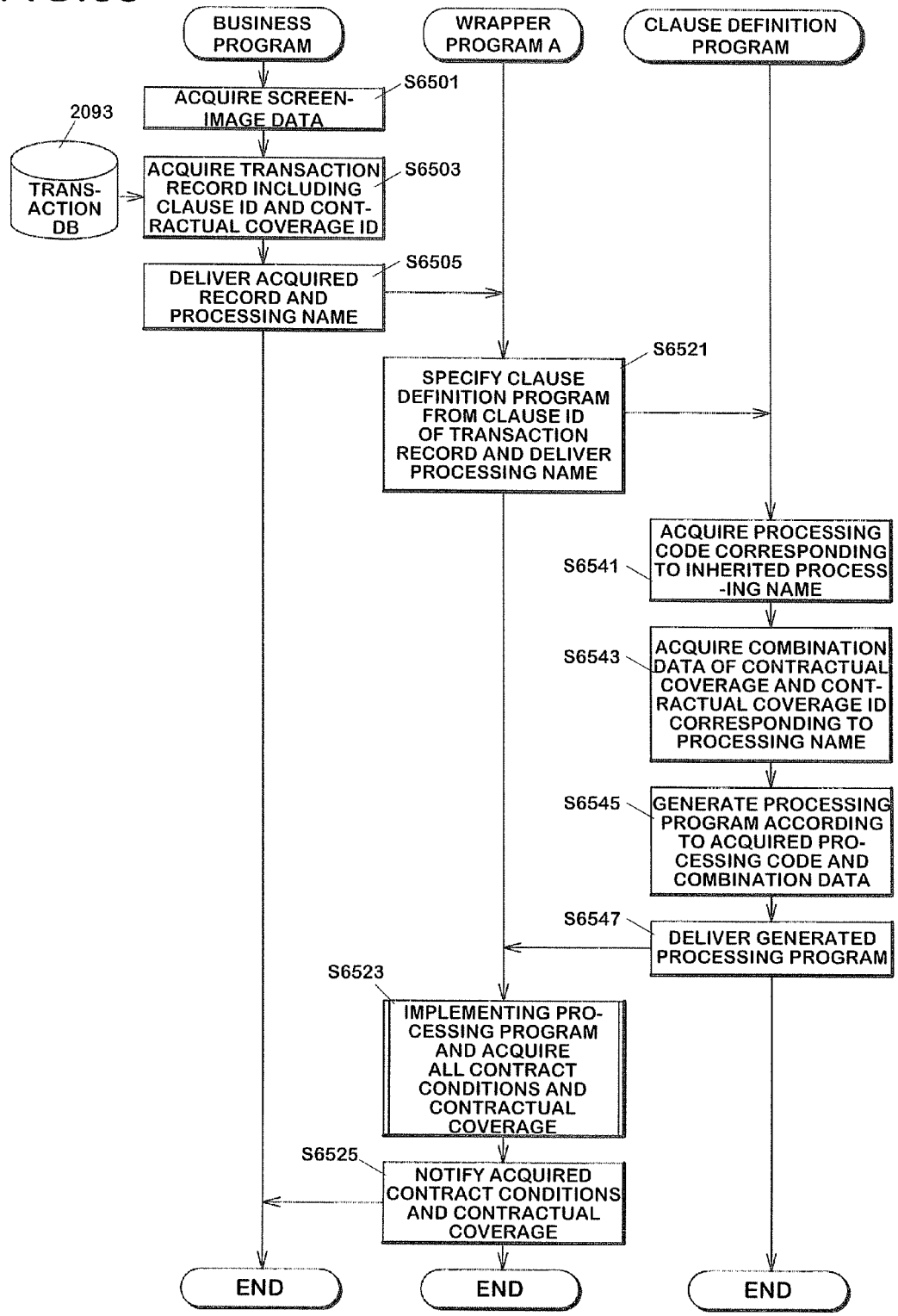
FIG. 65 is a flowchart of the business application program, the wrapper programs A and B, and the clause definition program according to the present invention.

On receipt of clicking of the button 682, the CPU 203 executing the main processing part 6421 acquires the screen-image data (step S6501, FIG. 65). For example, the CPU 203 acquires the policy number "00001" as the screen-image data.

9-3-2. Wrapper Program A (Business Program)

In the business program 6401, the CPU 203 acquires the transaction record of the insurance contract and stores it to a predetermined work record (step S6503). For example, the record whose policy number is "00001" is extracted from the transaction database 2093 and acquires the record as a work record 7101 shown in FIG. 71.

Upon acquisition of the record, the CPU 203 delivers the acquired record data and the predetermined processing name(s) to the wrapper program A6403 (step S6505). In the above-description, individual adjustment processing for data (contractual coverage) on data items (contract conditions) recorded in the transaction data of the insurance contract according to the policy number is carried out. Thus, the CPU 203 delivers to the wrapper program A6403 "data item acquisition" as processing name, for example.

9-3-3. Specification of Clause Definition Body (Wrapper Program A)

Upon delivery, the wrapper program A6403 delivers the processing name acquired from the business program 6401 to the clause definition program specified according to the clause ID (step S6521).

Figure 71:
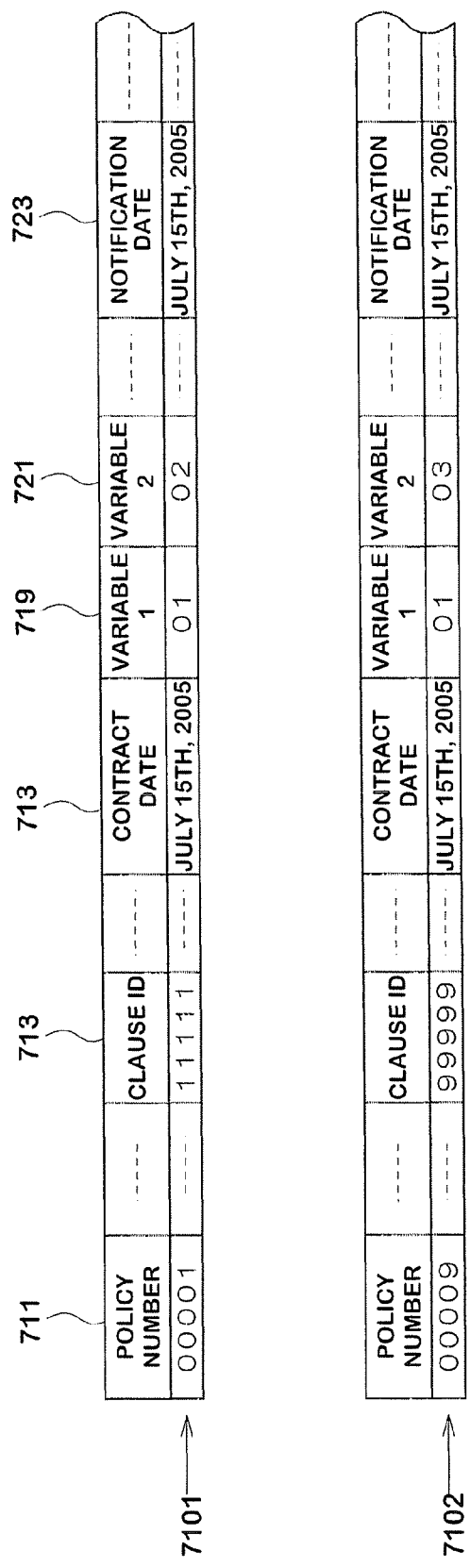
FIG. 71 is a diagram showing a work record according to the present invention.

For example, in the record 7101 shown in FIG. 71, the clause definition program 6405 is specified according to a clause ID "11111". Also, the CPU 203 delivers the "data item acquisition" as processing name.

9-3-4. Acquisition of Processing Data and Combination Data (Clause Definition Program)

Subsequently, the case in which a processing code is delivered to the clause definition program having clause ID "11111", will be described hereunder. On receipt of delivery, the CPU 203 carries out the processing program generation part 6427 of the program 6405 and acquires a processing code corresponding to the inherited processing name by conducting a search of the processing code storage part (step S6541). In the processing code storage part 6429, processing IDs are recorded for each processing name. For example, the CPU 203 acquires a processing code 6429a which has a processing name of "data item acquisition" by conducting a search and the like.

Subsequently, the CPU 203 acquires all contract conditions used for the execution of the processing code with reference to "relation table for variable n and contact conditions" 691a stored in the processing code storage part 6429 (FIG. 69) and further acquires combination data of contractual coverage and contractual coverage ID according to each contract condition being acquired from the combination data storage part 6430 (step S6543).

In the combination data storage part 6430, combination data is recorded for each contract condition (data item). For example, the CPU 203 acquires combination data such as "annuity class" 6430a, "payment period" 6430b and so on regarding all contract conditions (data items) capable of being set in the clause ID.

9-3-5. Generation of Processing Program (Clause Definition Program)

Figure 69:
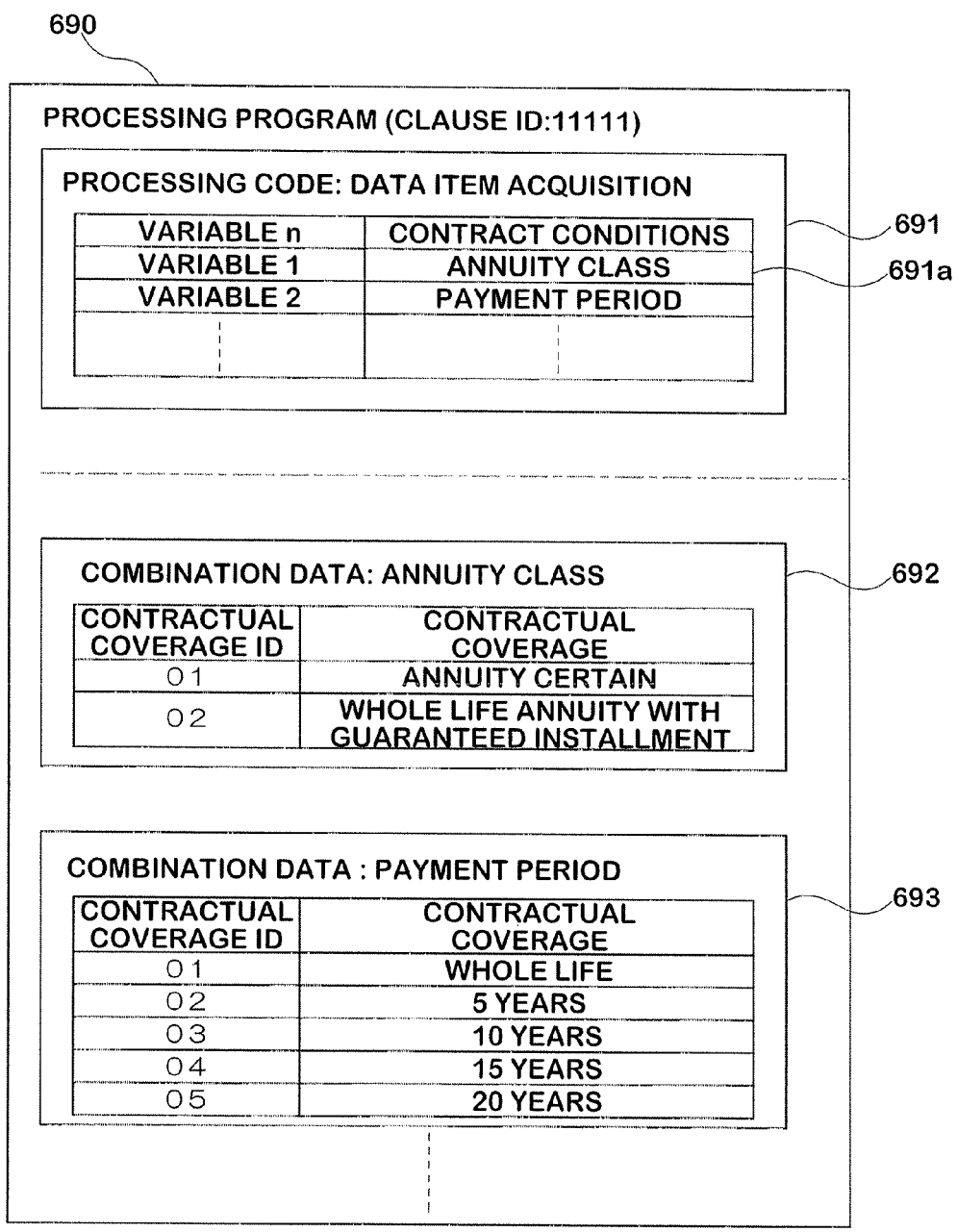
FIG. 69 is a diagram illustrating a structural example of the processing program according to the present invention.

The CPU 203 generates a processing program in accordance with the processing code acquired from the processing code storage part and combination data acquired from the combination data storage part (step S6545). FIG. 69 shows a diagram illustrating a structural example of the processing program thus generated. Such processing program 690 comprises a processing code 691 and combination data 692, another combination data 693 and so on. Program codes for acquiring all the contractual coverage capable of being selected for all the contract conditions (data items) are described in the processing code 691, for example. Such description format of the program codes may either be a source code or an object code.

Combination data of contractual data and a contractual coverage ID used for acquiring all the contractual coverage capable of being selected for all contract conditions (data items) are described in the combination data 692 and 693 and so on. The description format of the combination data can be any format capable of identifying the contractual coverage corresponding to the contractual ID at the execution of the program code. Formats such as a sequence format and a table format and the like correspond to the description format.

9-3-6. Delivery of Processing Program

The CPU 203 executing the clause definition program 6405 delivers the generated processing program 690 to the wrapper program A6403 (step S6547). For example, the CPU 203 carries out a processing for delivering the processing program 690 using a redirect function and a pipe function and so on.

9-3-7. Execution of Processing Program

In implementing the wrapper program A6403, the CPU 203 carries out the processing program 690 inherited from the clause definition program 6405, and acquires all contract conditions capable of being set to clause IDs specified by the policy numbers acquired from the screen-image data and all contractual coverage capable of being selected by the contract conditions (step S6523).

Figure 67:
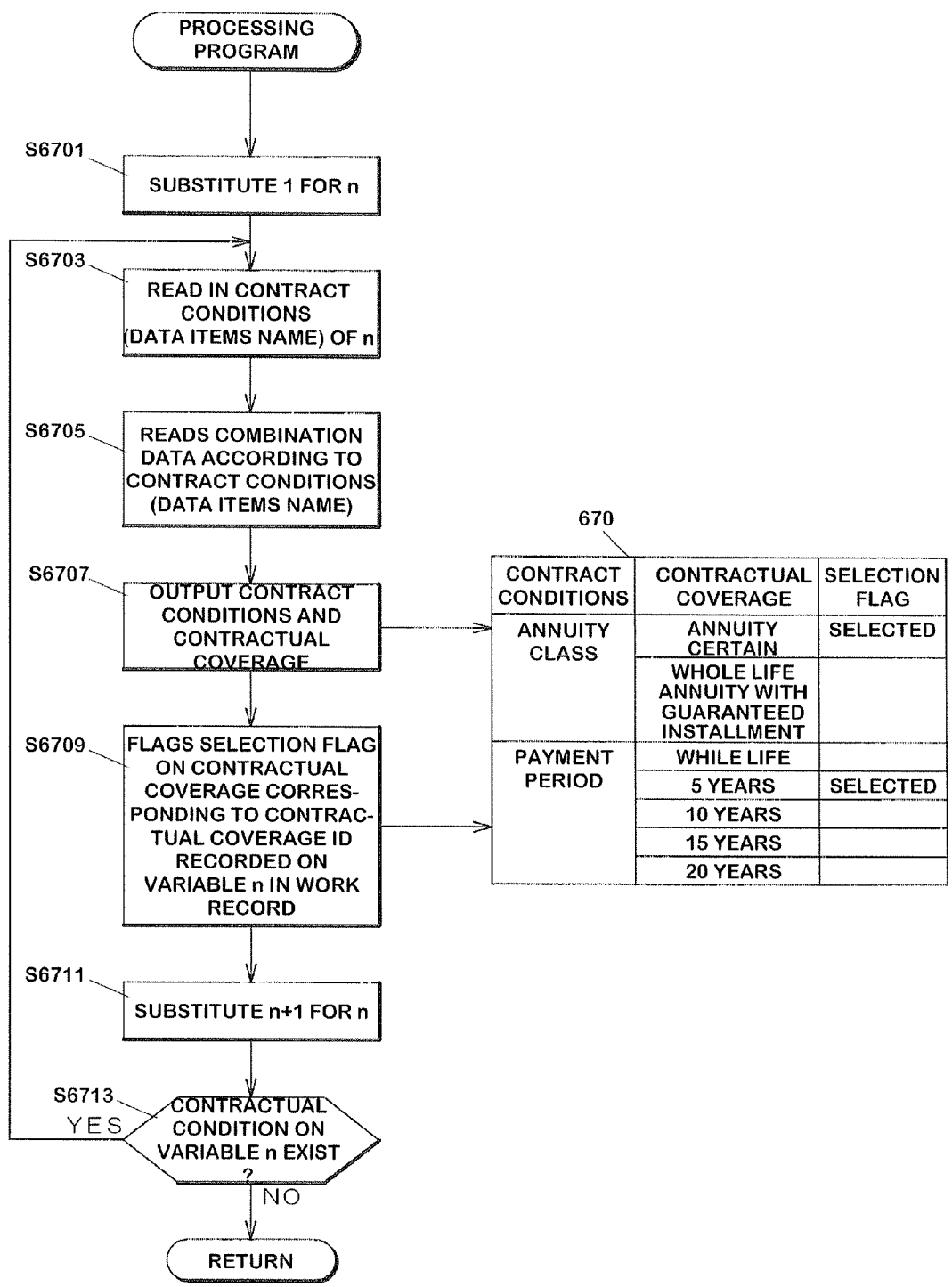
FIG. 67 is a flowchart of the processing program according to this invention.

FIG. 67 shows a flowchart of a processing program 690 performed at that time. In implementing the processing program 690, the CPU 203 substitutes 1 for local variable n (step S6701). Here, the local variable n is a value of a variable for specifying data item of transaction data "variable n". For example, the "variable n" is treated as "variable 1" when the local variable n is 1.

The CPU 203 reads in "contract conditions" corresponding to the "variable n" from the "relation table for variable n and contact conditions" 691a stored in the processing program 690 (step S6703). For example, "annuity class" recorded corresponding to "variable 1" of the relation table 691a in the processing code 691 shown in FIG. 69 is read in.

Subsequently, the CPU 203 reads all the combination data according to contract conditions thus read in as described in the above (step S6705). For example, all the combination of the contractual coverage IDs and the contractual coverage recorded for "annuity class" of the combination data 692 shown in FIG. 69 are read.

The CPU 203 outputs the contract conditions and the contractual coverage thus read in to "relation table of contract conditions and contractual coverage". For example, as shown in the "relation table of contract conditions and contractual coverage" 670 of FIG. 67, "annuity certain" and "whole life annuity with guaranteed installment" are output as contractual coverage when the contract condition is in "annuity class".

The CPU 203 judges contractual coverage corresponding to the contractual coverage ID recorded on the variable in the work record in order to set up initial values of the individual adjustment screen 680, conducts a search for the same contractual coverage with the judged contractual coverage on the "relation table of contract conditions and contractual coverage" 670, and records a selection flag corresponding to the contractual coverage.

For example, the CPU 203 stores the selection flag corresponding to the contractual coverage "annuity certain" in the "relation table of contract conditions and contractual coverage" 670 because a variable 1_719 recording a contractual ID of "annuity class" is "01" in the record 7101 of the work record shown in FIG. 71 and the contractual coverage represented by its contractual ID "01" is "annuity certain" in the combination data 692 of "annuity class" shown in FIG. 69. Thus, the initial value of "annuity class" in the individual adjustment screen 680 can be displayed as "annuity certain".

Then the CPU 203 substitutes n+1 for the local variable n (step S6711). For example, as a result of such substitution, the "variable 1" is treated as the "variable 2".

Subsequently, the CPU 203 judges whether or not contract condition for the variable n exist in the "relation table for variable n and contact conditions" 691a and repeats the above processing by returning to step S6703 (step S6713, YES). For example, since "variable 2" exits in the "relation table for variable n and contact conditions" 691a, the process on the contract conditions "payment period" corresponding to "variable 2" starts from step S6703.

By executing step S6707 on the contract conditions "payment period", "payment period" is output to the contract conditions as shown in the "relation table of contract conditions and contractual coverage" 670 and "whole life", "5 years", "10 years", "15 years" and "20 years" are output to the contract conditions.

By executing step S6709 on the contract conditions "payment period", the CPU 203 records a selection flag corresponding to the contractual coverage "5 years" in the "relation table of contract conditions and contractual coverage" 670 because a variable 2_721 recording a contractual ID of "payment period" is "02" in the record 7101 of the work record shown in FIG. 71 and the contractual coverage represented by its contractual ID "02" is "5 years" in the combination data 693 of "payment period" shown in FIG. 69.

If no contractual condition on the variable n will not exist, such processing is terminated (step S6713, NO).

9-3-8. Notification of Execution Results

The CPU 203 executing the wrapper program A6403 notifies the execution results to the business program 6401 (step S6225, FIG. 65). For example, processing to return the "relation table of contract conditions and contractual coverage" 670 to a program thread of the business program 6401 as a return value is carried out.

9-3-9. Acquisition of Display Format

Figure 66:
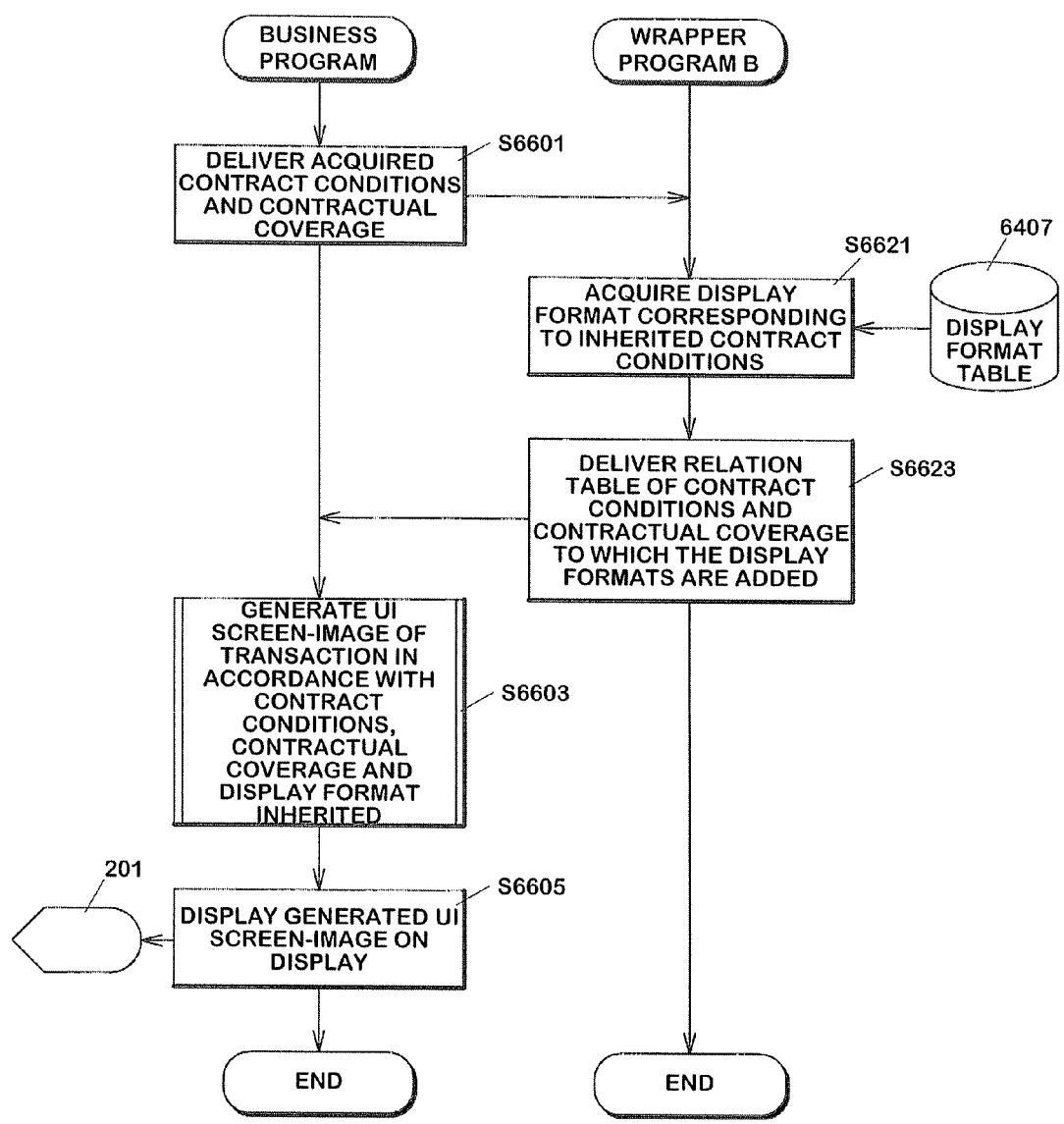
FIG. 66 is a flowchart of the business application program and the wrapper program B according to the fourth embodiment.

Upon receipt of the "relation table of contract conditions and contractual coverage" 670, the CPU carrying out main processing part 6421 delivers to the wrapper program B6404 "relation table of contract conditions and contractual coverage" 670 (step S6601, FIG. 66). For example, "relation table of contract conditions and contractual coverage" 670 shown in FIG. 70 is delivered.

The CPU 203 executing the wrapper program B6404 refers to the display format table 6407 in accordance with each contract condition in the inherited "relation table of contract conditions and contractual coverage" 670 and acquires display formats recorded correspondently to such contract condition (step S6621). Here, the display format table 6407 is a table for defining display formats for displaying data representing contractual coverage on predetermined contractual conditions on the screen.

For example, a "dropdown menu" 705 is acquired as a display format for displaying data representing contractual coverage of the contract condition "annuity class" by referring to the display format table 6407 in accordance with a contract condition "annuity class" 701 of the "relation table of contract conditions and contractual coverage" 670 shown in FIG. 70.

The CPU 203 acquires display formats for all the contract conditions in the inherited "relation table of contract conditions and contractual coverage" 670 and adds the acquired each display format correspondingly to each contract condition in the "relation table of contract conditions and contractual coverage" 670 as a data stream. For example, display formats for each contract condition of the "relation table of contract conditions and contractual coverage" 670 is added as shown in a table 700 shown in FIG. 70.

The CPU 203 executing the wrapper program B6404 delivers the "relation table of contract conditions and contractual coverage" to which the display formats are added to the main processing part 6421 of the business program 6401 (step S6623). For example, processing to return the "relation table of contract conditions and contractual coverage adding display formats" 700 shown in FIG. 70 to a program thread of the business program 6401 as a return value is carried out.

9-3-10. Generation of UI (User Interface) Screen-Image

Upon receipt of the "relation table of contract conditions and contractual coverage adding display formats" 700, the CPU 203 generates an UI screen-image regarding the transaction data (step S6603). For example, a second area 6802 of the individual adjustment screen is generated in accordance with the "relation table of contract conditions and contractual coverage adding display formats" 700.

In generation of the UI screen-image, the CPU 203 generates a screen image by performing an UI screen-image generation processing described hereunder for data items of variation n (n=1, 2 and so on) shown in transaction data of FIG. 71. With regard to the contract date 715 and a notification date 723 and so on, data values are output as screen-image data in accordance with display formats acquired from the display table 6407 based on the name of data items in the transaction data. For example, data value "2005 Jul. 15" of the contract date 715 (FIG. 71) is output as data "Jul. 15, 2005" as a result of editing according to the display format of the contract date of "Month Date, Year".

FIG. 72 shows a detailed flowchart of the UI screen-image generation processing in step S6603. The CPU 203 reads in one contract condition from the relation table 700 (step S7201). For example, it reads in a contract condition of "annuity class".

Subsequently, the CPU 203 reads in display formats stored correspondently with the contract conditions thus read from the relation table 700 (step S7203). For example, a display format "dropdown menu" for "annuity class" is read in.

The CPU 203 reads in all the contractual coverage for the contract conditions read in from the relation table 700 (step S7205). For example, contractual coverage "annuity certain" and "whole life annuity with guaranteed installment" for the "annuity class" are read in.

The CPU 203 edits the contract conditions and the contractual coverage thus read in accordance with the display formats read in at step S7203 (step S7207). For example, contractual coverage "annuity certain" and "whole life annuity with guaranteed installment" for the "annuity class" are edited in accordance with the display format "dropdown menu". In other words, both the contractual coverage "annuity certain" and "whole life annuity with guaranteed installment" are set as selected items in the drop down menu for selecting "annuity class".

Subsequently, the CPU 203 reads in a selection flag for the contractual coverage thus read in from the relation table 700 and sets the contractual coverage into which the selection flag is set as an initial value of selected items edited according to the display format (step S7209). For example, the initial value of the contractual coverage in the dropdown menu for selecting "annuity class" is set as "annuity certain" as a result of setting a selection flag in the contractual coverage "annuity certain" according to "annuity class".

The CPU 203 outputs the contractual conditions and contractual coverage both edited in the above as data to the UI generation screen-image (step S7211). For example, the initial value of the dropdown menu for annuity class is output as "annuity certain" as shown in the display field for insurance class 684 in the second area 6802 on the individual adjustment screen 680 shown in FIG. 68.

The CPU 203 repeatedly executes steps 7201 through S7211 described in the above for all the contract conditions stored in the relation table 700 (step S7213). By doing this, UI screen-images are generated for all the data items of the variable n in the transaction data.

Upon completion of the UI screen-image generation processing, the CPU 203 outputs to the display 201 the generated screen-image as an individual adjustment screen (FIG. 66, step S6605). For example, the contract date, the annuity class, the payment period, the notification date and so on is displayed as shown in the individual adjustment screen 680 of FIG. 68.

9-4. Processing Details (2)

An example of generating an individual adjustment screen for an insurance product (annuity insurance, for example) having clause ID "11111" recorded in the transaction data of policy number "00001" is described in the above described processing details (1).

In the processing details (2), an example of generating an adjustment screen for an insurance product (whole life insurance, for example) having clause ID "99999 recorded in the transaction data of policy number "00009" will be described. Only points different from the processing details (1) will be described for clarity because basically similar program to the processing details (1) is used for the processing details (2).

9-4-1. Acquisition of Screen-Image Data

FIG. 68a shows an example of the individual adjustment screen 680 displayed on the display 201 as a result of execution of the main processing part 6421 of the business program 6401. In this example, the entry field for policy number 681 is displayed in a first area 6801 and the display field for contract date 683, a display field of living-needs rider 687, a display field of long-term hospitalization rider 688 and a display field of notification date 686 and son on are displayed in the second area 6802.

The operator of the data management apparatus 1 instructs execution of processing for calling up individual adjustment data for a policy number "00009" by inputting "00009" into the entry field for policy number 681 and clicking the data calling button 682.

9-4-2. Start-Up of Wrapper Program a (Business Program)

In the business program 6401, the CPU 203 extracts the record whose policy number "00009" from the transaction database 2093 and acquires the record as a work record 7102 shown in FIG. 71 and delivers the acquired work record 7102 and processing name "data item acquisition" to the wrapper program A6403.

9-4-3. Specification of Clause Definition Body (Wrapper Program A)

Upon delivery, the wrapper program A6403 specifies a clause definition program in accordance with a clause ID 713 "99999" of a record 7102 and delivers the "99999" and the processing name "data item acquisition" to the specified program.

9-4-4. Acquisition of Processing Code and Combination Data (Clause Definition Program)

Upon delivery, the CPU 203 carries out the processing program generation part of the clause definition program according to the clause ID "99999" and acquires the processing code corresponding to the inherited processing name "data item acquisition" by conducting a search for the processing code storage part.

Subsequently, the CPU 203 acquires all the contract conditions used at the execution of the processing code by referring "relation table of variable n and contract condition" 691b (FIG. 69a) recorded in the processing code and further acquires combination data of the contractual coverage and the contractual coverage ID according to each contract condition thus acquired from the combination data storage part. For example, the CPU 203 acquires combination data "living needs rider", "long-term hospitalization" and so on for all possible contract condition (data items) capable of being set in the clause ID.

9-4-5. Generation of Processing Program

Figure 69A:
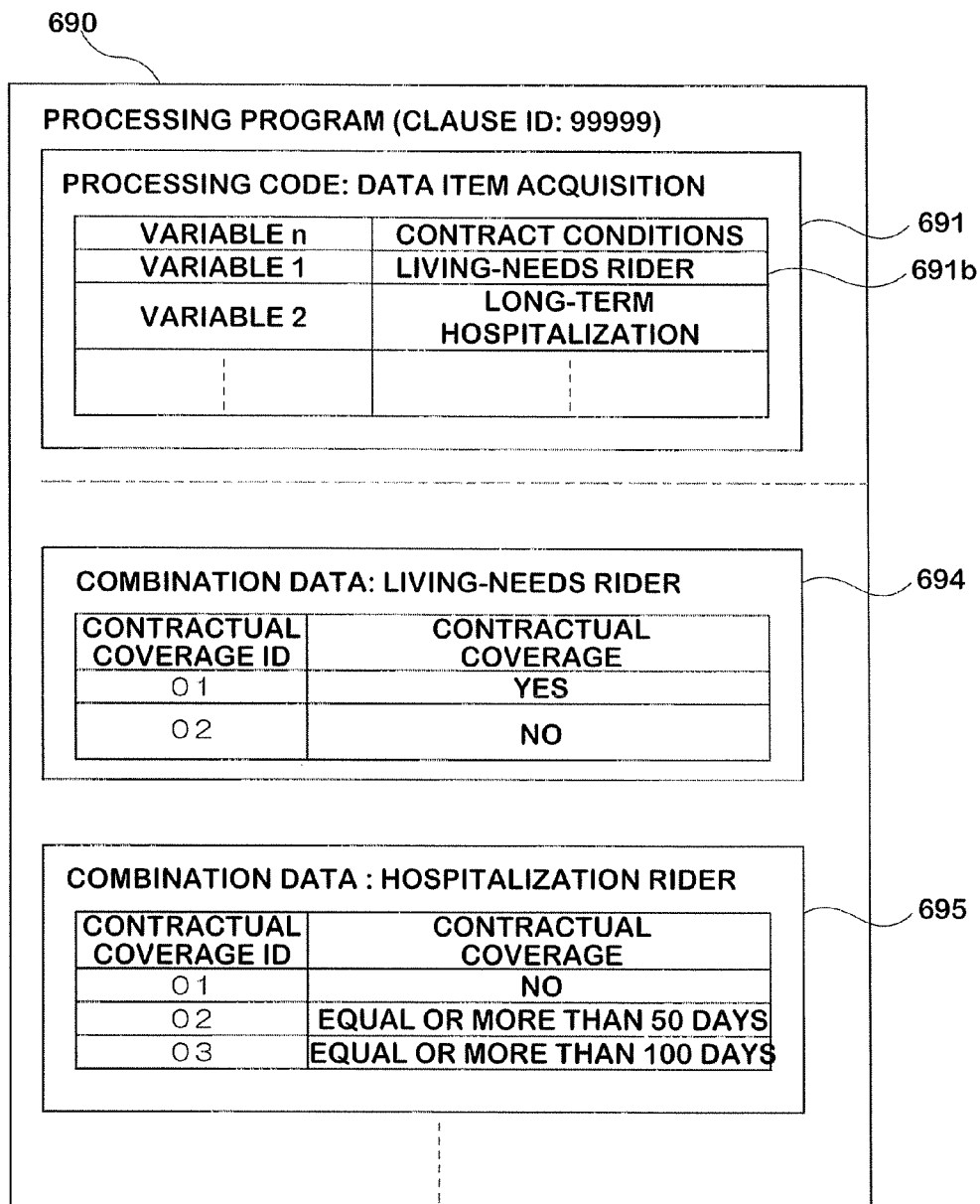
FIG. 69a is another diagram illustrating another structural example of the processing program according to the present invention.

The CPU 203 generates a processing program illustrated its structure in FIG. 69a in accordance with the processing code acquired from the processing code storage part and the combination data obtained from the combination data storage part. Such processing program comprises combination data 694 of the processing code 691 and the "living needs rider", combination data 695 of the processing code and "long-term hospitalization" and so on.

9-4-6. Delivery of Processing Program

The CPU 203 executing the clause definition program delivers the generated processing program 690 to the wrapper program A6403.

9-4-7. Execution of Processing Program

In implementing the wrapper program A6403, the CPU 203 carries out the processing program 690 inherited from the clause definition program and acquires all the contract conditions (such as "living-needs rider", "long-term hospitalization rider" and so on) capable of setting to the clause ID "99999" specified by the policy number "00009" obtained from the screen-image data and all the contractual coverage (such as "yes", "no" or "no", "equal or more than 50 days", "equal or more than 100 days") capable of being selected in each of the contract conditions.

9-4-8. Notification of Execution Results

The CPU 203 executing the wrapper program A6403 carries out processing to return the "relation table of contract conditions and contractual coverage" to a program thread of the business program 6401 as a return value.

9-4-9. Acquisition of Display Format

Upon receipt of the "relation table of contract conditions and contractual coverage", the CPU 203 delivers to the wrapper program B6404 the "relation table of contract conditions and contractual coverage" and refers to the display format table 6407 in accordance with each of contract condition and acquires a display format correspondently recorded to the contract condition.

For example, a "dropdown menu" is acquired as a display format for displaying data representing contractual coverage of the contract condition the "living-needs rider" by referring to the display format table 6407 in accordance with a contract condition "living-needs rider" of the "relation table of contract conditions and contractual coverage".

The CPU 203 executing the wrapper program B6404 delivers to the main processing part 6421 of the business program 6401 the "relation table of contract conditions and contractual coverage" adding its display format.

9-4-10. Generation of UI (User Interface) Screen-Image

Upon receipt of the "relation table of contract conditions and contractual coverage adding its display format", the CPU 203 generates a second area 6802 of the individual adjustment screen 680 shown in FIG. 68*a*.

In generation of the UI screen-image, the CPU 203 generates a screen image by performing an UI screen-image generation processing described in the processing details (1) for data items of variation n (n=1, 2 and so on) shown in transaction data of FIG. 71.

Upon completion of the UI screen-image generation processing for all the data items in the transaction data, the CPU 203 outputs to the display 201 the generated screen-image as an individual adjustment screen and display thereon the contract date, the living-needs rider, the long-term hospitalization rider and the notification date and so on as illustrated in the individual adjustment screen 680 in FIG. 68*a*.

It is possible to set-up each contract condition (data item) managed in the clause definition body as display data of an individual adjustment screen-image even when a clause ID specified by a policy number differs.

9-5. Conclusion

As described in the above, it is possible to execute data-led UI screen-image generation processing based on a clause definition program according to the present invention. Hence, it is possible to use without any change to an application for the adjustment screen-image even when insurance products and their data items change and is possible to enormously suppress the maintenance cost for system change.

In a field of packaging software in which statuses of insurance products and functional requirements differ depending on each company is a premise thereof, a data management method having a high versatility capable of decreasing not only the maintenance cost during the operation but also the cost in customization can be provided.

9-6. Others

In the above, all the contractual conditions according to a clause ID are displayed on the screen, it is possible to select contract conditions to be displayed on the business program side.

In the above description, it constituted so that the initial value of the contractual coverage capable of being selected for contract condition according to a clause ID is set up in accordance with the variable data recorded in the transaction data, it is possible not to display the contractual coverage but to display just the contract conditions if no transaction data exist. For example, a data entry screen for initial registration corresponds to this. In this case, a predetermined contractual coverage appointed by the business program may be employed as an initial value.

Although, en example of constructing so that contractual coverage on contract conditions according to a clause ID is displayed on the screen is described in the above, it is possible to display just the contractual coverage ID or both the clause ID and the contractual coverage at the same time.

Although, dropdown menu and radio buttons are exemplified as tools for displaying the contractual coverage on contract conditions according to a clause ID in the above description, other entry display form may be used. For example, text boxes, check boxes and so on may also be used.

Although, dropdown menu and radio buttons and so on are exemplified as display formats for displaying the contractual coverage on contract conditions according to a clause ID in the above description, colors for display, display size, digit numbers of display or display positions and so on may be included therein.

Although, an example of using one display format table for the entire system is described in the above description, it is possible to construct display format tables for each of company IDs and may selectively use a display format in accordance with company ID recorded in the transaction data. Alternatively, clause IDs, user IDs and any other IDs may also be used instead of company IDs.

10. Other Embodiments 10-1. Common Use of Processing Code

In the first embodiment described in the above, the processing program is generated in accordance with a processing code generated for each data item and the combination data, the processing code corresponding to data item may be generated by making processing codes in common and incorporating data item and variable position corresponding to a class ID into the processing code. For example, information on data item "annuity class" and variable position "variable 1" specified from the processing name may be incorporated into a processing code for set-up when "annuity class set-up" is carried out.

10-2. Decentralization of Apparatus Structure

In the first embodiment described in the above, the data management apparatus is configured using the business program 2091 and the product definition program 2094 both installed inside of the data management apparatus 1, such management apparatus may be configured so that each of the programs is installed into separated computer devices. In this case, a processing program is generated by a computer device performing the product definition program 2094 on receipt of a request from a computer device executing the business program 2091. In this way, decentralized processing can be carried out by the computers each managing products and generating a processing program, so that processing load at each computer device can be decreased.

When a computer device performing the product definition program 2094 is configured, the data definition part storing a correspondence table of data content IDs and data contents and the processing definition part recording processing codes can respectively be realized by the combination data storage part 735 (FIG. 7) and by the processing code storage part 733 (FIG. 7). Correspondence table acquisition means specified by specification processing, processing code acquisition means for acquiring processing code and program generation means for generating a program according to the correspondence table and the processing code can respectively realized by the processing program generation part 731 (FIG. 7).

10-3. Hierarchization of Product Definition

In both the first embodiment shown in FIG. 7 and the second embodiment shown in FIG. 9, the data management apparatus is configured using the product definition program generated respectively for a clause ID (class ID), one product definition program capable of being used commonly to all the clause IDs (class IDs) may be used.

FIG. 11 shows a functional block diagram of the product definition program in this case. As illustrated in FIG. 11, the product definition program according to the present invention comprises a processing program generation part 110, a first hierarchy 111, a second hierarchy 112, and a third hierarchy 113. In the first hierarchy, the processing code storage part and the combination data storage part are recorded for each of product categories, the processing code storage part and the combination data storage part are stored for each of clause classes in the second hierarchy and the processing code storage part and the combination data storage part are recorded for each of clause versions in the third hierarchy.

Here, product categories, the clause classes and the clause versions are defined based on the clause IDs. For example, the clause ID "010101" can respectively specified the product category "01" 1111, the clause class "01" 1121 and the clause version "01" 1131 when the first and the second upper digit of the clause IDs show the product category, the third and the fourth upper digit thereof represent the clause class and the fifth and the sixth upper digit thereof show the clause version.

In the above described structure, such structure is created using an object-oriented language so that the third hierarchy inherits the second hierarchy, the second hierarchy inherits the first hierarchy respectively. In other words, it is defined that the first hierarchy is a parent object of the second object and the second hierarchy is a parent object of the third object. Therefore, the processing program generation part 110 can acquire both the processing code storage part and the combination data storage part defined in objects of the second hierarchy and the first hierarchy by accessing the third hierarchy in accordance with the clause ID.

This result in simplification of structure of the product definition body because the processing codes and the combination data stored in the product definition program can commonly recorded among each of class IDs. In addition, even when new products are added, the maintenance-ability of the apparatus can be increased because just the difference of the new product(s) and the current available products need to be created in a predetermined hierarchy.

In the life insurance industry and the like, especially, it must be dealt with as a different product with contract even if it is the product that has slight difference in its features. Also, it is necessary to continue managing such products with accuracy for a long period of time. Under the circumstances, application of the data management apparatus according to the present invention can increase the maintenance-ability by adding a clause version to the third hierarchy during the update of clause and adding product category of the first hierarchy and adding clause version of the second hierarchy during the addition of new product(s). No adjustment in business program is required with the addition/adjustment of product(s) because the product definition program for defining products and the business program for executing business application are configured separately.

When insurance products for plural companies (life insurance companies) are handled in one system, both the processing code and the combination data in a predetermined hierarchy may be created for each of the companies. For example, when clause class is set for each company in the second hierarchy, information identifying each company may be added to the clause class. In practice, such approach may be realized by composing the clause class (4 digits) of a company code (2 digits) and a clause code (2 digits) and then a processing code and combination data responding to each are created in the product definition body.

In this way, data management can be performed within the same system even when the company data is for plural companied each having different contract conditions in clause and contractual coverage. Such data management is suitable for outsourcing business or ASP business and the like which handle all data management for plurality of companies.

In the present invention the term "company" is not only a business enterprise as an organization carrying out similar economical activities in a continuous/systematic fashion for the purpose of profit, but also a concept including a group of companies composed of a plural enterprises carrying out economic activities with collaboration and an intra-farm group forming a predetermined group by which similar economic activities are carried out within the same business enterprise.

10-4. Application to Other Industry

In the above-described embodiments, while examples of applying the present invention to data management for insurance products mainly in the life insurance industry are described, the present invention is applicable to data management in other industry in the case of managing plural class of data having different data management items. FIG. 12 shows a correspondence table for applying management data, data class and data items in the life insurance industry to other industry.

For example, in the life insurance industry shown as a reference number 121 in FIG. 12, it is possible to manage data relates to "insurance contract" as management data, to handle data items relate to "annuity insurance" and "whole life insurance" as data class, to record data contents relate to "annuity class", "annuity payment period" as data items of "annuity insurance" and to record data contents relate to "step payment period, step payment ratio" as data items of "whole life insurance".

Similarly, in the bank industry shown as a reference number 124, it is possible to manage data relates to "derivative" as management data, to handle data items relate to "interest-rate swap" and "option" as data class, to record data contents relate to "class of applied interest-rate", "class of target applied interest-rate" as data items of "interest-rate swap" and to record data contents relate to "strike rate" as data items of "option".

Similar to the above, examples of data class and data items in the case of applying the present invention to other industries and their management data are shown as reference numerals 122, 123, 125 through 127 of FIG. 12. As described, the present invention is applicable to any industry or data management business which manage plural classes of data having different data management items.

10-5. Combination of Embodiments

The data management apparatus 1 may be constructed by selectively combining such apparatus described in the embodiments 1 through 9.

Alternatively, it is possible to selectively employ structure composed of a combination of the embodiments 1 through 9 or that composed of such combination and either one of the above described columns such as "10-2. Decentralization of apparatus structure" and "10-3. Hierarchization of product definition".

For example, the apparatus may be configured so that upon receipt of an instruction for updating contractual coverage from the application program, update processing of the contractual coverage is executed by acquiring a combination of a contractual coverage ID and a contractual coverage of a predetermined contract condition corresponding to the instruction and a program for update processing in accordance with the clause ID stored in the insurance policy data (the first embodiment), and then check processing is carried out by acquiring a check list and a program for check processing for performing logical check on two or more contractual coverage (the third embodiment).

In this case, alternatively, it is possible to configure the apparatus so that a wrapper program generating a program relating to both the update processing and check processing and executing thereof on receipt of a request from the business application is used (the second embodiment).

In addition, it is possible to configure the apparatus so that the structure in which the processing program is generated by incorporating data item and variable position corresponding to a class ID into the processing code (10-1. Common use of processing code), the structure in which the product definition program is executed by the computer devices separated ("10-2. Decentralization of apparatus structure") and the structure in which hierarchy structure is created in one product definition program in order to take over product definition (10-3. Hierarchization of product definition) can be combined respectively.

10-6. Others

Although, the structure in which both the processing code storage part and the combination data storage part are provided in the product definition program and a processing program is generated by acquiring the processing code and the combination data corresponding to the processing name is described in the above embodiments, it is possible to record just the processing code in the product definition program and acquire the processing code from the business program or other outer program and execute desires processing based on the program. In other words, the product definition program may deliver only a data content ID and data content to a program executing processing.

In the above described embodiments, the apparatus is configured so that a processing program generated in either of the program definition program and the clause definition program is delivered to an outer program, and the processing program is executed by a processing program execution part of the outer program, such processing program may be executed a processing program execution part provided in either of the program definition program and the clause definition program. In this case, either of the program definition program and the clause definition program may be configured so that a result of execution of the processing program is returned as a return value upon a request from the outer program. For example, the structure by which a processing program is executed in either of the program definition program and the clause definition program is effective when a processing program having a relatively lower processing load is carried out.

In the above described embodiments, each of the functions shown in FIG. 1 is realized by utilizing a CPU and software. However, a part of the functions and the whole functions may also be realized by hardware such as logic circuitry. In addition, a part of processing carried out the program(s) may also be executed by the operating system (OS).

While the invention is described above by way of preferable embodiments, the language used is not for limitation but for explanation and the person having ordinary skill in the art would recognize variation(s) and/or modification(s) of a system(s), an apparatus(es), a device(s) and a method(s) and other variation(s) and/or modification(s) within the scope and spirit of the present invention defined in the appended claims. It is, therefore, such variation(s) and/or modification(s) is considered within the scope of the present invention.

What is claimed is:

1. A data management apparatus comprising:

a data storage part storing plural data on a physical storage media each of which has at least a policy ID for specifying each insurance policy which is a contract between an insurer and an insured, a clause ID for specifying each type of the insurance policy-including specifying each insurance policy goods and a contractual coverage content ID for specifying contractual coverage, said data storage part having a policy ID storing region for storing the policy ID, a clause ID storing region for storing the clause ID and variable storing regions for storing contractual coverage IDs, each of said variable storing regions being identified by variable name, a correspondence definition part for storing correspondences between said each variable name and each contractual coverage item name, the correspondence definition part being provided for each clause ID for specifying each type of the insurance policy, a data definition part for storing data correspondences between said each contractual coverage ID and each contractual coverage, the data correspondence being provided for each clause ID and each contractual coverage item name, a means for obtaining data having a given policy ID from the data storage part, a means for construing data, including a CPU, the data processing including identifying the contractual coverage item name corresponding to the variable name in reference to the correspondence recorded in said correspondence definition part identified by the clause ID of said obtained data and obtaining the contractual coverage corresponding to the contractual coverage ID of said obtained data in reference to the data correspondence recorded in said data definition part identified by said identified contractual coverage item name of the variable name, thereby identifying the contractual coverage item name and the contractual coverage of said obtained data;

means for assessing whether two contractual coverages to be updated satisfy a predetermined condition that shows the two contractual coverages are possible in the same insurance policy, means for updating the data with the two contractual coverage referring to the correspondence definition part and the data definition part, when the assessing means judges that the two contractual coverage satisfy the predetermined condition, and wherein the data management apparatus judges whether a combination of the contractual coverage ID and the contractual coverage to be processed is appropriate or not based on appropriate combinations of the contractual coverage IDs and the contractual coverages.

2. The data management apparatus according to claim 1, wherein definition storing part is provided for each clause ID, said definition storing part having storing part for storing processing program for each processing name, wherein said correspondence definition part selectively stores the data item names which are used in the processing program, said correspondence definition part being provided for said each processing name, wherein said data processing means processes the data in response to receive the processing name and the policy ID, wherein said data processing means obtains the processing program corresponding to said given processing name from the definition storing part corresponding to the clause ID of the data having the given policy ID, identifies the data item name used in said processing program in reference to the definition storing part corresponding to the given processing name of the definition storing part corresponding to the clause ID of the data having the given policy ID and obtaining the contractual coverage corresponding to the contractual coverage ID of the obtained data based on said obtained data item name in reference to the data definition part corresponding to said given processing name of the definition storing part corresponding to the clause ID of the data having the given policy ID thereby deciding the data item name and the contractual coverage of the obtained data having said given policy ID, wherein said processing means selectively obtains the contractual coverage corresponding to the contractual coverage item name which is necessary to carry out said obtained processing program of said given processing name from the data having the given policy ID and carries out said obtained processing program using said obtained contractual coverage.

3. A computer-readable medium storing a data management program, said computer having (a) a data storage part storing plural data each of which has at least a policy ID for specifying each insurance policy which is a contract between an insurer and an insured, a clause ID for specifying each type of the insurance policy, including specifying each insurance policy goods and a contractual coverage ID for specifying contractual coverage, said data storage part having a policy ID storing region for storing the policy ID, a clause ID storing region for storing the clause ID and variable storing regions for storing contractual coverage IDs, each of said variable storing regions being identified by variable name, (b) a correspondence definition part for storing correspondences between said each variable name and each data item name, the correspondence definition part being provided for each clause ID, (c) a data definition part for storing data correspondences between said each contractual coverage ID and each contractual coverage, the data correspondence being provided for each clause ID and each contractual coverage item name, said management program carrying out the steps of:

obtaining data having a given policy ID from the data storage part, processing data, the data processing including identifying the contractual coverage item name corresponding to the variable name in reference to the correspondence recorded in said correspondence definition part identified by the clause ID of said obtained data and obtaining the contractual coverage corresponding to the contractual coverage ID of said obtained data in reference to the data correspondence recorded in said data definition part identified by said identified data item name of the variable name, thereby identifying the contractual coverage item name and the contractual coverage of said obtained data;

assessing whether two contractual coverages to be updated satisfy a predetermined condition that shows the two contractual coverages are possible in the same insurance policy, updating the data with the two contractual coverage referring to the correspondence definition part and the data definition part, when the assessing means judges that the two contractual coverage satisfy the predetermined condition, and wherein the data management program judges whether a combination of the contractual coverage ID and the contractual coverage to be processed is appropriate or not based on appropriate combinations of the contractual coverage IDs and the contractual coverages.

4. The computer-readable medium storing data management program according to claim 3, wherein definition storing part is provided for each clause ID, said definition storing part having storing part for storing processing program for each processing name, wherein said correspondence definition part selectively stores the data item names which are used in the processing program, said correspondence definition part being provided for said each processing name, wherein said data processing means processes the data in response to receive the processing name and the policy ID, wherein said data processing means obtains the processing program corresponding to said given processing name form the definition storing part corresponding to the clause ID of the data having the given policy ID, identifies the data item name used in said processing program in reference to the definition storing part corresponding to the given processing name of the definition storing part corresponding to the clause ID of the data having the given policy ID and obtaining the contractual coverage corresponding to the contractual coverage ID of the obtained data based on said obtained data item name in reference to the data definition part corresponding to said given processing name of the definition storing part corresponding to the clause ID of the data having the given policy ID thereby deciding the data item name and the contractual coverage of the obtained data having said given policy ID, wherein said processing means selectively obtains the contractual coverage corresponding to the contractual coverage item name which is necessary to carry out said obtained processing program of said given processing name from the data having the given policy ID and carries out said obtained processing program using said obtained contractual coverage.

5. The computer-readable medium storing data management program according to claim 4, wherein the definition storing part stores a processing code for executing processing for checking whether a combination of contractual coverage corresponding to at least two contractual coverage item names is appropriate or not and appropriate combinations of the contractual coverage IDs and the contractual coverages, wherein the data management program obtains from the definition storing part the processing code together with the appropriate combinations of the contractual coverage IDs and the contractual coverages, and wherein the data management program judges whether combination of the contractual coverage ID and the contractual coverage to be processed is appropriate or not based on the appropriate combinations of the contractual coverage IDs and the contractual coverages.

* * * * *